US010669483B2

(12) United States Patent
Tong et al.

(10) Patent No.: US 10,669,483 B2
(45) Date of Patent: Jun. 2, 2020

(54) POLYMERISABLE COMPOUNDS AND THE USE THEREOF IN LIQUID-CRYSTAL DISPLAYS

(71) Applicant: MERCK PATENT GMBH, Darmstadt (DE)

(72) Inventors: Qiong Tong, Darmstadt (DE); Helga Haas, Lampertheim (DE); Thorsten Kodek, Moerfelden-Walldorf (DE); Peer Kirsch, Seeheim-Jugenheim (DE); Constanze Brocke, Gross-Gerau (DE); Eveline Baron, Darmstadt (DE); Christoph Marten, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 60 days.

(21) Appl. No.: 15/544,157

(22) PCT Filed: Dec. 17, 2015

(86) PCT No.: PCT/EP2015/002547

§ 371 (c)(1),
(2) Date: Jul. 17, 2017

(87) PCT Pub. No.: WO2016/116119

PCT Pub. Date: Jul. 28, 2016

(65) Prior Publication Data

US 2018/0010046 A1 Jan. 11, 2018

(30) Foreign Application Priority Data

Jan. 19, 2015 (EP) .................................... 15000133

(51) Int. Cl.

| | |
|---|---|
| ***G02F 1/1333*** | (2006.01) |
| ***C09K 19/44*** | (2006.01) |
| ***C09K 19/32*** | (2006.01) |
| ***C09K 19/34*** | (2006.01) |
| ***C09K 19/42*** | (2006.01) |
| *C09K 19/04* | (2006.01) |
| *C09K 19/12* | (2006.01) |
| *C09K 19/30* | (2006.01) |

(52) U.S. Cl.

CPC .............. *C09K 19/44* (2013.01); *C09K 19/32* (2013.01); *C09K 19/322* (2013.01); *C09K 19/3483* (2013.01); *C09K 19/42* (2013.01); *C09K 2019/0448* (2013.01); *C09K 2019/0481* (2013.01); *C09K 2019/122* (2013.01); *C09K 2019/123* (2013.01); *C09K 2019/124* (2013.01); *C09K 2019/301* (2013.01); *C09K 2019/3009* (2013.01); *C09K 2019/3016* (2013.01)

(58) Field of Classification Search

CPC ...... C09K 19/44; C09K 19/32; C09K 19/322; C09K 19/3483; C09K 19/42; C09K 2019/0448; C09K 2019/0481; C09K 2019/122; C09K 2019/123; C09K 2019/124; C09K 2019/3009; C09K 2019/301; C09K 2019/3016; G02F 1/1333

USPC ..................................................... 252/299.61

See application file for complete search history.

(56) References Cited

U.S. PATENT DOCUMENTS

| | | | | |
|---|---|---|---|---|
| 7,608,659 | B2 * | 10/2009 | Taki ........................ | C08F 20/36 524/495 |
| 8,349,210 | B2 * | 1/2013 | Xu ....................... | C07D 401/12 252/299.01 |
| 2004/0011996 | A1 | 1/2004 | Klasen Memmer | |
| 2005/0192419 | A1 | 9/2005 | Debaud | |
| 2012/0003401 | A1 | 1/2012 | Xu | |
| 2012/0027960 | A1 | 2/2012 | Xu | |
| 2013/0314655 | A1 | 11/2013 | Archetti | |

FOREIGN PATENT DOCUMENTS

| | | | |
|---|---|---|---|
| JP | 05708966 | B | 4/2015 |
| JP | 05708967 | B | 4/2015 |
| WO | 2010012363 | A1 | 2/2010 |

OTHER PUBLICATIONS

International Search Report PCT/EP2015/002547 dated Apr. 15, 2016.
English machine translation of JP05708967B2 issued Apr. 30, 2015 to Dainippon Ink Inc.
English machine translation of JP05708966B2 issued Apr. 30, 2015 to Dainippon Ink Inc.

* cited by examiner

*Primary Examiner* — Geraldina Visconti
(74) *Attorney, Agent, or Firm* — Millen White Zelano and Branigan, PC; Csaba Henter

(57) ABSTRACT

The present invention relates to polymerisable compounds, to processes and intermediates for the preparation thereof, to liquid-crystal (LC) media comprising them, and to the use of the polymerisable compounds and LC media for optical, electro-optical and electronic purposes, in particular in LC displays, especially in LC displays of the polymer sustained alignment type.

26 Claims, No Drawings

POLYMERISABLE COMPOUNDS AND THE USE THEREOF IN LIQUID-CRYSTAL DISPLAYS

The present invention relates to polymerisable compounds, to processes and intermediates for the preparation thereof, to liquid-crystal (LC) media comprising them, and to the use of the polymerisable compounds and LC media for optical, electro-optical and electronic purposes, in particular in LC displays, especially in LC displays of the polymer sustained alignment type.

BACKGROUND OF THE INVENTION

A liquid crystal display mode which has meanwhile found widespread interest and commercial use is the so-called PS ("polymer sustained") or PSA ("polymer sustained alignment") mode, for which the term "polymer stabilised" is also occasionally used. In PSA displays an LC medium is used that contains an LC mixture (hereinafter also referred to as "host mixture") and a small amount, for example 0.3% by weight and typically <1% by weight, of one or more polymerisable compounds, preferably polymerisable monomeric compounds. After filling the LC medium into the display, the polymerisable compounds are polymerised or crosslinked in situ, usually by UV photopolymerisation, optionally while a voltage is applied to the electrodes of the display. The polymerisation is carried out at a temperature where the LC medium exhibits a liquid-crystal phase, usually at room temperature. The addition of polymerisable mesogenic or liquid-crystalline compounds, also known as reactive mesogens or "RMs", to the LC host mixture has proven particularly suitable.

The PS(A) mode is meanwhile used in various conventional LC display types. Thus, for example, PS-VA ("vertically aligned"), PS-OCB ("optically compensated bend"), PS-IPS ("in-plane switching"), PS-FFS ("fringe-field switching"), PS-UB-FFS ("Ultra Brightness FFS) and PS-TN ("twisted nematic") displays are known. The polymerisation of the RMs preferably takes place with an applied voltage in the case of PS-VA and PS-OCB displays, and with or without, preferably without, an applied voltage in the case of PS-IPS displays. As a result a pretilt angle of the LC molecules is generated in the display cell. In case of PS-OCB displays, for example, it is possible for the bend structure to be stabilised so that an offset voltage is unnecessary or can be reduced. In case of PS-VA displays, the pretilt has a positive effect on the response times. For PS-VA displays, a standard MVA ("multidomain VA") or PVA ("patterned VA") pixel and electrode layout can be used. It is also possible to use only one structured electrode without protrusions, which significantly simplifies production and improves contrast and transparency.

Furthermore, the so-called posi-VA mode ("positive VA") has proven to be particularly suitable. Like in conventional VA and PS-VA displays, the initial orientation of the LC molecules in posi-VA displays is homeotropic, i.e. substantially perpendicular to the substrates, in the initial state when no voltage is applied. However, in contrast to conventional VA and PS-VA displays, in posi-VA displays LC media with positive dielectric anisotropy are used. Like in IPS and PS-IPS displays, the two electrodes in posi-VA displays are arranged only on one of the two substrates, and preferably exhibit intermeshed, comb-shaped (interdigital) structures. Upon application of a voltage to the interdigital electrodes, which create an electrical field that is substantially parallel to the layer of the LC medium, the LC molecules are switched to an orientation substantially parallel to the substrates. In posi-VA displays, a polymer stabilisation by addition of RMs to the LC medium, which are then polymerised in the display, has also proven to be advantageous. Thereby a significant reduction of the switching times can be achieved.

PS-VA displays are described for example in EP1170626 A2, U.S. Pat. Nos. 6,861,107, 7,169,449, US 2004/0191428A1, US2006/0066793A1 and US2006/0103804A1. PS-OCB displays are described for example in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described for example in U.S. Pat. No. 6,177,972 and Appl. Phys. Lett. 1999, 75(21), 3264. PS-TN displays are described for example in Optics Express 2004, 12(7), 1221.

PSA displays can be operated as either active-matrix or passive-matrix displays. In case of active-matrix displays individual pixels are usually addressed by integrated, non-linear active elements like for example transistors (such as thin-film transistors or "TFTs"), whereas in passive-matrix displays individual pixels are usually addressed by the multiplex method as known from prior art.

A PSA display may also comprise an alignment layer on one or both of the substrates forming the display cell. The alignment layer is usually applied on the electrodes (in case such electrodes are present) such that it is in contact with the LC medium and induces initial alignment of the LC molecules. The alignment layer may comprise or consist of, for example, a polyimide, which may also be rubbed or prepared by a photoalignment method.

In particular for monitor and especially TV applications optimisation of the response times, but also of the contrast and luminance (and thus transmission) of the LC display is still desired. The PSA method can provide significant advantages here. Especially in case of PS-VA, PS-IPS, PS-FFS and PS-posi-VA displays, a shortening of the response times, which correlate with a measurable pretilt in test cells, can be achieved without significant adverse effects on other parameters.

Prior art has suggested biphenyl diacrylates or dimethacrylates, which are optionally fluorinated, as polymerisable compounds for use in PSA displays.

However, the problem arises that not all combinations of LC host mixture and polymerisable compounds are suitable for use in PSA displays because, for example, only inadequate tilt angles or no tilt angles at all could be generated or because, for example, the voltage holding ratio (VHR) is inadequate for TFT display applications. In addition, it has been found that the LC mixtures and polymerisable compounds known from prior art still have some disadvantages when used in PSA displays. Thus, not every known polymerisable compound which is soluble in the LC host mixture is suitable for use in PSA displays. In addition, it is often difficult to find a suitable selection criterion for the polymerisable compound besides direct measurement of the pretilt in the PSA display. The choice of suitable polymerisable compounds becomes even smaller if UV photopolymerisation without the addition of photoinitiators is desired, which is advantageous for certain applications.

In addition, the selected combination of LC host mixture/polymerisable compound should have a low rotational viscosity and good electrical properties, in particular a high VHR. In PSA displays, a high VHR after irradiation with UV light is particularly important, because UV exposure does not only occur as normal exposure during operation of the finished display, but is also a necessary part of the display production process.

In particular, it is desirable to have available improved materials for PSA displays which produce a particularly small pretilt angle. Preferred materials are those which, compared to prior art materials, can generate a lower pretilt angle after the same exposure time, and/or can generate at least the same pretilt angle after a shorter exposure time. This would allow reducing the display production time ("tact time") and production costs.

Another problem observed in prior art is that LC media for use in PSA displays, including but not limited to displays of the PSA type, do often exhibit high viscosities and, as a consequence, high switching times. In order to reduce the viscosity and response time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photopolymerisation of the polymerisable compounds in the PSA display is usually carried out by exposure to UV radiation, which may cause a VHR drop in the LC medium.

Another problem to be solved is that the RMs of prior art, which are used as polymerised compounds in PSA displays, do often have high melting points, and do only show limited solubility in many commonly used LC mixtures. As a result these RMs tend to spontaneously crystallise out of the LC mixture. In addition, the risk of spontaneous polymerisation prevents that the LC host mixture can be warmed in order to better dissolve the RMs, so that a high solubility even at room temperature is required. In addition, there is a risk of phase separation, for example when filling the LC medium into the LC display (chromatography effect), which may greatly impair the homogeneity of the display. This is further aggravated by the fact that the LC media are usually filled in the display at low temperatures in order to reduce the risk of spontaneous polymerisation (see above), which in turn has an adverse effect on the solubility.

Another problem in the production of PSA displays is the presence and removal of residual amounts of monomers which did not polymerise during the polymerisation step that is necessary for generation of the pretilt angle in the display. These unpolymerised monomers may adversely affect the properties of the display, for example by polymerising in an uncontrolled manner during display operation.

Thus, the PSA displays known from prior art often exhibit the undesired effect of so-called "image sticking" or "image burn", i.e. the image produced in the LC display by temporary addressing of individual pixels still remains visible even after the electric field in these pixels has been switched off, or after other pixels have been addressed.

Image sticking can occur for example if LC host mixtures having a low VHR are used. The UV component of daylight or the display backlight can cause undesired decomposition reactions of the LC molecules and initiate the production of ionic or free-radical impurities. These can accumulate in particular at the electrodes or the alignment layers, where they reduce the effective applied voltage. This effect can also be observed in conventional LC displays without a polymer component.

An additional image sticking effect caused by the presence of unpolymerised monomers is often observed in PSA displays. Uncontrolled polymerisation of residual monomers can be initiated by UV light from the environment or the display backlight. In the switched display areas, this can change the tilt angle after a number of addressing cycles. As a result, a change in transmission in the switched areas may occur, while transmission remains unchanged in the non-switched areas.

During production of the PSA display it is therefore desirable that polymerisation of the monomers proceeds as completely as possible and the presence of unpolymerised monomers in the display can be excluded or reduced to a minimum. Thus, polymerisable monomers and LC host mixtures are required which enable or support quick and complete polymerisation. In addition, a controlled reaction of the residual monomer amounts is desirable. This could be achieved by providing improved polymerisable compounds that polymerise quicker and more effectively than the materials of prior art.

A further problem that has been observed in PSA displays is an un-sufficient pretilt angle stability. Thus, it was observed that the generated pretilt angle in the display does not remain constant but can deteriorate after the display was subjected to voltage stress during display operation. This can negatively affect the display performance, e.g. by increasing the black state transmission and hence lowering the contrast.

Another problem observed in prior art is that the use of conventional LC media in LC displays, including but not limited to displays of the PSA type, often leads to the occurrence of mura in the display, especially when the LC medium is filled in the display by using the one drop filling (ODF) method. This phenomenon is also known as "ODF mura". It is therefore desirable to provide LC media which lead to reduced ODF mura.

Another problem observed in LC displays, including but not limited to PSA type displays, is the so-called "frame mura". This may occur at the edges of the display cell where the LC medium is in contact with the sealant material which is used to connect the two substrates of the display cell and seal the edges, and which can cause orientation defects in the LC layer. The sealant material typically contains acrylates that are cured by UV photopolymerisation using appropriate photoinitiators after the LC medium has been filled into the display cell. Therefore, in PSA displays there is also the problem that the polymerisable compounds contained in the LC medium can show undesired pre-polymerisation during the curing process of the sealant material.

In order to suppress undesired pre-polymerisation of the polymerisable compounds in LC media for PSA displays, it is possible to add small molecule inhibitors to the LC medium. However, this can lead to undesired impurities in the display.

There is thus still a great demand for PSA displays and LC media and polymerisable compounds for use in such displays, which have improved properties and can help to avoid the drawbacks as described above completely or at least partially.

In particular, it is desirable to provide improved PSA displays and LC media, and LC host mixtures, polymerisable compounds or components used therein, wherein the polymerisable compounds should have low melting points and high solubility in the LC host mixture, and wherein the LC media and PSA displays show one or more of the following improvements: High specific resistance, high VHR values and high reliability especially after UV and/or heat exposure, low threshold voltage, large working-temperature range, low viscosity, short response times even at low temperatures, high birefringence, good UV absorption especially at longer wavelengths, quick and complete polymerisation of the polymerisable compounds, reduced undesired pre-polymerisation of the polymerisable compounds, quick generation of a low pretilt angle, high stability of the pretilt angle even after long operation time and after UV or heat exposure, reduced image sticking, reduced ODF mura and reduced frame mura in the display, a multiplicity of grey shades, high contrast and a broad viewing angle.

The present invention is based on the object of providing novel suitable materials, in particular polymerisable compounds or components, LC host mixtures, and LC media comprising the same, for use in PSA displays, which do not have the disadvantages and drawbacks observed in the LC media and displays of prior art as described above, and which show one or more of the above mentioned desired improvements.

The present invention is also based on the object of providing LC media for use in PSA displays, which enable high specific resistance values, low viscosity and high VHR while enabling quick and complete polymerisation of the polymerisable compounds.

A further object of the invention is the provision of novel and improved polymerisable compounds, which are in particular suitable for optical, electro-optical and electronic applications, and of suitable synthesis processes and intermediates for the preparation of the novel polymerisable compounds.

The above objects have been achieved in accordance with the present invention by materials and processes as described and claimed hereinafter.

It has surprisingly been found that at least some of the above-mentioned problems can be solved, and one or more of the above-mentioned improvements can be achieved, by using polymerisable compounds and/or LC media as disclosed and claimed hereinafter, especially by using an LC medium which comprises an LC host mixture and a polymerisable component, wherein the polymerisable component comprises or consists of one or more compounds of formula I as described below, and preferably comprises one or more RMs.

The compounds of formula I are characterized in that they contain a stabilizing functional group that is capable of catching free radicals, and additionally contain one or more polymerizable functional groups. The stabilising group is for example 2,6-di-t-butylphenol, or a hindered amine light stabiliser (HALS) group, such as 2,2,6,6-tetraalkylpiperidinyl-oxy (NO-HALS), 2,2,6,6-tetraalkylpiperidinyl-hydroxy or 2,2,6,6-tetraalkylpiperidinyl. Compared to non-polymerizable stabilizers as known from prior art, the polymerizable stabilizers of formula I provide advantages like delayed polymerization, higher reliability and higher VHR values after the PSA process.

It was surprisingly found that the use of a polymerisable component and an LC medium comprising it, as claimed and described hereinafter, in PSA displays allows good control of the polymerisation and tilt generation process. Thus, it was found that the use of a compound of formula I, optionally together with a conventional RM, leads to a delay of the polymerisation and pretilt generation process, because the compound of formula I acts as an inhibitor that catches free radicals which start the polymerisation process. After the delay phase, polymerisation and tilt generation proceed without significant negative influence on the desired low pretilt and low amount of residual monomer finally achieved, which are comparable to an LC medium without the stabilising compound of formula I.

The use of a polymerisable component and an LC medium comprising it as described and claimed hereinafter in PSA displays also allows to suppress undesired, process-induced pre-polymerisation, for example during the curing process of the sealant material, which is expected to reduce frame mura.

The polymerisable component and LC medium of the present invention also enable a greater flexibility in varying the process conditions and broadening the process window, for example with respect to monomer concentration, LC host mixture composition, UV irradiation intensity, irradiation time, lamp spectrum, temperature, voltage or alignment layer material.

In addition, the compounds of formula I can also be used to replace small molecule stabilisers that are often added to the LC medium to prevent undesired spontaneous polymerisation of the polymerisable component for example during storage or transport.

Finally, the use of the polymerisable component and LC medium according to the present invention in PSA displays allows a complete UV-photopolymerisation reaction, controlled generation of large and stable pretilt angles, reduces image sticking and mura in the display, enables high VHR values after UV photopolymerisation, especially in case of LC host mixtures containing LC compounds with an alkenyl group, and enables to achieve fast response times, a low threshold voltage and a high birefringence.

US2005/0192419A1 discloses 2,2,6,6-tetramethylpiperidinyloxyacrylate and 2,2,6,6-tetramethylpiperidinyloxymethacrylate and their use in scorch-retardant compositions, but does neither disclose nor suggest the use of these compounds in LC media or PSA displays.

SUMMARY OF THE INVENTION

The invention relates to an LC medium comprising one or more compounds of formula I $$\text{P-Sp-(A}^2\text{-Z}^2\text{-A}^1)_{m1}\text{-Z}^1\text{-T} \qquad \text{I}$$

wherein the individual radicals, independently of each other, and on each occurrence identically or differently, have the following meanings T a group selected from the following formulae (1)

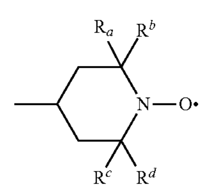

(2)

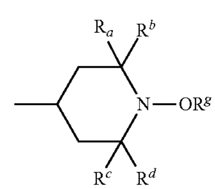

(3)

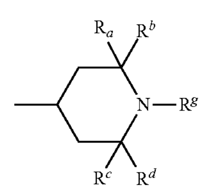

-continued (4)

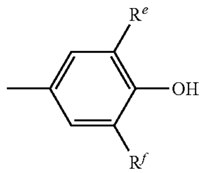

$R^{a-f}$ straight chain or branched alkyl with 1 to 10 C atoms, preferably with 1 to 6 C atoms, very preferably with 1 to 4 C atoms, $R^g$ H or straight chain or branched alkyl with 1 to 10 C atoms, preferably with 1 to 6 C atoms, very preferably with 1 to 4 C atoms, or benzyl, most preferably H, P vinyloxy, acrylate, methacrylate, fluoroacrylate, chloroacrylate, oxetane or epoxy, preferably acrylate or methacrylate, Sp a spacer group or a single bond, $A^1$, $A^2$ an alicyclic, heterocyclic, aromatic or heteroaromatic group with 4 to 30 ring atoms, which may also contain fused rings, and is optionally substituted by one or more groups L or R-$(A^3$-$Z^3)_{m2}$-, and one of $A^1$ and $A^2$ may also denote a single bond, $A^3$ an alicyclic, heterocyclic, aromatic or heteroaromatic group with 4 to 30 ring atoms, which may also contain fused rings, and is optionally substituted by one or more groups L, $Z^1$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_n$—, —$CF_2CH_2$—, —$CH_2CF_2$—, —$(CF_2)_n$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^{00}R^{000}$—, or a single bond, with the proviso that, if m1 is 0 and Sp is a single bond, $Z^1$ is a single bond, $Z^2$, $Z^3$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_n$—, —$CF_2CH_2$—, —$CH_2CF_2$—, —$(CF_2)_n$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^{00}R^{000}$—, or a single bond, $R^{00}$, $R^{000}$ H or alkyl having 1 to 12 C atoms, R P-Sp-, H, F, Cl, CN, or straight chain, branched or cyclic alkyl having 1 to 25 C atoms, wherein one or more non-adjacent $CH_2$— groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or P-Sp-, or a group selected from formula 1, 2, 3 and 4, L P-Sp-, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or P-Sp-, or a group selected from formula 1, 2, 3 and 4, m1 0, 1, 2, 3 or 4, m2 0, 1, 2, 3 or 4, n 1, 2, 3 or 4.

The invention further relates to a polymerisable material comprising a compound of formula I and a polymerisable compound that is different from formula I and is preferably selected from reactive mesogens. The polymerisable material can be used for example as polymerisable component in an LC medium.

The invention further relates to an LC medium comprising one or more polymerisable compounds, at least one of which is a compound of formula I.

The invention further relates to an LC medium comprising two or more polymerisable compounds, or comprising a polymerisable component comprising two or more polymerisable compounds, wherein at least one of said two or more polymerisable compounds is a compound of formula I, and at least one other of the said two or more polymerisable compounds is different from formula I.

The invention further relates to the use of compounds of formula I as polymerisable compounds in LC media and LC displays, especially in the LC medium, active layer or alignment layer of an LC display, wherein the LC displays are preferably PSA displays.

The invention further relates to novel compounds of formula I, preferably wherein m1 is different from 0 and/or T is a group of formula (1), (2) or (3).

The invention further relates to methods for preparing compounds of formula I, and to novel intermediates used or obtained in these methods.

The invention furthermore relates to an LC medium comprising a polymerisable component A) comprising one or polymerisable compounds, at least one of which is a compound of formula I, and a liquid-crystalline component B), hereinafter also referred to as "LC host mixture", comprising, preferably consisting of, one or more mesogenic or liquid-crystalline compounds.

The invention preferably relates to an LC medium comprising a polymerisable component A) comprising two or more polymerisable compounds, at least one of which is a compound of formula I, and at least one other of which is different from formula I, a liquid-crystalline component B), hereinafter also referred to as "LC host mixture", comprising, preferably consisting of, one or more mesogenic or liquid-crystalline compounds.

The liquid-crystalline component B) of an LC medium according to the present invention is hereinafter also referred to as "LC host mixture", and preferably comprises one or more, preferably at least two mesogenic or LC compounds selected from low-molecular-weight compounds which are unpolymerisable.

The invention furthermore relates to an LC medium as described above and below, wherein the LC host mixture or component B) comprises at least one mesogenic or LC compound comprising an alkenyl group.

The invention furthermore relates to an LC medium or LC display as described above and below, wherein the compounds of formula I, or the polymerisable compounds of component A), are polymerised.

The invention furthermore relates to a process for preparing an LC medium as described above and below, comprising the steps of mixing one or more mesogenic or LC compounds, or an LC host mixture or LC component B) as described above and below, with one or more compounds of formula I, and optionally with further LC compounds and/or additives.

The invention furthermore relates to the use of compounds of formula I and LC media according to the invention in PSA displays, in particular the use in PSA displays containing an LC medium, for the production of a tilt angle in the LC medium by in-situ polymerisation of the compound(s) of the formula I in the PSA display, preferably in an electric or magnetic field.

The invention furthermore relates to an LC display comprising one or more compounds of formula I or an LC medium according to the invention, in particular a PSA display, particularly preferably a PS-VA, PS-OCB, PS-IPS, PS-FFS, PS-UB-FFS, PS-posi-VA or PS-TN display.

The invention furthermore relates to an LC display comprising a polymer obtainable by polymerisation of one or more compounds of formula I or of a polymerisable component A) as described above, or comprising an LC medium according to the invention, which is preferably a PSA display, very preferably a PS-VA, PS-OCB, PS-IPS, PS-FFS, PS-UB-FFS, PS-posi-VA or PS-TN display.

The invention furthermore relates to an LC display of the PSA type comprising two substrates, at least one which is transparent to light, an electrode provided on each substrate or two electrodes provided on only one of the substrates, and located between the substrates a layer of an LC medium that comprises one or more polymerisable compounds and an LC component as described above and below, wherein the polymerisable compounds are polymerised between the substrates of the display.

The invention furthermore relates to a process for manufacturing an LC display as described above and below, comprising the steps of filling or otherwise providing an LC medium, which comprises one or more polymerisable compounds as described above and below, between the substrates of the display, and polymerising the polymerisable compounds.

The PSA displays according to the invention have two electrodes, preferably in the form of transparent layers, which are applied to one or both of the substrates. In some displays, for example in PS-VA, PS-OCB or PS-TN displays, one electrode is applied to each of the two substrates. In other displays, for example in PS-posi-VA, PS-IPS or PS-FFS or PS-UB-FFS displays, both electrodes are applied to only one of the two substrates.

In a preferred embodiment the polymerisable component is polymerised in the LC display while a voltage is applied to the electrodes of the display.

The polymerisable compounds of the polymerisable component are preferably polymerised by photo-polymerisation, very preferably by UV photo-polymerisation.

DETAILED DESCRIPTION OF THE INVENTION

Unless stated otherwise, the compounds of formula I are preferably selected from achiral compounds.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid-crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

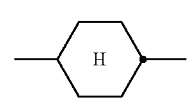

denotes a trans-1,4-cyclohexylene ring, and

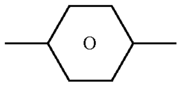

denotes a 1,4-phenylene ring.

Above and below “organic group” denotes a carbon or hydrocarbon group.

“Carbon group” denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term “hydrocarbon group” denotes a carbon group which additionally contains one or more H atoms and optionally one or more heteroatoms, such as, for example, N, O, S, B, P, Si, Se, As, Te or Ge.

“Halogen” denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms “alkyl”, “aryl”, “heteroaryl”, etc., also encompass polyvalent groups, for example alkylene, arylene, heteroarylene, etc.

The term “aryl” denotes an aromatic carbon group or a group derived therefrom. The term “heteroaryl” denotes “aryl” as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

A preferred substituent for the alicyclic, heterocyclic, aromatic and heteroaromatic groups is L as defined in formula I.

Preferred substituents L are selected from P-Sp-, F, Cl, —CN, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl.

Very preferred substituents L are, for example, F, Cl, CN, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$.

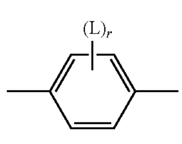

is preferably

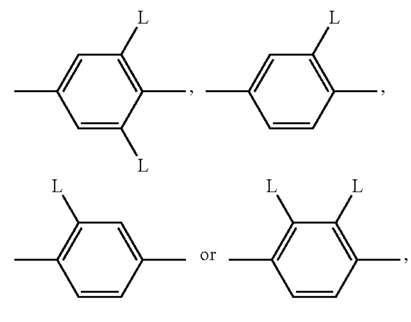

in which L has one of the meanings indicated above.

If the spacer group Sp is different from a single bond, it is preferably selected of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH═CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^2$═$CY^3$—, —C≡C—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}—O)_{p1}$—, in which p1 is an integer from 1 to 12, q1 is an integer from 1 to 3, and $R^0$ and $R^{00}$ have the meanings indicated above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

Preferably $R^{a-d}$ in formulae 1-3 are selected, independently of each other, from methyl, ethyl, n-propyl, isopropyl, n-butyl, isobutyl, t-butyl, very preferably methyl.

Preferably $R^a$, $R^b$, $R^c$ and $R^d$ in formulae 1-3 have the same meaning.

Preferably $R^e$ and $R^f$ in formula 4 are selected, independently of each other, from methyl, ethyl, n-propyl, isopropyl, n-butyl, t-butyl, very preferably methyl.

Preferably $R^e$ and $R^f$ in formula 4 have the same meaning.

In a preferred embodiment of the present invention $R^g$ in formula 2 is H.

In another preferred embodiment of the present invention $R^g$ in formula 2 is methyl, ethyl, propyl or butyl, very preferably methyl.

In a preferred embodiment of the present invention $R^g$ in formula 3 is H.

In another preferred embodiment of the present invention $R^g$ in formula 3 is methyl, ethyl, propyl or butyl, very preferably methyl.

Preferably m1 in formula I is 1, 2 or 3.

In another preferred embodiment of the present invention m1 in formula I is 0.

Preferably $Z^1$ in formula I denotes —CO—O—, —O—CO— or a single bond, very preferably —CO—O—.

Preferably $Z^2$ and $Z^3$ in formula I denote —CO—O—, —O—CO— or a single bond, very preferably a single bond.

Preferably P in formula I is an acrylate or methacrylate group.

Preferably Sp in formula I is a single bond.

Preferably $A^3$ in formula I denotes an aromatic or heteroaromatic group with 6 to 24 ring atoms, which may also contain fused rings, and is optionally substituted by one or more groups L.

Very preferably $A^3$ in formula I denotes benzene or naphthalene, which is optionally substituted by one or more groups L.

Preferably $A^1$ and $A^2$ in formula I denote an aromatic or heteroaromatic group with 6 to 24 ring atoms, which may also contain fused rings, and is optionally substituted by one or more groups L or R-$(A^3$-$Z^3)_{m2}$-, or $A^1$ is a singe bond.

Very preferably $A^1$ and $A^2$ in formula I denote benzene, naphthalene, phenanthrene or anthracene, which is optionally substituted by one or more groups L or R-$(A^3$-$Z^3)_{m2}$-, or $A^1$ is a singe bond.

Preferably -$(A^2$-$Z^2$-$A^1)_{m1}$- in formula I denotes benzene, biphenylene, p-terphenylene (1,4-diphenylbenzene), m-terphenylene (1,3-diphenylbenzene), naphthylene, 2-phenyl-naphthylene, phenanthrene or anthracene, all of which are optionally substituted by one or more groups L.

Very preferably -$(A^2$-$Z^2$-$A^1)_{m1}$- denotes biphenylene, p-terphenylene or m-terphenylene, all of which are optionally substituted by one or more groups L.

Preferred groups -$(A^2$-$Z^2$-$A^1)_{m1}$- are selected from the following formulae

A1

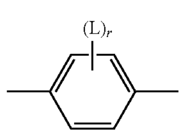

A2

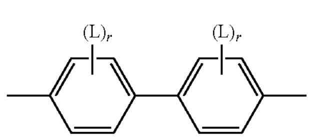

-continued

A3

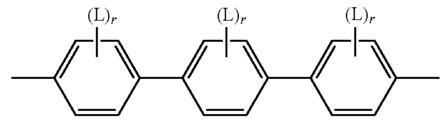

A4

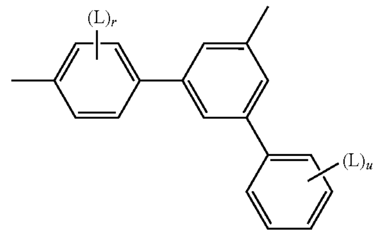

A5

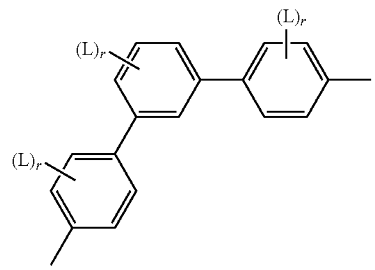

A6

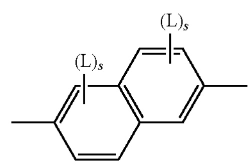

A7

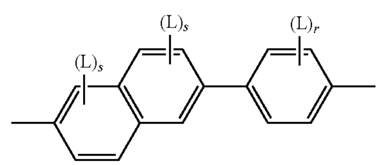

A8

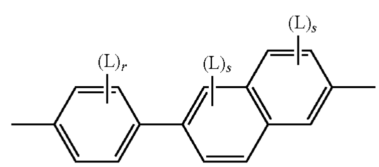

A9

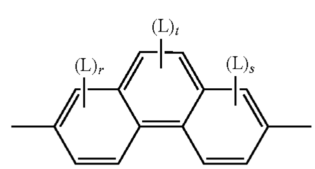

A10

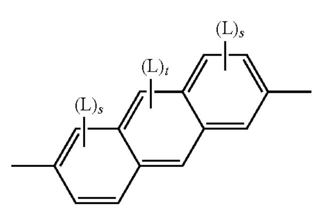

wherein L is as defined in formula I or has one of the preferred meanings as described above and below, r is 0, 1, 2, 3 or 4, s is 0, 1, 2 or 3, t is 0, 1 or 2, and u is 0, 1, 2, 3, 4 or 5.

Particular preference is given to the groups of formula A1, A2, A3, A4 and A5.
In another preferred embodiment $-(A^2-Z^2-A^1)_{m1}-$ is a single bond.
Preferred compounds of formula I are selected from the following subformulae
I1-1
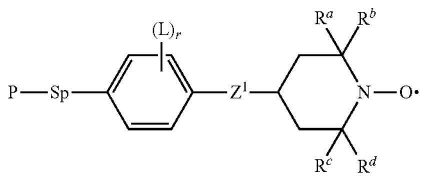
I1-2
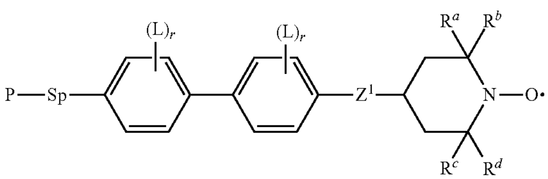
I1-3
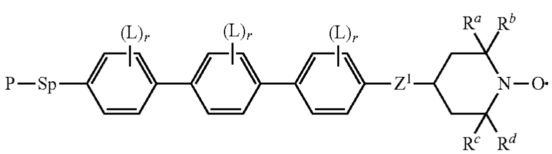
I1-4
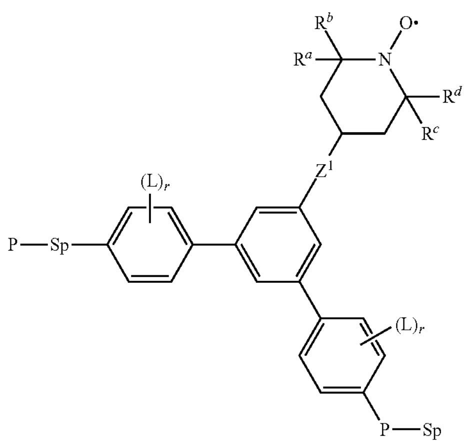
I1-5
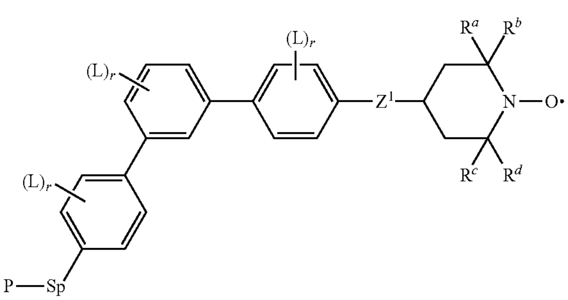
-continued
I1-6
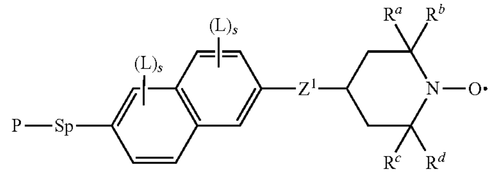
I1-7
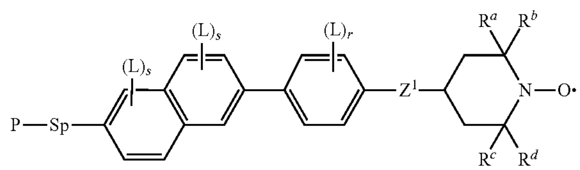
I1-8
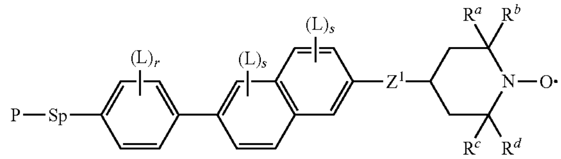
I1-9
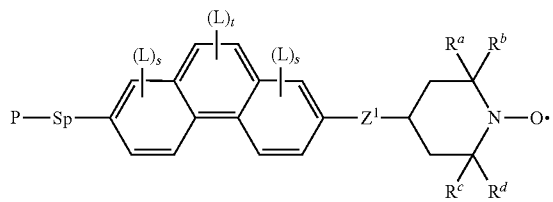
I1-10
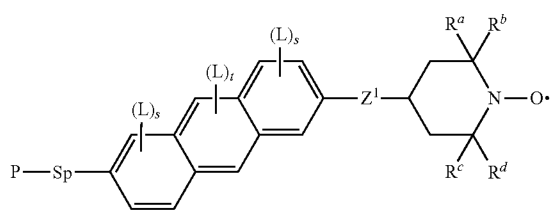
I1-11
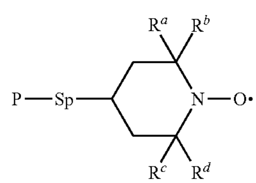
I2-1
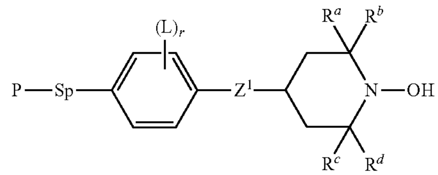
I2-2
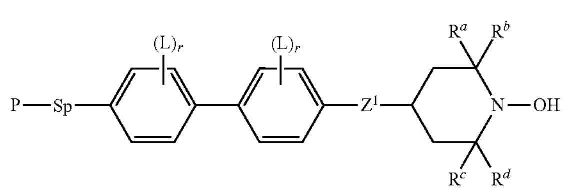

-continued
I2-3
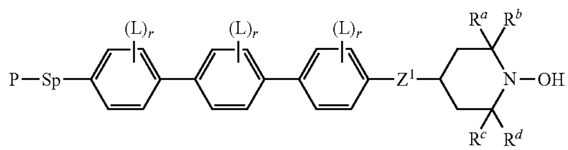
I2-4
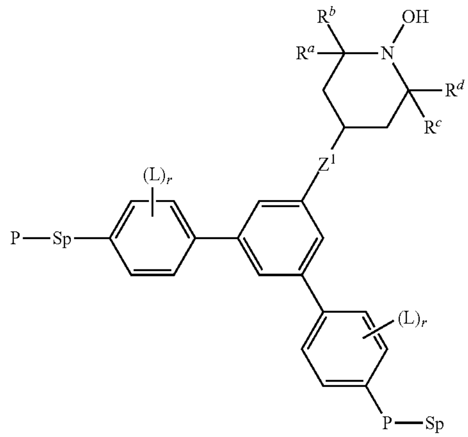
I2-5
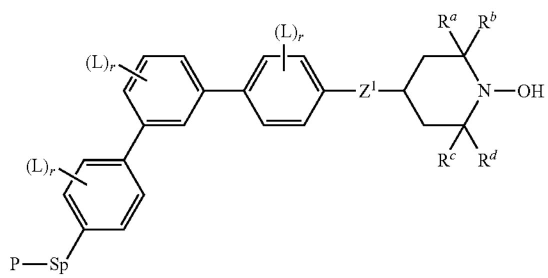
I2-6
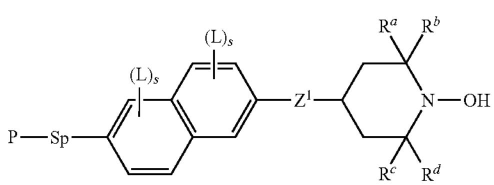
I2-7
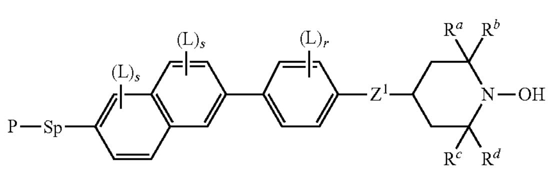
I2-8
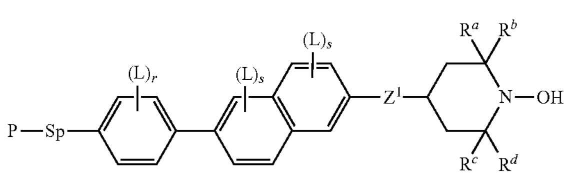
-continued
I2-9
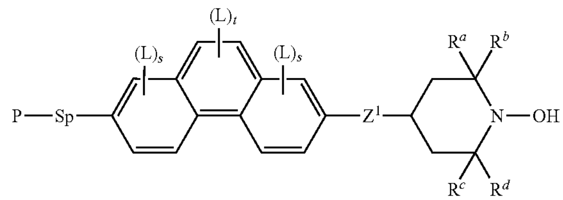
I2-10
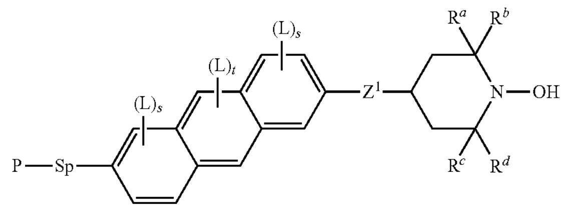
I2-11
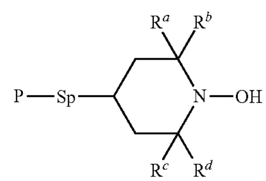
I3-1
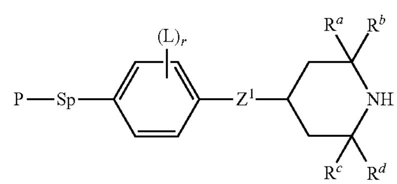
I3-2
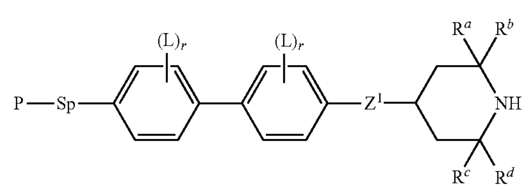
I3-3
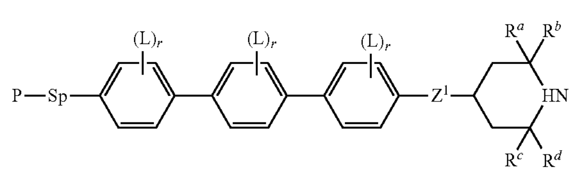

-continued
I3-4
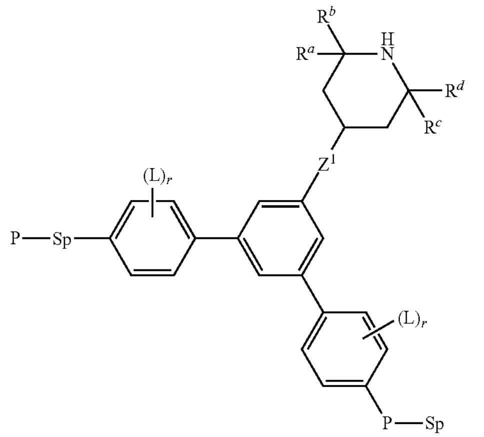
I3-5
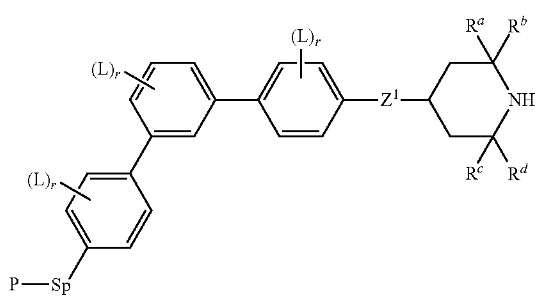
I3-6
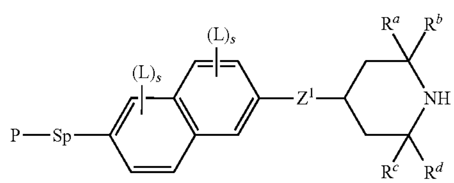
I3-7
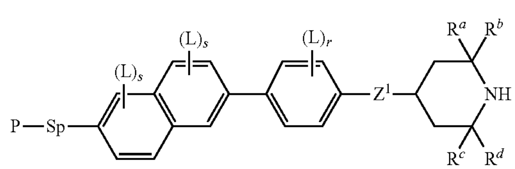
I3-8
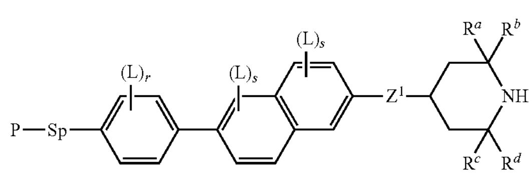
I3-9
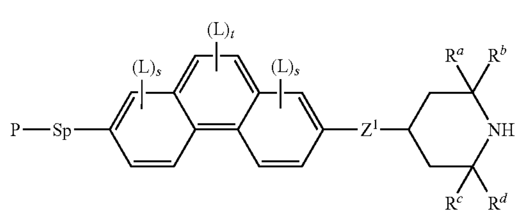
-continued
I3-10
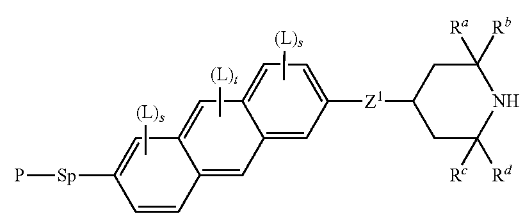
I3-11
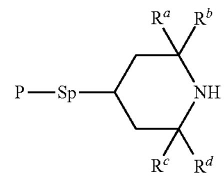
I3-12
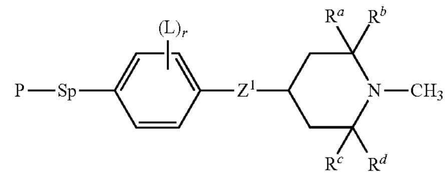
I3-13
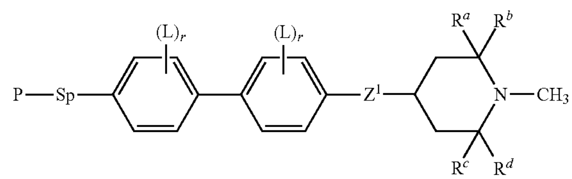
I3-14
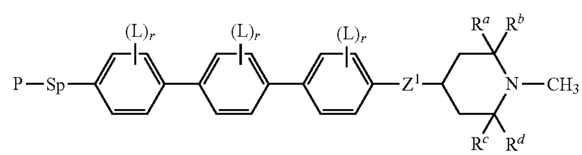
I3-15
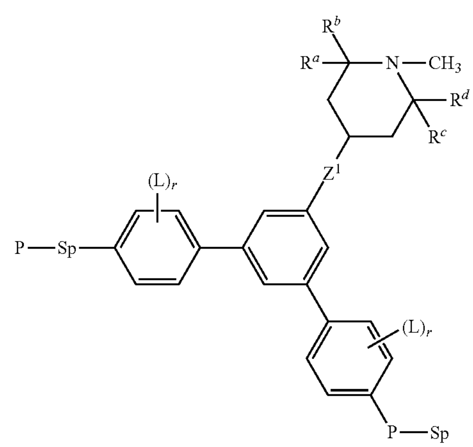

I3-16
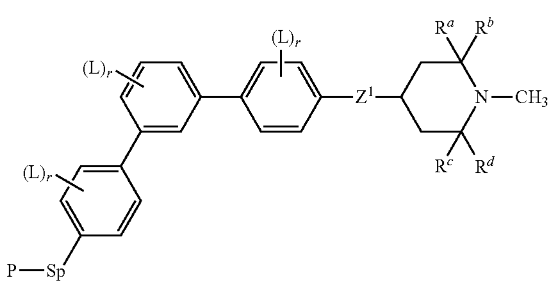
I3-17
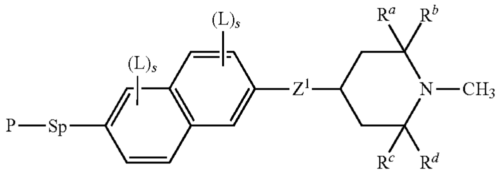
I3-18
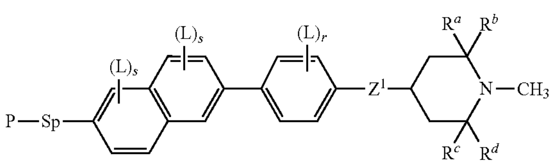
I3-19
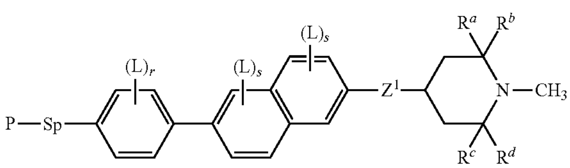
I3-20
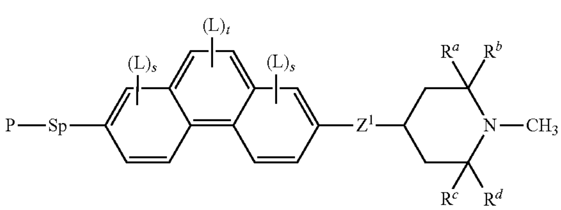
I3-21
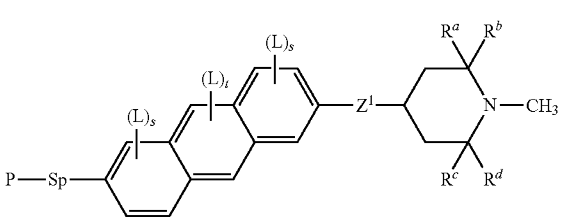
I3-22
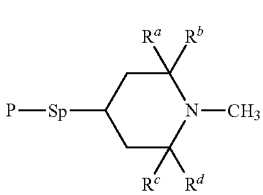
I4-1
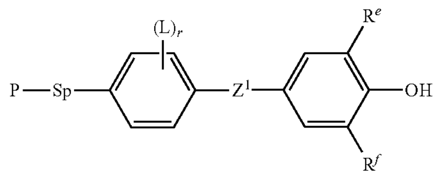
I4-2
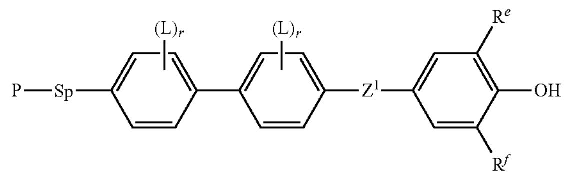
I4-3
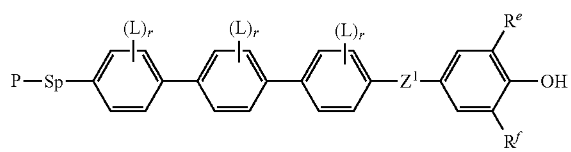
I4-4
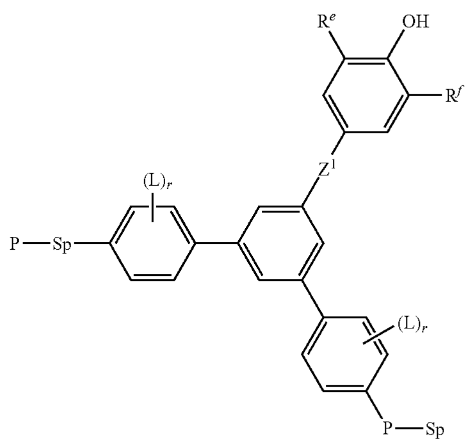
I4-5
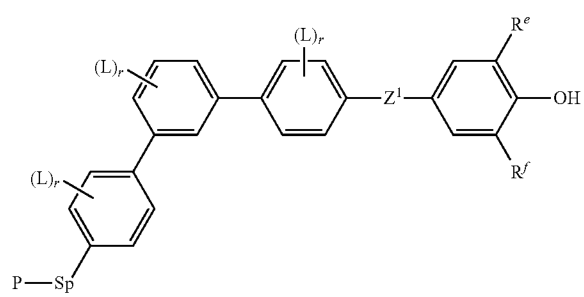
I4-6
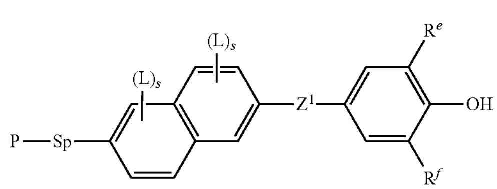

-continued

I4-7

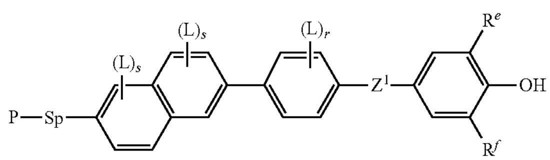

I4-8

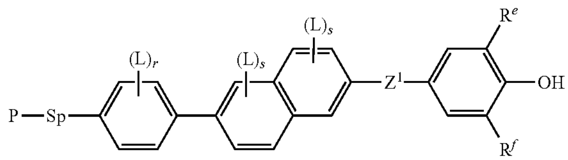

I4-9

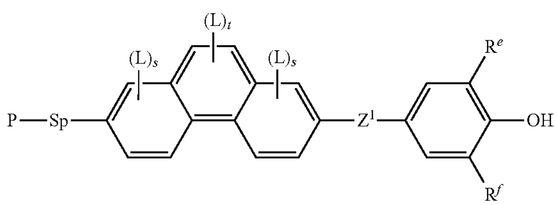

I4-10

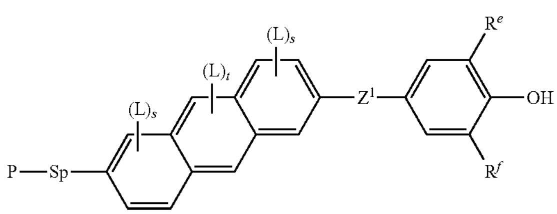

I4-11

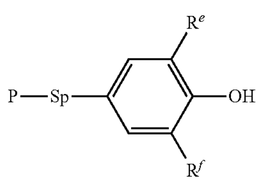

wherein P, Sp, $R^{a-d}$, $Z^1$, L and R are as defined in formula I or have one of the preferred meanings as described above and below, r is 0, 1, 2, 3 or 4 and s is 0, 1, 2 or 3.

Preferably $Z^1$ in formulae I and I1 to I4-11 is —CO—O—, —O—CO—, or a single bond, very preferably —CO—O—.

Preferably P in formulae I and I1-11 to I4-11 is acrylate or methacrylate.

Preferably Sp in formulae I and I1-11 to I4-11 is a single bond.

Preferably $R^a$, $R^b$, $R^c$ and $R^d$ in formulae I and I1-11 to I4-11 are methyl.

Preferably $R^e$ and $R^f$ in formulae I and I1-11 to I4-11 are t-butyl.

Preferably $R^g$ in formula I is H.

Further preferred compounds of formula I and its subformulae I1-11 to I4-11 are selected from the following preferred embodiments, including any combination thereof:

- The compounds contain exactly one polymerisable group (represented by the group P),
- the compounds contain exactly two polymerisable groups (represented by the groups P),
- the compounds contain exactly three polymerisable groups (represented by the groups P),
- P is acrylate or methacrylate,
- Sp is a single bond,
- Sp, when being different from a single bond, is selected from —$(CH_2)_a$—, —$(CH_2)_a$—O—, —$(CH_2)_a$—CO—O—, —$(CH_2)_a$—O—CO—, wherein a is 2, 3, 4, 5 or 6, and the O-atom or the CO-group, respectively, is connected to the benzene ring,
- $R^a$, $R^b$, $R^c$ and $R^d$ are methyl,
- $R^e$ and $R^f$ are t-butyl,
- $R^g$ is H,
- $R^g$ is methyl,
- m1 is 1 or 2,
- m1 is 0,
- m2 is 1 or 2,
- m2 is 0,
- $Z^1$ denotes —CO—O—, —O—CO— or a single bond, preferably —CO—O—,
- $Z^2$ denotes —CO—O—, —O—CO— or a single bond, preferably a single bond,
- L denotes F, Cl, CN, or alkyl or alkoxy with 1 to 6 C atoms that is optionally fluorinated, very preferably F, Cl, CN, $CH_3$, $OCH_3$, $OCF_3$, $OCF_2H$ or $OCFH_2$, most preferably F,
- one or more of L denotes P-Sp,
- one or more of L denote a group selected from formula 1, 2, 3 and 4,
- the compounds contain at least one group L or R that denotes P-Sp,
- r is 0 or 1,
- s is 0,
- t is 0
- u is 0, 1 or 2.

The invention furthermore relates to novel compounds of formula I, especially those wherein m1 is different from 0 and/or T is a group selected from formulae (2), (3) and (4).

The novel compounds of formula I can be selected from any of the above-mentioned preferred embodiments are any combination thereof.

Preferred novel compounds of formula I are those wherein m1 is different from 0, and is preferably 1 or 2.

Further preferred novel compounds of formula I are those selected from the preferred embodiments as described above and below.

Further preferred novel compounds of formula I are those selected from subformulae I1-1 to I1-10, I2-1 to I2-11, I3-1 to I3-11, I4-1 to I4-11.

Further preferred novel compounds of formula I are those selected from subformulae I1-1 to I1-10, I2-1 to I2-10, I3-1 to I3-10, I4-1 to I4-10.

The invention further relates to compounds of formula II $$\text{Pg-Sp-}(A^2\text{-}Z^2\text{-}A^1)_{m1}\text{-}Z^1\text{-T} \qquad \text{II}$$

wherein T, Sp, $A^{1,2}$, $Z^{1,2}$ and m1 are as defined in formula I, P in the meanings of R and L is replaced by Pg, and Pg denotes OH, a protected hydroxyl group or a masked hydroxyl group.

Preferred compounds of formula II are selected from subformulae I1-1 to I4-11 as defined above, wherein P is replaced by Pg.

Suitable protected hydroxyl groups Pg are known to the person skilled in the art. Preferred protecting groups for hydroxyl groups are alkyl, alkoxyalkyl, acyl, alkylsilyl, arylsilyl and arylmethyl groups, especially 2-tetrahydropyranyl, methoxymethyl, methoxyethoxymethyl, acetyl, triisopropylsilyl, tert-butyl-dimethylsilyl or benzyl.

The term “masked hydroxyl group” is understood to mean any functional group that can be chemically converted into a hydroxyl group. Suitable masked hydroxyl groups Pg are known to the person skilled in the art.

The compounds of formula II are suitable as intermediates for the preparation of compounds of the formula I and its subformulae.

The invention further relates to the use of the compounds of formula II as intermediates for the preparation of compounds of the formula I and its subformulae.

The compounds and intermediates of the formulae I and II and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, compounds of formula I can be synthesised by esterification or etherification of the intermediates of formula II, wherein Pg denotes OH, using corresponding acids, acid derivatives, or halogenated compounds containing a polymerisable group P.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

Further suitable synthesis methods are shown in the Examples.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:

- a first substrate including a pixel electrode defining pixel areas, the pixel electrode being connected to a switching element disposed in each pixel area and optionally including a micro-slit pattern, and optionally a first alignment layer disposed on the pixel electrode,
- a second substrate including a common electrode layer, which may be disposed on the entire portion of the second substrate facing the first substrate, and optionally a second alignment layer,
- an LC layer disposed between the first and second substrates and including an LC medium comprising a polymerisable component A and a liquid-crystal component B as described above and below, wherein the polymerisable component A may also be polymerised.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerisable component of the LC medium is then polymerised for example by UV photopolymerisation. The polymerisation can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerisation the polymerisable compounds form a crosslinked polymer, which causes a certain pretilt of the LC molecules in the LC medium. Without wishing to be bound to a specific theory, it is believed that at least a part of the crosslinked polymer, which is formed by the polymerisable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerisation can be carried out in one step. It is also possible firstly to carry out the polymerisation, optionally while applying a voltage, in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

The polymerisable compounds and components according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus does not contain a polymerisation initiator.

The LC medium may also comprise one or more stabilisers in order to prevent undesired spontaneous polymerisation of the RMs, for example during storage or transport. Suitable types and amounts of stabilisers are known to the person skilled in the art and are described in the literature.

Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-500,000 ppm, particularly preferably 50-50,000 ppm.

The LC media according to the present invention preferably do not contain any other compounds with stabilising groups than those of formula I.

The polymerisable component contained in the LC media according to the present invention does in particular show good UV absorption in, and are therefore especially suitable for, a process of preparing a PSA display including one or more of the following features:

- the LC medium is exposed to UV light in the display in a 2-step process, including a first UV exposure step ("UV-1 step") to generate the tilt angle, and a second UV exposure step ("UV-2 step") to finish polymerization,
- the LC medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process.
- the LC medium is exposed to UV light in the display generated by a UV lamp with a radiation spectrum that is shifted to longer wavelengths, preferably 340 nm or more, to avoid short UV light exposure in the PSA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

- the LC medium is exposed to UV light in a 2-step process, including a first UV exposure step ("UV-1 step") to generate the tilt angle, and a second UV exposure step ("UV-2 step") to finish polymerization,
- the LC medium is exposed to UV light generated by a UV lamp having an intensity of from 0.5 $mW/cm^2$ to 10 $mW/cm^2$ in the wavelength range from 300-380 nm, preferably used in the UV2 step, and optionally also in the UV1 step,
- the LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV exposure can be carried out using a cut-off filter being substantially transmissive for wavelengths λ>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Preferably the LC medium of the present invention essentially consists of a polymerisable component A), or one or more polymerisable compounds of formula I, preferably selected from formulae I1-1 to I4-11, very preferably from formulae I1-1 to I1-11, and optionally one or more polymerisable compounds different from formula I, and an LC component B), or LC host mixture, as described above and below.

However, the LC medium may additionally comprise one or more further components or additives, preferably selected from the list including but not limited to co-monomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Preference is furthermore given to LC media in which the liquid-crystalline component B) or the LC host mixture has a nematic LC phase, and preferably has no chiral liquid-crystal phase.

The LC component B), or LC host mixture, is preferably a nematic LC mixture.

Preference is furthermore given to achiral compounds of formula I, and to LC media in which the compounds of component A and/or B are selected exclusively from the group consisting of achiral compounds.

Preferably the proportion of the polymerisable component A in the LC medium is from >0 to <5%, very preferably from >0 to <1%, most preferably from 0.001 to 0.5%.

Preferably the proportion of the LC component B in the LC medium is from 95 to <100%, very preferably from 99 to <100%.

In a preferred embodiment of the present invention, the LC medium and/or polymerisable component A does not contain any other polymerisable compounds than those of formula I.

In this preferred embodiment, the compounds of formula I are preferably selected from those wherein T is a group of formula (1), (2) or (3).

Furthermore, in this preferred embodiment, the compounds of formula I are selected from those containing at least one groups P-Sp-.

In another preferred embodiment of the present invention, the LC medium and/or its polymerisable component A contain one or more compounds of formula I and one or more polymerisable compounds that are different from formula I.

In this preferred embodiment, the compounds of formula I are preferably selected from those wherein T is of formula (1), (2) or (3), very preferably of formula (1).

The polymerisable compounds that are different from formula I, hereinafter also referred to as "co-monomers", are preferably selected from RMs.

Suitable and preferred co-monomers for use in LC media together with the compounds of formula I are selected from the following formulae:

M1

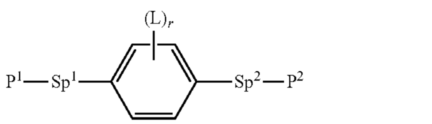

M2

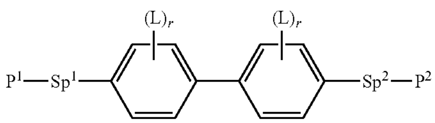

M3

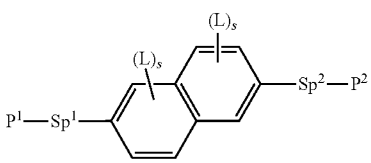

M4

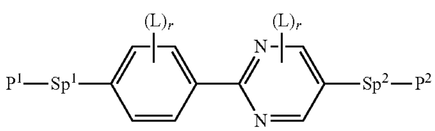

M5

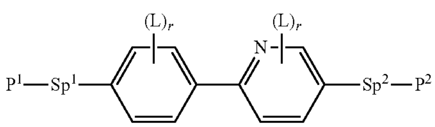

M6

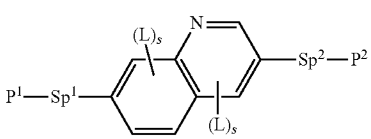

M7

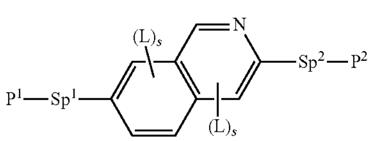

M8

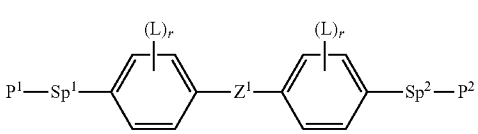

M9

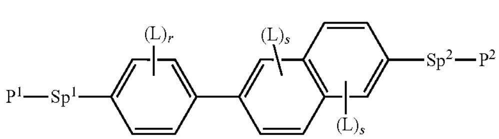

-continued

M10

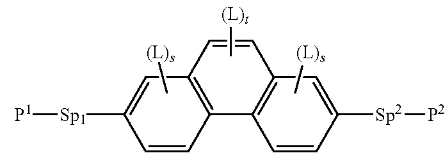

M11

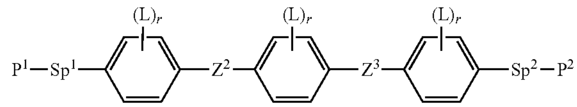

M12

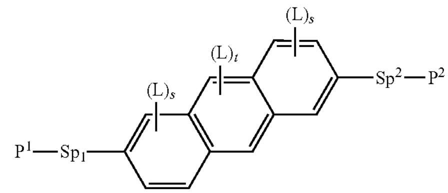

M13

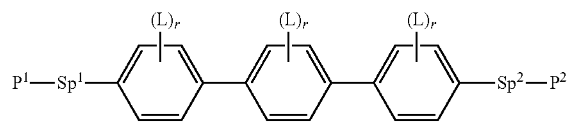

M14

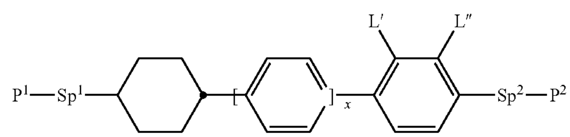

M15

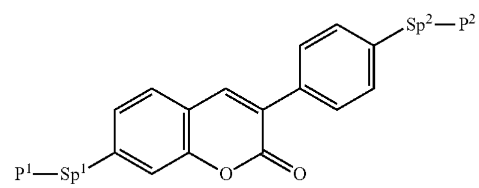

M16

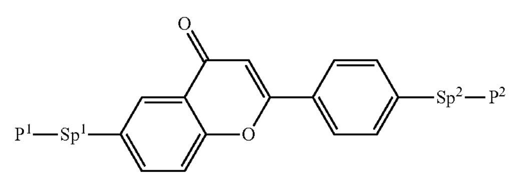

M17

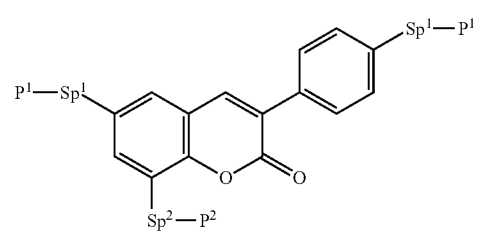

-continued
M18
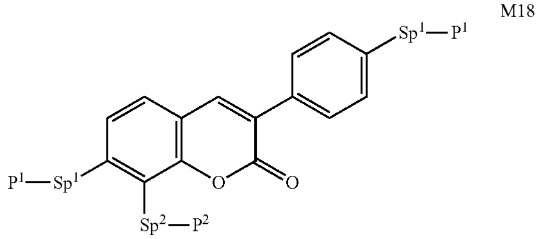
M19
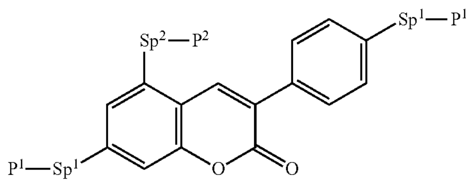
M20
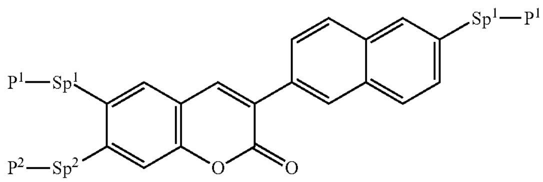
M21
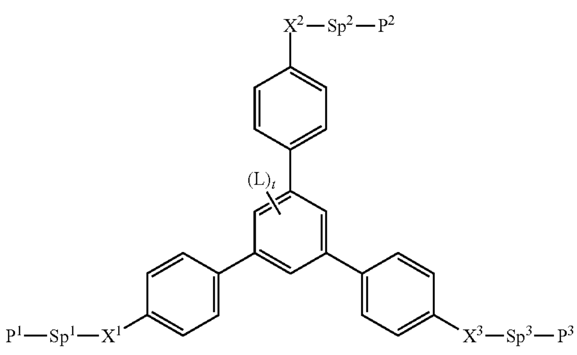
M22
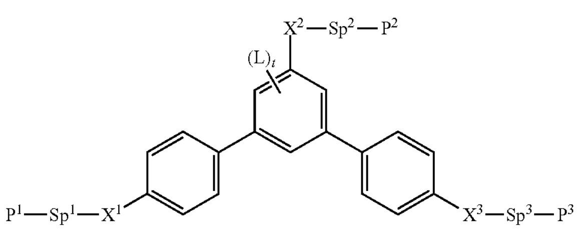
M23
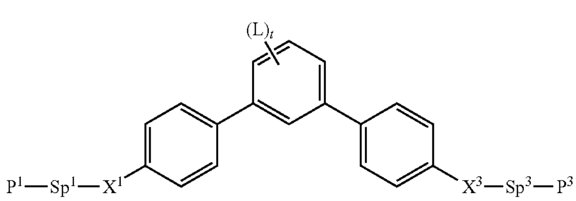
-continued
M24
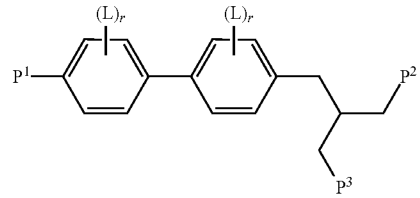
M25
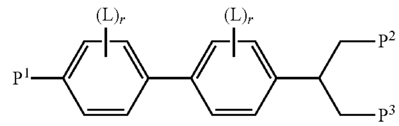
M26
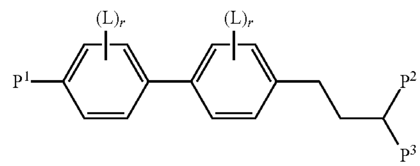
M27
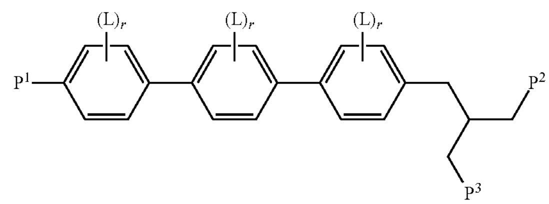
M28
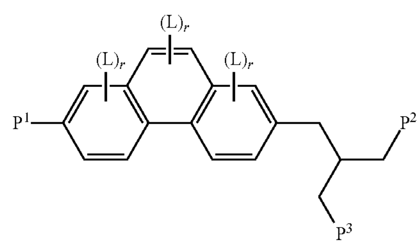
M29
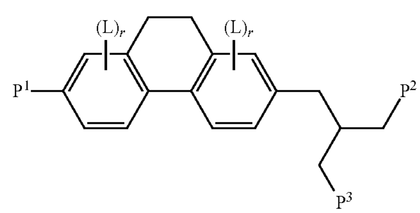
M30
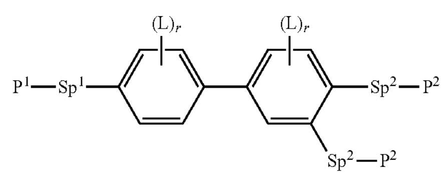
M31
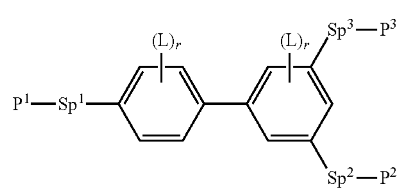
in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings indicated above and below for Sp, and particularly preferably denote —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, in which p1 is an integer from 1 to 12, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

Especially preferred are direactive compounds of formulae M1 to M14, in particular M2, M3, M10, M12, M13, M15 and M16, very preferably M2.

Further preferred are trireactive compounds M15 to M30, in particular M17, M18, M19, M22, M23, M24, M25, M29 and M30.

In the compounds of formulae M1 to M30 the group

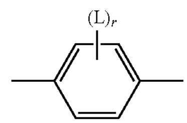

is preferably

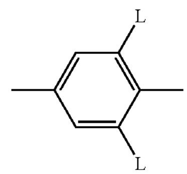 , 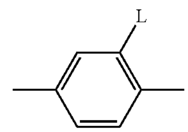 ,

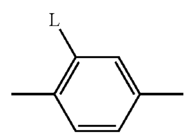 , 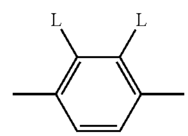 ,

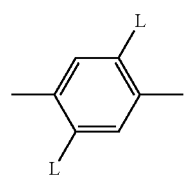 or 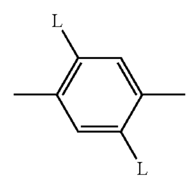 , wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Especially preferred co-monomers of formulae M1-M30 are selected from the following formulae

RM-1

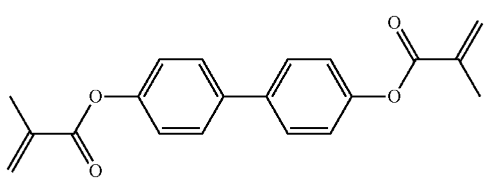

RM-2

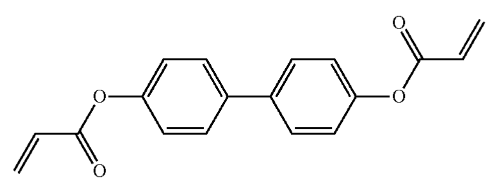

-continued
RM-3
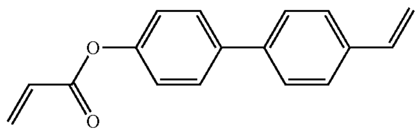
RM-4
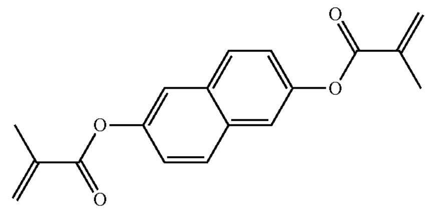
RM-5
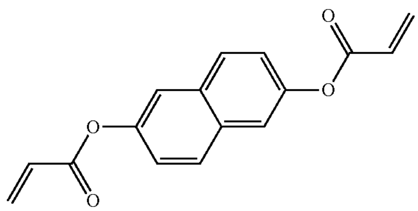
RM-6
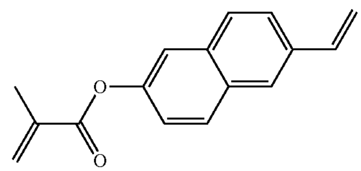
RM-7
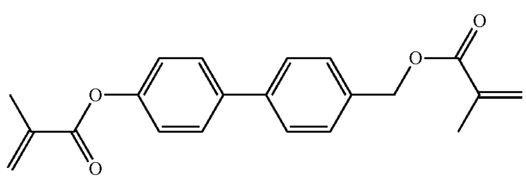
RM-8
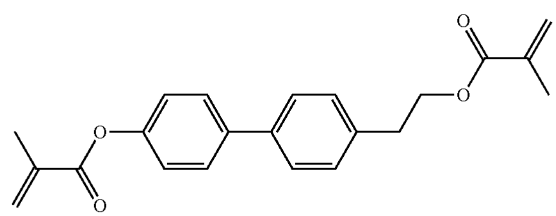
RM-9
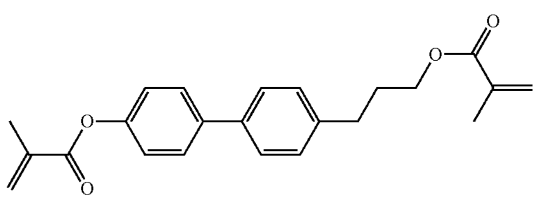
RM-10
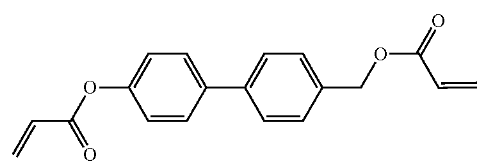
RM-11
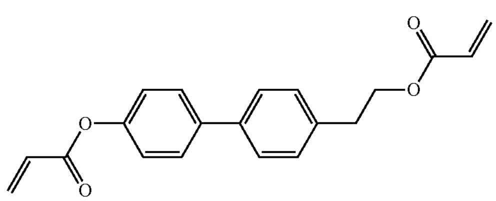
RM-12
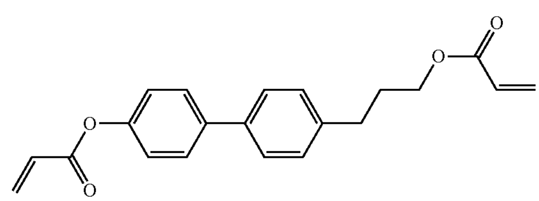
RM-13
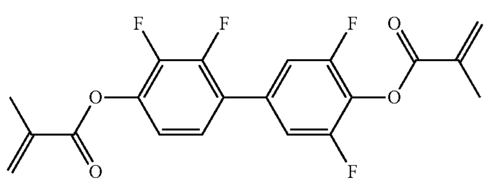
RM-14
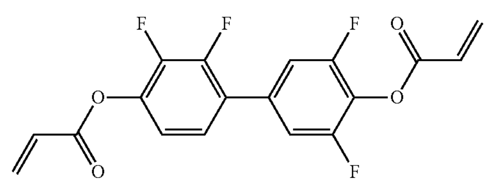
RM-15
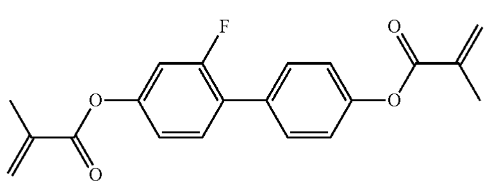
RM-16
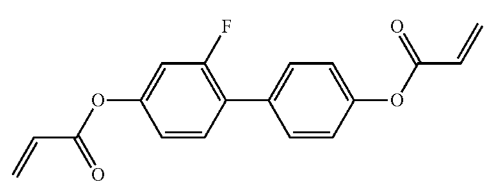

-continued
RM-17
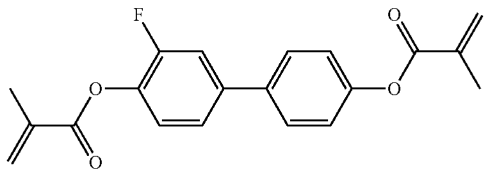
RM-18
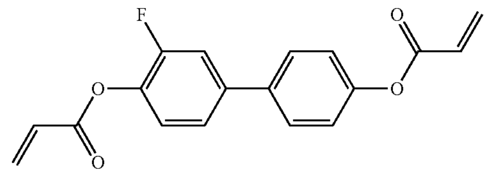
RM-19
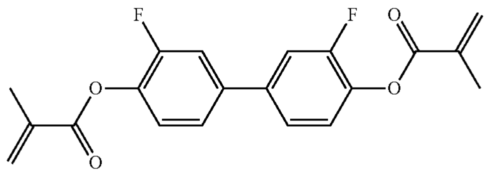
RM-20
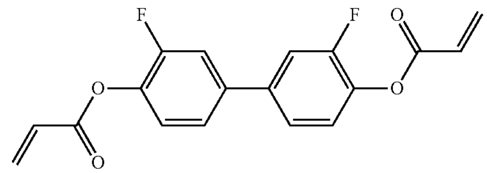
RM-21
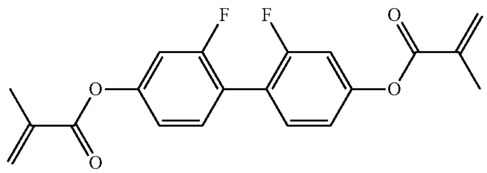
RM-22
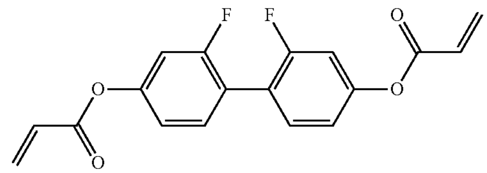
RM-23
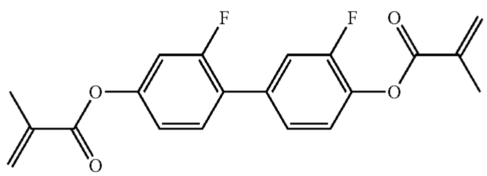
RM-24
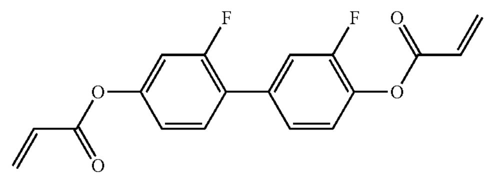
RM-25
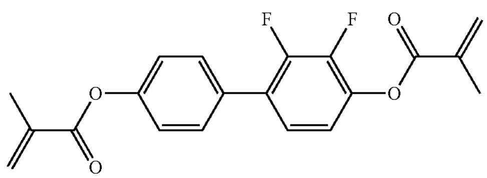
RM-26
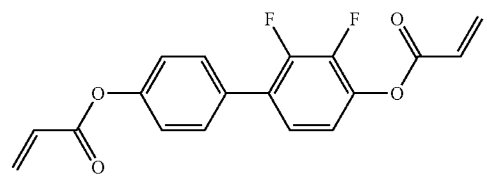
RM-27
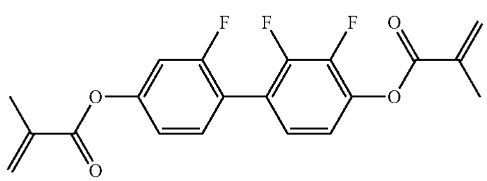
RM-28
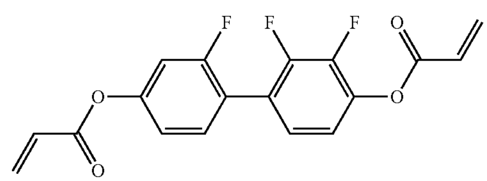
RM-29
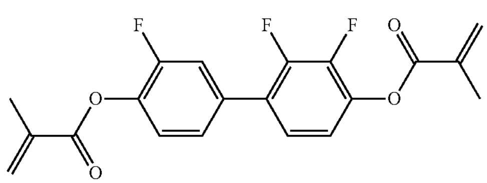
RM-30
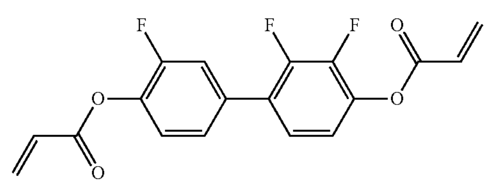
RM-31
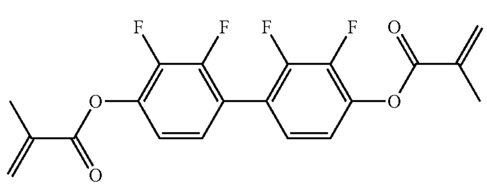
RM-32
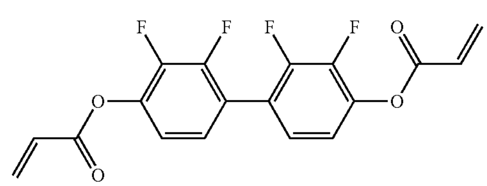

-continued
RM-33
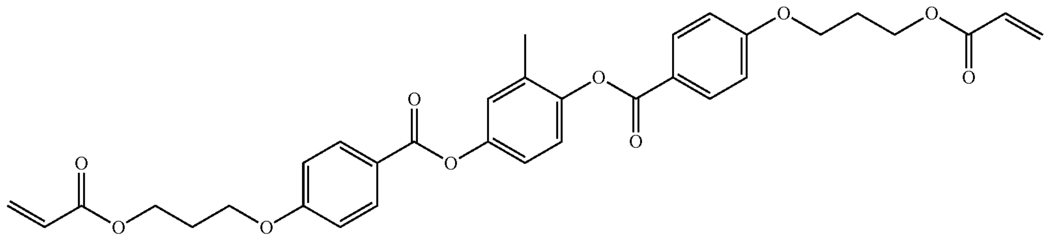
RM-34
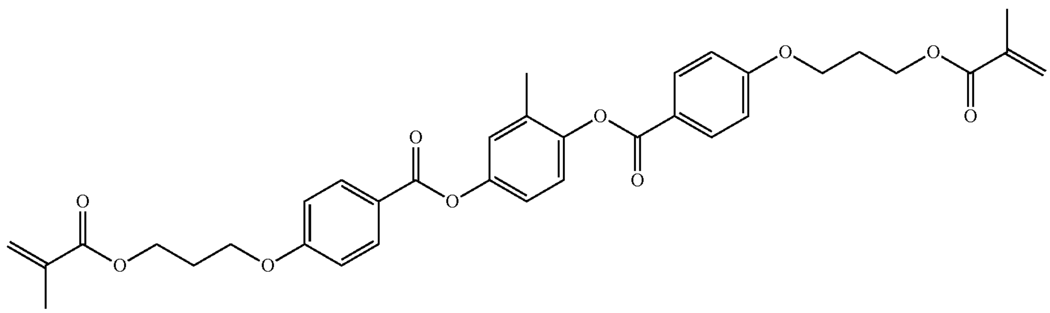
RM-35
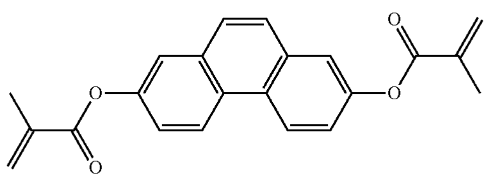
RM-36
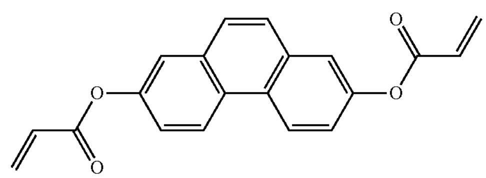
RM-37
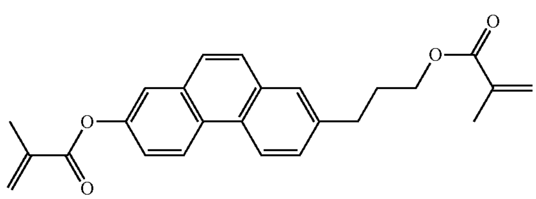
RM-38
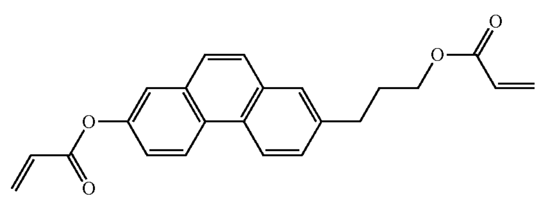
RM-39
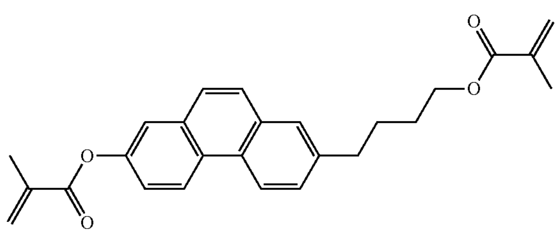
RM-40
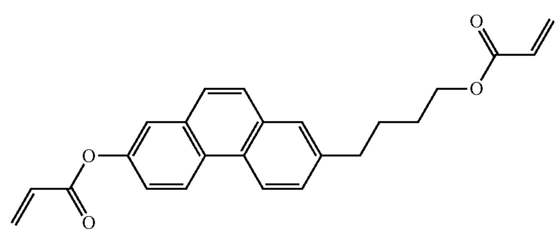
RM-41
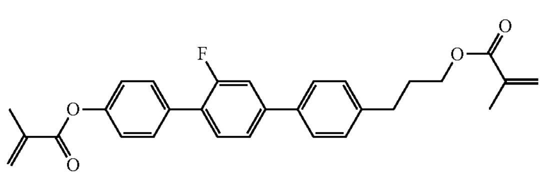
RM-42
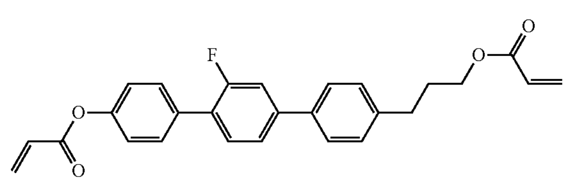
RM-43
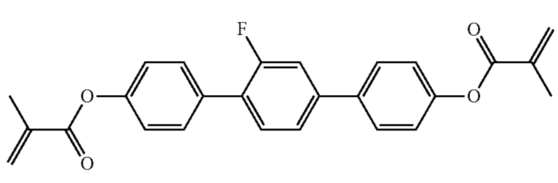
RM-44
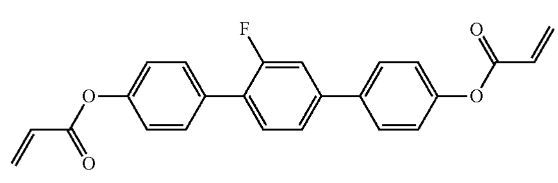

-continued
RM-45
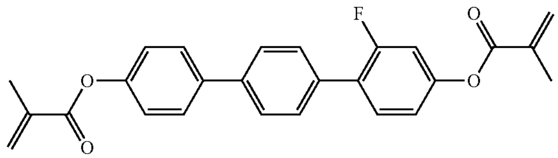
RM-47
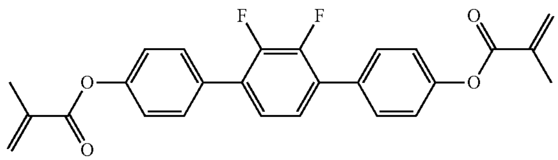
RM-49
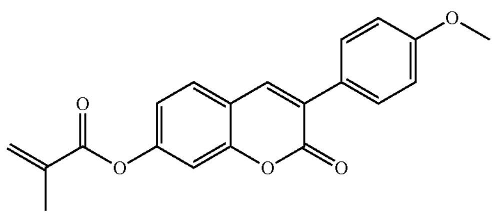
RM-51
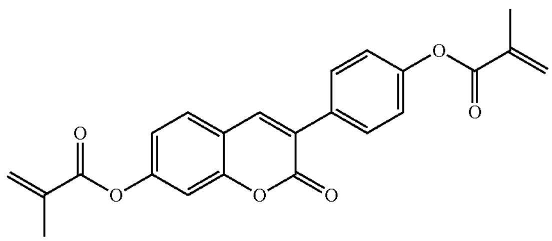
RM-53
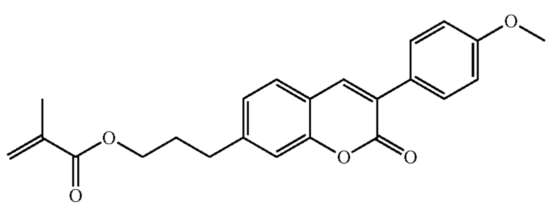
RM-55
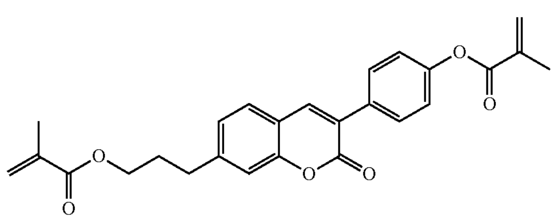
RM-57
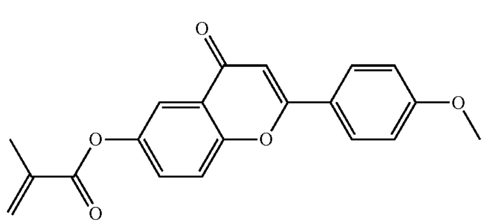
RM-46
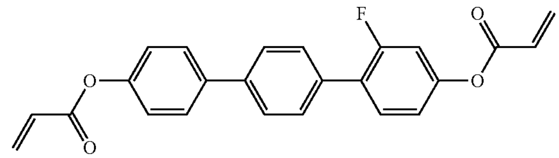
RM-48
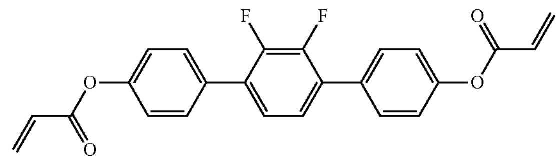
RM-50
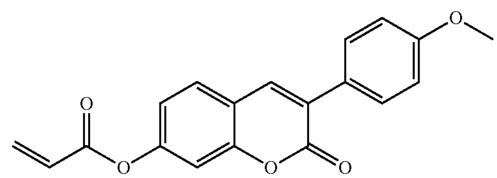
RM-52
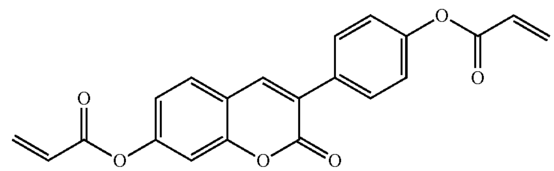
RM-54
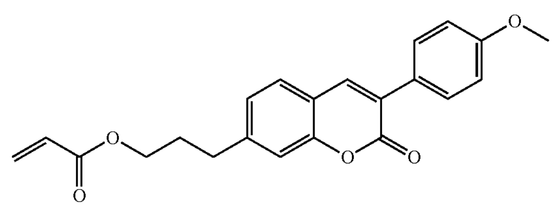
RM-56
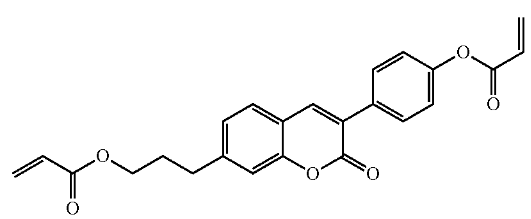
RM-58
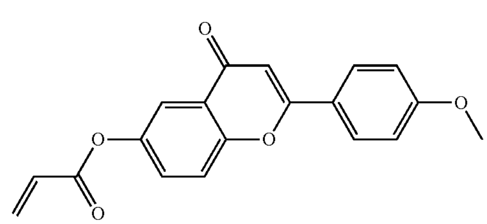

-continued
RM-59
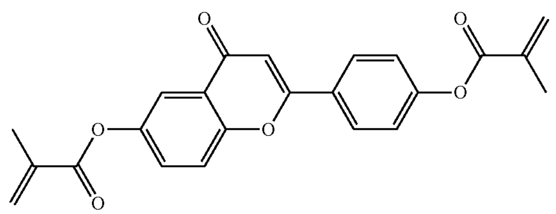
RM-60
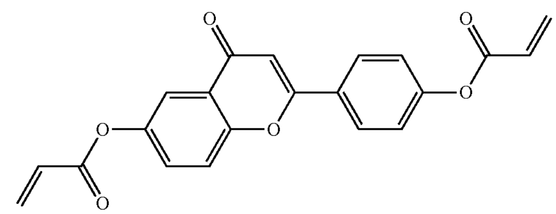
RM-61
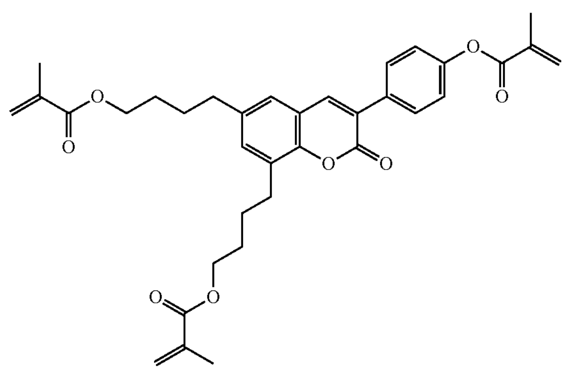
RM-62
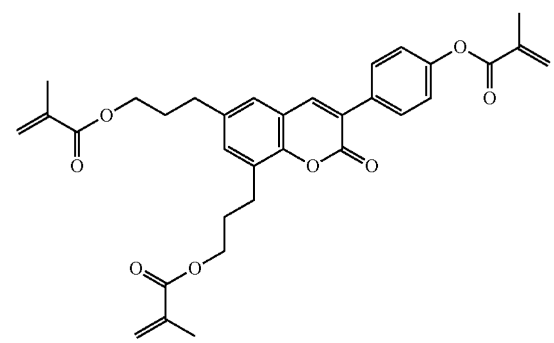
RM-63
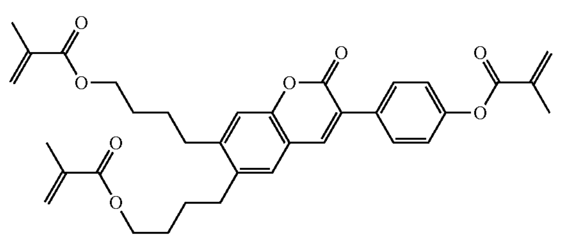
RM-64
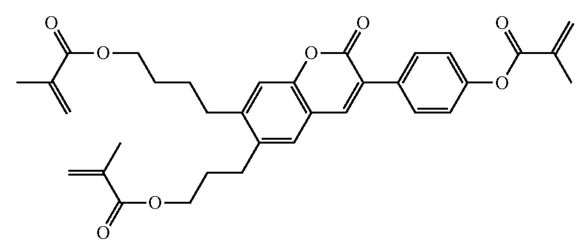
RM-65
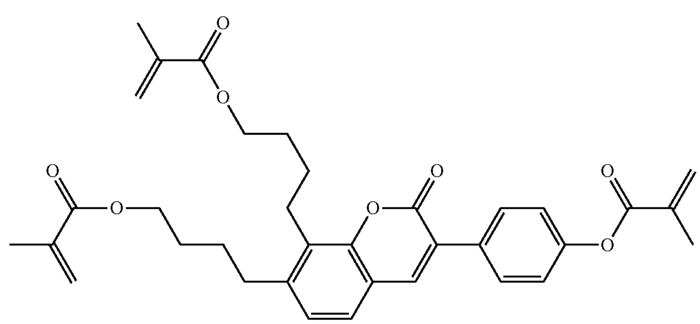
RM-66
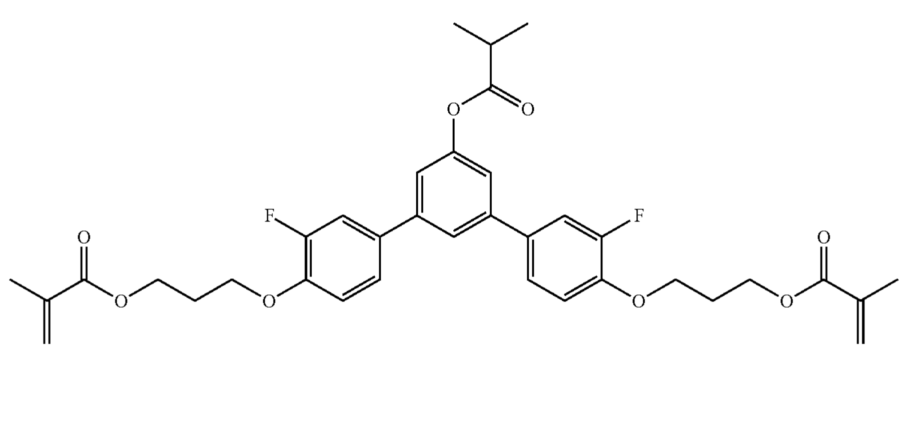

-continued

RM-67

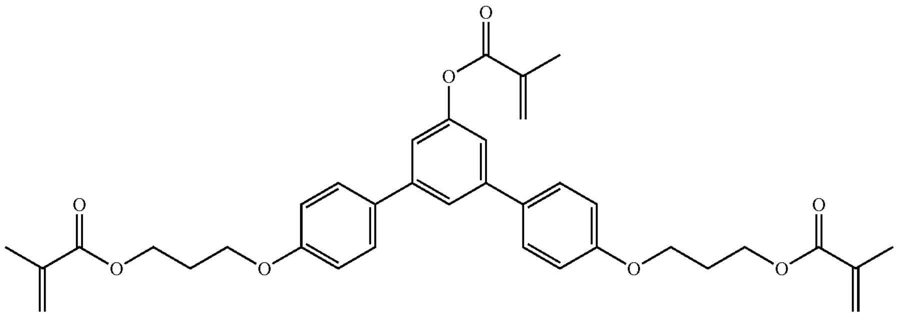

RM-68

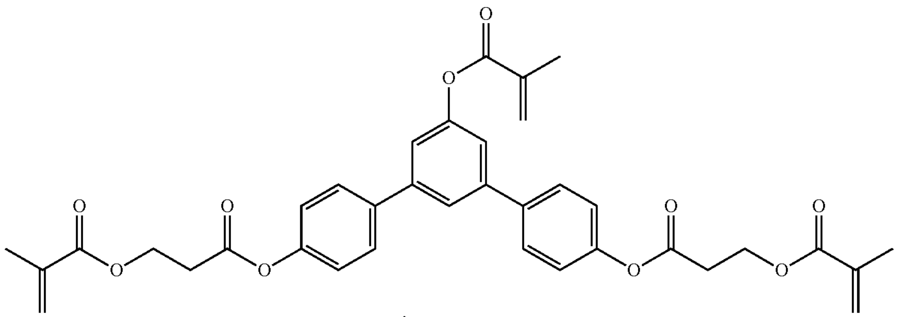

RM-69

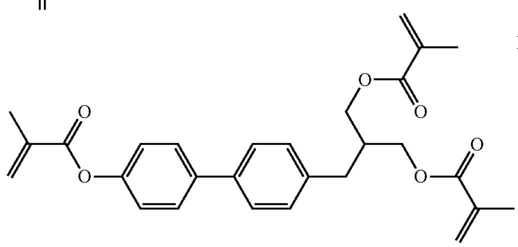

RM-70

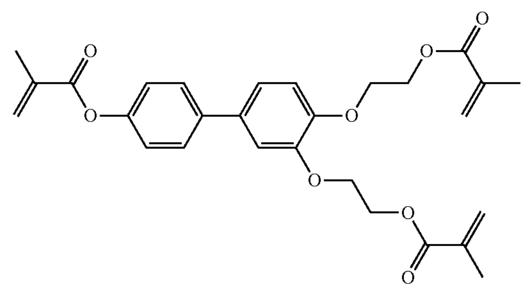

RM-71

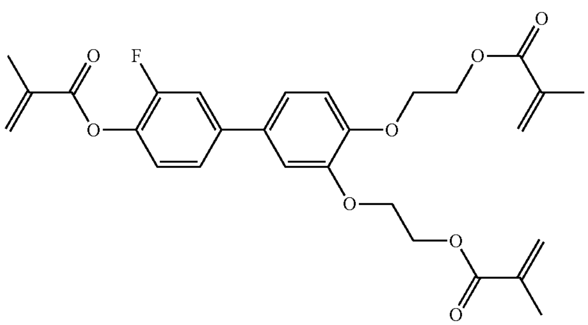

Particular preference is given to a polymerisable component or an LC medium comprising one, two or three polymerisable compounds of formula I, preferably selected from formulae I1-1 to I4-11, very preferably from formulae I1-1 to I1-11, and one, two or three polymerisable compounds that are different from formula I and are preferably selected from formulae M1-M30, very preferably from formulae RM-1 to RM-71, most preferably selected from formula M2, in particular selected from formula RM-1.

Preference is furthermore given to LC media in which the polymerisable component A consists of polymerisable compounds of formula I, preferably selected from formulae I1-1 to I4-11, very preferably from formulae I1-1 to I1-11, and polymerisable compounds of formula M2, especially those of formula RM-1.

Preference is furthermore given to LC media in which the polymerisable component A consists only of polymerisable compounds of formula I, preferably selected from formulae I1-1 to I4-11, very preferably from formulae I2-1 to I1-11.

Preferably the proportion of polymerisable compounds of formula I in the LC medium is from $>0$ to $<3\%$, very preferably from $>0$ to $\leq 1\%$, most preferably from 0.001 to 0.5%.

In the preferred embodiments where the LC medium or the polymerisable component A does not contain any other polymerisable compounds except those of formula I, the proportion of the compounds of formula I in the LC medium is preferably from >0 to <3%, very preferably from >0 to ≤1%, most preferably from 0.001 to 0.5%.

In the preferred embodiments where the LC medium or the polymerisable component A contains one or more compounds of formula I and one or more polymerisable compounds different from formula I, the proportion of compounds of formula I in the LC medium is preferably from >0 to <1%, very preferably from >0 to ≤0.3%, most preferably from 0.001 to 0.15%.

Preferably the proportion of polymerisable compounds different from formula I, preferably selected from formulae M1-M30, in the LC medium is from >0 to <3%, very preferably from >0 to <1%, most preferably from 0.05 to 0.5%.

Besides the polymerisable compounds described above, the LC media for use in the LC displays according to the invention comprise an LC host mixture comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

In principle, any LC mixture which is suitable for use in conventional displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

The polymerisable compounds and components of the present invention are especially suitable for use in an LC host mixture that comprises one or more mesogenic or LC compounds comprising an alkenyl group (hereinafter also referred to as "alkenyl compounds"), wherein said alkenyl group is stable to a polymerisation reaction under the conditions used for polymerisation of the compounds of formula I and of the other polymerisable compounds contained in the LC medium. Compared to RMs known from prior art the polymerisable compounds and components of the present invention do in such an LC host mixture exhibit improved properties, like solubility, reactivity or capability of generating a tilt angle.

Thus, in a preferred embodiment of the present invention, the LC medium comprises one or more mesogenic or liquid-crystalline compounds comprising an alkenyl group, ("alkenyl compound"), where this alkenyl group is preferably stable to a polymerisation reaction under the conditions used for the polymerisation of the polymerisable compounds of formula I and of the other polymerisable compounds contained in the LC medium.

The alkenyl groups in the alkenyl compounds are preferably selected from straight-chain, branched or cyclic alkenyl, in particular having 2 to 25 C atoms, particularly preferably having 2 to 12 C atoms, in which, in addition, one or more non-adjacent $CH_2$ groups may be replaced by —O—, —S—, —CO—, —CO—O—, —O—CO—, —O—CO—O— in such a way that 0 and/or S atoms are not linked directly to one another, and in which, in addition, one or more H atoms may be replaced by F and/or Cl.

Preferred alkenyl groups are straight-chain alkenyl having 2 to 7 C atoms and cyclohexenyl, in particular ethenyl, propenyl, butenyl, pentenyl, hexenyl, heptenyl, 1,4-cyclohexen-1-yl and 1,4-cyclohexen-3-yl.

The concentration of compounds containing an alkenyl group in the LC host mixture (i.e. without any polymerisable compounds) is preferably from 5% to 100%, very preferably from 20% to 60%.

Especially preferred are LC mixtures containing 1 to 5, preferably 1, 2 or 3 compounds having an alkenyl group.

The mesogenic and LC compounds containing an alkenyl group are preferably selected from the following formulae:

AN

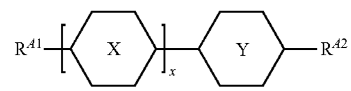

AY

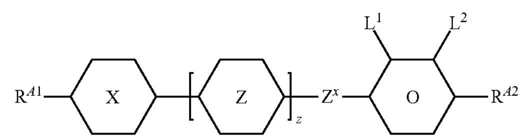

in which the individual radicals, on each occurrence identically or differently, each, independently of one another, have the following meaning:

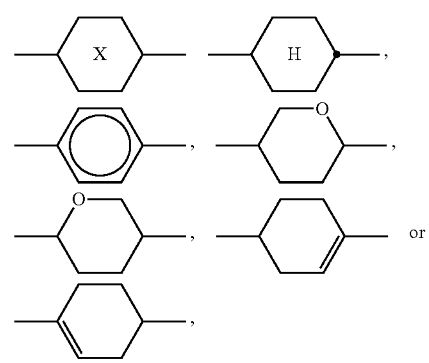

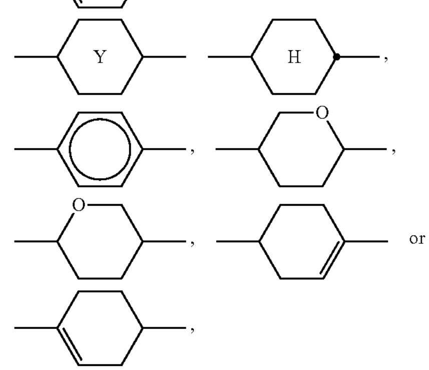

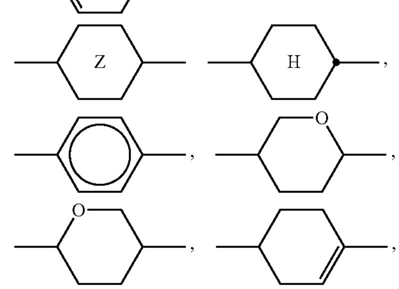

-continued

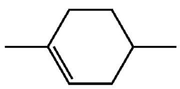

or

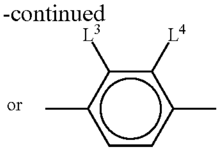

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may be replaced by —O—, —CH═CH—, —CO—, —OCO— or —COO— in such a way that O atoms are not linked directly to one another, $Z^x$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, preferably a single bond, $L^{1-4}$ each, independently of one another, H, F, Cl, $OCF_3$, $CF_3$, $CH_3$, $CH_2F$ or $CHF_2H$, preferably H, F or Cl, x 1 or 2, z 0 or 1.

$R^{A2}$ is preferably straight-chain alkyl or alkoxy having 1 to 8 C atoms or straight-chain alkenyl having 2 to 7 C atoms.

The LC medium preferably comprises no compounds containing a terminal vinyloxy group (—O—CH═$CH_2$), in particular no compounds of the formula AN or AY in which $R^{A1}$ or $R^{A2}$ denotes or contains a terminal vinyloxy group (—O—CH═$CH_2$).

Preferably, $L^1$ and $L^2$ denote F, or one of $L^1$ and $L^2$ denotes F and the other denotes Cl, and $L^3$ and $L^4$ denote F, or one of $L^3$ and $L^4$ denotes F and the other denotes Cl.

The compounds of the formula AN are preferably selected from the following sub-formulae:

AN1

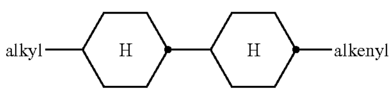

AN2

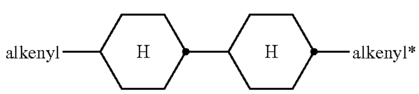

AN3

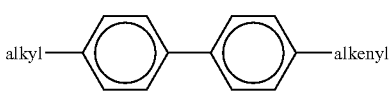

AN4

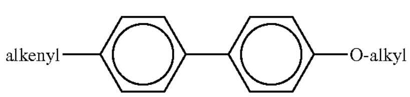

AN5

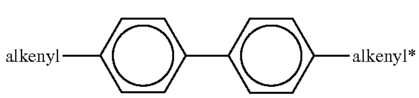

AN6

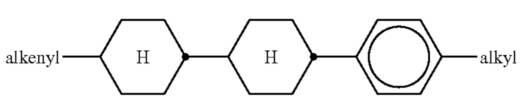

AN7

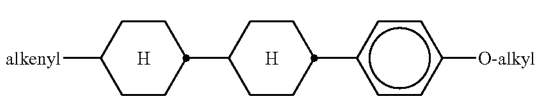

-continued

AN8

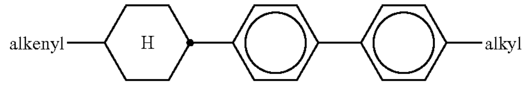

AN9

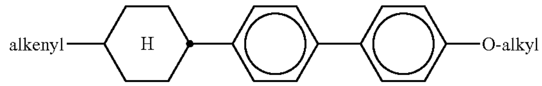

AN10

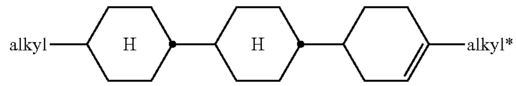

AN11

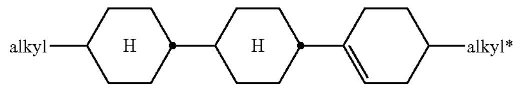

AN12

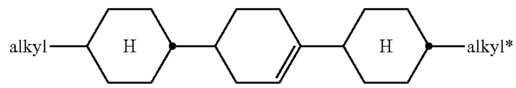

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferred compounds of the formula AN are selected from the following sub-formulae:

AN1a

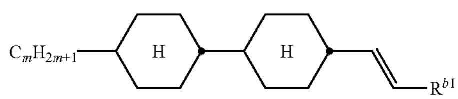

AN3a

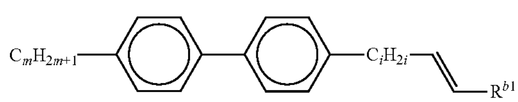

AN6a

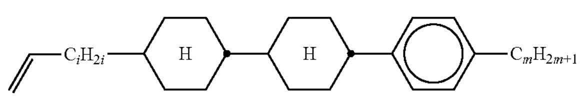

in which m denotes 1, 2, 3, 4, 5 or 6, i denotes 0, 1, 2 or 3, and $R^{b1}$ denotes H, $CH_3$ or $C_2H_5$.

Very particularly preferred compounds of the formula AN are selected from the following sub-formulae:

AN1a1

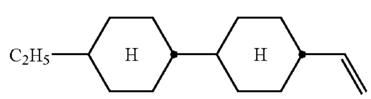

-continued
AN1a2
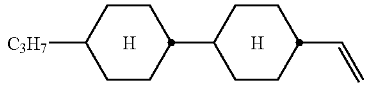
AN1a3
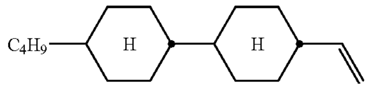
AN1a4
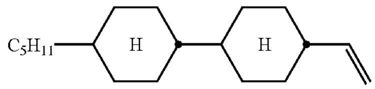
AN1a5
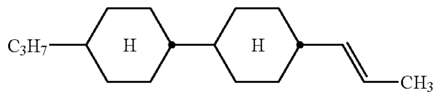
Most preferred are compounds of formula AN1a2 and AN1a5.
The compounds of the formula AY are preferably selected from the following sub-formulae:
AY1
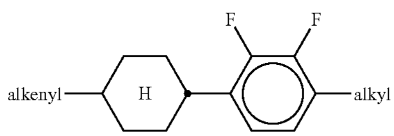
AY2
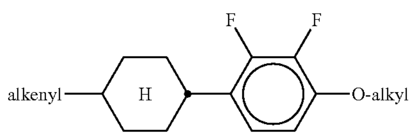
AY3
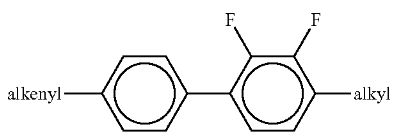
AY4
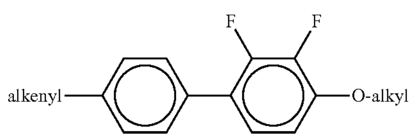
AY5
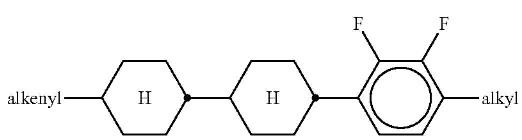
AY6
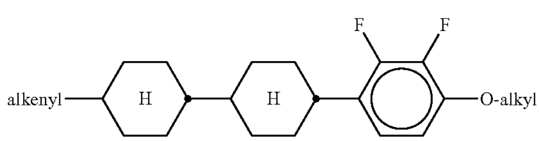
AY7
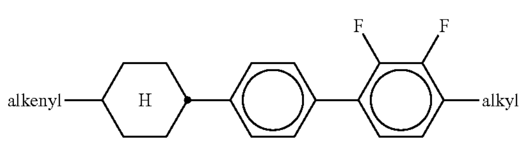
-continued
AY8
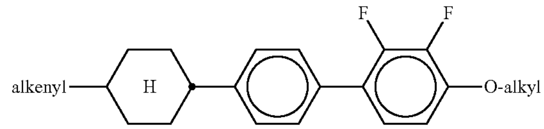
AY9
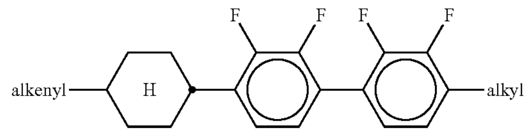
AY10
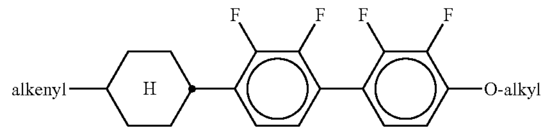
AY11
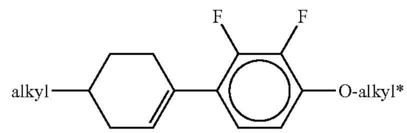
AY12
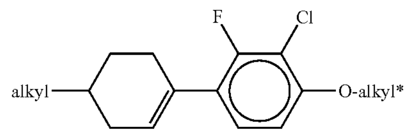
AY13
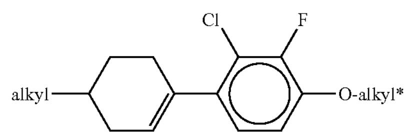
AY14
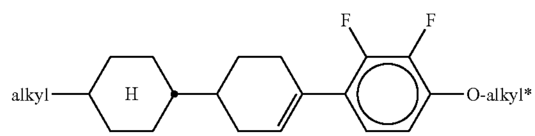
AY15
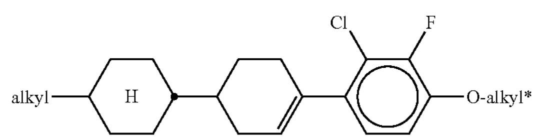
AY16
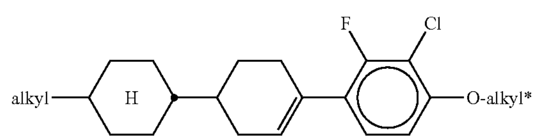
AK17
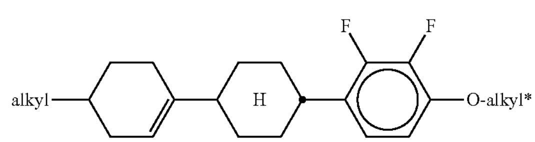

-continued

AK18

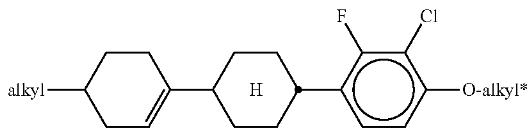

AK19

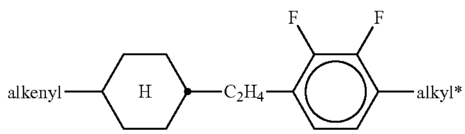

AK20

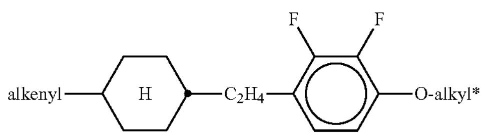

AK21

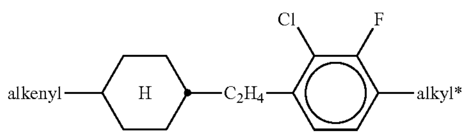

AK22

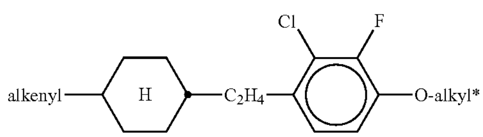

AK23

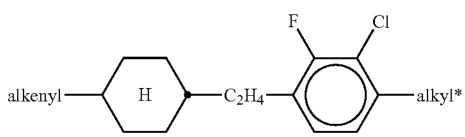

AK24

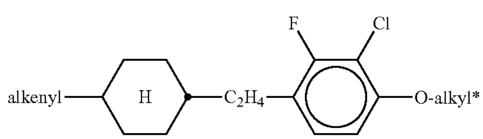

AY25

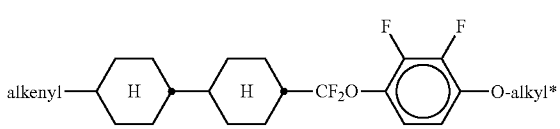

AY26

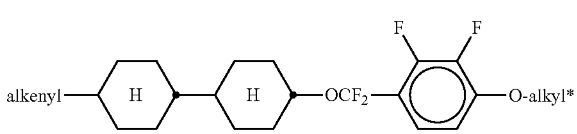

AY27

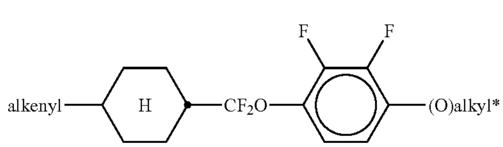

-continued

AY28

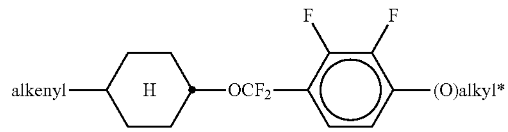

AY29

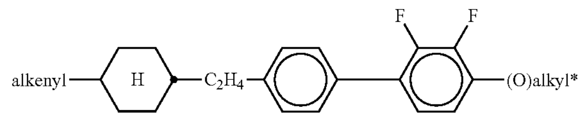

AY30

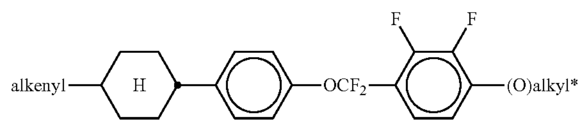

AY31

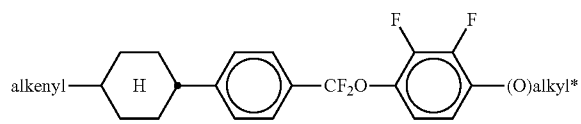

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very preferred compounds of the formula AY are selected from the following sub-formulae:

AY5a

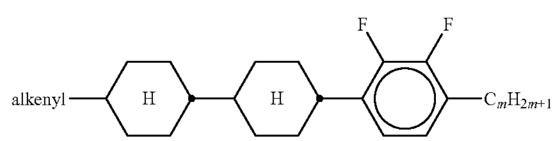

AY6a

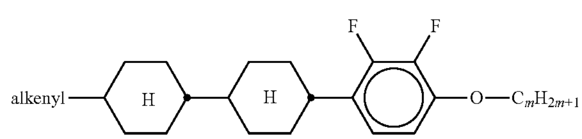

AY9a

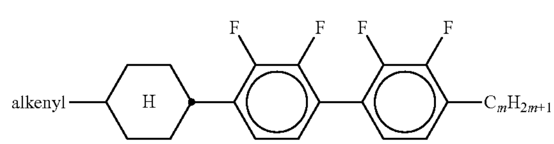

AY10a

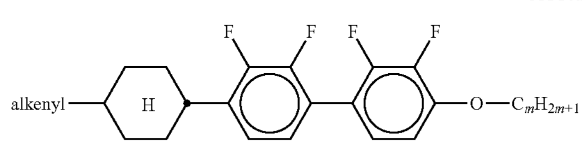

-continued

AY11a

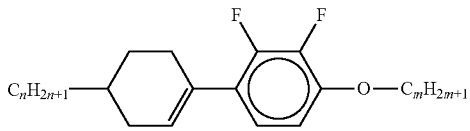

AY14a

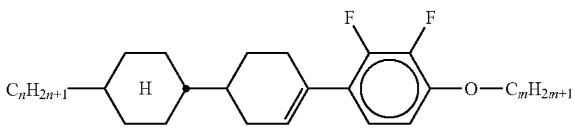

in which m and n each, independently of one another, denote 1, 2, 3, 4, 5 or 6, and alkenyl denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Besides the polymerisable component A) as described above, the LC media according to the present invention comprise an LC component B), or LC host mixture, comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

In a first preferred embodiment the LC medium contains an LC component B), or LC host mixture, based on compounds with negative dielectric anisotropy. Such LC media are especially suitable for use in PS-VA and PS-UB-FFS displays. Particularly preferred embodiments of such an LC medium are those of sections a)-z) below:

a) LC medium which comprises one or more compounds of the formulae CY and/or PY:

CY

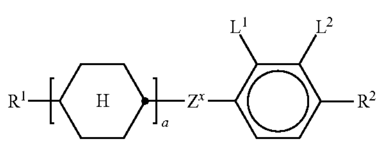

PY

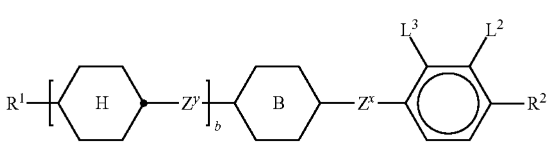

wherein a denotes 1 or 2, b denotes 0 or 1,

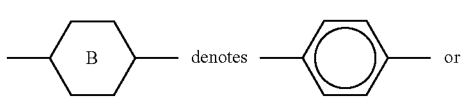

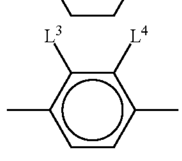

$R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

CY1

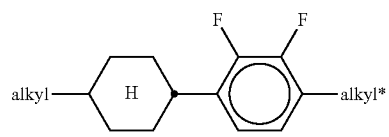

CY2

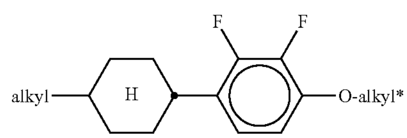

CY3

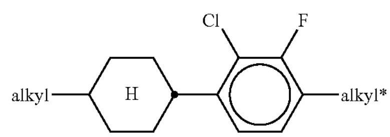

CY4

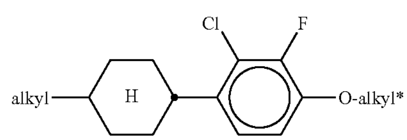

CY5

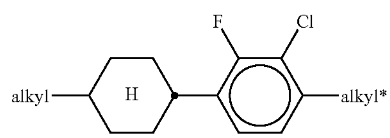

CY6

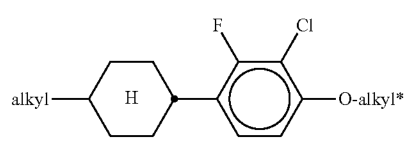

CY7

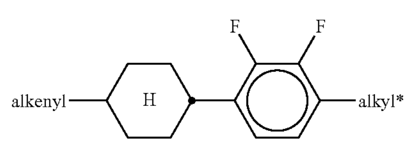

CY8

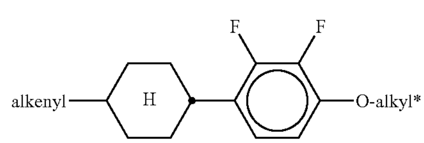

-continued
CY9
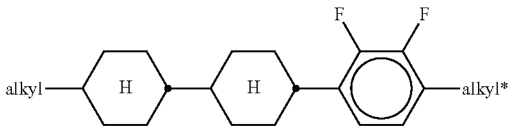
CY10
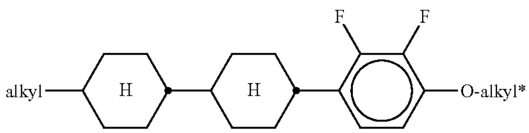
CY11
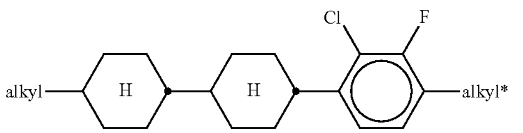
CY12
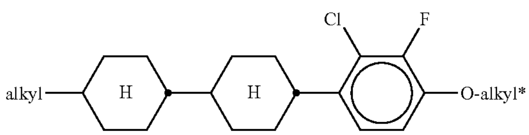
CY13
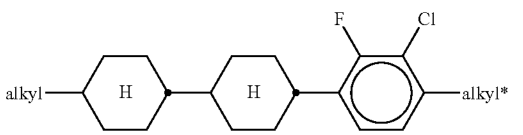
CY14
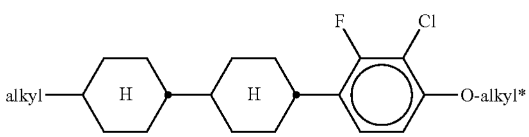
CY15
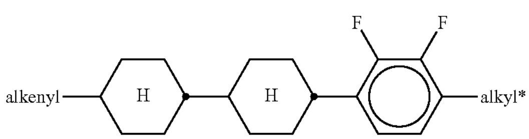
CY16
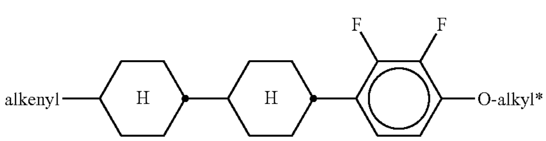
CY17
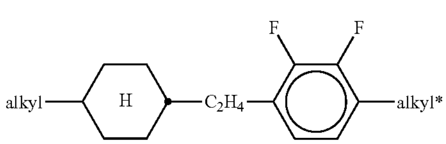
CY18
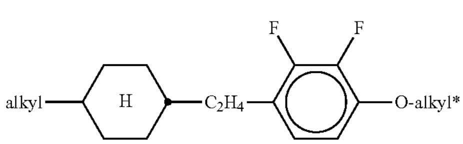
-continued
CY19
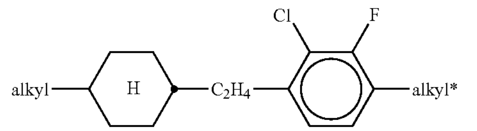
CY20
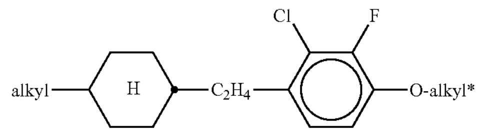
CY21
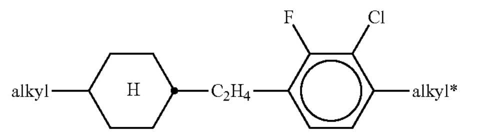
CY22
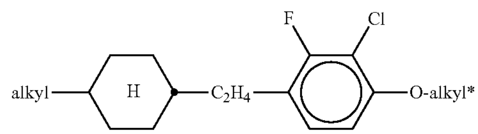
CY23
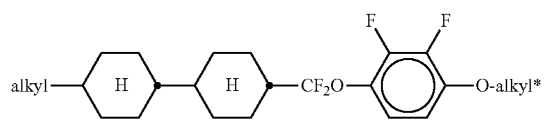
CY24
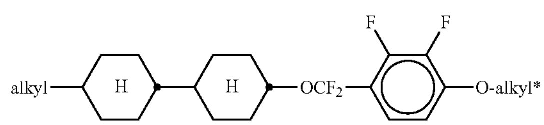
CY25
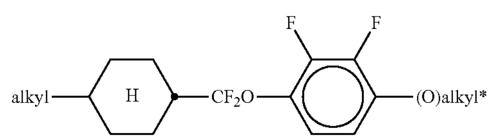
CY26
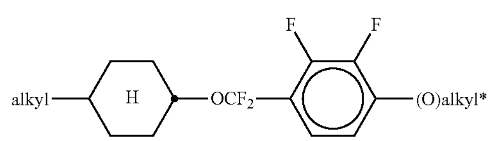
CY27
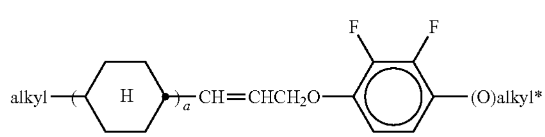
CY28
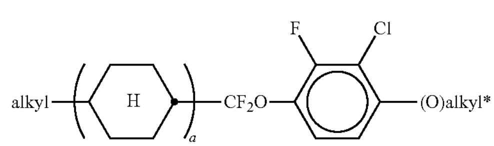

-continued

CY29

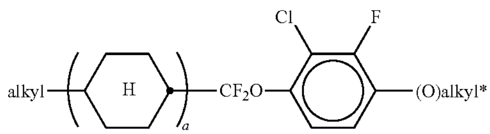

CY30

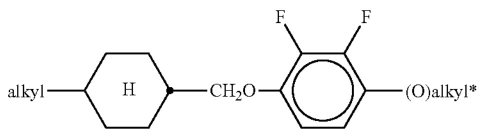

CY31

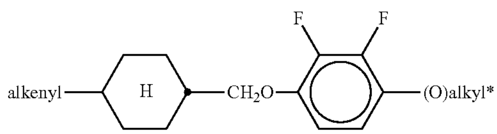

CY32

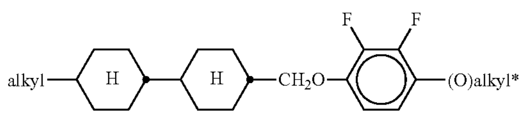

CY33

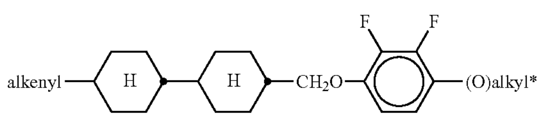

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The compounds of the formula PY are preferably selected from the group consisting of the following sub-formulae:

PY1

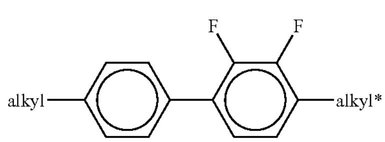

PY2

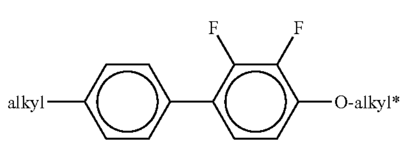

PY3

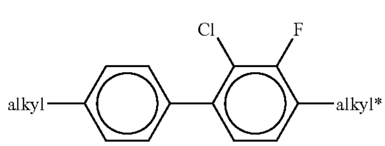

-continued

PY4

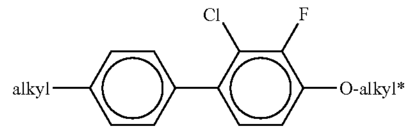

PY5

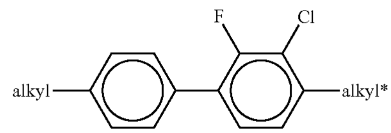

PY6

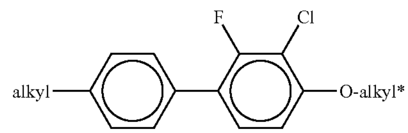

PY7

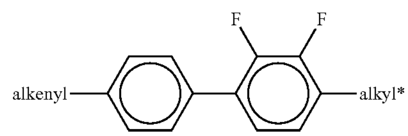

PY8

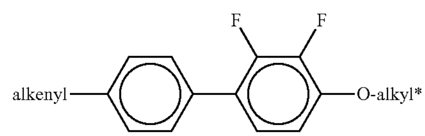

PY9

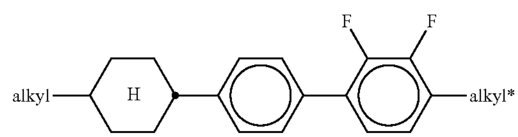

PY10

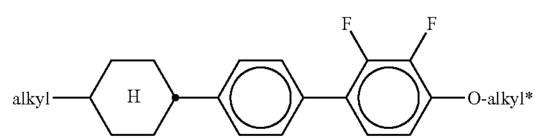

PY11

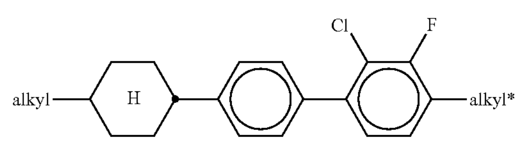

PY12

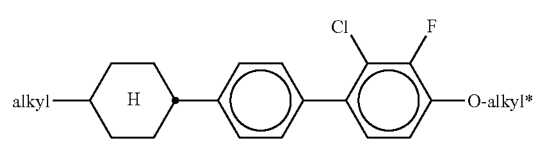

PY13

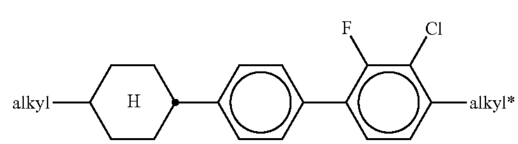

-continued

PY14

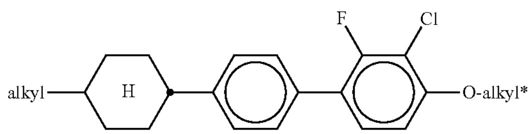

PY15

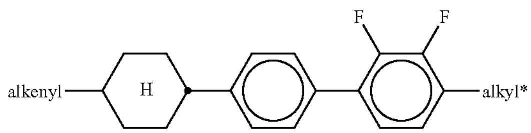

PY16

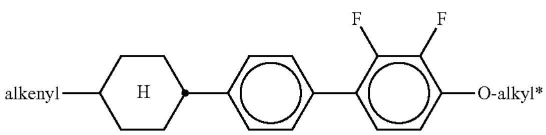

PY17

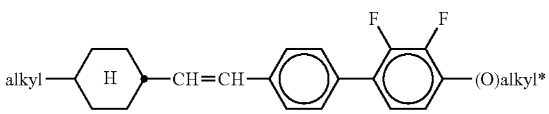

PY18

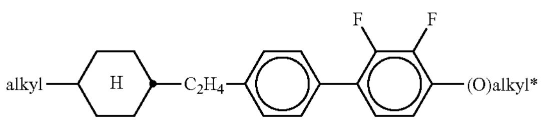

PY19

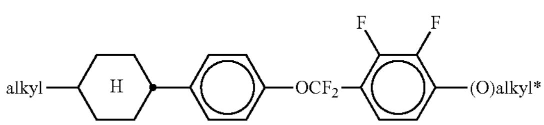

PY20

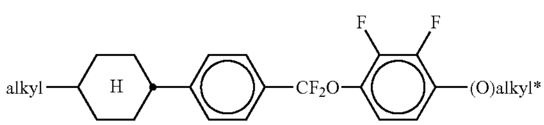

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

b) LC medium which additionally comprises one or more compounds of the following formula:

ZK

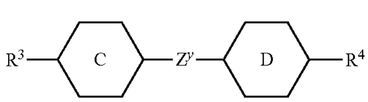

in which the individual radicals have the following meanings:

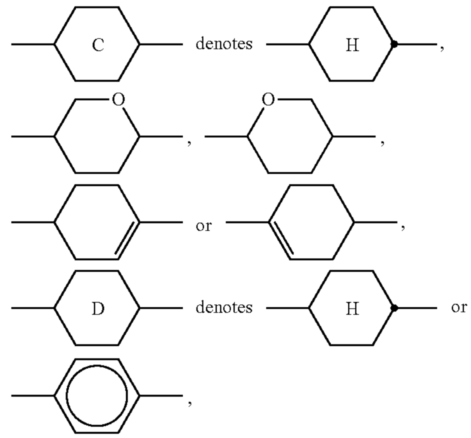

$R^3$ and $R^4$ each, independently of one another, denote alkyl having 1 to 12 C atoms, in which, in addition, one or two non-adjacent $CH_2$ groups may be replaced by —O—, —CH═CH—, —CO—, —O—CO— or —CO—O— in such a way that O atoms are not linked directly to one another, $Z^y$ denotes —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond.

The compounds of the formula ZK are preferably selected from the group consisting of the following sub-formulae:

ZK1

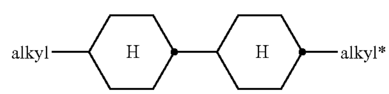

ZK2

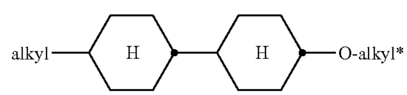

ZK3

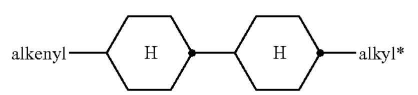

ZK4

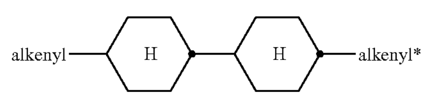

ZK5

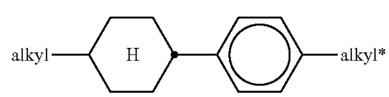

ZK6

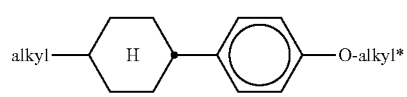

ZK7

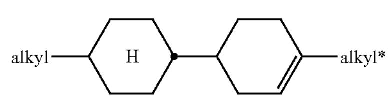

ZK8

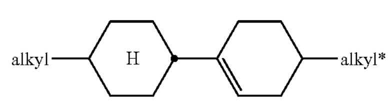

-continued

ZK9

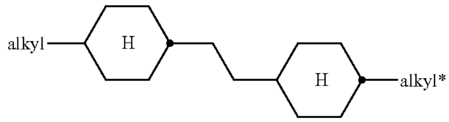

ZK10

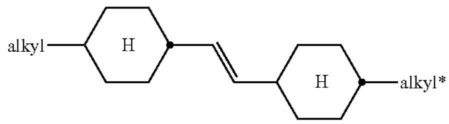

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Especially preferred are compounds of formula ZK1.

Particularly preferred compounds of formula ZK are selected from the following sub-formulae:

ZK1a

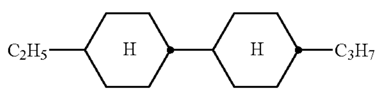

ZK1b

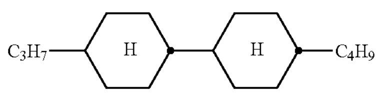

ZK1c

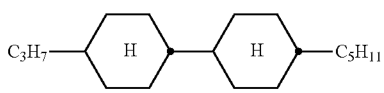

wherein the propyl, butyl and pentyl groups are straight-chain groups.

Most preferred are compounds of formula ZK1a.

c) LC medium which additionally comprises one or more compounds of the following formula:

DK

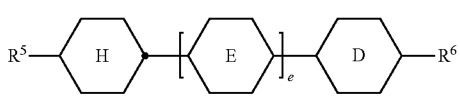

in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms,

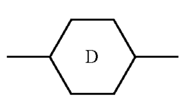 denotes 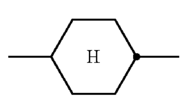 or

-continued

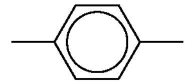 ,

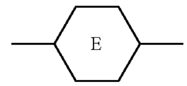 denotes 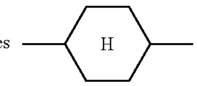 ,

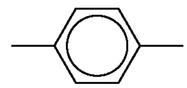 or 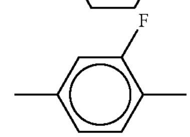 , and e denotes 1 or 2.

The compounds of the formula DK are preferably selected from the group consisting of the following sub-formulae:

DK1

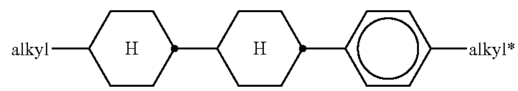

DK2

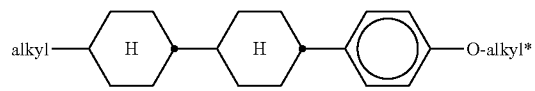

DK3

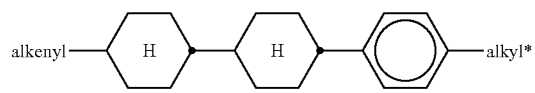

DK4

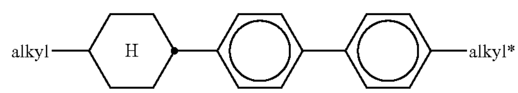

DK5

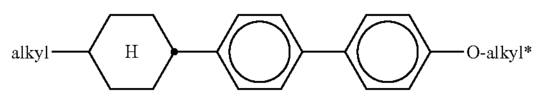

DK6

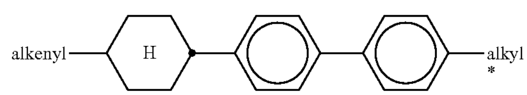

DK7

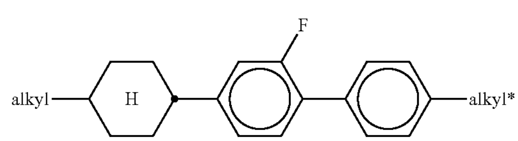

DK8

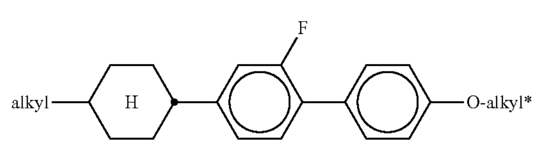

DK9

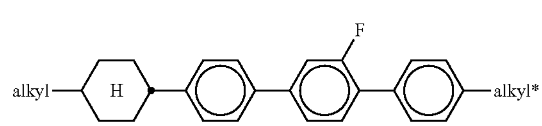

-continued

DK10

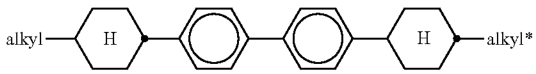

DK11

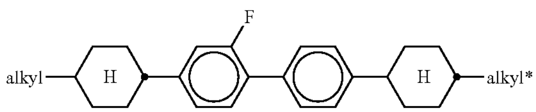

DK12

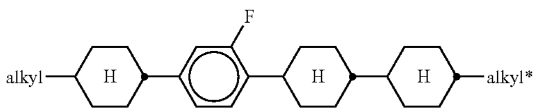

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

d) LC medium which additionally comprises one or more compounds of the following formula:

LY

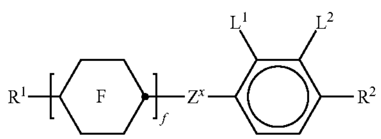

in which the individual radicals have the following meanings:

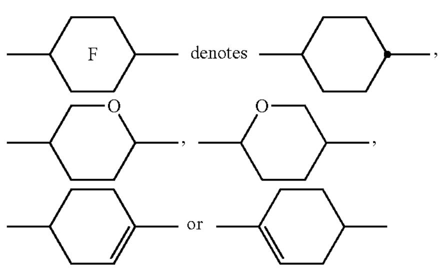

with at least one ring F being different from cyclohexylene, f denotes 1 or 2, $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, $Z^x$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1

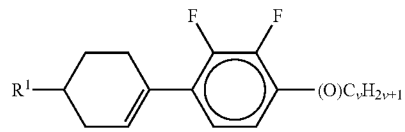

LY2

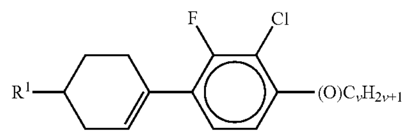

LY3

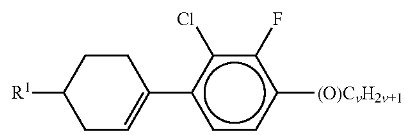

LY4

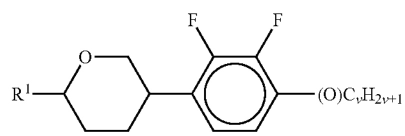

LY5

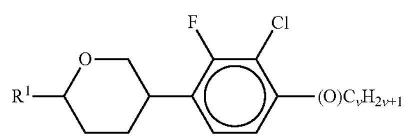

LY6

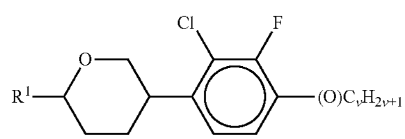

LY7

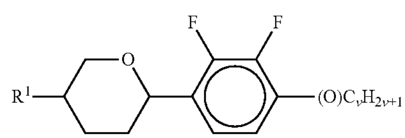

LY8

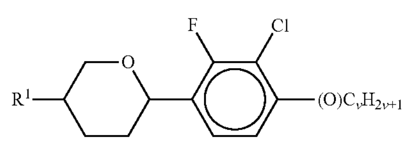

LY9

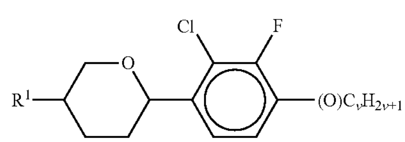

LY10

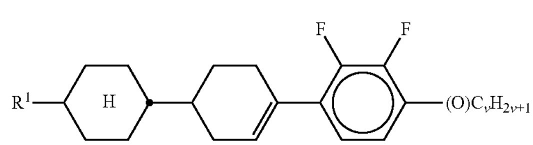

-continued

LY11

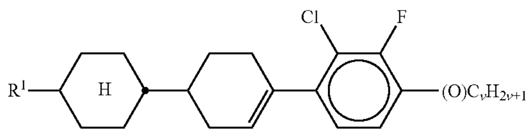

LY12

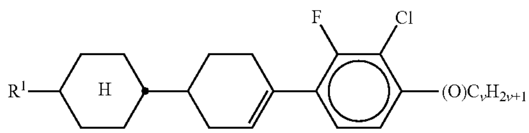

LY13

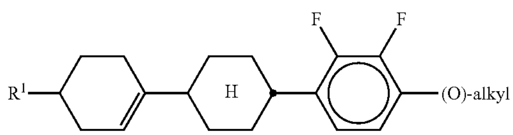

LY14

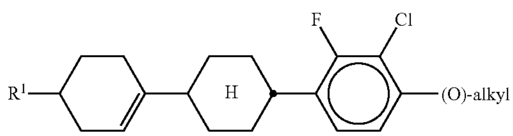

LY15

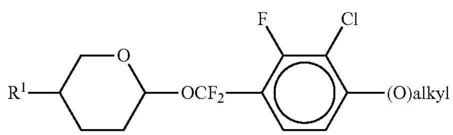

LY16

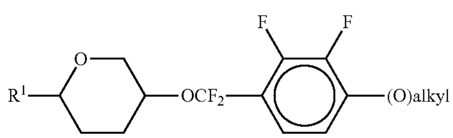

LY17

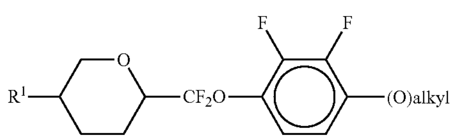

LY18

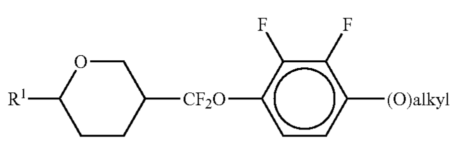

LY19

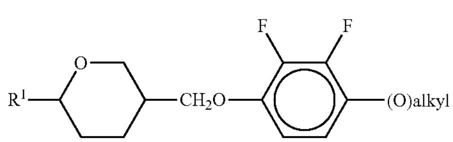

LY20

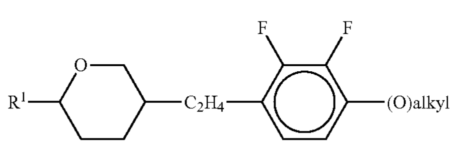

LY21

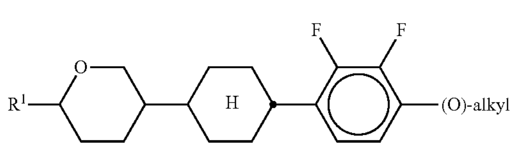

-continued

LY22

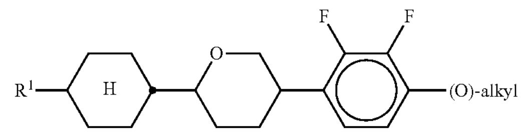

LY23

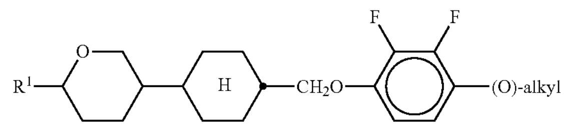

LY24

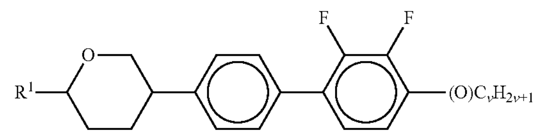

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2CH$—, $CH_2{=}CHCH_2CH_2$—, $CH_3$—$CH{=}CH$—, $CH_3$—$CH_2$—$CH{=}CH$—, $CH_3$—$(CH_2)_2$—$CH{=}CH$—, $CH_3$—$(CH_2)_3$—$CH{=}CH$— or $CH_3$—$CH{=}CH$—$(CH_2)_2$—.

e) LC medium which additionally comprises one or more compounds selected from the group consisting of the following formulae:

G1

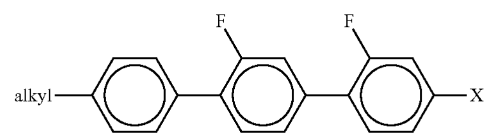

G2

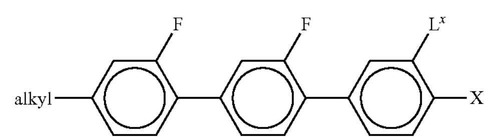

G3

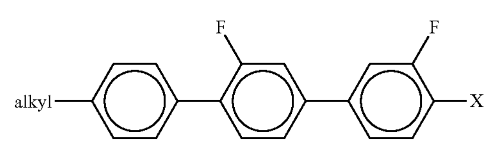

G4

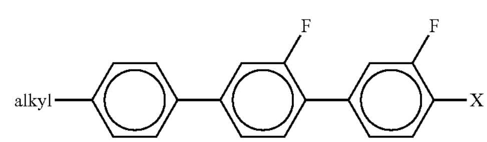

in which alkyl denotes $C_{1-6}$-alkyl, $L^x$ denotes H or F, and X denotes F, Cl, $OCF_3$, $OCHF_2$ or $OCH{=}CF_2$. Particular preference is given to compounds of the formula G1 in which X denotes F.

f) LC medium which additionally comprises one or more compounds selected from the group consisting of the following formulae:

Y1

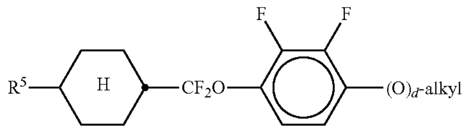

Y2

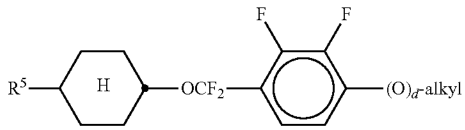

Y3

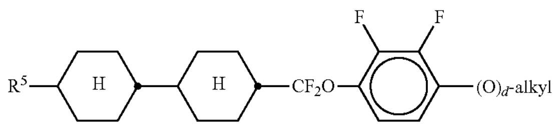

Y4

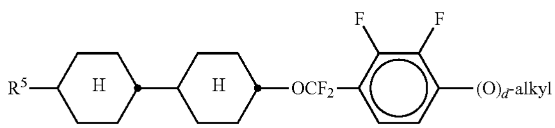

Y5

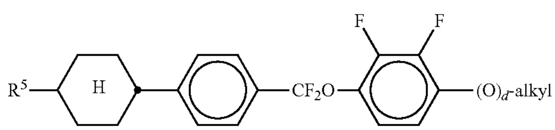

Y6

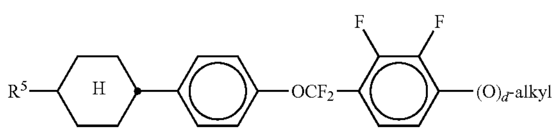

Y7

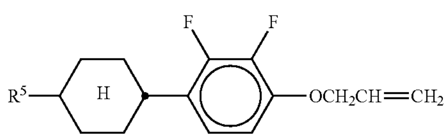

Y8

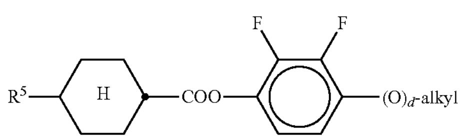

Y9

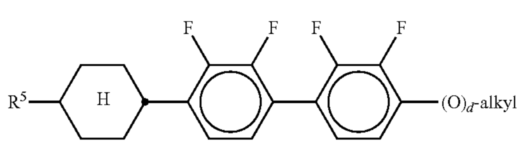

Y10

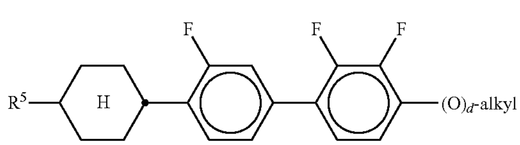

-continued

Y11

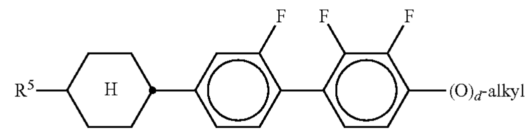

Y12

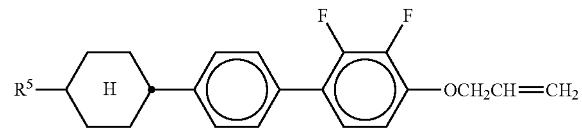

Y13

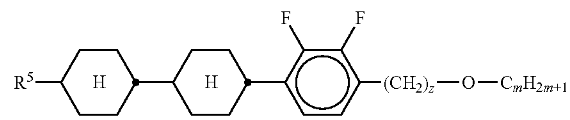

Y14

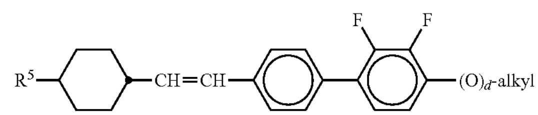

Y15

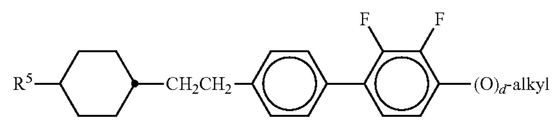

Y16

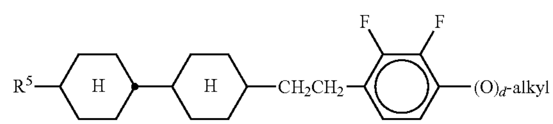

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

B1

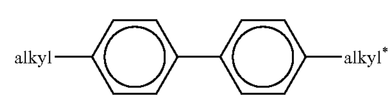

B2

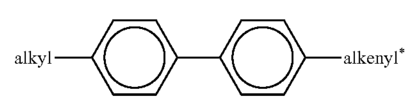

B3

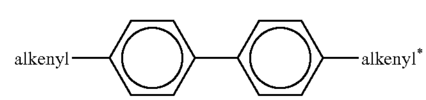

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

B1a

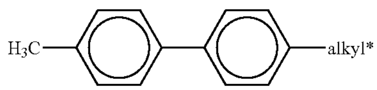

B2a

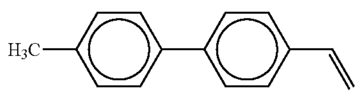

B2b

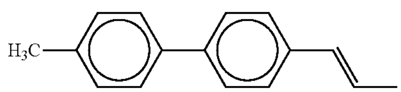

B2c

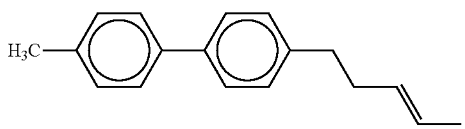

in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

T

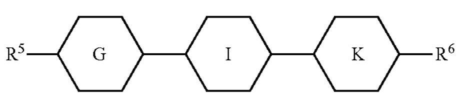

in which $R^5$ and $R^6$ each, independently of one another, have one of the meanings indicated above, and

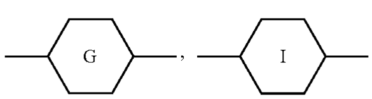

and

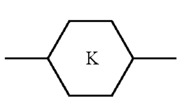

each, independently of one another, denote

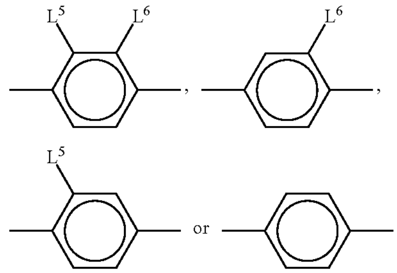

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

T1

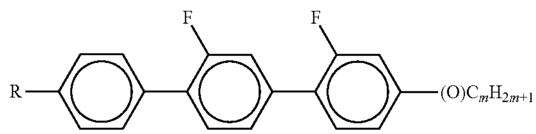

T2

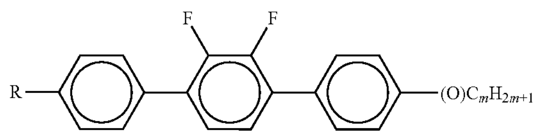

T3

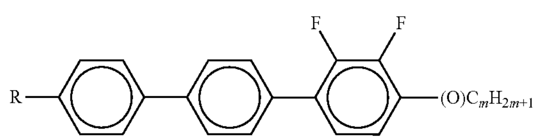

T4

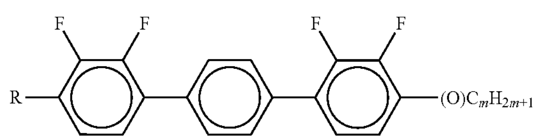

T5

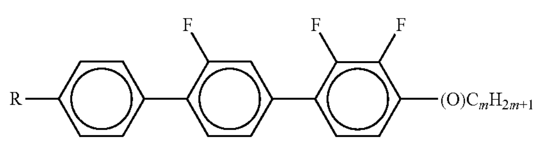

T6

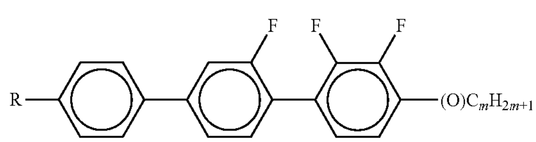

T7

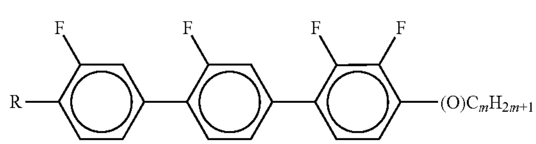

-continued

T8

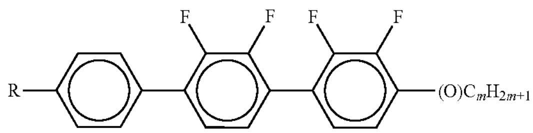

T9

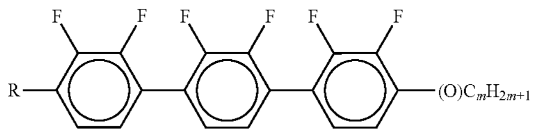

T10

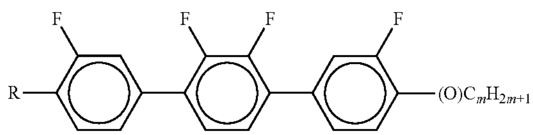

T11

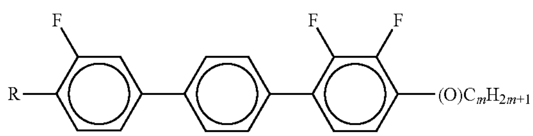

T12

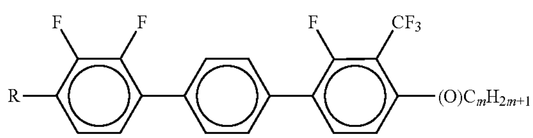

T13

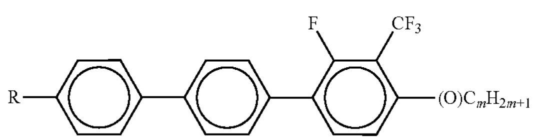

T14

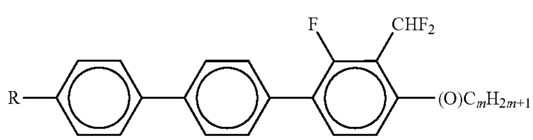

T15

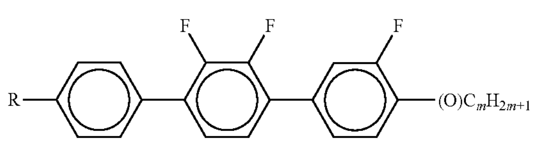

T16

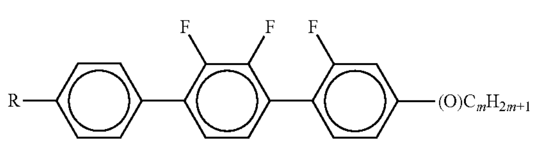

T17

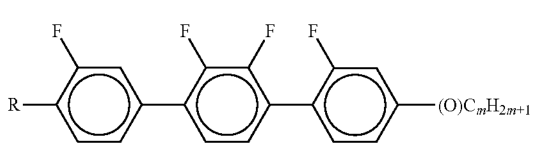

-continued

T18

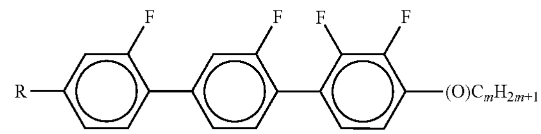

T19

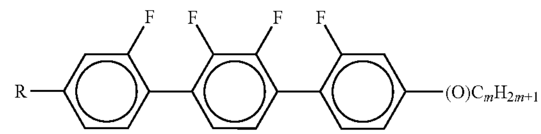

T20

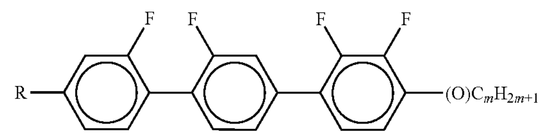

T21

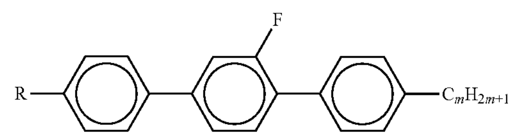

T22

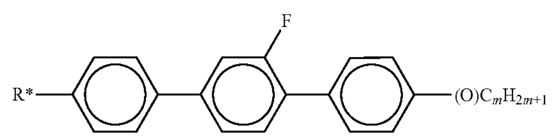

T23

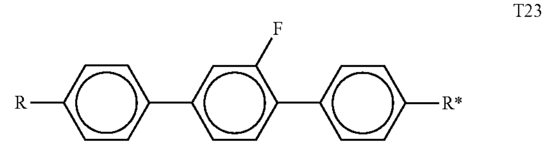

T24

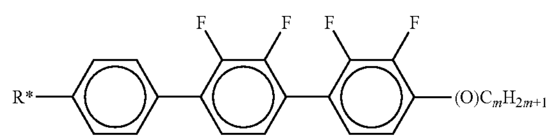

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more quaterphenyl compounds selected from the group consisting of the following formulae:

Q

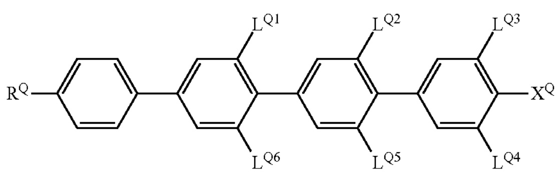

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

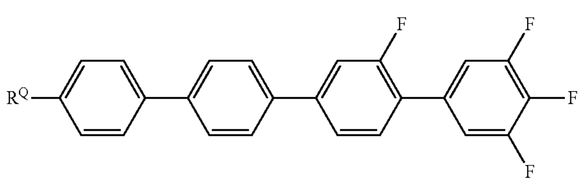

Q2

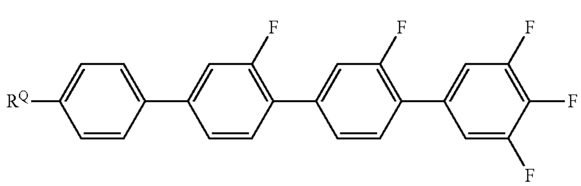

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC medium is from >0 to ≤5% by weight, very preferably from 0.1 to 2% by weight, most preferably from 0.2 to 1.5% by weight.

Preferably the LC medium contains 1 to 5, preferably 1 or 2 compounds of formula Q.

The addition of quaterphenyl compounds of formula Q to the LC medium mixture enables to reduce ODF mura, whilst maintaining high UV absorption, enabling quick and complete polymerisation, enabling strong and quick tilt angle generation, and increasing the UV stability of the LC medium.

Besides the addition of compounds of formula Q, which have positive dielectric anisotropy, to the LC medium with negative dielectric anisotropy allows a better control of the values of the dielectric constants $\varepsilon_{\parallel}$ and $\varepsilon_{\perp}$, and in particular enables to achieve a high value of the dielectric constant $\varepsilon_{\parallel}$ while keeping the dielectric anisotropy $\Delta\varepsilon$ constant, thereby reducing the kick-back voltage and reducing image sticking.

k) LC medium which additionally comprises one or more compounds selected from the group consisting of the following formulae:

O1

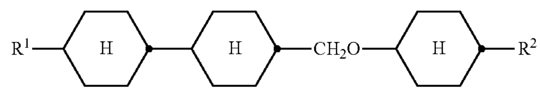

O2

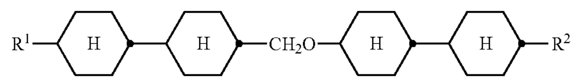

O3

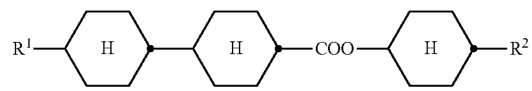

O4

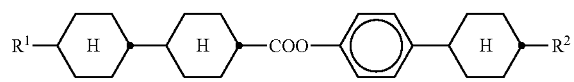

O5

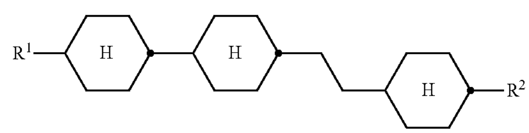

O6

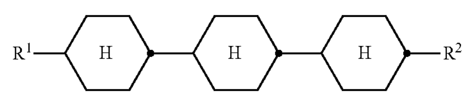

O7

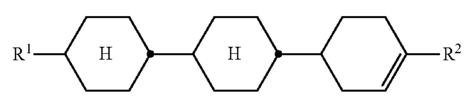

O8

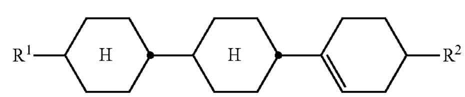

O9

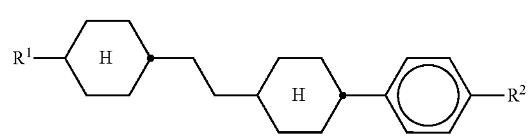

O10

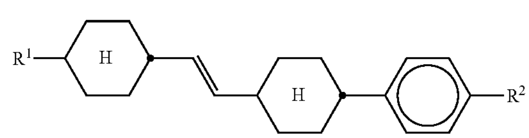

-continued

O11

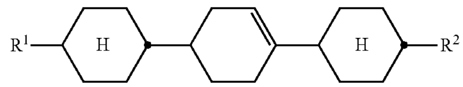

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

l) LC medium which additionally comprises one or more compounds of the following formula:

FI

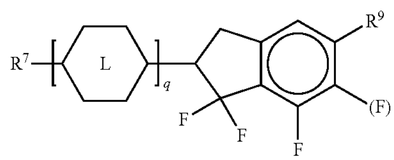

in which

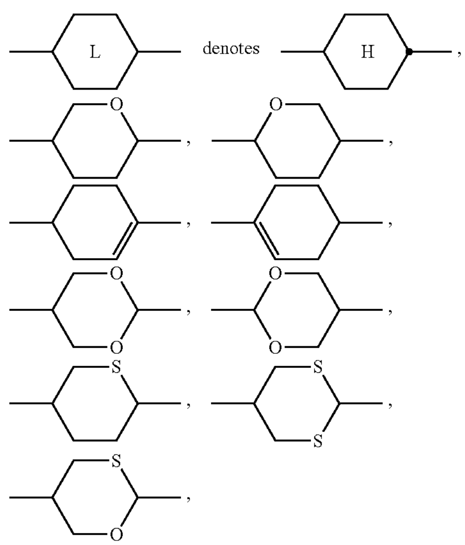

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1

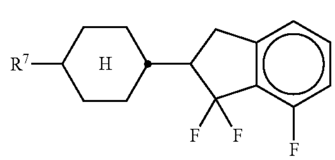

-continued

FI2

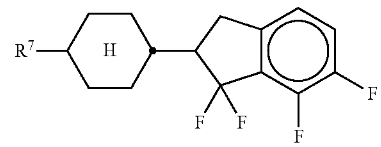

FI3

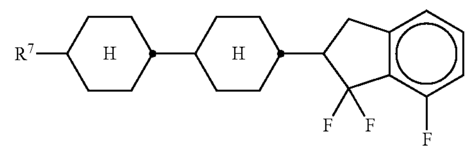

FI4

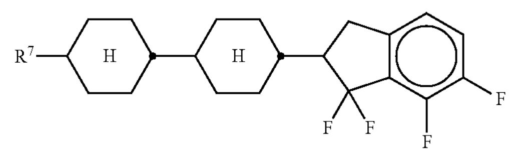

FI5

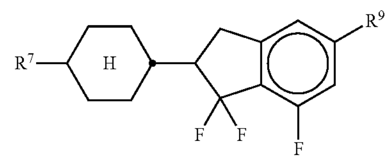

FI6

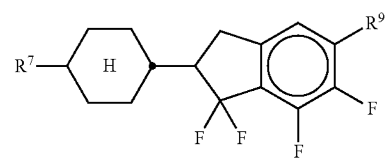

FI7

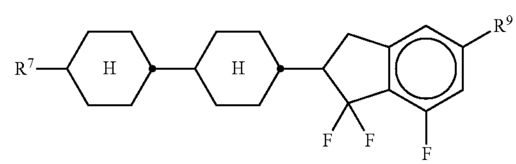

FI8

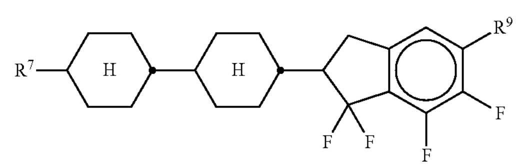

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

VK1

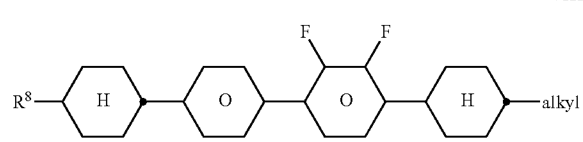

-continued

VK2

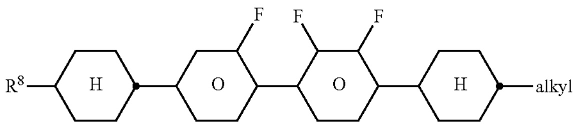

VK3

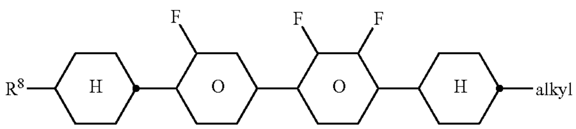

VK4

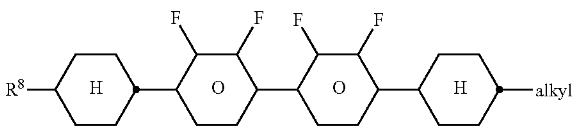

in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

N1

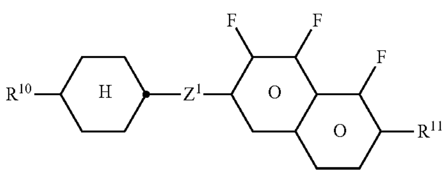

N2

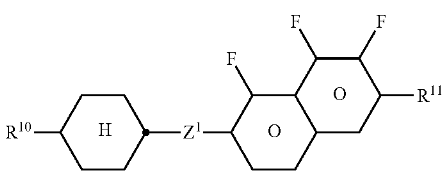

N3

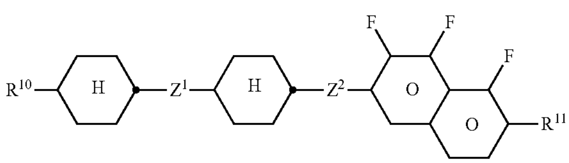

N4

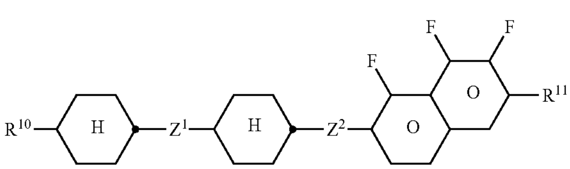

N5

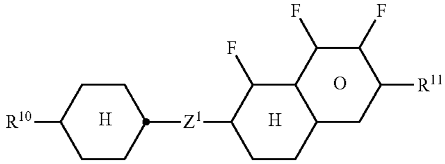

-continued

N6

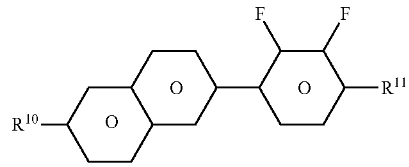

N7

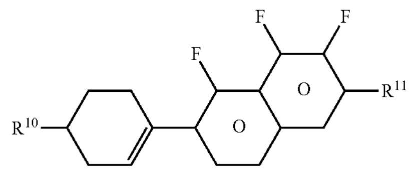

N8

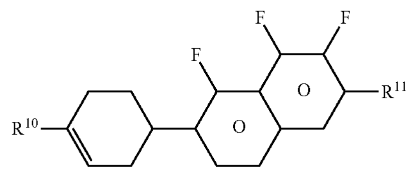

N9

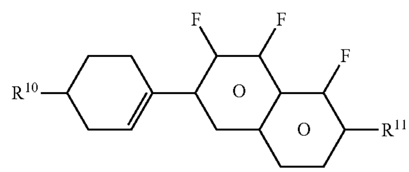

N10

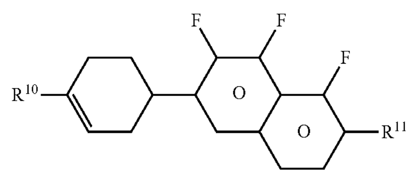

in which $R^{10}$ and $R^{11}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that 0 atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH═CH—, —$(CH_2)_4$—, —$(CH_2)_3O$—, —$O(CH_2)_3$—, —CH═CH—$CH_2CH_2$—, —$CH_2CH_2$CH═CH—, —$CH_2O$—, —$OCH_2$—, —CO—O—, —O—CO—, —$C_2F_4$—, —CF═CF—, —CF═CH—, —CH═CF—, —$CH_2$— or a single bond.

o) LC medium which additionally comprises one or more difluorodibenzo-chromans and/or chromans of the following formulae:

BC

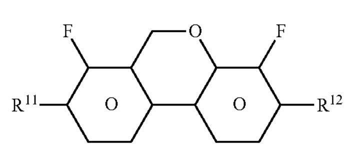

-continued

CR

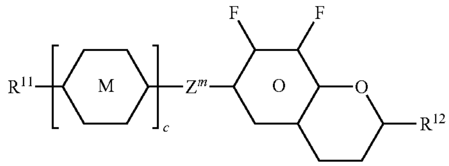

RC

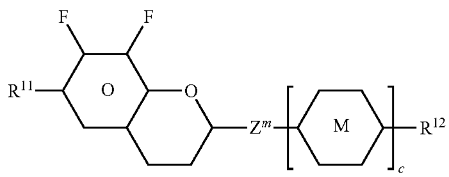

in which $R^{11}$ and $R^{12}$ each, independently of one another, have one of the meanings indicated above for $R^{11}$, ring M is trans-1,4-cyclohexylene or 1,4-phenylene, $Z^m$ —$C_2H_4$—, —$CH_2O$—, —$OCH_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1

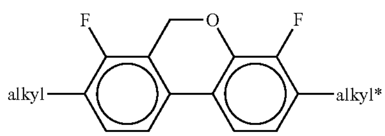

BC2

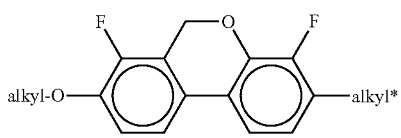

BC3

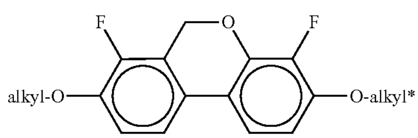

BC4

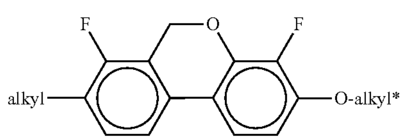

BC5

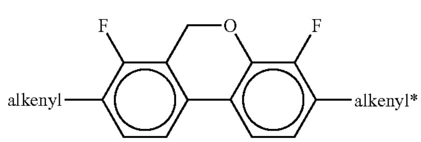

BC6

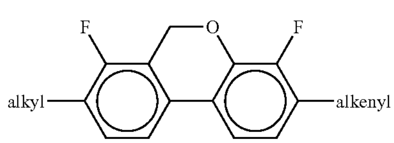

-continued

BC7

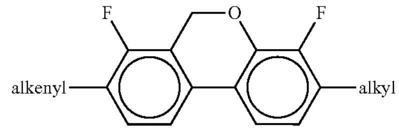

CR1

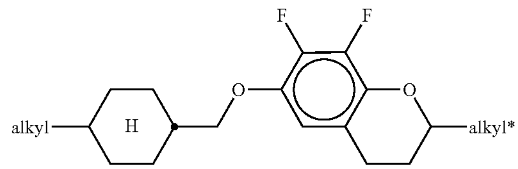

CR2

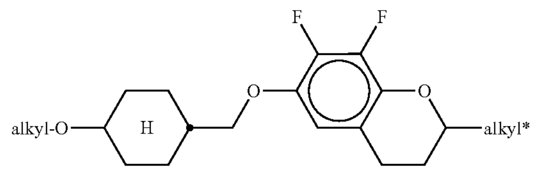

CR3

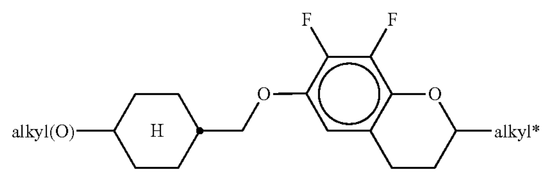

CR4

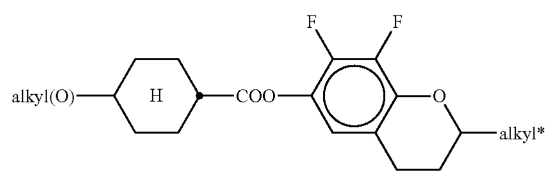

CR5

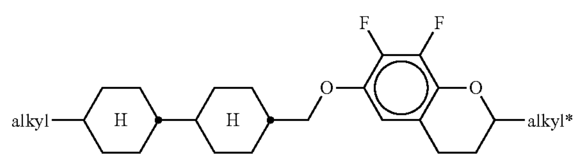

CR6

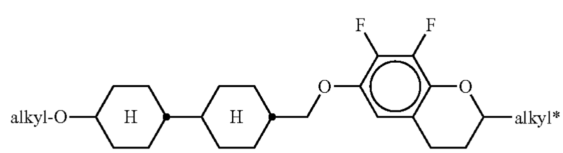

CR7

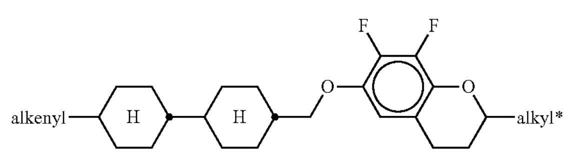

CR8

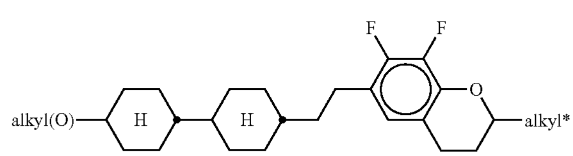

-continued

CR9

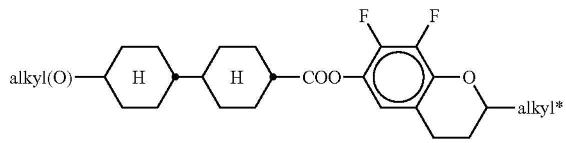

RC1

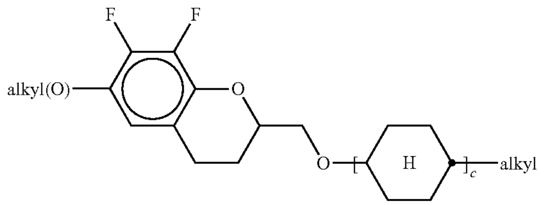

RC2

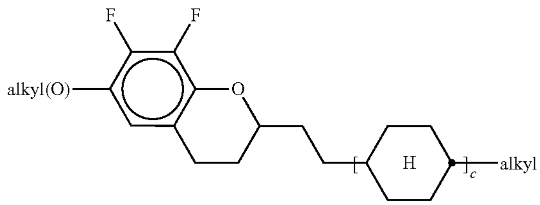

RC3

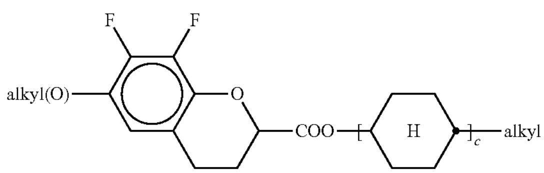

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very particular preference is given to mixtures comprising one, two or three compounds of the formula BC-2.

p) LC medium which additionally comprises one or more fluorinated phenanthrenes and/or dibenzofurans of the following formulae:

PH

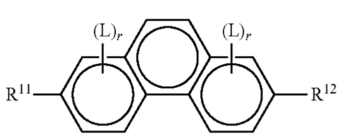

BF

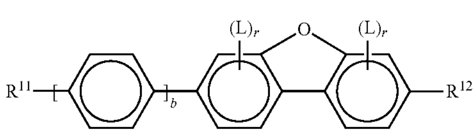

in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

PH1

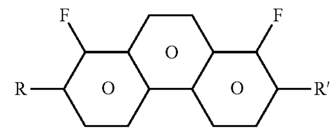

PH2

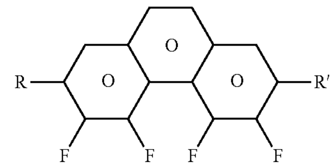

BF1

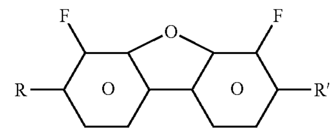

BF2

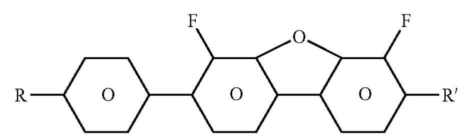

in which R and R' each, independently of one another, denote a straight-chain alkyl or alkoxy radical having 1-7 C atoms.

q) LC medium which additionally comprises one or more monocyclic compounds of the following formula

Y

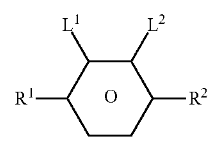

wherein $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

Y1

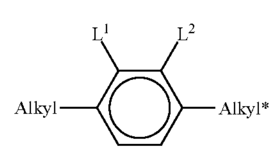

-continued

Y2

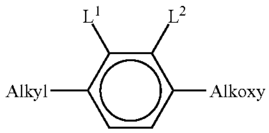

Y3

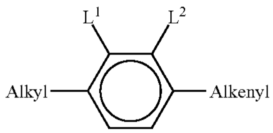

Y4

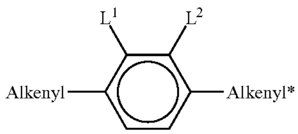

Y5

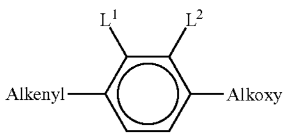

Y6

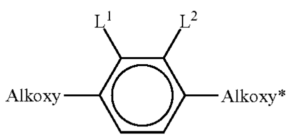

Y7

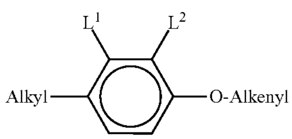

Y8

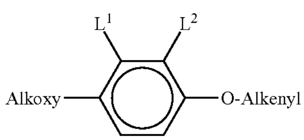

Y9

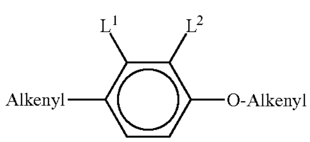

Y10

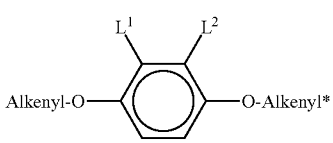

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Particularly preferred compounds of the formula Y are selected from the group consisting of the following sub-formulae:

Y6A

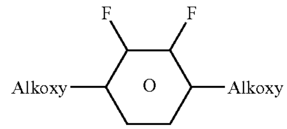

Y6B

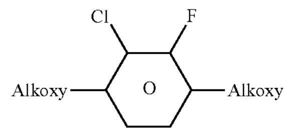

wherein Alkoxy preferably denotes straight-chain alkoxy with 3, 4, or 5 C atoms.

r) LC medium which, apart from the polymerisable compounds according to the invention, in particular of the formula I or sub-formulae thereof and the comonomers, comprises no compounds which contain a terminal vinyloxy group (—O—CH═$CH_2$).

s) LC medium which comprises 1 to 5, preferably 1, 2 or 3, polymerisable compounds, preferably selected from polymerisable compounds according to the invention, in particular of the formula I or sub-formulae thereof.

t) LC medium in which the proportion of polymerisable compounds, in particular of the formula I or sub-formulae thereof, in the mixture as a whole is 0.05 to 5%, preferably 0.1 to 1%.

u) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

v) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

w) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the mixture as a whole is greater than 70%, preferably greater than 80%.

y) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

z) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z1) LC medium which contains one or more, preferably 1, 2 or 3, compounds of formula T2. The content of these compounds in the mixture as a whole is preferably 1 to 20%.

z2) LC medium in which the LC host mixture contains one or more, preferably 1, 2 or 3, compounds of formula BF1, and one or more, preferably 1, 2 or 3, compounds selected from formulae AY14, AY15 and AY16, very preferably of formula AY14. The proportion of the compounds of formula AY14-AY16 in the LC host mixture is preferably from 2 to 35%, very preferably from 3 to 30%. The proportion of the compounds of formula BF1 in the LC host mixture is preferably from 0.5 to 20%, very preferably from 1 to 15%. Further preferably the LC host mixture according to this preferred embodiment contains one or more, preferably 1, 2 or 3 compounds of formula T, preferably selected from formula T1, T2 and T5, very preferably from formula T2 or T5. The proportion of the compounds of formula T in the LC host mixture medium is preferably from 0.5 to 15%, very preferably from 1 to 10%.

In a second preferred embodiment the LC medium contains an LC host mixture based on compounds with positive dielectric anisotropy. Such LC media are especially suitable for use in PS-OCB-, PS-TN-, PS-Posi-VA-, PS-IPS- or PS-FFS-displays.

Particularly preferred is an LC medium of this second preferred embodiment, which contains one or more compounds selected from the group consisting of compounds of formula AA and BB

AA

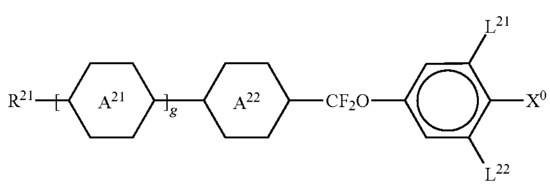

BB

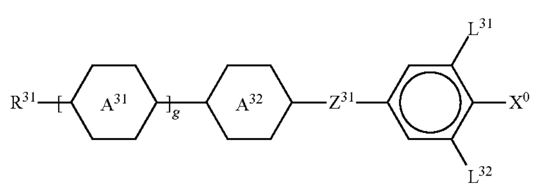

and optionally contains, in addition to the compounds of formula AA and/or BB, one or more compounds of formula CC

CC

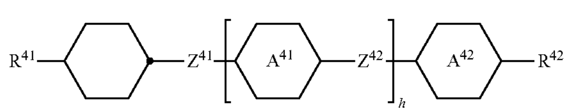

in which the individual radicals have the following meanings:

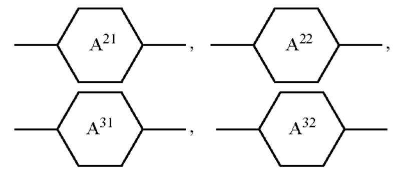

each, independently of one another, and on each occurrence, identically or differently

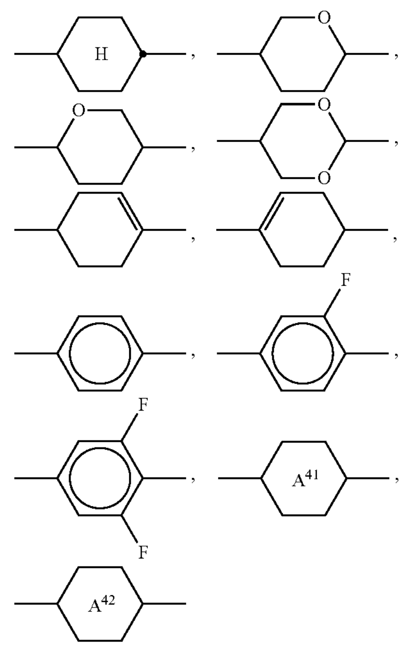

each, independently of one another, and on each occurrence, identically or differently

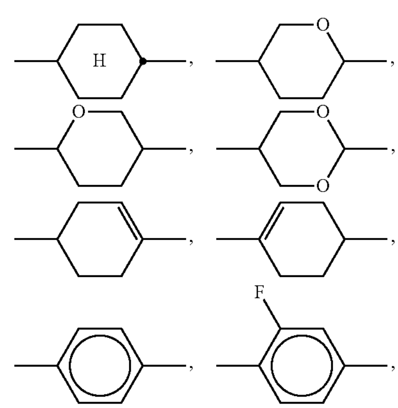

$R^{21}$, $R^{31}$, $R^{41}$, $R^{42}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans-CH═CH—, trans-CF═CF—, —$CH_2O$— or a single bond, preferably —$CH_2CH_2$—, —COO—, trans-CH═CH— or a single bond, particularly preferably —COO—, trans-CH═CH— or a single bond, $Z^{41}$, $Z^{42}$ —$CH_2CH_2$—, —COO—, trans-CH═CH—, trans-CF═CF—, —$CH_2O$—, —$CF_2O$—, —C≡C— or a single bond, preferably a single bond, $L^{21}$, $L^{22}$, $L^{31}$, $L^{32}$ H or F, g 0, 1, 2 or 3, h 0, 1, 2 or 3.

$X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH═$CF_2$, very preferably F or $OCF_3$ The compounds of formula AA are preferably selected from the group consisting of the following formulae:

AA1

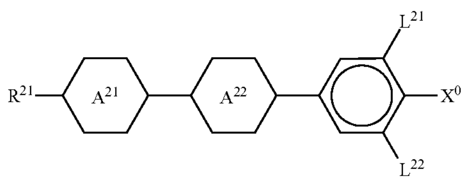

AA2

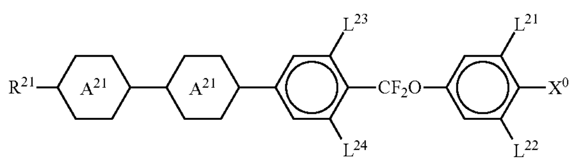

AA3

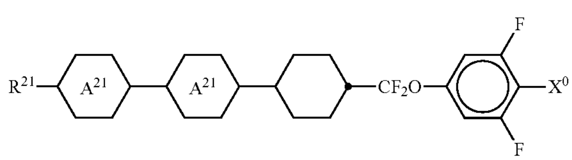

AA4

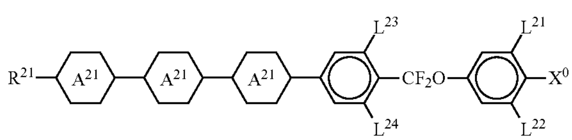

in which $A^{21}$, $R^{21}$, $X^0$, $L^{21}$ and $L^{22}$ have the meanings given in formula AA, $L^{23}$ and $L^{24}$ each, independently of one another, are H or F, and $X^0$ is preferably F. Particularly preferred are compounds of formulae AA1 and AA2.

Particularly preferred compounds of formula AA1 are selected from the group consisting of the following subformulae:

AA1a

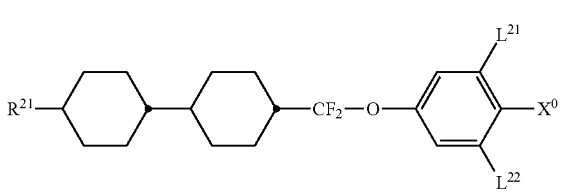

-continued

AA1b

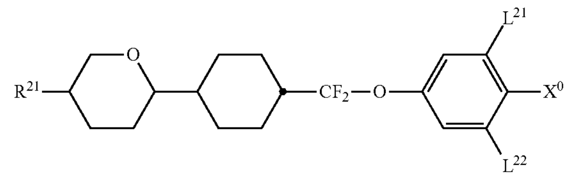

AA1c

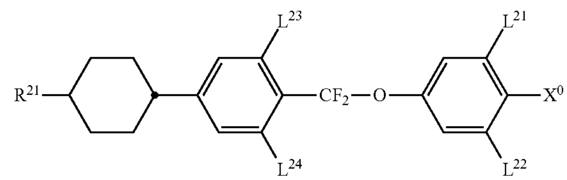

AA1d

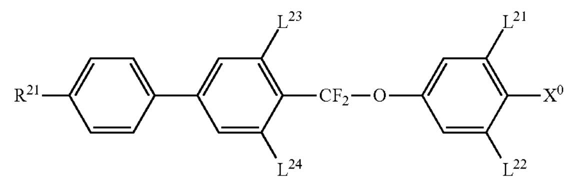

AA1e

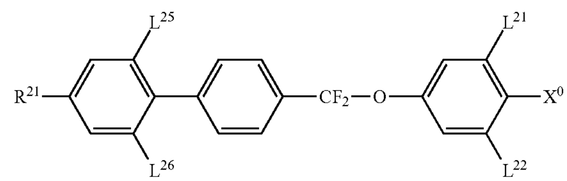

in which $R^{21}$, $X^0$, $L^{21}$ and $L^{22}$ have the meaning given in formula AA1, $L^{23}$, $L^{24}$, $L^{25}$ and $L^{26}$ are each, independently of one another, H or F, and $X^0$ is preferably F.

Very particularly preferred compounds of formula AA1 are selected from the group consisting of the following subformulae:

AA1a1

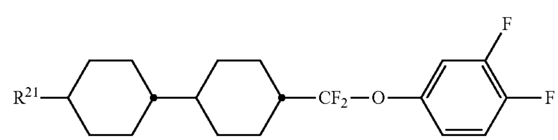

AA1a2

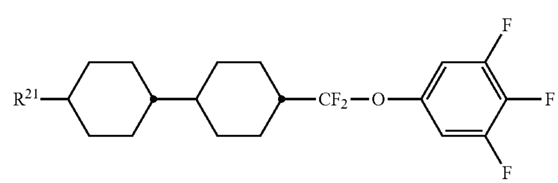

AA1b1

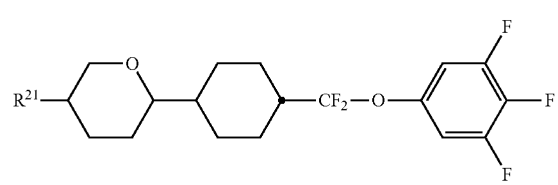

-continued

AA1d1

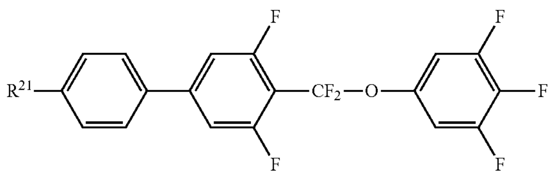

AA1e2

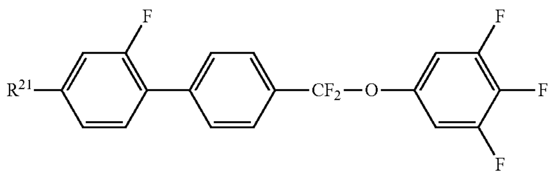

In which $R^{21}$ is as defined in formula AA1.

Very preferred compounds of formula AA2 are selected from the group consisting of the following subformulae:

AA2a

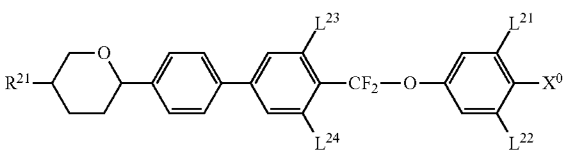

AA2b

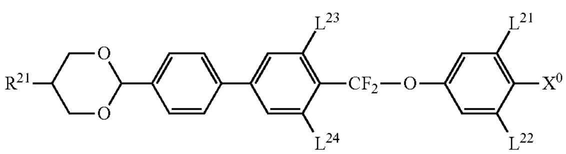

AA2c

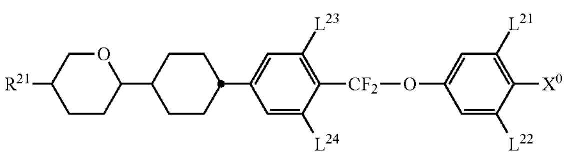

AA2d

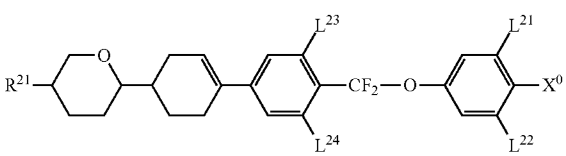

AA2e

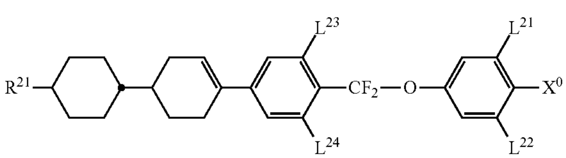

AA2f

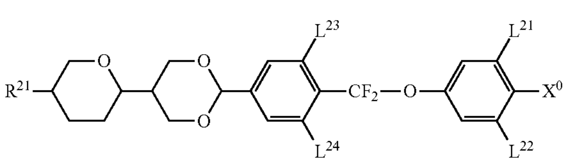

-continued

AA2g

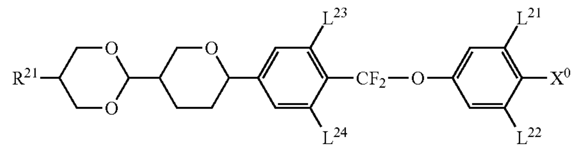

AA2h

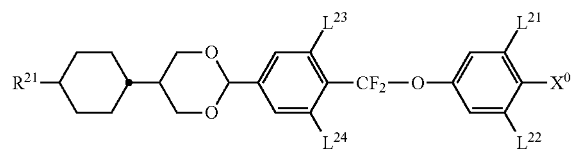

AA2i

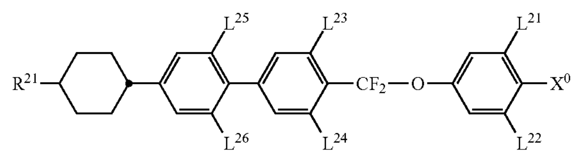

AA2j

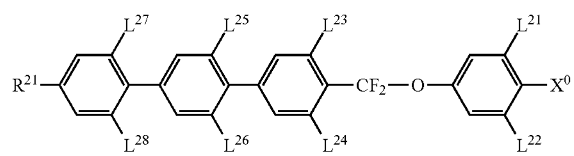

in which $R^{21}$, $X^0$, $L^{21}$ and $L^{22}$ have the meaning given in formula AA2, $L^{23}$, $L^{24}$, $L^{25}$ and $L^{26}$ each, independently of one another, are H or F, and $X^0$ is preferably F.

Very particularly preferred compounds of formula AA2 are selected from the group consisting of the following subformulae:

AA2a1

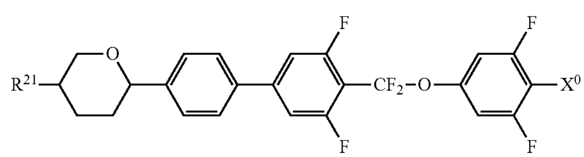

AA2c1

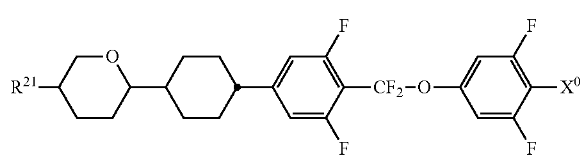

AA2d1

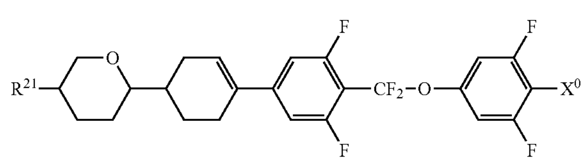

-continued

AA2e1

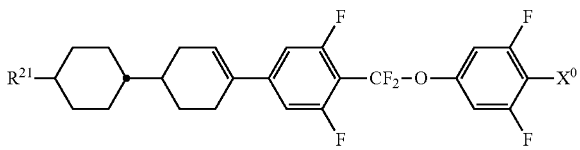

AA2f1

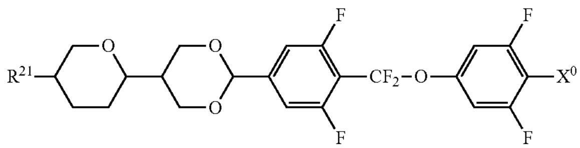

AA2h1

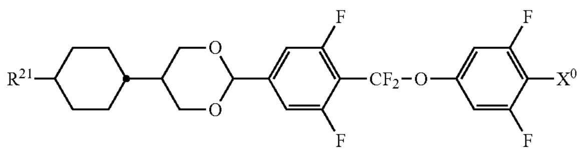

AA2i1

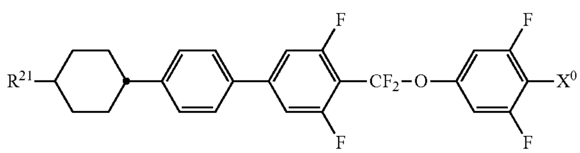

AA2i2

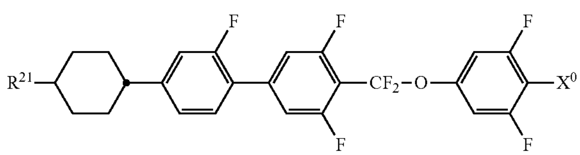

AA2j1

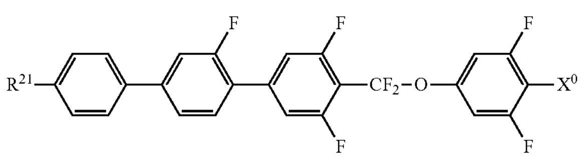

-continued

AA2j2

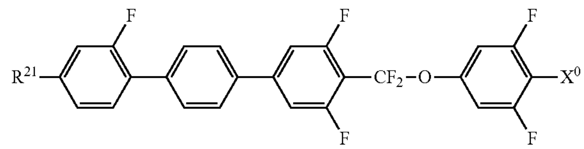

in which $R^{21}$ and $X^0$ are as defined in formula AA2.

Particularly preferred compounds of formula AA3 are selected from the group consisting of the following subformulae:

AA3a

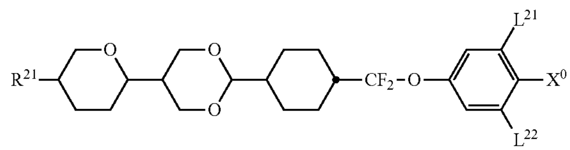

AA3b

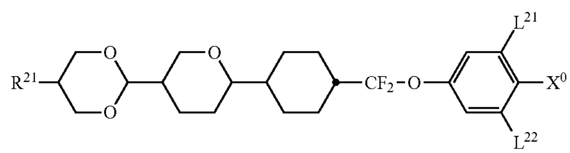

AA3c

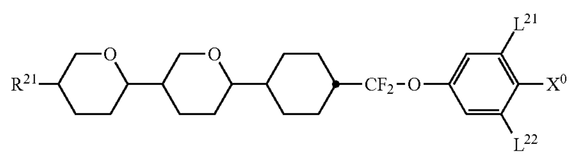

in which $R^{21}$, $X^0$, $L^{21}$ and $L^{22}$ have the meaning given in formula AA3, and $X^0$ is preferably F.

Particularly preferred compounds of formula AA4 are selected from the group consisting of the following subformulae:

AA4a

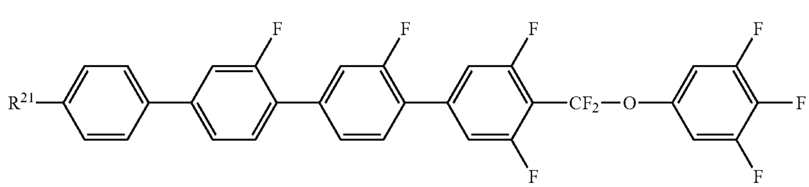

in which $R^{21}$ is as defined in formula AA4.

The compounds of formula BB are preferably selected from the group consisting of the following formulae:

BB1

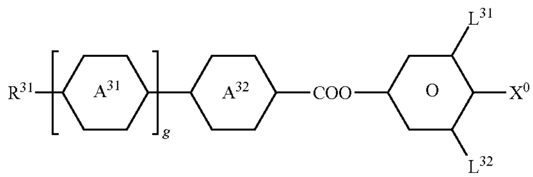

BB2

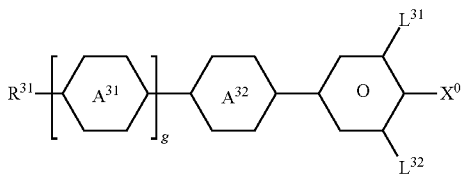

BB3

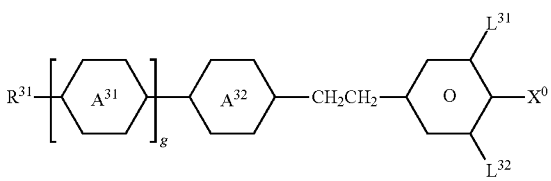

in which g, $A^{31}$, $A^{32}$, $R^{31}$, $X^0$, $L^{31}$ and $L^{32}$ have the meanings given in formula BB, and $X^0$ is preferably F. Particularly preferred are compounds of formulae BB1 and BB2.

Particularly preferred compounds of formula BB1 are selected from the group consisting of the following subformulae:

BB1a

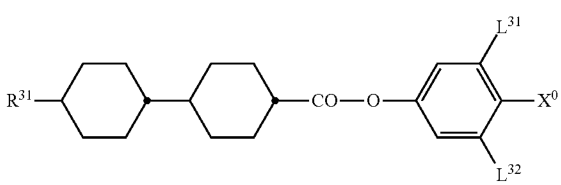

BB1b

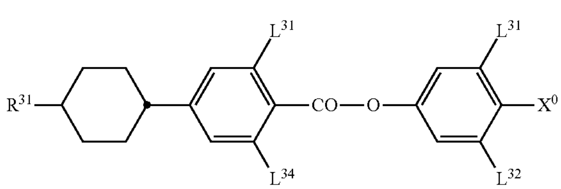

in which $R^{31}$, $X^0$, $L^{31}$ and $L^{32}$ have the meaning given in formula BB1, and $X^0$ is preferably F.

Very particularly preferred compounds of formula BB1a are selected from the group consisting of the following subformulae:

BB1a1

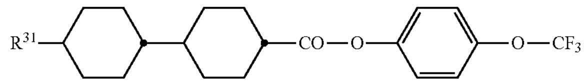

BB1a2

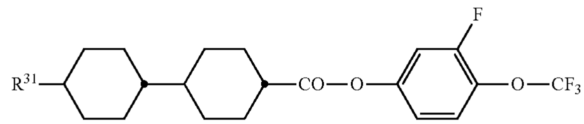

BB1a3

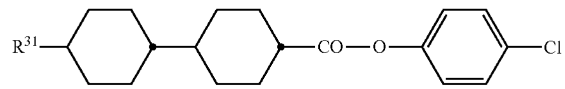

BB1a4

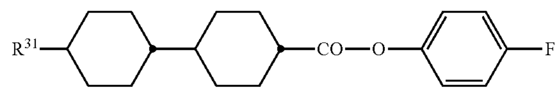

BB1a5

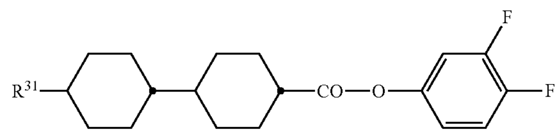

BB1a6

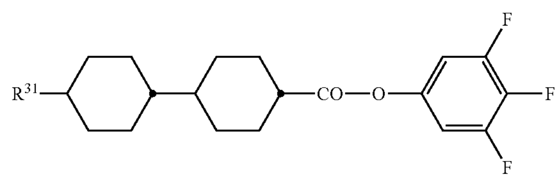

in which $R^{31}$ is as defined in formula BB1.

Very particularly preferred compounds of formula BB1b are selected from the group consisting of the following subformulae:

BB1b1

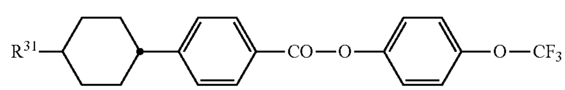

BB1b2

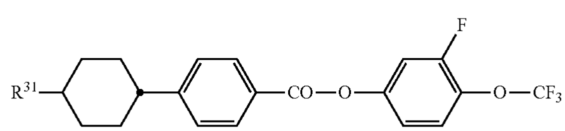

BB1b3

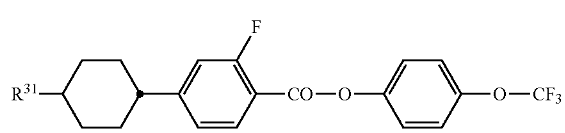

BB1b4

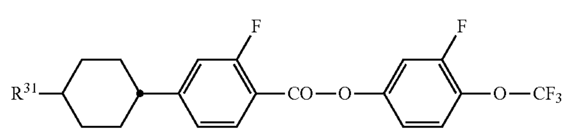

in which $R^{31}$ is as defined in formula BB1.

Particularly preferred compounds of formula BB2 are selected from the group consisting of the following subformulae:

BB2a

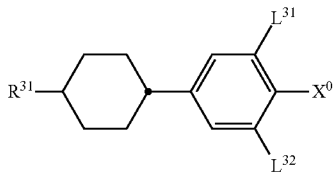

BB2b

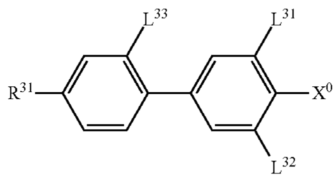

BB2c

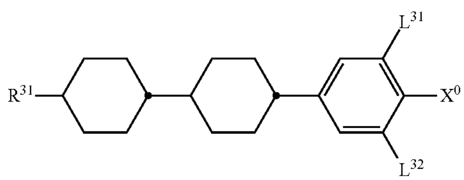

BB2d

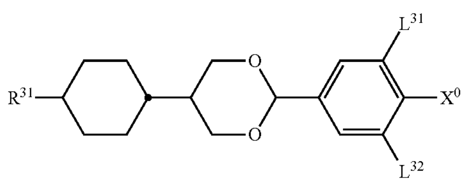

BB2e

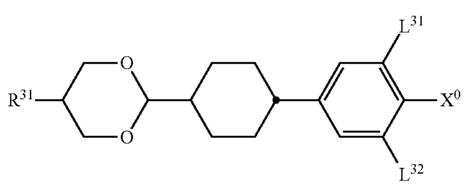

BB2f

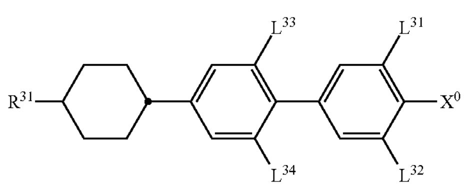

BB2g

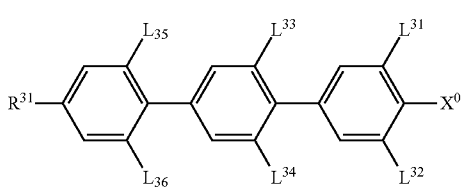

BB2h

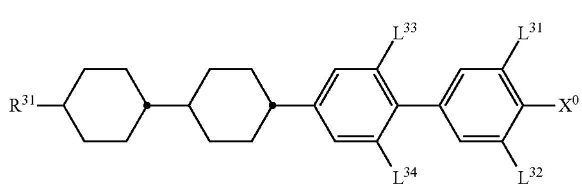

-continued

BB2i

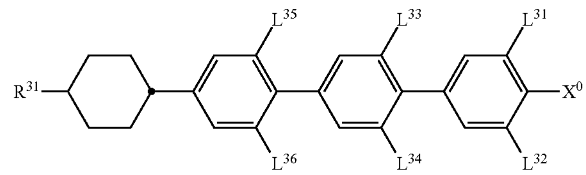

BB2k

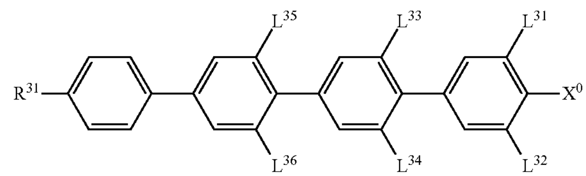

in which $R^{31}$, $X^0$, $L^{31}$ and $L^{32}$ have the meaning given in formula BB2, $L^{33}$, $L^{34}$, $L^{35}$ and $L^{36}$ are each, independently of one another, H or F, and $X^0$ is preferably F.

Very particularly preferred compounds of formula BB2 are selected from the group consisting of the following subformulae:

BB2a1

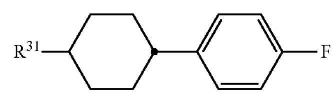

BB2a2

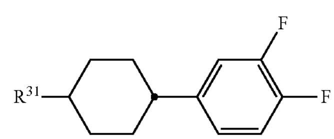

BB2a3

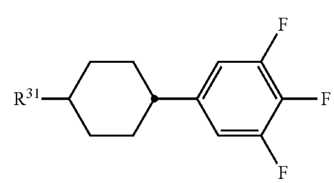

BB2a4

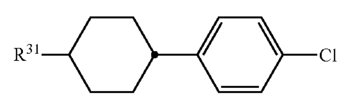

BB2a5

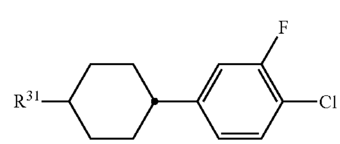

in which $R^{31}$ is as defined in formula BB2.

Very particularly preferred compounds of formula BB2b are selected from the group consisting of the following subformulae BB2b1

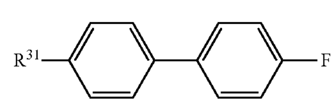

-continued

BB2b2

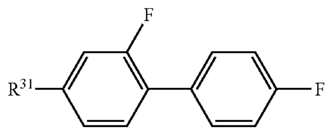

BB2b3

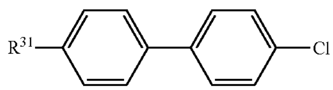

BB2b4

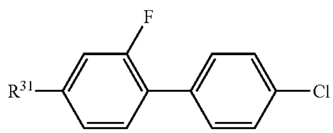

in which $R^{31}$ is as defined in formula BB2.

Very particularly preferred compounds of formula BB2c are selected from the group consisting of the following subformulae:

BB2c1

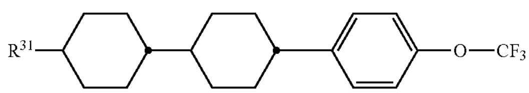

BB2c2

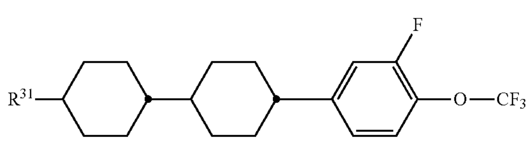

BB2c3

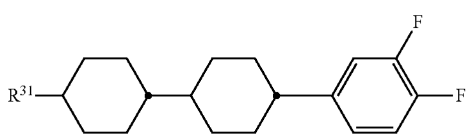

BB2c4

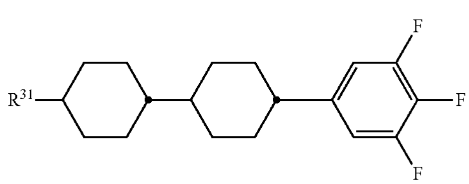

BB2c5

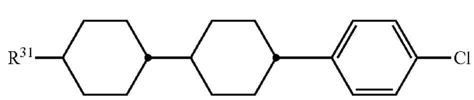

in which $R^{31}$ is as defined in formula BB2.

Very particularly preferred compounds of formula BB2d and BB2e are selected from the group consisting of the following subformulae:

BB2d1

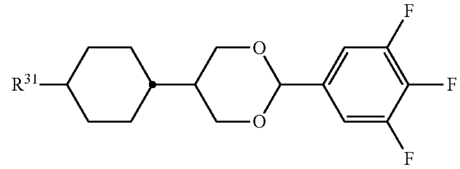

BB2e1

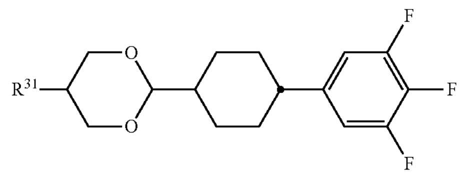

in which $R^{31}$ is as defined in formula BB2.

Very particularly preferred compounds of formula BB2f are selected from the group consisting of the following subformulae:

BB2f1

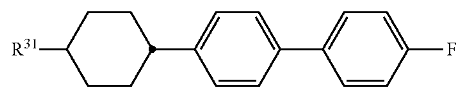

BB2f2

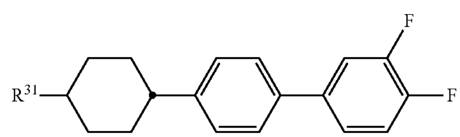

BB2f3

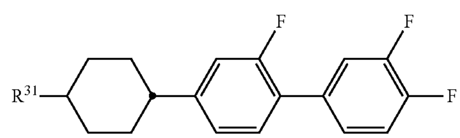

BB2f4

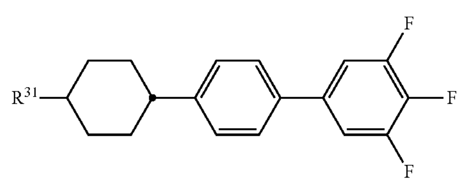

BB2f5

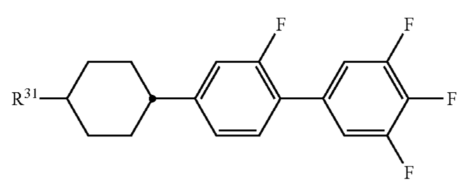

in which $R^{31}$ is as defined in formula BB2.

Very particularly preferred compounds of formula BB2g are selected from the group consisting of the following subformulae:

BB2g1

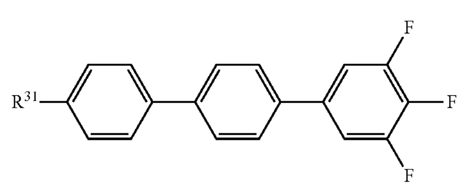

-continued

BB2g2

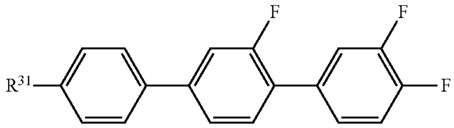

BB2g3

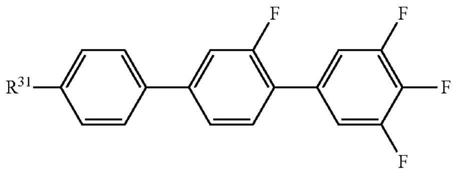

BB2g4

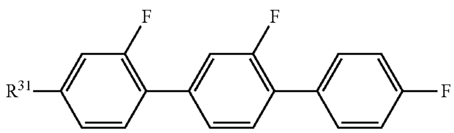

BB2g5

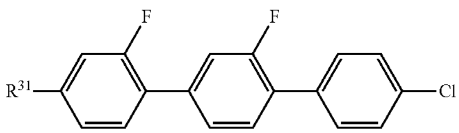

in which $R^{31}$ is as defined in formula BB2.

Very particularly preferred compounds of formula BB2h are selected from the group consisting of the following subformulae:

BB2h1

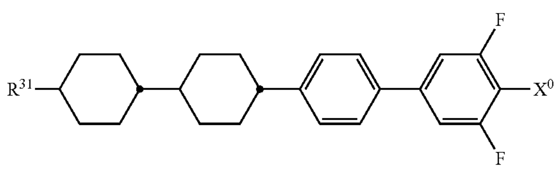

BB2h2

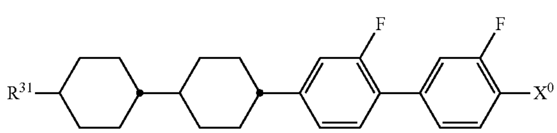

BB2h3

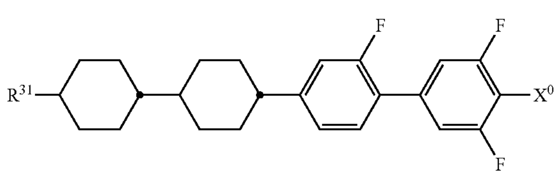

in which $R^{31}$ and $X^0$ are as defined in formula BB2.

Very particularly preferred compounds of formula BB2i are selected from the group consisting of the following subformulae:

BB2i1

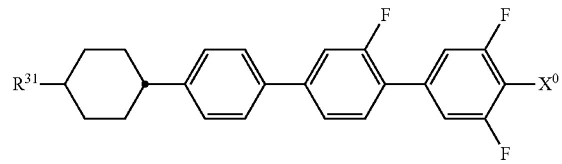

BB2i2

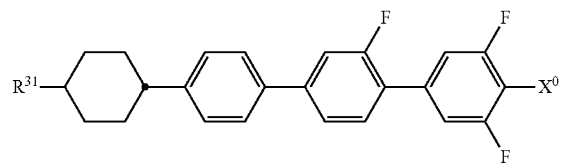

in which $R^{31}$ and $X^0$ are as defined in formula BB2.

Very particularly preferred compounds of formula BB2k are selected from the group consisting of the following subformulae:

BB2k1

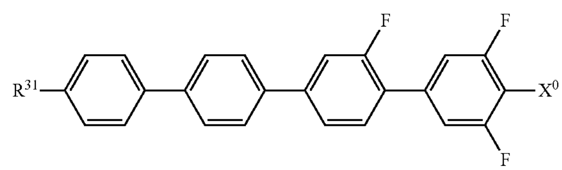

BB2k2

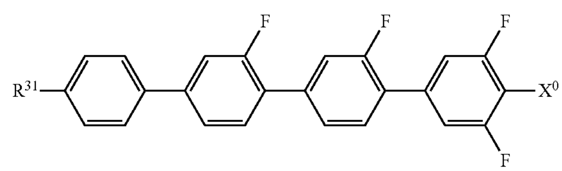

in which $R^{31}$ and $X^0$ are as defined in formula BB2.

Alternatively to, or in addition to, the compounds of formula BB1 and/or BB2 the LC media may also comprise one or more compounds of formula BB3 as defined above.

Particularly preferred compounds of formula BB3 are selected from the group consisting of the following subformulae:

BB3a

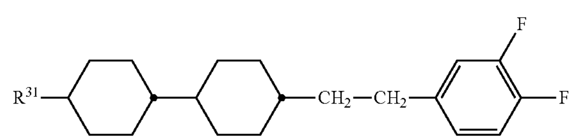

BB3b

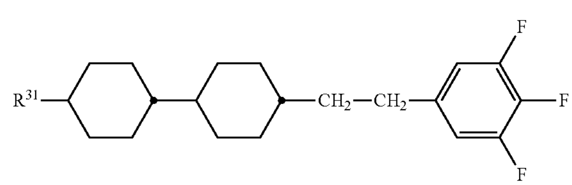

in which $R^{31}$ is as defined in formula BB3.

Preferably the LC media according to this second preferred embodiment comprise, in addition to the compounds of formula AA and/or BB, one or more dielectrically neutral compounds having a dielectric anisotropy in the range from −1.5 to +3, preferably selected from the group of compounds of formula CC as defined above.

Particularly preferred compounds of formula CC are selected from the group consisting of the following subformulae:

CC1

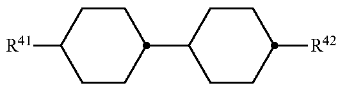

CC2

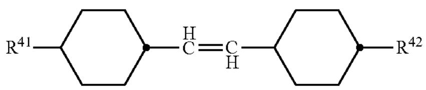

CC3

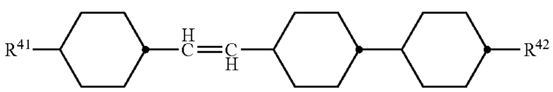

CC4

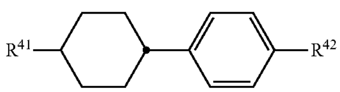

CC5

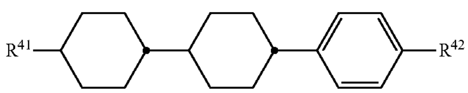

CC6

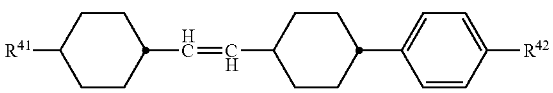

CC7

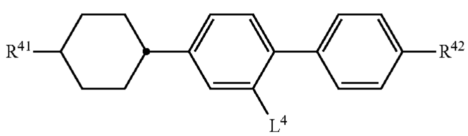

CC8

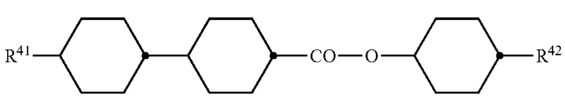

CC9

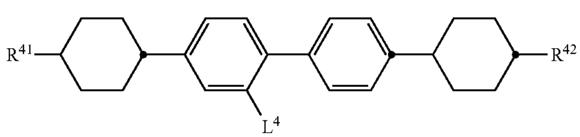

CC10

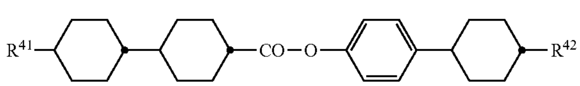

CC11

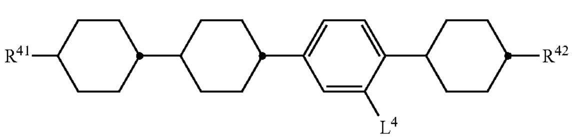

-continued

CC12

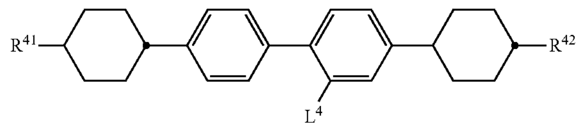

CC13

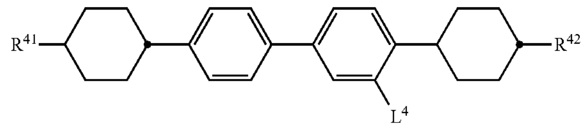

CC14

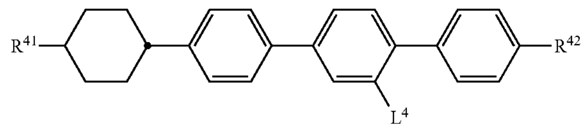

In which $R^{41}$ and $R^{42}$ have the meanings given in formula CC, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms, and $L^4$ is H or F.

Preferably the LC media according to this second preferred embodiment comprise, in addition or alternatively to the dielectrically neutral compounds of formula CC, one or more dielectrically neutral compounds having a dielectric anisotropy in the range from −1.5 to +3, selected from the group of compounds of formula DD.

DD

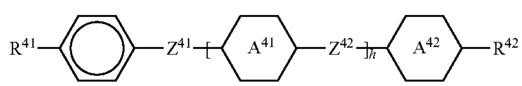

In which $A^{41}$, $A^{42}$, $Z^{41}$, $Z^{42}$, $R^{41}$, $R^{42}$ and h have the meanings given in formula CC.

Particularly preferred compounds of formula DD are selected from the group consisting of the following subformulae:

DD1

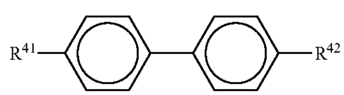

DD2

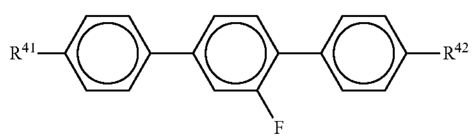

in which $R^{41}$ and $R^{42}$ have the meanings given in formula DD and $R^{41}$ preferably denotes alkyl bedeutet, and in formula DD1 $R^{42}$ preferably denotes alkenyl, particularly preferably —$(CH_2)_2$—CH═CH—$CH_3$, and in formula DD2 $R^{42}$ preferably denotes alkyl, —$(CH_2)_2$—CH═$CH_2$ or —$(CH_2)_2$—CH═CH—$CH_3$.

The compounds of formula AA and BB are preferably used in the LC medium according to the invention in a concentration from 2% to 60%, more preferably from 3% to 35%, and very particularly preferably from 4% to 30% in the mixture as a whole.

The compounds of formula CC and DD are preferably used in the LC medium according to the invention in a concentration from 2% to 70%, more preferably from 5% to 65%, even more preferably from 10% to 60%, and very particularly preferably from 10%, preferably 15%, to 55% in the mixture as a whole.

The combination of compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤250 mPa·s, preferably ≤200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PS-VA and PS-UB-FFS type, have a negative dielectric anisotropy $\Delta\varepsilon$, preferably from −0.5 to −10, in particular from −2.5 to −7.5, at 20° C. and 1 kHz.

The birefringence $\Delta n$ in LC media according to the invention for use in displays of the PS-VA and PS-UB-FFS type is preferably below 0.16, particularly preferably from 0.06 to 0.14, very particularly preferably from 0.07 to 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PS-OCB, PS-TN, PS-IPS, PS-posi-VA and PS-FFS type are preferably those based on compounds with positive dielectric anisotropy according to the second preferred embodiment, and preferably have a positive dielectric anisotropy $\Delta\varepsilon$ from +4 to +17 at 20° C. and 1 kHz.

The birefringence $\Delta n$ in LC media according to the invention for use in displays of the PS-OCB type is preferably from 0.14 to 0.22, particularly preferably from 0.16 to 0.22.

The birefringence $\Delta n$ in LC media according to the invention for use in displays of the PS-TN-, PS-posi-VA-, PS-IPS- oder PS-FFS-type is preferably from 0.07 to 0.15, particularly preferably from 0.08 to 0.13.

LC media according to the invention, based on compounds with positive dielectric anisotropy according to the second preferred embodiment, for use in displays of the PS-TN-, PS-posi-VA-, PS-IPS- oder PS-FFS-type, preferably have a positive dielectric anisotropy $\Delta\varepsilon$ from +2 to +30, particularly preferably from +3 to +20, at 20° C. and 1 kHz.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: in each case, independently of one another, 1, 2, 3, 4, 5 or 6)
TABLE A
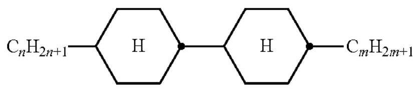
CCH-nm
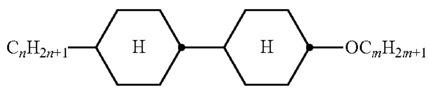
CCH-nOm
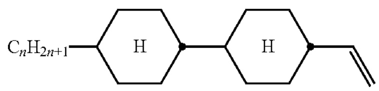
CC-n-V
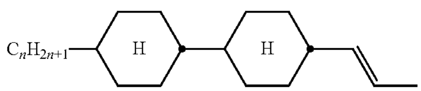
CC-n-V1
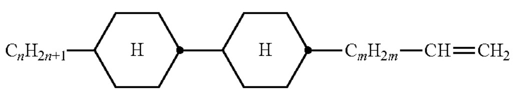
CC-n-mV
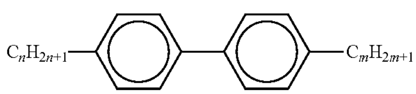
PP-n-m
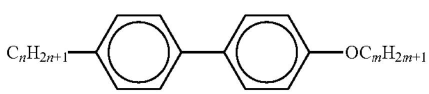
PP-n-Om
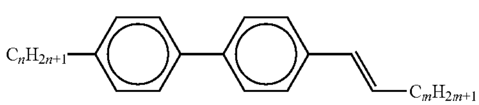
PP-n-Vm
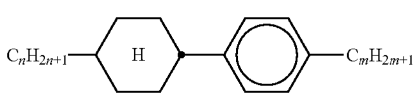
PCH-nm
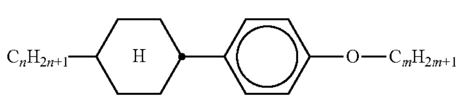
PCH-nOm
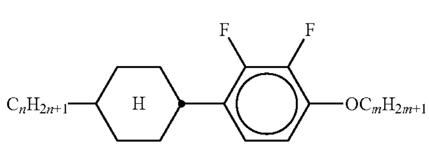
CY-n-Om TABLE A-continued
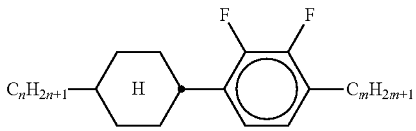
CY-n-m
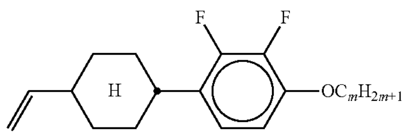
CY-V-Om
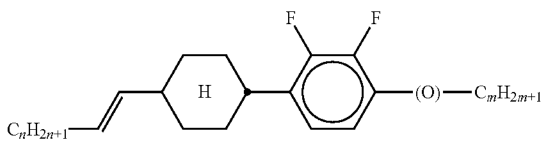
CY-nV-(O)m
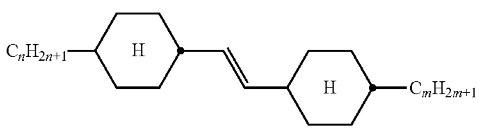
CVC-n-m
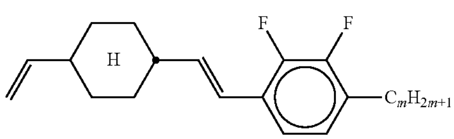
CVY-V-m
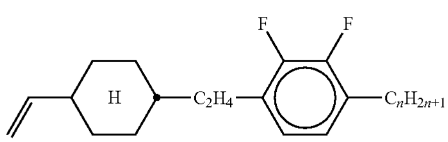
CEY-V-m
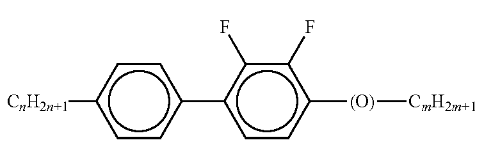
PY-n-(O)m
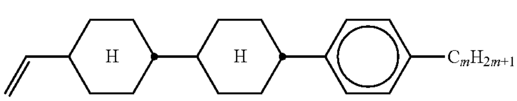
CCP-V-m
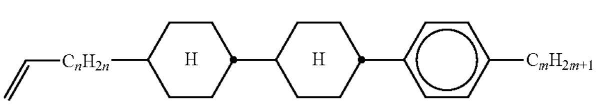
CCP-Vn-m TABLE A-continued
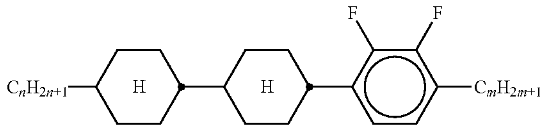
CCY-n-m
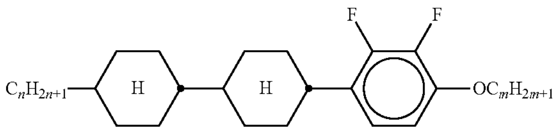
CCY-n-Om
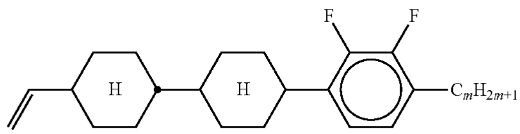
CCY-V-m
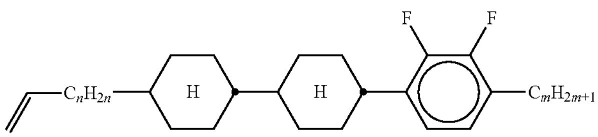
CCY-Vn-m
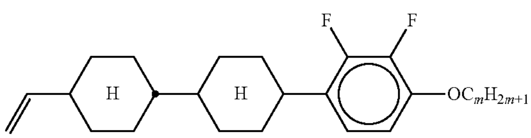
CCY-V-Om
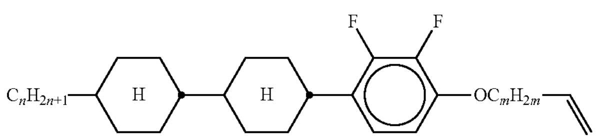
CCY-n-OmV
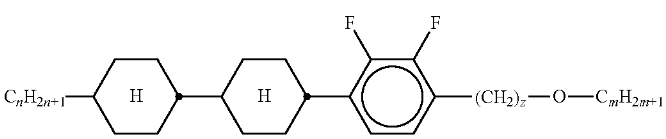
CCY-n-zOm
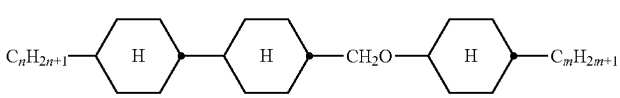
CCOC-n-m
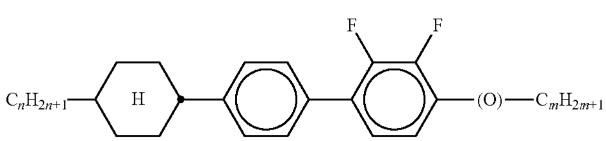
CPY-n-(O)m TABLE A-continued
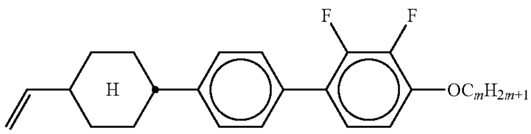
CPY-V-Om
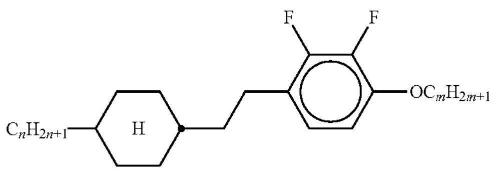
CEY-n-Om
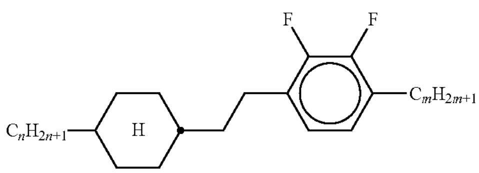
CEY-n-m
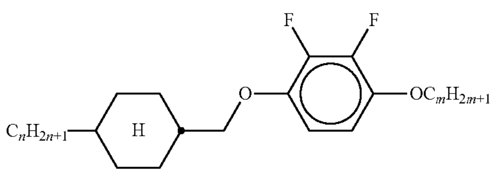
COY-n-Om
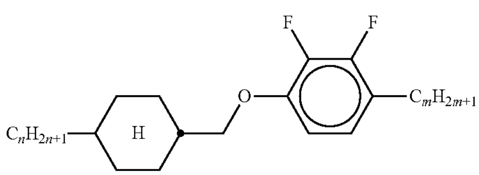
COY-n-m
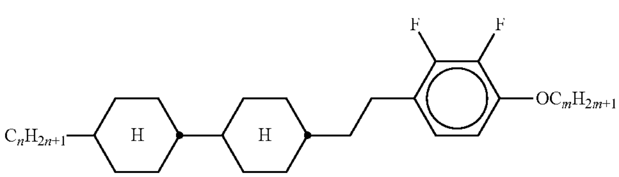
CCEY-n-Om
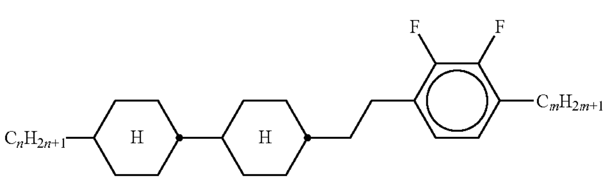
CCEY-n-m TABLE A-continued
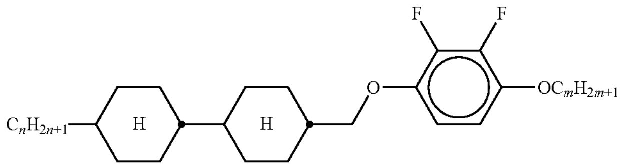
CCOY-n-Om
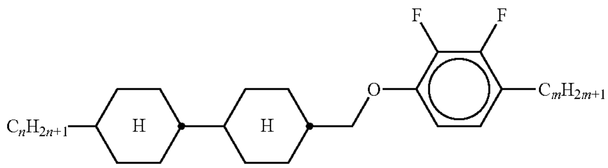
CCOY-n-m
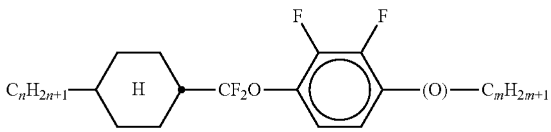
CQY-n-(O)m
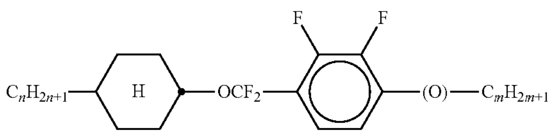
CQIY-n-(O)m
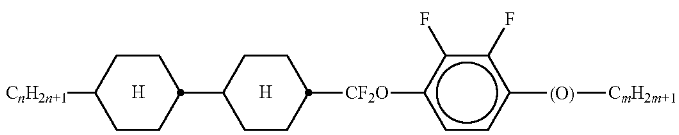
CCQY-n-(O)m
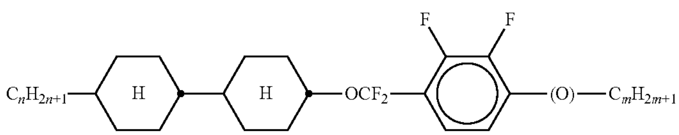
CCQIY-n-(O)m
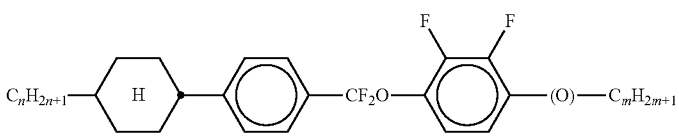
CPQY-n-(O)m
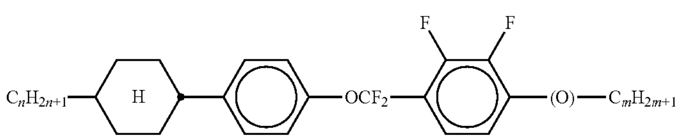
CPQIY-n-Om
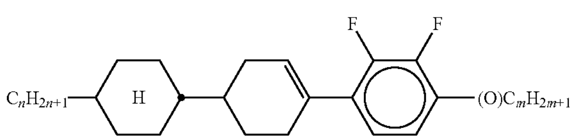
CLY-n-(O)m TABLE A-continued
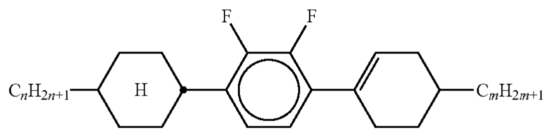
CYLI-n-m
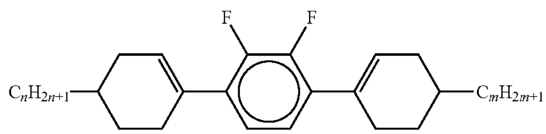
LYLI-n-m
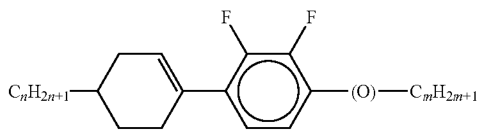
LY-n-(O)m
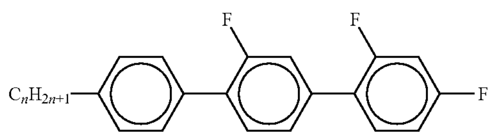
PGIGI-n-F
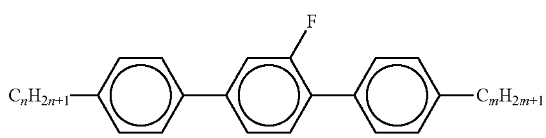
PGP-n-m
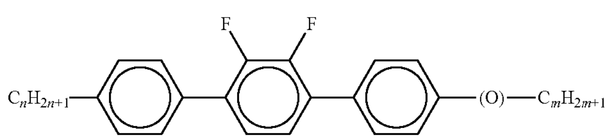
PYP-n-(O)m
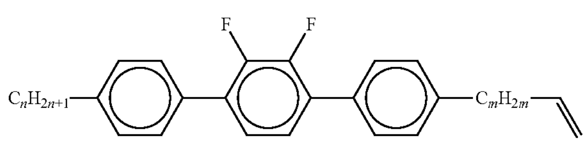
PYP-n-mV
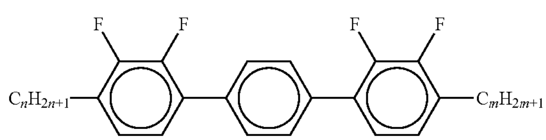
YPY-n-m
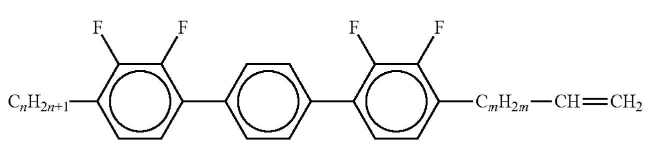
YPY-n-mV TABLE A-continued
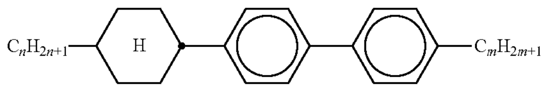
BCH-nm
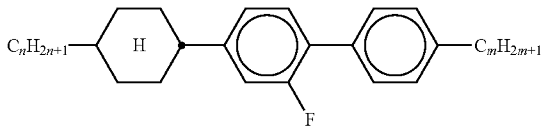
BCH-nmF
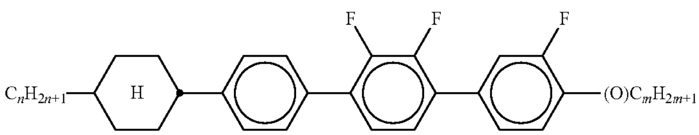
CPYP-n-(O)m
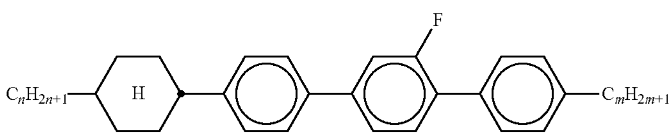
CPGP-n-m
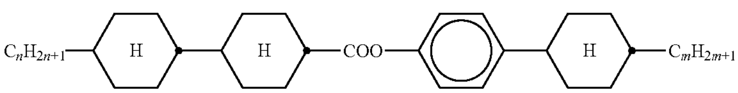
CCZPC-n-m
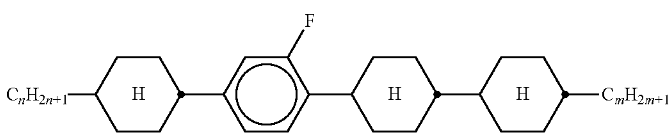
CGCC-n-m
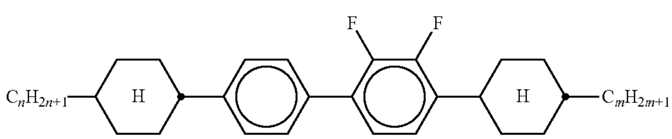
CPYC-n-m
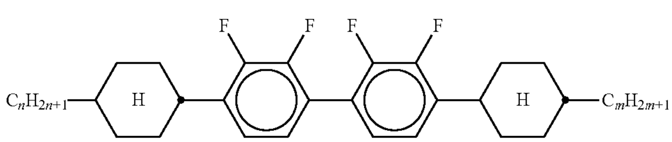
CYYC-n-m
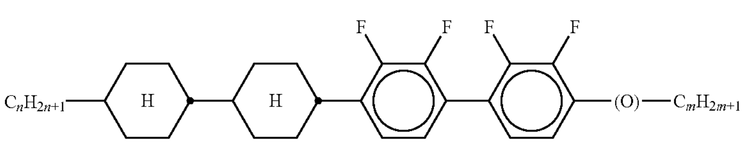
CCYY-n-m TABLE A-continued
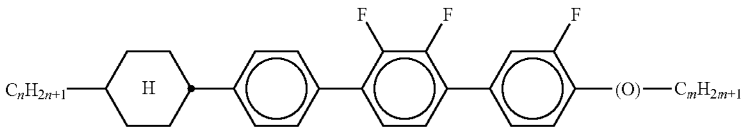
CPYG-n-(O)m
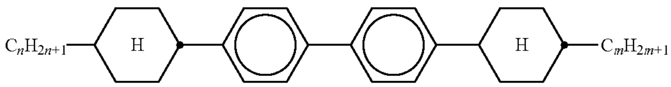
CBC-nm
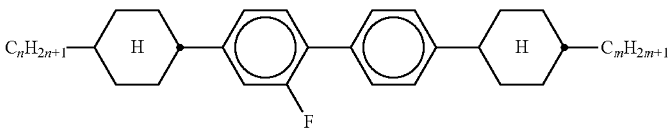
CBC-nmF
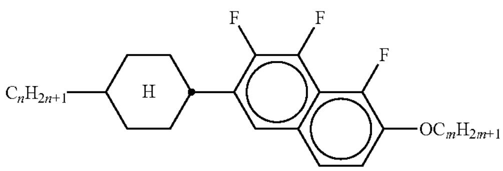
CNap-n-Om
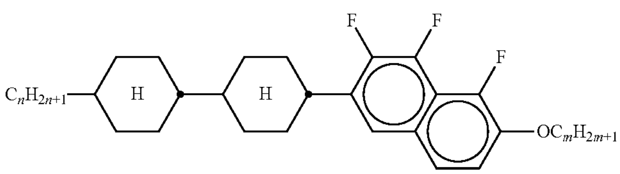
CCNap-n-Om
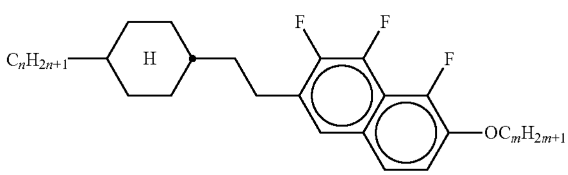
CENap-n-Om
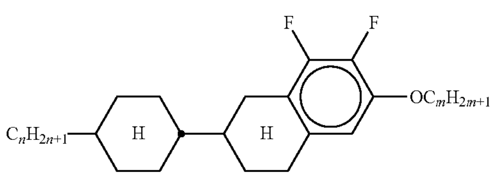
CTNap-n-Om
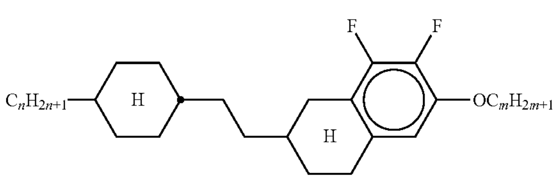
CETNap-n-Om TABLE A-continued
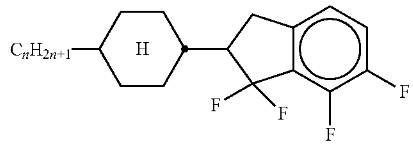
CK-n-F
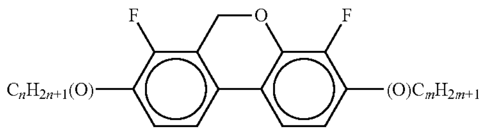
CB-n(O)-(O)m
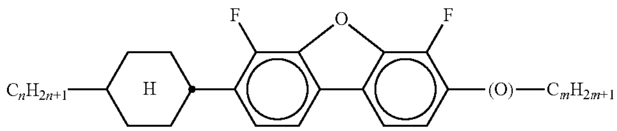
CB-n-(O)m
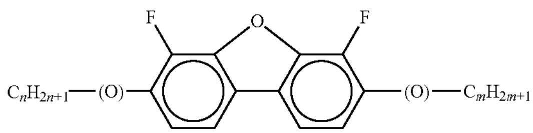
B-n(O)-(O)m
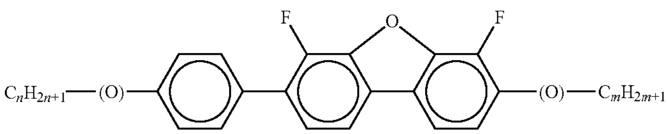
PB-n(O)-(O)m
In a preferred embodiment of the present invention, the LC media according to the invention comprise one or more compounds selected from the group consisting of compounds from Table A.
TABLE B
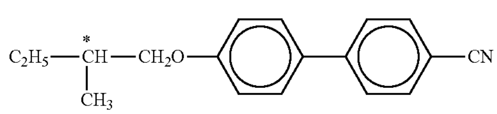
C 15
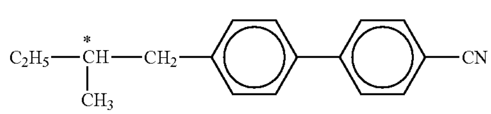
CB 15
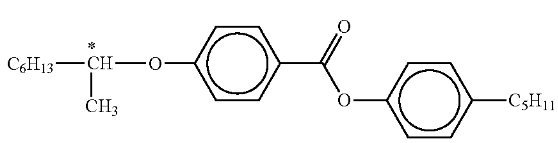
CM 21

TABLE B-continued
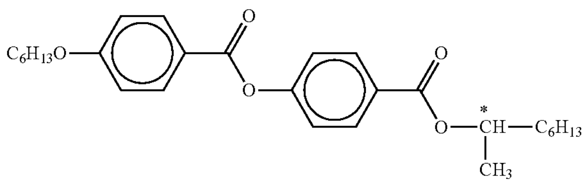
R/S-811
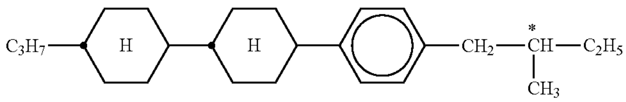
CM 44
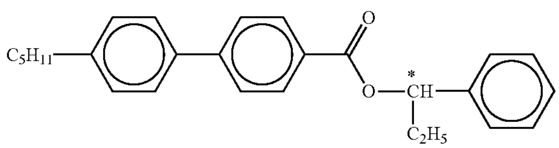
CM 45
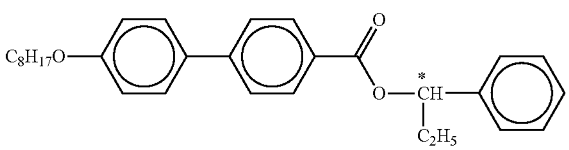
CM 47
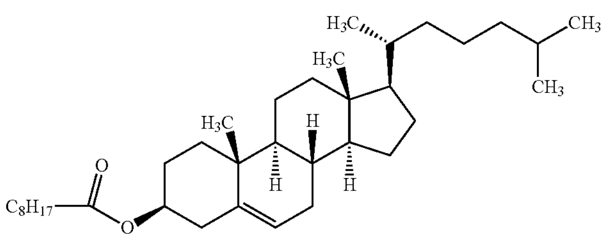
CN
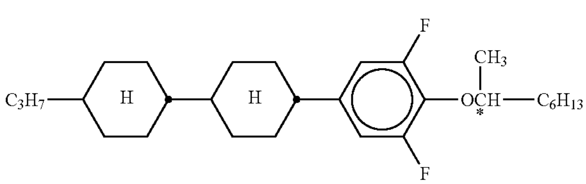
R/S-2011
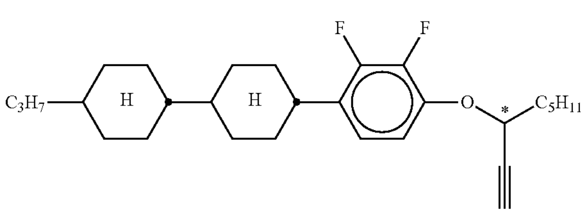
R/S-3011

TABLE B-continued

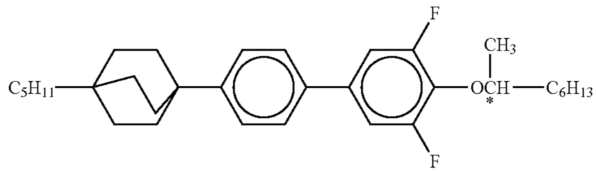

R/S-4011

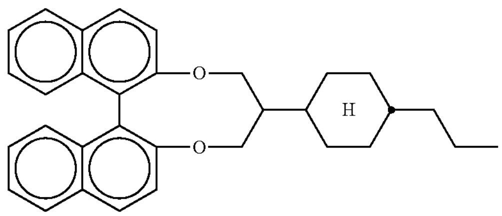

R/S-5011

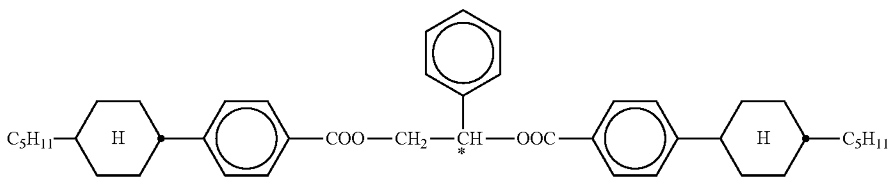

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

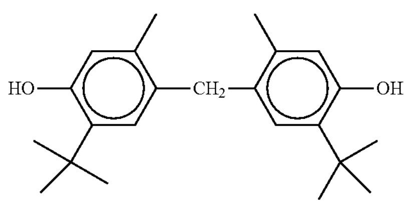

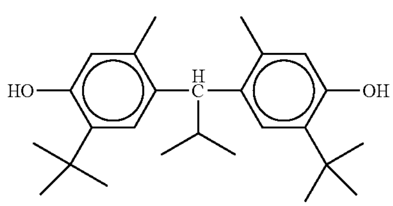

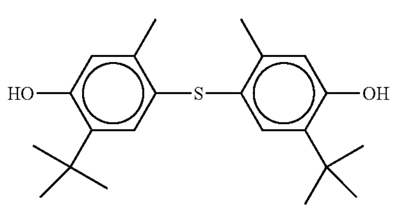

TABLE C-continued
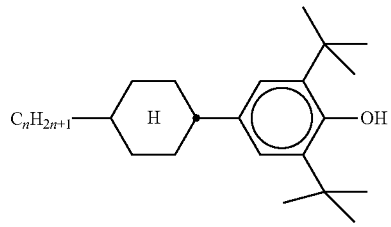
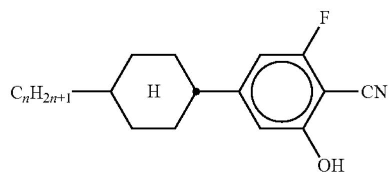
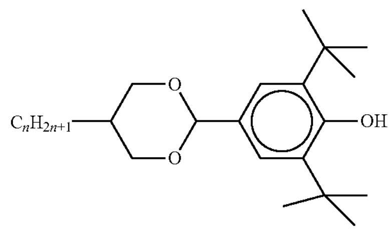
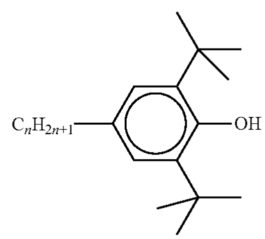
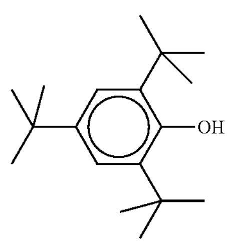
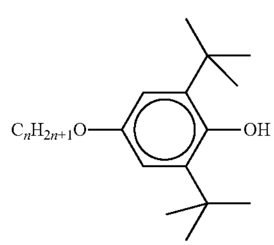
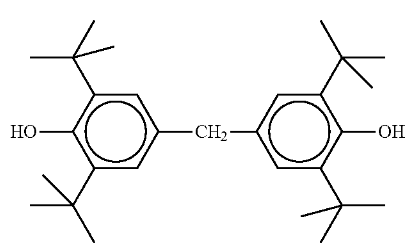

TABLE C-continued
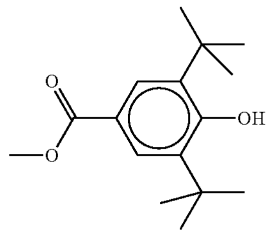
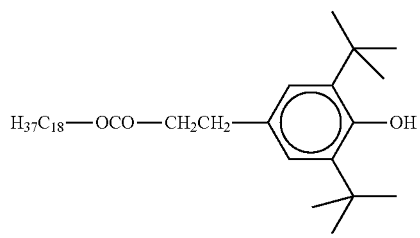
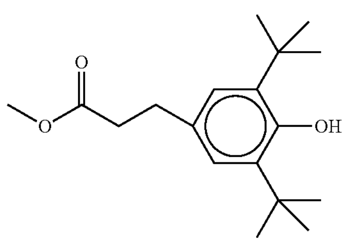
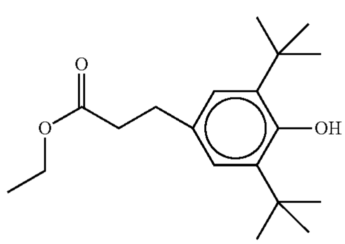
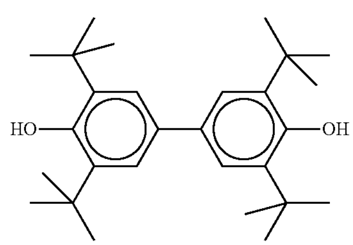

TABLE C-continued
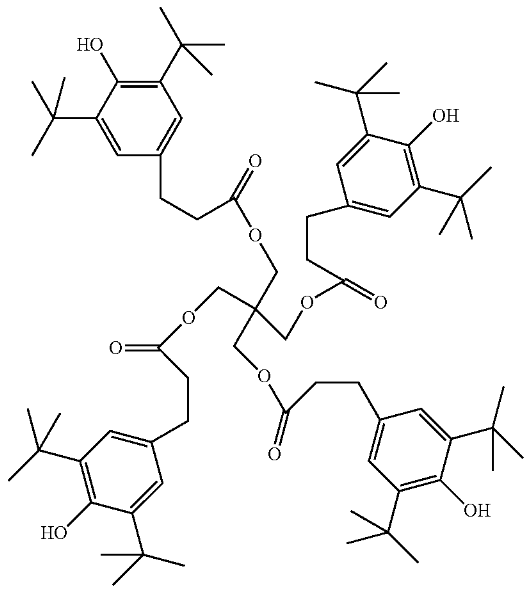 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
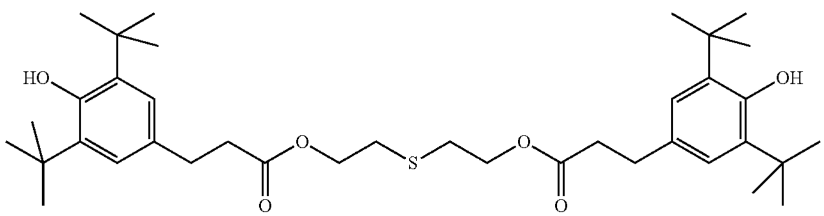 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
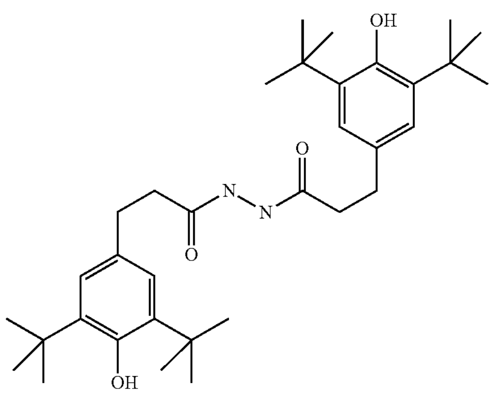 [SMILES: CC(C)(C)c1cc(CCC(=O)NNC(=O)CCc2cc(C(C)(C)C)c(O)c(C(C)(C)C)c2)cc(C(C)(C)C)c1O]
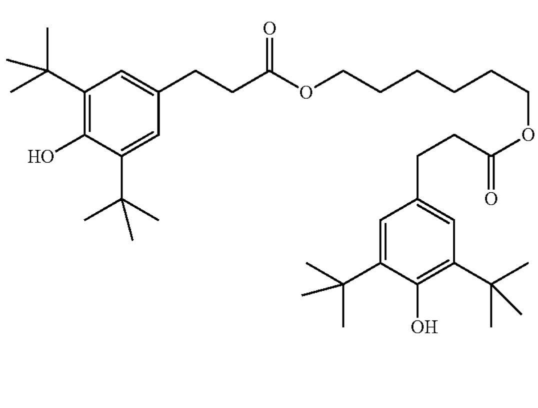 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE C-continued
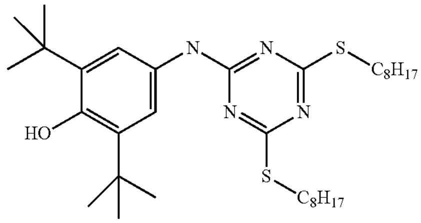
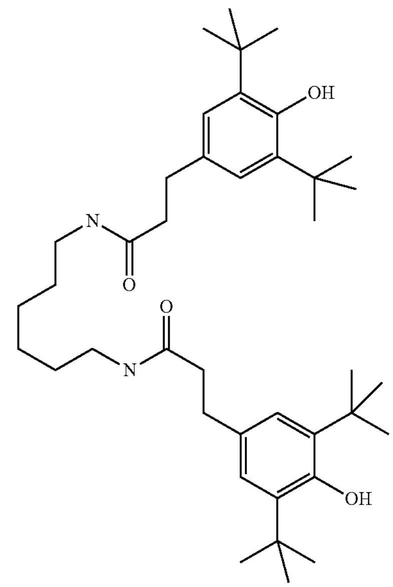 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
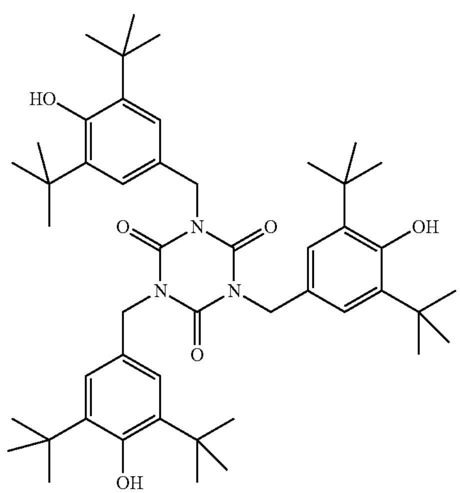 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
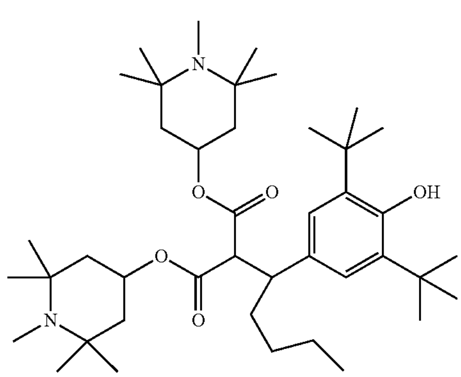 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
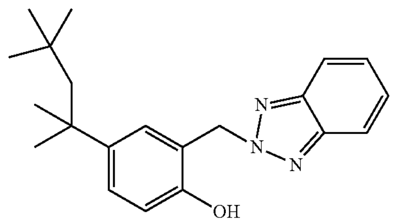 [SMILES: CC(C)(C)CC(C)(C)c1ccc(O)c(Cn2nc3ccccc3n2)c1]
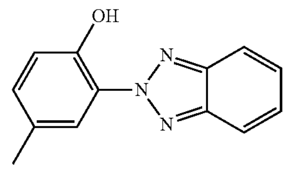 [SMILES: Cc1ccc(O)c(-n2nc3ccccc3n2)c1]
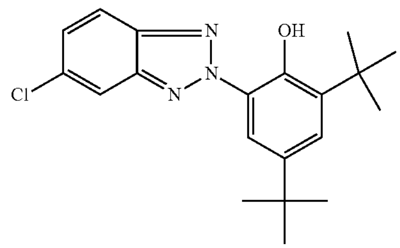 [SMILES: CC(C)(C)c1cc(-n2nc3ccc(Cl)cc3n2)c(O)c(C(C)(C)C)c1]
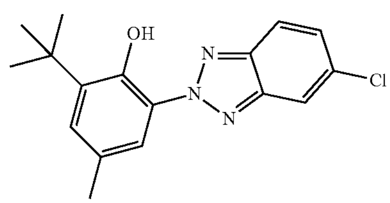 [SMILES: Cc1cc(-n2nc3ccc(Cl)cc3n2)c(O)c(C(C)(C)C)c1]
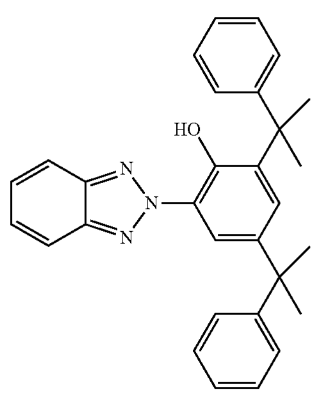 [SMILES: CC(C)(c1ccccc1)c1cc(-n2nc3ccccc3n2)c(O)c(C(C)(C)c2ccccc2)c1]
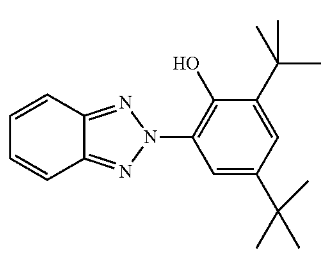 [SMILES: CC(C)(C)c1cc(-n2nc3ccccc3n2)c(O)c(C(C)(C)C)c1]

TABLE C-continued
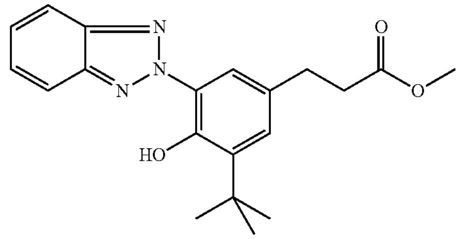 [SMILES: COC(=O)CCc1cc(-n2nc3ccccc3n2)c(O)c(C(C)(C)C)c1]
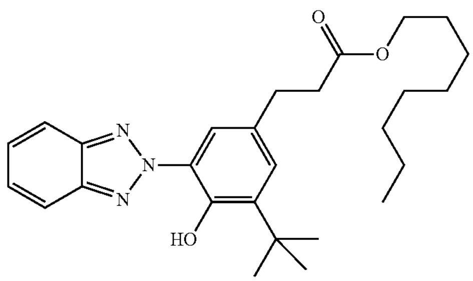 [SMILES: CCCCCCCCOC(=O)CCc1cc(-n2nc3ccccc3n2)c(O)c(C(C)(C)C)c1]
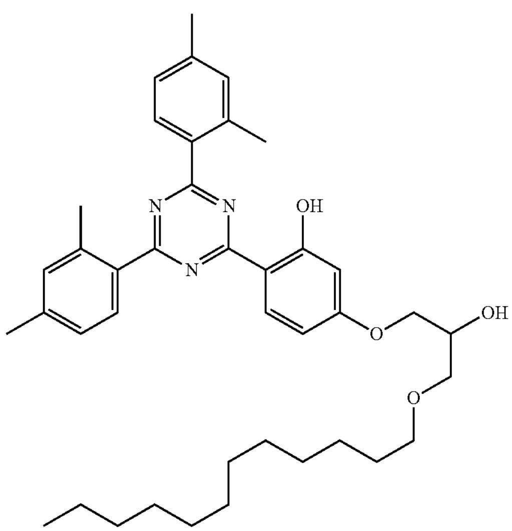 [SMILES: CCCCCCCCCCCCOCC(O)COc1ccc(-c2nc(-c3ccc(C)cc3C)nc(-c3ccc(C)cc3C)n2)c(O)c1]
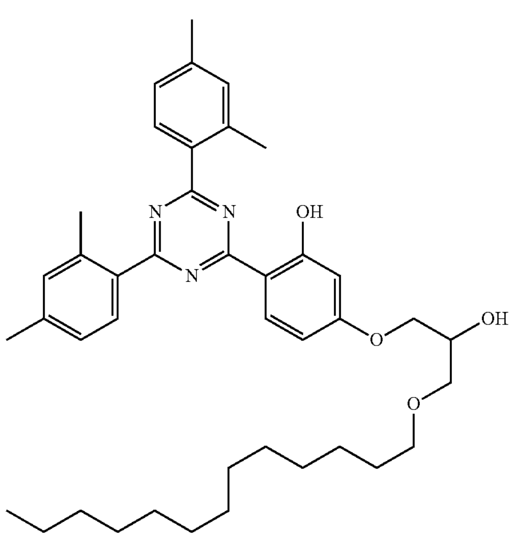 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
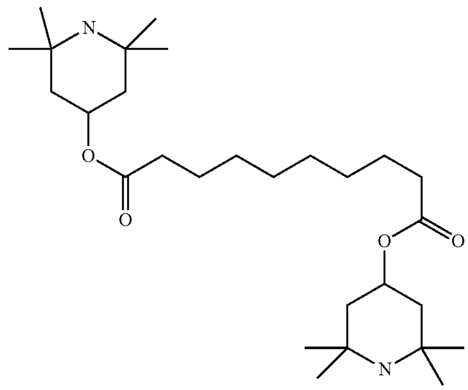
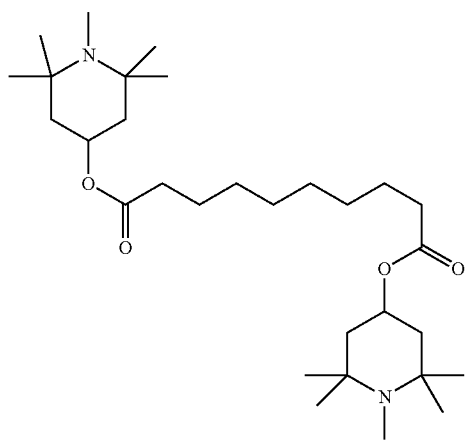
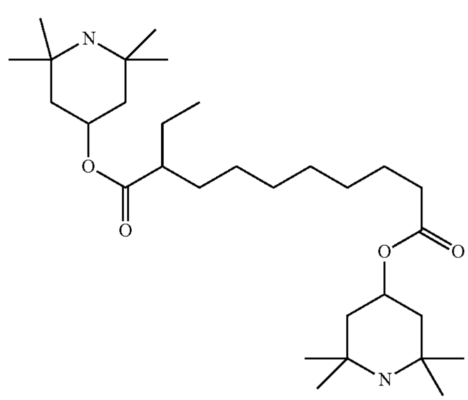

TABLE C-continued
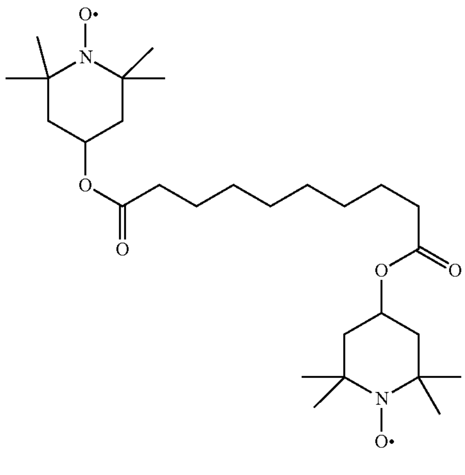
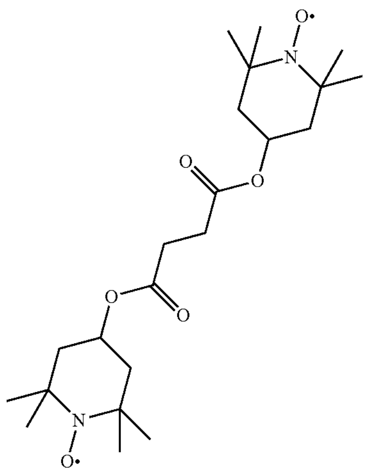
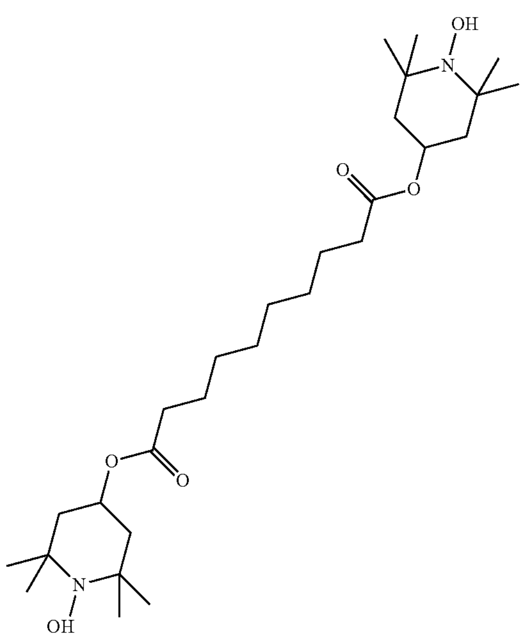

Table C shows possible stabilisers which can be added to the LC media according to the invention.

(n here denotes an integer from 1 to 12, preferably 1, 2, 3, 4, 5, 6, 7, or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

RM-1

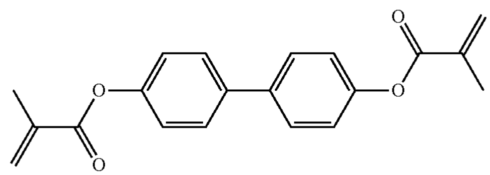

RM-2

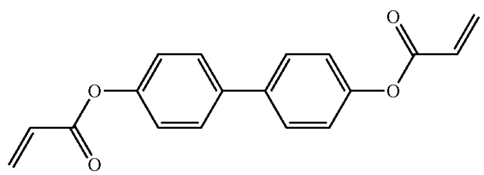 [SMILES: C=CC(=O)Oc1ccc(-c2ccc(OC(=O)C=C)cc2)cc1]

RM-3

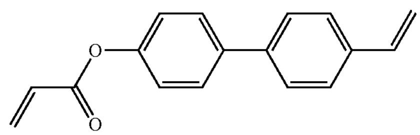 [SMILES: C=CC(=O)Oc1ccc(-c2ccc(C=C)cc2)cc1]

RM-4

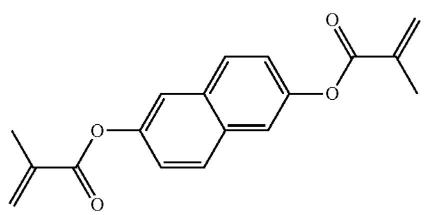 [SMILES: C=C(C)C(=O)Oc1ccc2cc(OC(=O)C(=C)C)ccc2c1]

RM-5

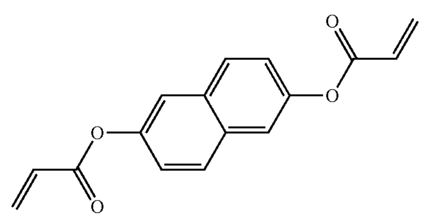 [SMILES: C=CC(=O)Oc1ccc2cc(OC(=O)C=C)ccc2c1]

RM-6

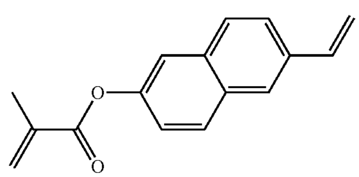 [SMILES: C=Cc1ccc2cc(OC(=O)C(=C)C)ccc2c1]

RM-7

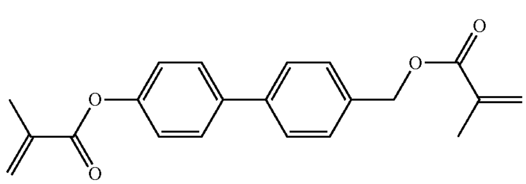 [SMILES: C=C(C)C(=O)OCc1ccc(-c2ccc(OC(=O)C(=C)C)cc2)cc1]

TABLE D-continued
RM-8
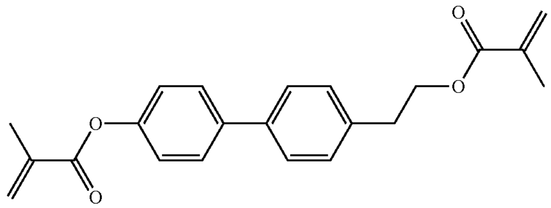 [SMILES: C=C(C)C(=O)OCCc1ccc(-c2ccc(OC(=O)C(=C)C)cc2)cc1]
RM-9
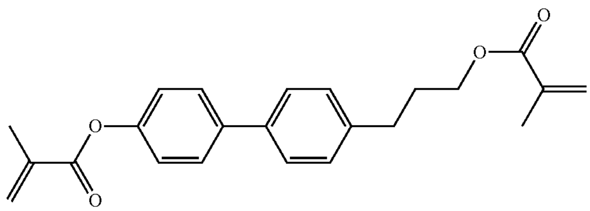 [SMILES: C=C(C)C(=O)OCCCc1ccc(-c2ccc(OC(=O)C(=C)C)cc2)cc1]
RM-10
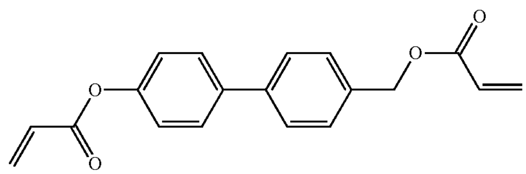 [SMILES: C=CC(=O)OCc1ccc(-c2ccc(OC(=O)C=C)cc2)cc1]
RM-11
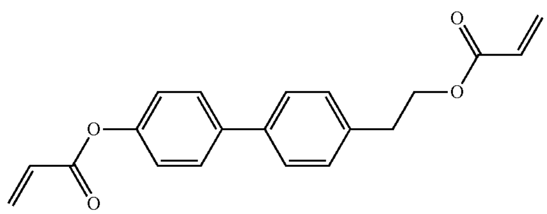 [SMILES: C=CC(=O)OCCc1ccc(-c2ccc(OC(=O)C=C)cc2)cc1]
RM-12
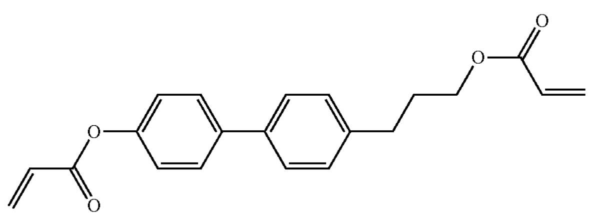 [SMILES: C=CC(=O)OCCCc1ccc(-c2ccc(OC(=O)C=C)cc2)cc1]
RM-13
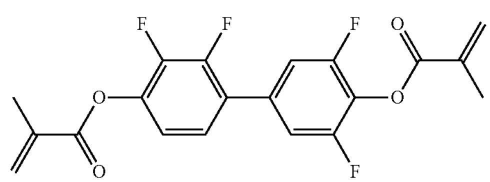 [SMILES: C=C(C)C(=O)Oc1ccc(-c2cc(F)c(OC(=O)C(=C)C)c(F)c2)c(F)c1F]
RM-14
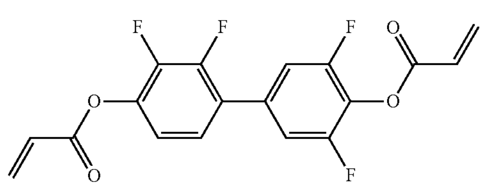 [SMILES: C=CC(=O)Oc1ccc(-c2cc(F)c(OC(=O)C=C)c(F)c2)c(F)c1F]
RM-15
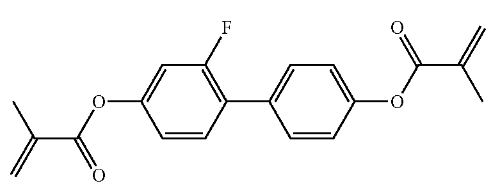 [SMILES: C=C(C)C(=O)Oc1ccc(-c2ccc(OC(=O)C(=C)C)cc2F)cc1]

TABLE D-continued
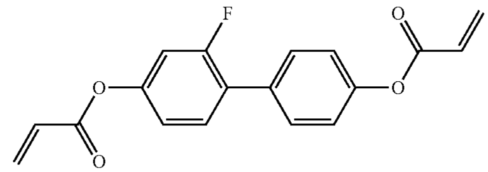
RM-16
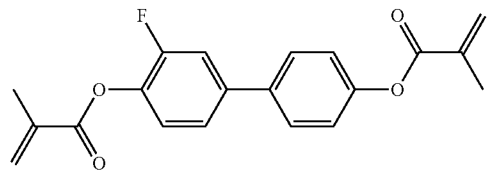 [SMILES: C=C(C)C(=O)Oc1ccc(-c2ccc(OC(=O)C(=C)C)c(F)c2)cc1]
RM-17
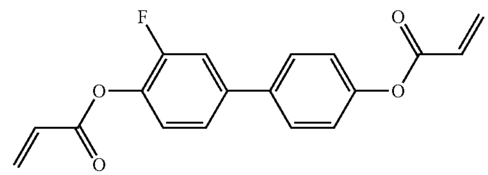 [SMILES: C=CC(=O)Oc1ccc(-c2ccc(OC(=O)C=C)c(F)c2)cc1]
RM-18
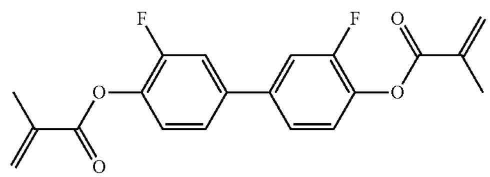
RM-19
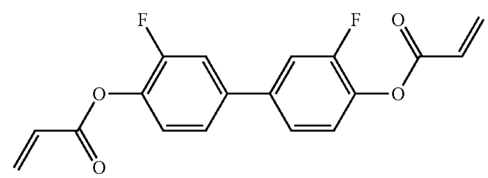 [SMILES: C=CC(=O)Oc1ccc(-c2ccc(OC(=O)C=C)c(F)c2)cc1F]
RM-20
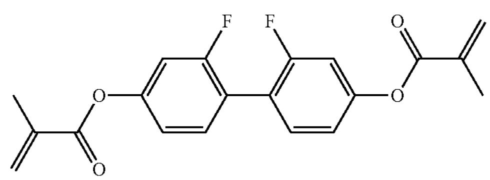 [SMILES: C=C(C)C(=O)Oc1ccc(-c2ccc(OC(=O)C(=C)C)cc2F)c(F)c1]
RM-21
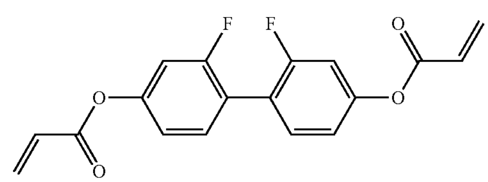
RM-22
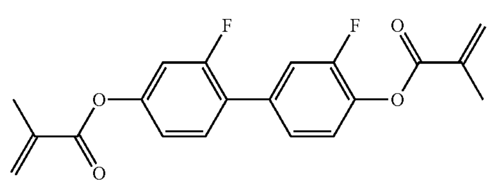 [SMILES: C=C(C)C(=O)Oc1ccc(-c2ccc(OC(=O)C(=C)C)c(F)c2)c(F)c1]
RM-23
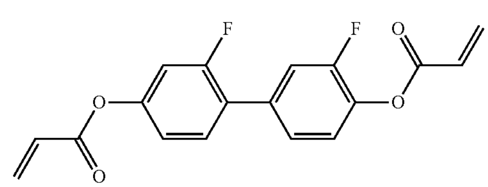
RM-24

TABLE D-continued
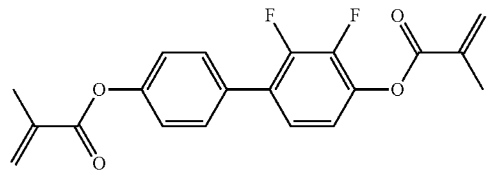 [SMILES: C=C(C)C(=O)Oc1ccc(-c2ccc(OC(=O)C(=C)C)c(F)c2F)cc1]
RM-25
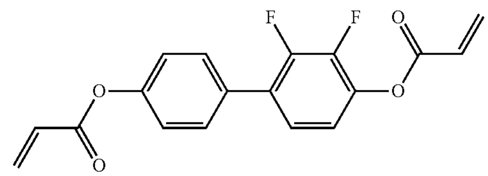
RM-26
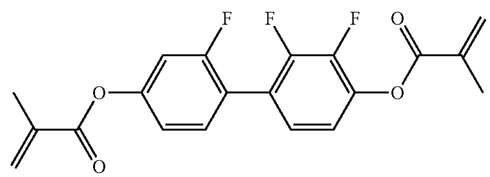 [SMILES: C=C(C)C(=O)Oc1ccc(-c2ccc(OC(=O)C(=C)C)c(F)c2F)c(F)c1]
RM-27
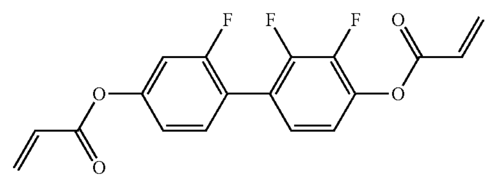 [SMILES: C=CC(=O)Oc1ccc(-c2ccc(OC(=O)C=C)c(F)c2F)c(F)c1]
RM-28
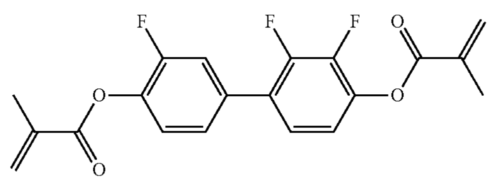
RM-29
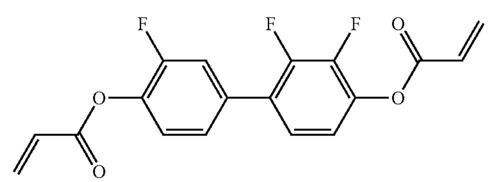 [SMILES: C=CC(=O)Oc1ccc(-c2ccc(OC(=O)C=C)c(F)c2F)cc1F]
RM-30
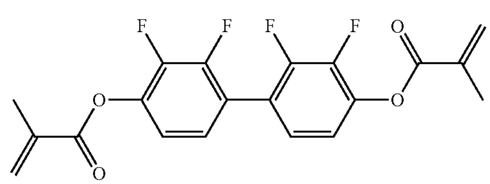 [SMILES: C=C(C)C(=O)Oc1ccc(-c2ccc(OC(=O)C(=C)C)c(F)c2F)c(F)c1F]
RM-31
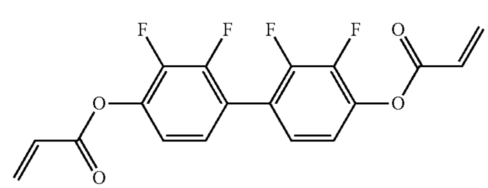 [SMILES: C=CC(=O)Oc1ccc(-c2ccc(OC(=O)C=C)c(F)c2F)c(F)c1F]
RM-32

TABLE D-continued
RM-33
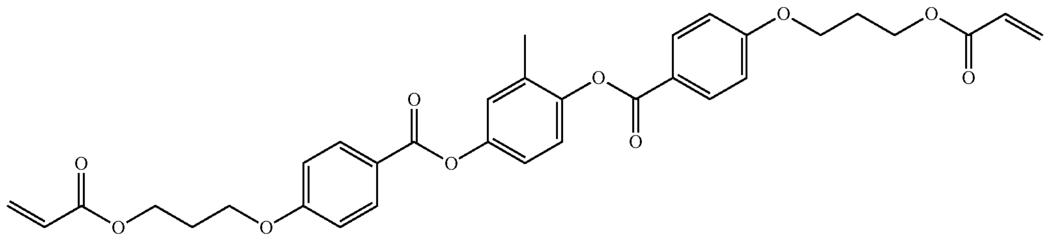 [SMILES: C=CC(=O)OCCCOc1ccc(C(=O)Oc2ccc(OC(=O)c3ccc(OCCCOC(=O)C=C)cc3)c(C)c2)cc1]
RM-34
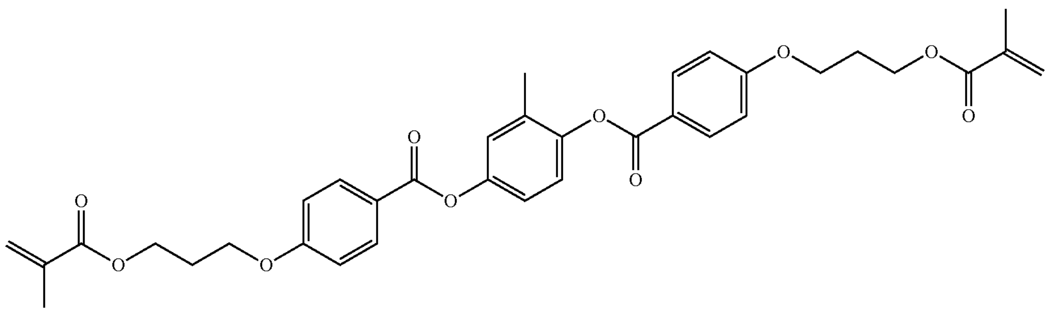 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-35
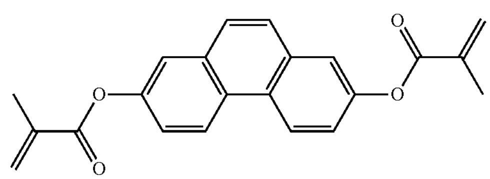 [SMILES: C=C(C)C(=O)Oc1ccc2c(ccc3cc(OC(=O)C(=C)C)ccc32)c1]
RM-36
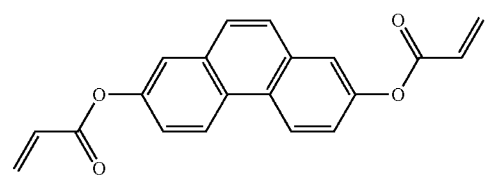
RM-37
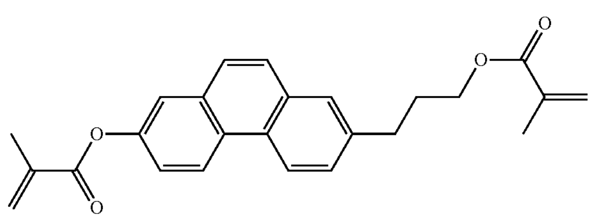 [SMILES: C=C(C)C(=O)OCCCc1ccc2c(ccc3cc(OC(=O)C(=C)C)ccc32)c1]
RM-38
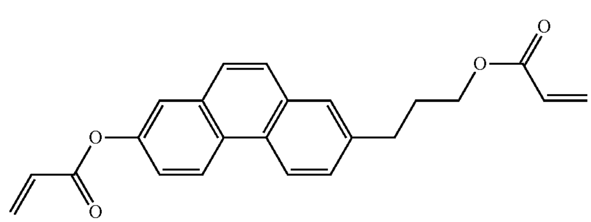 [SMILES: C=CC(=O)OCCCc1ccc2c(ccc3cc(OC(=O)C=C)ccc32)c1]
RM-39
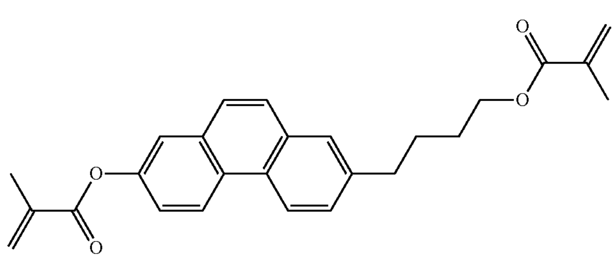 [SMILES: C=C(C)C(=O)OCCCCc1ccc2c(ccc3cc(OC(=O)C(=C)C)ccc32)c1]

TABLE D-continued
RM-40
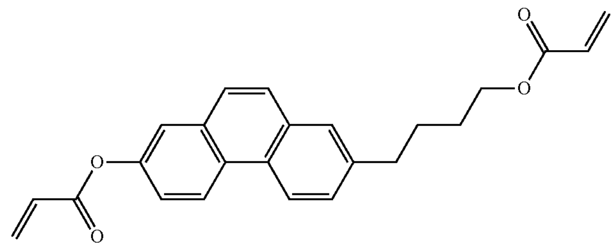 [SMILES: C=CC(=O)OCCCCc1ccc2c(ccc3cc(OC(=O)C=C)ccc32)c1]
RM-41
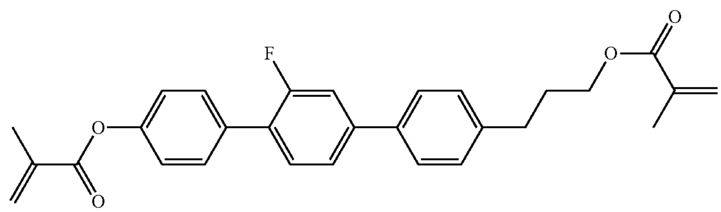 [SMILES: C=C(C)C(=O)OCCCc1ccc(-c2ccc(-c3ccc(OC(=O)C(=C)C)cc3)c(F)c2)cc1]
RM-42
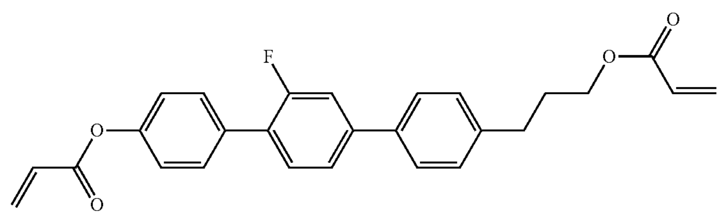 [SMILES: C=CC(=O)OCCCc1ccc(-c2ccc(-c3ccc(OC(=O)C=C)cc3)c(F)c2)cc1]
RM-43
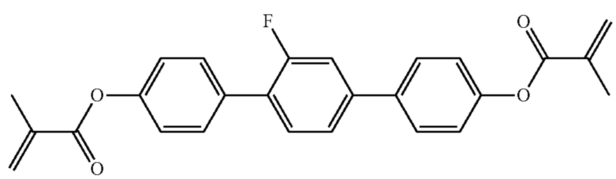 [SMILES: C=C(C)C(=O)Oc1ccc(-c2ccc(-c3ccc(OC(=O)C(=C)C)cc3)c(F)c2)cc1]
RM-44
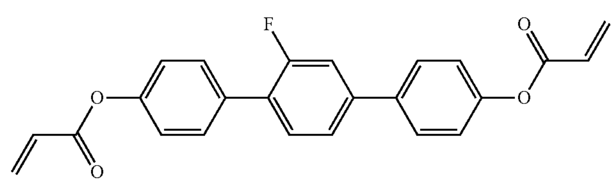 [SMILES: C=CC(=O)Oc1ccc(-c2ccc(-c3ccc(OC(=O)C=C)cc3)c(F)c2)cc1]
RM-45
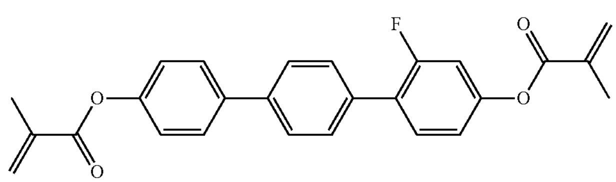 [SMILES: C=C(C)C(=O)Oc1ccc(-c2ccc(-c3ccc(OC(=O)C(=C)C)cc3F)cc2)cc1]
RM-46
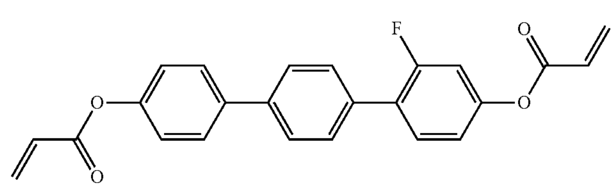
RM-47
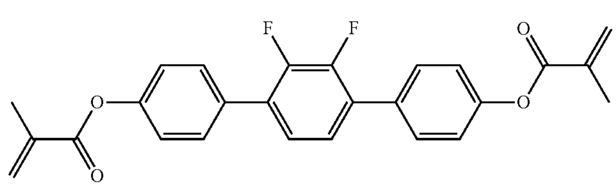 [SMILES: C=C(C)C(=O)Oc1ccc(-c2ccc(-c3ccc(OC(=O)C(=C)C)cc3)c(F)c2F)cc1]

TABLE D-continued
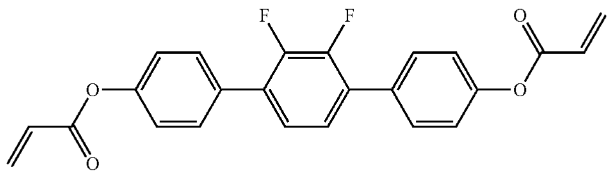
RM-48
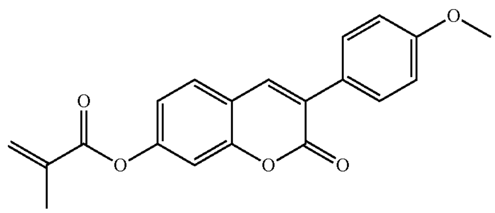 [SMILES: C=C(C)C(=O)Oc1ccc2cc(-c3ccc(OC)cc3)c(=O)oc2c1]
RM-49
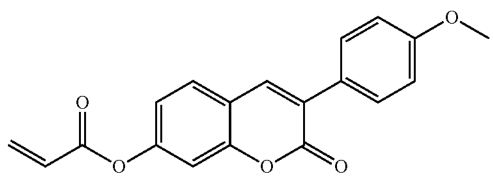 [SMILES: C=CC(=O)Oc1ccc2cc(-c3ccc(OC)cc3)c(=O)oc2c1]
RM-50
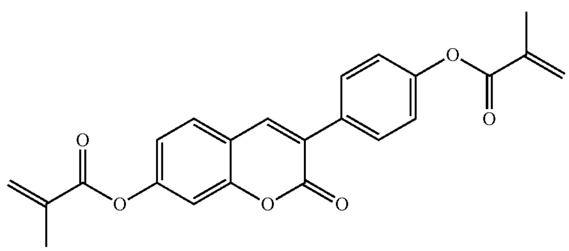 [SMILES: C=C(C)C(=O)Oc1ccc(-c2cc3ccc(OC(=O)C(=C)C)cc3oc2=O)cc1]
RM-51
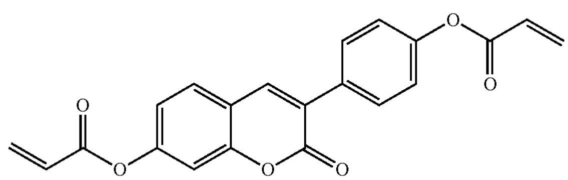 [SMILES: C=CC(=O)Oc1ccc(-c2cc3ccc(OC(=O)C=C)cc3oc2=O)cc1]
RM-52
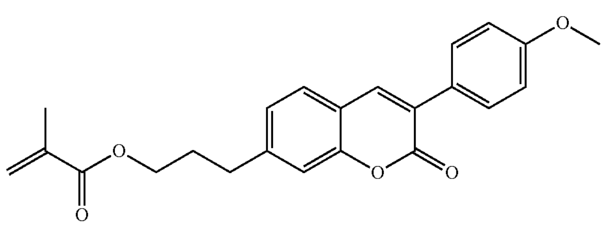 [SMILES: C=C(C)C(=O)OCCCc1ccc2cc(-c3ccc(OC)cc3)c(=O)oc2c1]
RM-53
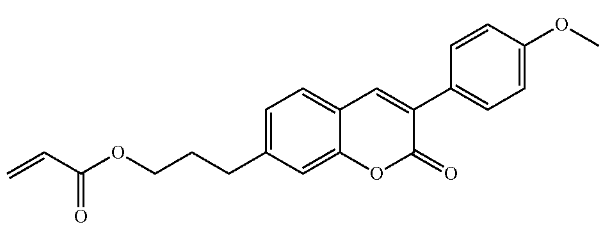 [SMILES: C=CC(=O)OCCCc1ccc2cc(-c3ccc(OC)cc3)c(=O)oc2c1]
RM-54

TABLE D-continued
RM-55
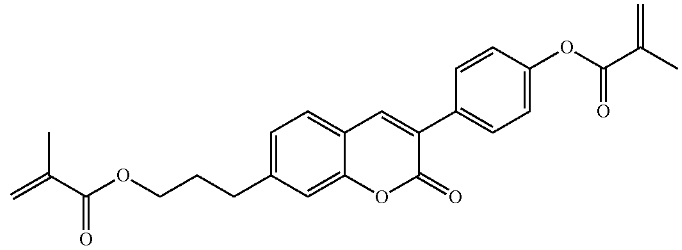 [SMILES: C=C(C)C(=O)OCCCc1ccc2cc(-c3ccc(OC(=O)C(=C)C)cc3)c(=O)oc2c1]
RM-56
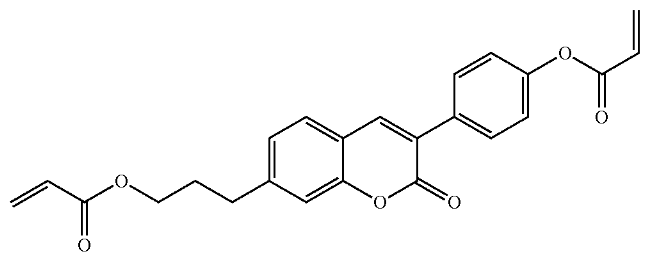 [SMILES: C=CC(=O)OCCCc1ccc2cc(-c3ccc(OC(=O)C=C)cc3)c(=O)oc2c1]
RM-57
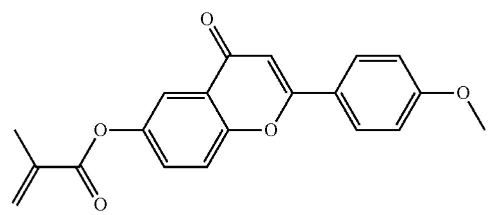 [SMILES: C=C(C)C(=O)Oc1ccc2oc(-c3ccc(OC)cc3)cc(=O)c2c1]
RM-58
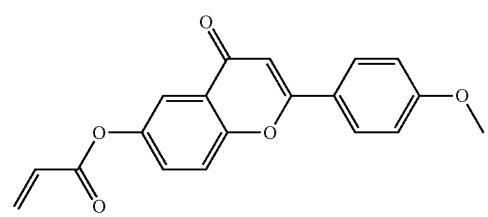 [SMILES: C=CC(=O)Oc1ccc2oc(-c3ccc(OC)cc3)cc(=O)c2c1]
RM-59
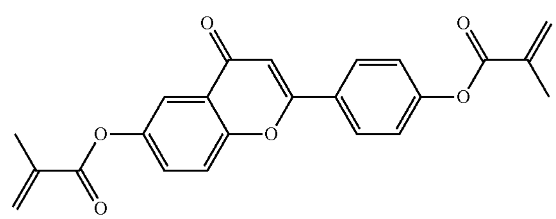 [SMILES: C=C(C)C(=O)Oc1ccc(-c2cc(=O)c3cc(OC(=O)C(=C)C)ccc3o2)cc1]
RM-60
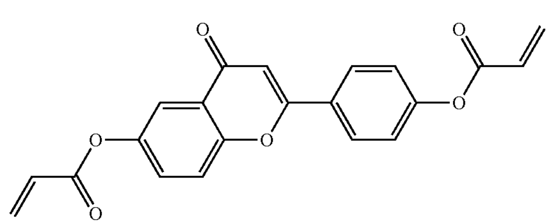 [SMILES: C=CC(=O)Oc1ccc(-c2cc(=O)c3cc(OC(=O)C=C)ccc3o2)cc1]

TABLE D-continued
RM-61
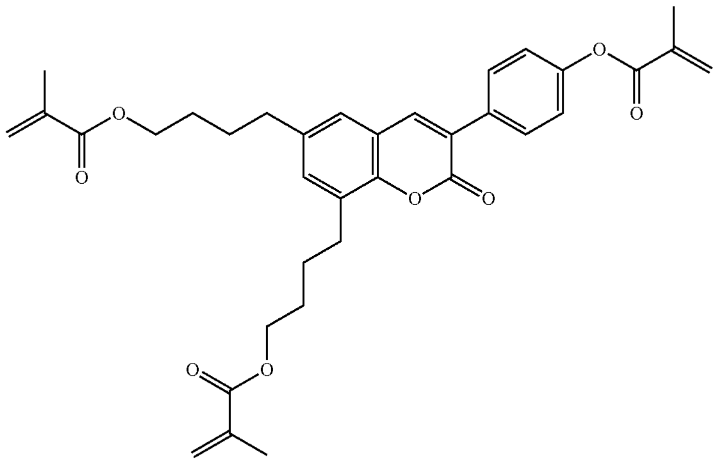 [SMILES: C=C(C)C(=O)OCCCCc1cc(CCCCOC(=O)C(=C)C)c2oc(=O)c(-c3ccc(OC(=O)C(=C)C)cc3)cc2c1]
RM-62
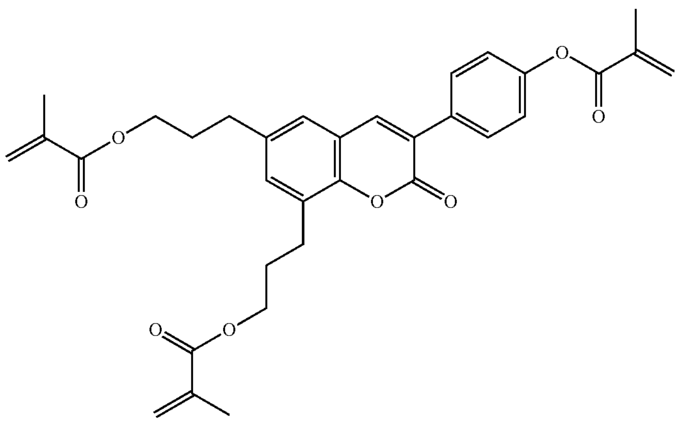 [SMILES: C=C(C)C(=O)OCCCc1cc(CCCOC(=O)C(=C)C)c2oc(=O)c(-c3ccc(OC(=O)C(=C)C)cc3)cc2c1]
RM-63
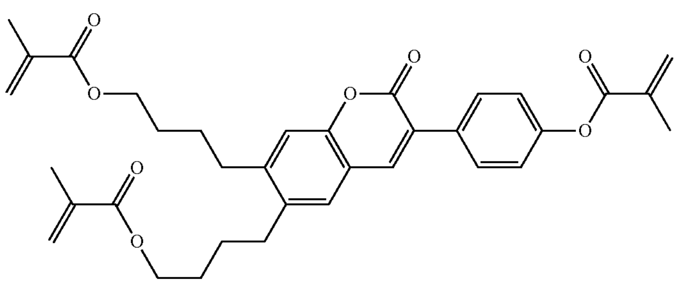 [SMILES: C=C(C)C(=O)OCCCCc1cc2cc(-c3ccc(OC(=O)C(=C)C)cc3)c(=O)oc2cc1CCCCOC(=O)C(=C)C]
RM-64
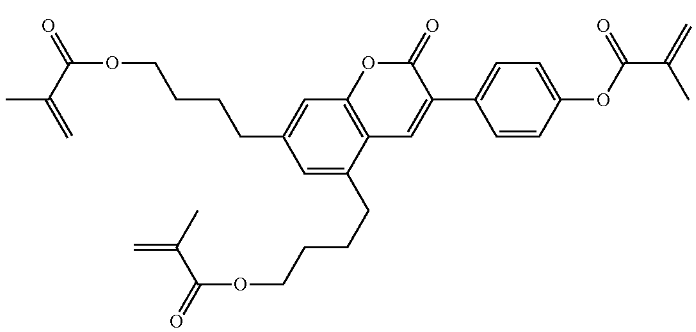 [SMILES: C=C(C)C(=O)OCCCCc1cc(CCCCOC(=O)C(=C)C)c2cc(-c3ccc(OC(=O)C(=C)C)cc3)c(=O)oc2c1]

TABLE D-continued
RM-65
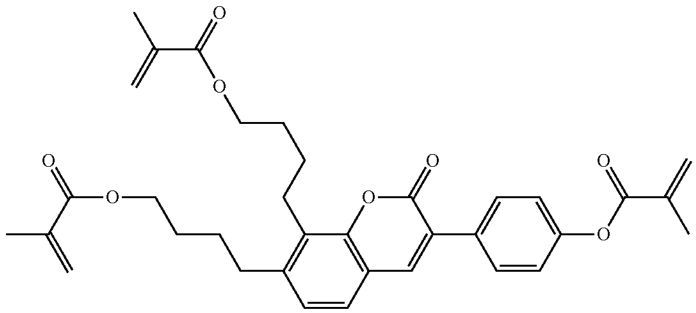 [SMILES: C=C(C)C(=O)OCCCCc1ccc2cc(-c3ccc(OC(=O)C(=C)C)cc3)c(=O)oc2c1CCCCOC(=O)C(=C)C]
RM-66
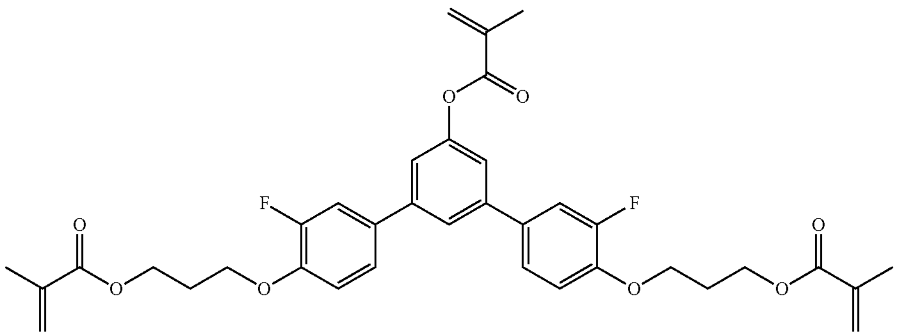 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-67
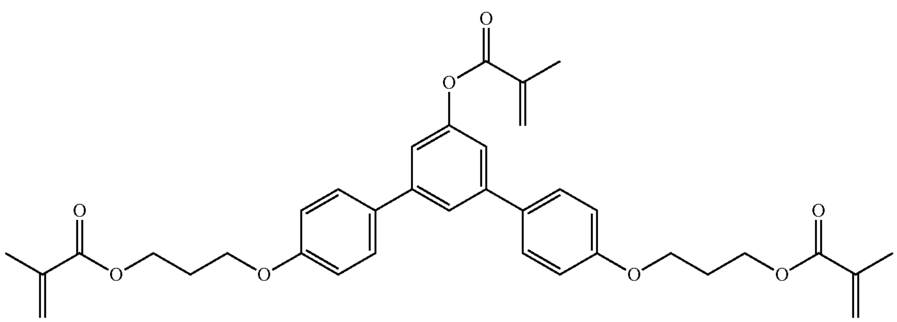 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-68
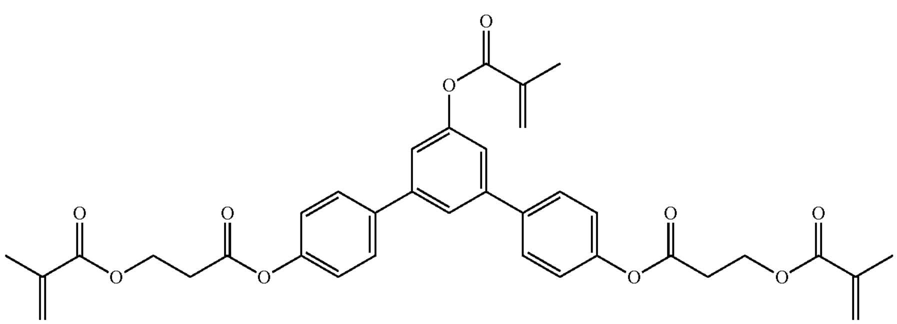 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-69
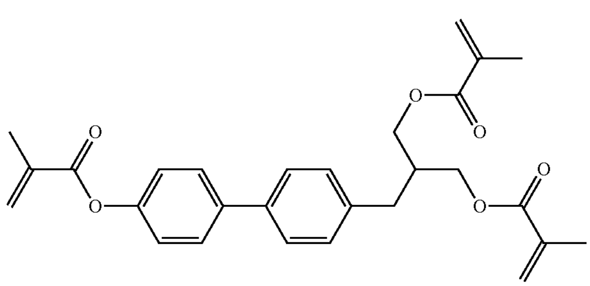 [SMILES: C=C(C)C(=O)OCC(COC(=O)C(=C)C)Cc1ccc(-c2ccc(OC(=O)C(=C)C)cc2)cc1]

TABLE D-continued

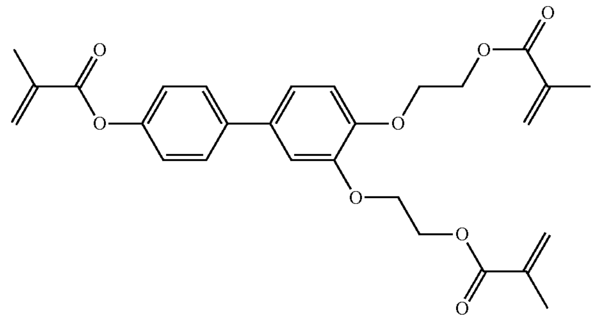

RM-70

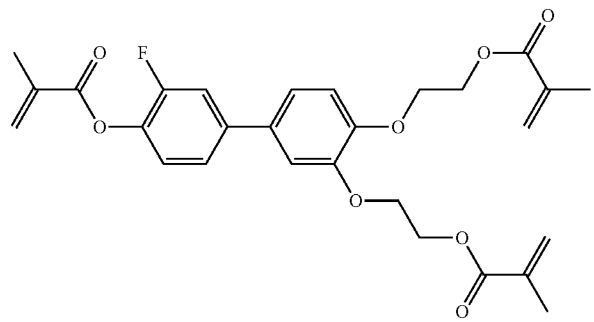 [SMILES: C=C(C)C(=O)OCCOc1ccc(-c2ccc(OC(=O)C(=C)C)c(F)c2)cc1OCCOC(=O)C(=C)C]

RM-71

Table D shows illustrative compounds which can be used in the LC media in accordance with the present invention, preferably as reactive mesogenic compounds.

In a preferred embodiment of the present invention, the mesogenic media comprise one or more compounds selected from the group of the compounds from Table D.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid-crystals, Physical Properties of Liquid-crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerisable compounds in the PSA displays as described above and below is carried out at a temperature where the LC medium exhibits a liquid-crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm$^2$ is used for polymerisation. The intensity is measured using a standard UVA meter (Hoenle UV-meter high end with UVA sensor).

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into VA-VHR test cells which comprise an unrubbed VA-polyimide alignment layer. The LC-layer thickness d is approx. 6 μm, unless stated otherwise. The VHR value is determined after 5 min at 100° C. before and after UV exposure at 1 V, 60 Hz, 64 μs pulse (measuring instrument: Autronic-Melchers VHRM-105).

EXAMPLE 1

Compound 1 is prepared as follows.

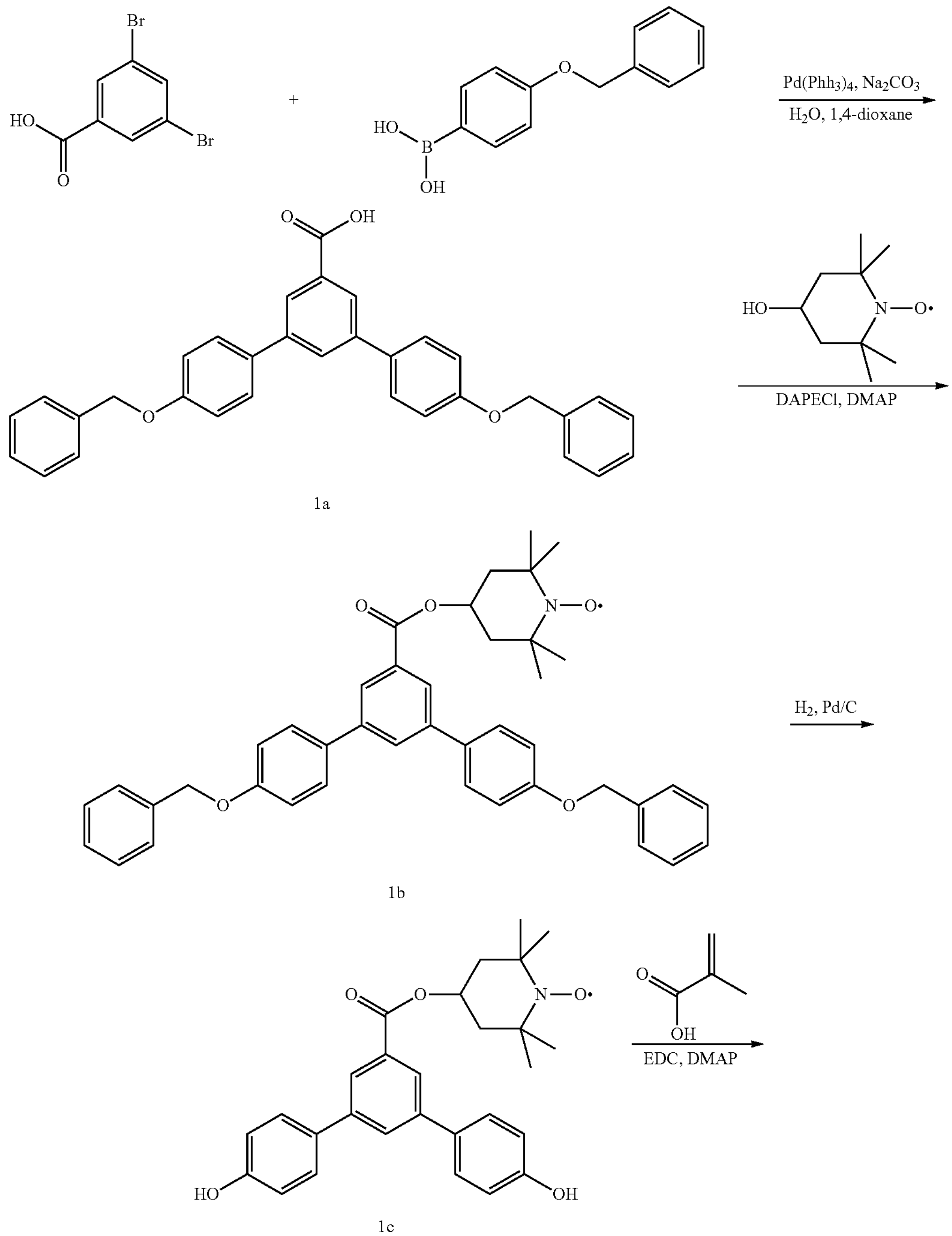

-continued

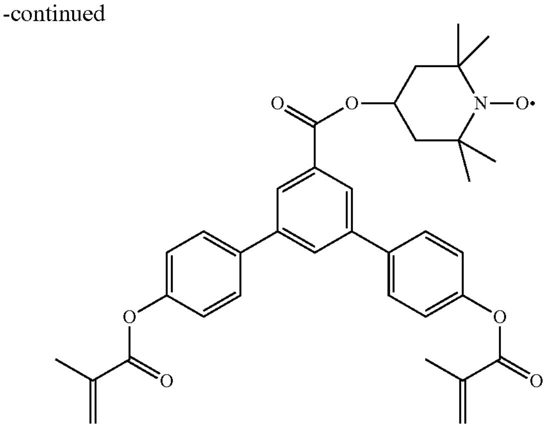

(1)

1a: To a solution of 4-benzyloxy-phenylboronic acid (16.29 g, 71.45 mmol) and 3,5-dibromobenzoic acid (10.0 g, 35.7 mmol) in 250 ml 1,4-dioxane was added 160 ml dist. water and sodium carbonate (37.8 g, 357.25 mmol). After degassing carefully with argon, bis(triphenylphosphine)-palladium(II) chloride (1.00 g, 1.43 mmol) is then added, followed by triphenylphosphine (0.38 g, 1.43 mmol) and triethylamine (0.15 ml, 1.43 mmol). The reaction mixture is heated to reflux and stirred 3 hours. After cooling to room temperature, the reaction mixture is neutralized carefully with 6 M HCl acid under cooling to pH~7. The precipitated crude product was filtrated and recrystallized from heptane/toluene 1:1 to provide 1a as gray solid (18.0 g).

1b: To a solution of 1a (4.0 g, 8.2 mmol) in 100 ml dichloromethane (DCM) was added 4-hydroxy-2,2,6,6-tetramethylpiperidine 1-oxyl (TEMPO) (1.42 g, 8.22) and 4-(dimethylamino)pyridine (DMAP, 0.20 g, 1.64 mmol). To this yellowish solution is added then N-(3-dimethylamino-propyl)-N'-ethylcarbodiimidhydrochlorid (DAPECl) (2.2 g, 11.0 mmol) in several portions at room temperature. The reaction mixture is stirred for 3 hours. 50 ml dist. water is added. The aqueous phase is extracted with DCM. The organic phase is combined and dried over anhydrous sodium sulfate, and filtrated. After removing solvent in vacuo, the oily residue is purified by column chromatography on silica gel with heptane/ethyl acetate as eluent to afford 1b as orange crystal (3.9 g).

1c: A solution of 1b (3.9 g, 6.09 mmol) in tetrahydrofuran (40 ml) is treated with palladium (5%) on activated charcoal (1.5 g) and submitted to hydrogenation for 15 hs. After filtered off the catalyst and removing solvent, the crude product is recrystallized from DCM to provide 1d as orange crystal (2.4 g).

1: Methacrylic acid (0.86 g, 10.0 mmol) and 4-(dimethylamino)pyridine (0.053 g, 0.43 mmol) is added to a suspension of 1c (2.0 g, 4.3 mmol) in 100 ml dichloromethane. The reaction mixture is treated dropwise at 0° C. with a solution of N-(3-dimethylaminopropyl)-N'-ethylcarbodiimide (1.55 g, 10.0 mmol) in 30 ml DCM and stirred for 20 hs at room temperature. The reaction mixture is concentrated in vacuo, and the oily residue is purified by column chromatography on silica gel with heptane/ethyl acetate as eluent to afford 1 as orange amorphous solid (0.34 g).

$^1$H-NMR ($d_6$-DMSO, 500 MHz): δ (ppm): 8.25 (br. s., 3 H, Ar-H), 7.91 (br. s., 4 H, Ar—H), 7.34 (br. s., 4 H, Ar—H), 6.32 (br. s., 2 H, $H_{olefin}$), 5.93 (br. s., 2 H, $H_{olefin}$), 2.04 (br. s., 6 H, 2×$CH_3$). MS (EI$^+$) m/z: [M]$^+$ Calcd. for $C_{36}H_{38}NO_7$: 596.7; Found 596.4.

EXAMPLE 2

Compound 2 is prepared in analogy to the method described in Example 1.

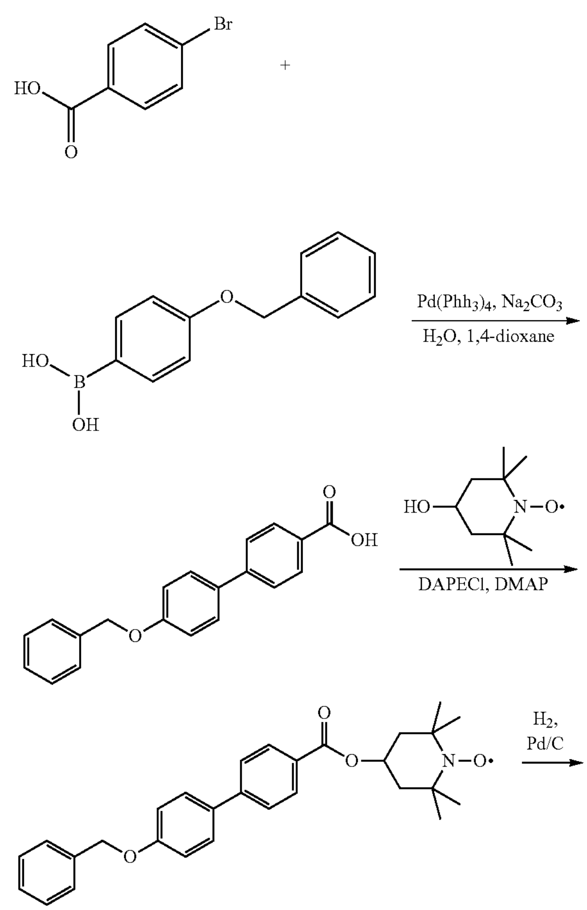

-continued

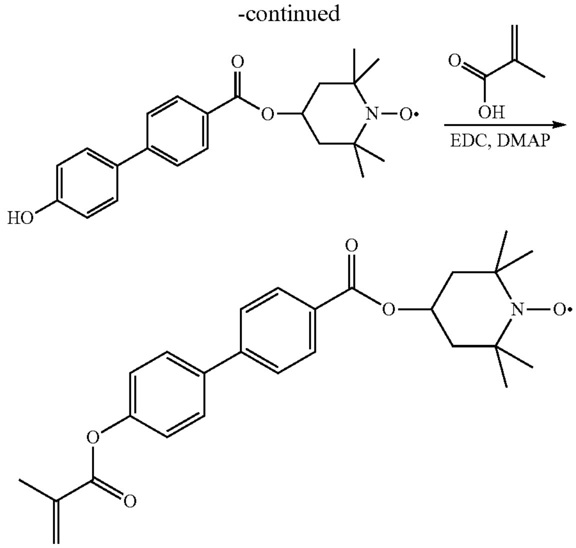

(2)

2 is obtained as orange crystal (m.p. 139° C.).

$^{1}$H-NMR ($d_6$-DMSO, 500 MHz): δ (ppm): 8.08-7.82 (br. m., 6 H, Ar—H), 7.32 (br. s., 2 H, Ar—H), 6.31 (br. s., 1 H, $H_{olefin}$), 5.92 (br. s., 1 H, $H_{olefin}$), 2.02 (br. s., 3 H, $CH_3$). MS ($EI^+$) m/z: $[M]^+$ Calcd. for $C_{26}H_{30}NO_5$: 436.5; Found 406.1 (—NO).

EXAMPLE 3

Compound 3 is prepared as follows.

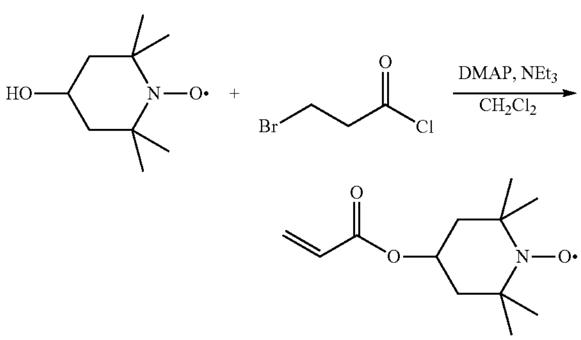

(3)

3: 4-hydroxyl TEMPO (8.00 g, 45.5 mmol) and 4-(dimethylamino)pyridine (0.30 g, 2.46 mmol) is added into 100 ml DCM. After cooled down to 2° C., triethylamine (25.00 ml, 180.35 mmol) is added to the above solution, followed by dropwise addition of 3-bromo-propionyl chloride (6.00 ml, 50.6 mmol) in 50 ml DCM. After complete addition, the reaction mixture is allowed to warm up to room temperature. After complete conversion indicated by TLC, aqueous ammonium chloride solution is added. The aqueous phase is extracted with DCM. The organic phase is combined and dried over anhydrous sodium sulfate, and filtrated. After removing solvent in vacuo, the solid residue is purified by column chromatography on silica gel with DCM/methyl t-butyl ether (MTBE) 95:5 as eluent, and further recrystallization from heptane/MTBE to afford 3 as red crystal (4.2 g, m.p. 102° C.).

$^{1}$H-NMR ($CDCl_3$, 500 MHz): δ (ppm): 6.54 (br. m., 1 H, $H_{olefin}$), 6.24 (br. m., 1 H, $H_{olefin}$), 6.00 (br. m., 1 H, $H_{olefin}$), MS ($EI^+$) m/z: $[M]^+$ Calcd. for $C_{12}H_{20}NO_3$: 226.3; Found 226.1.

EXAMPLE 4

Compound 4 is prepared as follows.

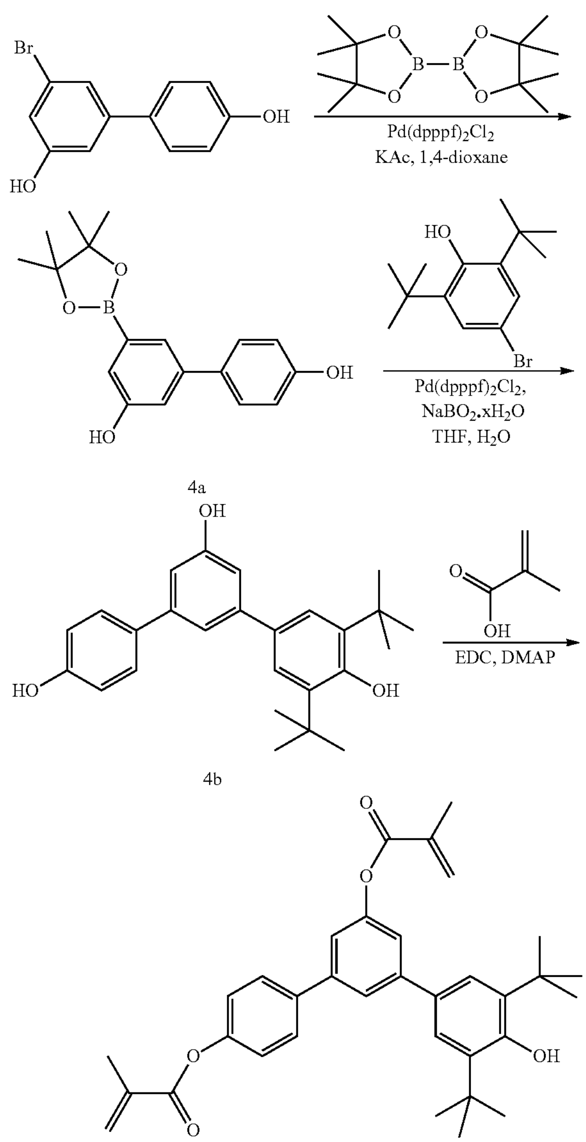

(4)

4a: To a solution of 5-bromo-biphenyl-3,4'-diol (10.00 g, 37.0 mmol) and bis(pinacolato)diboron (9.10 g, 36.0 mmol) in 300 ml 1,4-dioxane was added sodium acetate (14.81 g, 151.0 mmol). After thoroughly degassing with argon, [1,1'-bis(diphenylphosphino)ferrocene]dichloropalladium(II) (0.84 g, 1.13 mmol) is added. The reaction mixture is heated to reflux and stirred for 4 hours. After cooling to room temperature, 100 ml dist. water is added. The aqueous phase is separated and extracted with MTBE. The organic phase is combined and dried over anhydrous sodium sulfate, and filtrated through silica gel. After removing solvent in vacuo, the oily residue is purified by column chromatography on silica gel with DCM/MTBE as eluent to afford 4a (7.0 g).

4b: To a solution of sodium metaborate tetrahydrate (9.27 g, 33.6 mmol) in 150 ml dist. water is added the solution of 4a (7.00 g, 22.4 mmol) and 4-bromo-2,6-di-tert-butyl-phenol (6.40 g, 22.4 mmol) in 150 ml THF. After thoroughly degassing with argon, [1,1'-bis(diphenylphosphino)ferrocene]dichloropalladium(II) (0.37 g, 0.45 mmol) is added. The reaction mixture is heated to reflux and stirred overnight. After cooling to room temperature, the reaction mixture is carefully neutralized with 2 M HCl acid. The aqueous phase is separated and extracted with MTBE. The organic phase is combined and dried over anhydrous sodium sulfate, and filtrated through silica gel. After removing solvent in vacuo, the oily residue is purified by column chromatography on silica gel with DCM/MTBE as eluent to afford 4b (5.4 g).

4: Methacrylic acid (2.69 g, 31.0 mmol) and 4-(dimethylamino)pyridine (0.16 g, 1.3 mmol) is added to a suspension of 4b (5.3 g, 13.0 mmol) in 230 ml DCM. The reaction mixture is treated dropwise at 0° C. with a solution of N-(3-dimethylaminopropyl)-N'-ethylcarbodiimide (4.84 g, 31.0 mmol) in 30 ml DCM and stirred for 20 hs at room temperature. The reaction mixture is concentrated in vacuo, and the oily residue is purified by column chromatography on silica gel with heptane/ethyl acetate as eluent. The obtained product is recrystallized from heptane/MTBE to afford yellowish crystals of 4 (2.4 g, m.p. 171° C.).

$^1$H-NMR ($CDCl_3$, 500 MHz): δ (ppm): 7.80 (d., J=9 Hz, 2 H, Ar—H), 7.69 (s., 1 H, Ar—H), 7.40-7.35 (m., 4 H, Ar—H), 7.28 (d., J=9 Hz, 2 H, Ar—H), 6.32 (m. m., 2 H, $H_{olefin}$), 5.91 (m., 2 H, $H_{olefin}$), 2.03 (d., 6 H, 2×$CH_3$), 1.45 (s., 18 H, 6×$CH_3$), MS ($EI^+$) m/z: $[M]^+$ Calcd. for $C_{34}H_{38}O_5$: 526.7; Found 526.3.

MIXTURE EXAMPLES

Example 1

The nematic LC host mixture N1 is formulated as follows.

| | | | |
|---|---|---|---|
| CC-3-V | 37.00% | cl.p. | 75° C. |
| CC-3-V1 | 7.00% | Δn | 0.1090 |
| CCY-3-O2 | 5.00% | Δε | −3.2 |
| CLY-3-O2 | 10.00% | $\varepsilon_{\parallel}$ | 3.5 |
| CPY-2-O2 | 10.50% | $K_3/K_1$ | 1.14 |
| CPY-3-O2 | 10.50% | $\gamma_1$ | 87 mPa · s |
| PY-1-O4 | 10.00% | $V_0$ | 2.34 V |
| PY-3-O2 | 9.00% | | |
| PGIY-2-O4 | 1.00% | | |

Polymerisable mixture P11 is prepared by adding 0.3% of polymerisable compound RM-1 to the LC host mixture N1, and adding to the resulting mixture 100 ppm (0.01%) of the polymerisable compound of Example 1.

RM-1

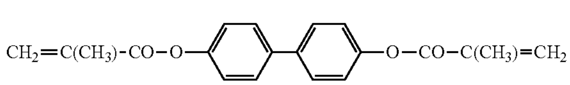

Polymerisable mixture P12 is prepared by adding 0.3% of polymerisable compound RM-1 to the LC host mixture N1, and adding to the resulting mixture 75 ppm (0.0075%) of the polymerisable compound of Example 2.

Polymerisable mixture P13 is prepared by adding 0.3% of polymerisable compound RM-1 to the LC host mixture N1, and adding to the resulting mixture 40 ppm (0.0040%) of the polymerisable compound of Example 3.

Example 2

The nematic LC host mixture N2 is formulated as follows.

| | | | |
|---|---|---|---|
| CCH-501 | 9.00% | Clp. | 70.0° C. |
| CCH-35 | 14.00% | Δn | 0.0825 |
| PCH-53 | 8.00% | Δε | −3.5 |
| PCH-304FF | 14.00% | ε\|\| | 3.5 |
| PCH-504FF | 13.00% | K3/K1 | 1.00 |
| CCP-302FF | 8.00% | $\gamma_1$ | 141 mPa s |
| CCP-502FF | 8.00% | V0 | 2.10 V |
| CCP-21FF | 9.00% | | |
| CCP-31FF | 9.00% | | |
| CPY-2-O2 | 8.00% | | |

Polymerisable mixture P21 is prepared by adding 0.3% of polymerisable compound RM-1 to the LC host mixture N2, and adding to the resulting mixture 100 ppm (0.01%) of the polymerisable compound of Example 1.

Polymerisable mixture P22 is prepared by adding 0.3% of polymerisable compound RM-1 to the LC host mixture N2, and adding to the resulting mixture 100 ppm (0.01%) of the polymerisable compound of Example 2.

Polymerisable mixture P23 is prepared by adding 0.3% of polymerisable compound RM-1 to the LC host mixture N2, and adding to the resulting mixture 100 ppm (0.01%) of the polymerisable compound of Example 3.

Example 3

The nematic LC host mixture N3 is formulated as follows.

| | | | |
|---|---|---|---|
| CY-3-O2 | 18.00% | Clp. | +74.5° C. |
| CPY-2-O2 | 10.00% | Δn | 0.1021 |
| CPY-3-O2 | 10.00% | Δε | −3.1 |
| CCY-3-O2 | 9.00% | ε\|\| | 3.5 |
| CCY-4-O2 | 4.00% | K3/K1 | 1.16 |
| CC-3-V | 40.00% | $\gamma_1$ | 86 mPa s |
| PYP-2-3 | 9.00% | V0 | 2.29 V |

Polymerisable mixture P31 is prepared by adding 0.3% of polymerisable compound RM-1 to the LC host mixture N3, and adding to the resulting mixture 100 ppm (0.01%) of the polymerisable compound of Example 1.

Example 4

The nematic LC host mixture N4 is formulated as follows.

| | | | |
|---|---|---|---|
| CC-3-V | 20.00% | Clp. | 74.5° C. |
| CC-3-V1 | 10.00% | Δn | 0.1084 |
| CCH-34 | 8.00% | Δε | −3.2 |
| CCH-35 | 4.00% | V0 | 2.33 V |
| CCY-3-O1 | 5.50% | K3/K1 | 1.04 |
| CCY-3-O2 | 12.00% | $\gamma_1$ | 94 mPa s |
| CPY-2-O2 | 2.00% | | |
| CPY-3-O2 | 12.00% | | |
| PY-3-O2 | 15.00% | | |
| PY-4-O2 | 8.50% | | |
| PYP-2-3 | 3.00% | | |

Polymerisable mixture P41 is prepared by adding 0.3% of polymerisable compound RM-1 to the LC host mixture N4, and adding to the resulting mixture 100 ppm (0.01%) of the polymerisable compound of Example 1.

Example 5

The nematic LC host mixture N5 is formulated as follows.

| | | | |
|---|---|---|---|
| CC-3-V | 20.00% | Clp. | 74.6° C. |
| CC-3-V1 | 10.00% | Δn | 0.1042 |
| CCH-35 | 9.00% | Δε | −3.1 |
| CCP-3-1 | 7.00% | V0 | 2.48 V |
| CCY-3-O2 | 13.00% | K3/K1 | 1.13 |
| CPY-3-O2 | 13.00% | $\gamma_1$ | 94 mPa s |
| CY-3-O2 | 8.00% | | |
| PY-3-O2 | 15.00% | | |
| PY-4-O2 | 5.00% | | |

Polymerisable mixture P51 is prepared by adding 0.3% of polymerisable compound RM-1 to the LC host mixture N5, and adding to the resulting mixture 100 ppm (0.01%) of the polymerisable compound of Example 1.

Example 6

The nematic LC host mixture N6 is formulated as follows.

| | | | |
|---|---|---|---|
| CC-3-V | 27.50% | Clp. | 74.8° C. |
| CC-3-V1 | 7.50% | Δn | 0.0986 |
| CCH-23 | 3.00% | Δε | −3.4 |
| CCP-3-1 | 3.75% | V0 | 2.26 V |
| CCY-3-O2 | 12.50% | K3/K1 | 1.16 |
| CPY-2-O2 | 11.50% | $\gamma_1$ | 95 mPa s |
| CPY-3-O2 | 10.50% | | |
| CY-3-O2 | 15.50% | | |
| PY-3-O2 | 3.00% | | |
| PY-4-O2 | 5.25% | | |

Polymerisable mixture P61 is prepared by adding 0.3% of polymerisable compound RM-1 to the LC host mixture N6, and adding to the resulting mixture 100 ppm (0.01%) of the polymerisable compound of Example 1.

Example 7

The nematic LC host mixture N7 is formulated as follows.

| | | | |
|---|---|---|---|
| CC-3-V | 41.50% | Clp. | 74.6° C. |
| CCP-3-1 | 2.00% | Δn | 0.0983 |
| CCY-3-O1 | 5.25% | Δε | −3.1 |
| CCY-3-O2 | 12.50% | V0 | 2.28 V |
| CPY-2-O2 | 12.25% | K3/K1 | 1.11 |
| CPY-3-O2 | 7.50% | $\gamma_1$ | 85 mPa s |
| CY-3-O2 | 5.50% | | |
| PY-3-O2 | 3.50% | | |
| PY-4-O2 | 10.00% | | |

Polymerisable mixture P71 is prepared by adding 0.3% of polymerisable compound RM-1 to the LC host mixture N7, and adding to the resulting mixture 100 ppm (0.01%) of the polymerisable compound of Example 1.

Example 8

The nematic LC host mixture N8 is formulated as follows.

| | | | |
|---|---|---|---|
| CC-3-V | 27.50% | Clp. | 75.6° C. |
| CC-3-V1 | 8.00% | Δn | 0.0989 |
| CCH-23 | 2.50% | Δε | −3.4 |
| CCP-3-1 | 3.00% | V0 | 2.28 V |
| CCY-3-O2 | 12.00% | K3/K1 | 1.16 |
| CCY-4-O2 | 2.00% | $\gamma_1$ | 94 mPa s |
| CPY-2-O2 | 10.00% | | |
| CPY-3-O2 | 10.50% | | |
| CY-3-O2 | 15.50% | | |
| CY-3-O4 | 1.00% | | |
| PY-3-O2 | 15.00% | | |
| PY-4-O2 | 7.00% | | |
| PYP-2-3 | 1.00% | | |

Polymerisable mixture P81 is prepared by adding 0.3% of polymerisable compound RM-1 to the LC host mixture N8, and adding to the resulting mixture 100 ppm (0.01%) of the polymerisable compound of Example 1.

Example 9

The nematic LC host mixture N9 is formulated as follows.

| | | | |
|---|---|---|---|
| CC-3-V | 41.50% | Clp. | 74.5° C. |
| CCY-3-O1 | 2.50% | Δn | 0.0984 |
| CCY-3-O2 | 11.50% | Δε | −3.3 |
| CCY-3-O3 | 5.00% | V0 | 2.29 V |
| CPY-2-O2 | 5.00% | K3/K1 | 1.15 |
| CPY-3-O2 | 12.00% | $\gamma_1$ | 89 mPa s |
| CY-3-O2 | 9.50% | | |
| PY-3-O2 | 7.00% | | |
| PY-4-O2 | 3.00% | | |
| PYP-2-3 | 3.00% | | |

Polymerisable mixture P91 is prepared by adding 0.3% of polymerisable compound RM-1 to the LC host mixture N9, and adding to the resulting mixture 100 ppm (0.01%) of the polymerisable compound of Example 1.

Example 10

The nematic LC host mixture N10 is formulated as follows.

| | | | |
|---|---|---|---|
| CC-3-V | 15.00% | Clp. | 74.4° C. |
| CC-3-V1 | 9.00% | Δn | 0.1086 |
| CCH-23 | 8.00% | Δε | −3.2 |
| CCH-34 | 7.50% | V0 | 2.33 V |
| CCY-3-O2 | 10.00% | K3/K1 | 1.10 |
| CCY-5-O2 | 8.00% | $\gamma_1$ | 102 mPa s |
| CPY-2-O2 | 3.00% | | |
| CPY-3-O2 | 8.50% | | |
| CY-3-O2 | 7.00% | | |
| PY-3-O2 | 16.00% | | |
| PYP-2-3 | 8.00% | | |

Polymerisable mixture P101 is prepared by adding 0.3% of polymerisable compound RM-1 to the LC host mixture N10, and adding to the resulting mixture 100 ppm (0.01%) of the polymerisable compound of Example 1.

Polymerisable mixture P102 is prepared by adding 0.3% of polymerisable compound RM-1 to the LC host mixture N10, and adding to the resulting mixture 100 ppm (0.01%) of the polymerisable compound of Example 2.

Polymerisable mixture P103 is prepared by adding 0.3% of polymerisable compound RM-1 to the LC host mixture N10, and adding to the resulting mixture 100 ppm (0.01%) of the polymerisable compound of Example 3.

Example 11

The nematic LC host mixture N11 is formulated as follows.

| | | | |
|---|---|---|---|
| CC-3-V | 42.00% | Clp. | 73.5° C. |
| CCY-3-O1 | 5.00% | Δn | 0.1007 |
| CCY-3-O2 | 10.00% | Δε | −3.5 |
| CCY-4-O2 | 2.50% | V0 | 2.15 V |
| CPY-2-O2 | 10.00% | K3/K1 | 1.13 |
| CPY-3-O2 | 10.00% | $\gamma_1$ | 85 mPa s |
| CY-3-O2 | 6.50% | | |
| PY-3-O2 | 11.00% | | |
| B-2O-O5 | 3.00% | | |

Polymerisable mixture P111 is prepared by adding 0.3% of polymerisable compound RM-1 to the LC host mixture N11, and adding to the resulting mixture 100 ppm (0.01%) of the polymerisable compound of Example 1.

Polymerisable mixture P113 is prepared by adding 0.3% of polymerisable compound RM-1 to the LC host mixture N11, and adding to the resulting mixture 100 ppm (0.01%) of the polymerisable compound of Example 3.

Example 12

The nematic LC host mixture N12 is formulated as follows.

| | | | |
|---|---|---|---|
| B-2O-O5 | 6.00% | Clp. | 73.0° C. |
| CC-3-V | 45.50% | Δn | 0.1011 |
| CCY-3-O1 | 3.00% | Δε | −3.5 |
| CCY-3-O2 | 11.00% | V0 | 2.15 V |
| CCY-4-O2 | 3.50% | K3/K1 | 1.09 |
| CPY-2-O2 | 7.50% | $\gamma_1$ | 79 mPa s |
| CPY-3-O2 | 10.00% | | |
| CY-3-O2 | 2.00% | | |
| PY-3-O2 | 11.50% | | |

Polymerisable mixture P121 is prepared by adding 0.3% of polymerisable compound RM-1 to the LC host mixture N12, and adding to the resulting mixture 100 ppm (0.01%) of the polymerisable compound of Example 1.

Example 13

The nematic LC host mixture N13 is formulated as follows.

| | | | |
|---|---|---|---|
| B-2O-O5 | 5.00% | Clp. | 75.0° C. |
| CC-3-V | 34.50% | Δn | 0.1075 |
| CC-3-V1 | 8.00% | Δε | −3.1 |
| CCY-3-O1 | 7.00% | V0 | 2.41 V |
| CCY-3-O2 | 11.50% | K3/K1 | 1.12 |
| CCY-4-O2 | 3.50% | $\gamma_1$ | 84 mPa s |
| CPY-3-O2 | 11.50% | | |
| PY-3-O2 | 13.00% | | |
| PP-1-2V1 | 6.00% | | |

Polymerisable mixture P131 is prepared by adding 0.3% of polymerisable compound RM-1 to the LC host mixture N13, and adding to the resulting mixture 100 ppm (0.01%) of the polymerisable compound of Example 1.

Polymerisable mixture P133 is prepared by adding 0.3% of polymerisable compound RM-1 to the LC host mixture N13, and adding to the resulting mixture 100 ppm (0.01%) of the polymerisable compound of Example 3.

Example 14

The nematic LC host mixture N14 is formulated as follows.

| | | | |
|---|---|---|---|
| CC-3-V | 37.50% | Clp. | 75.5° C. |
| CC-3-V1 | 7.00% | Δn | 0.1080 |
| CCY-3-O1 | 6.00% | Δε | −3.0 |
| CCY-3-O2 | 11.00% | V0 | 2.41 V |
| CPY-2-O2 | 4.50% | K3/K1 | 1.12 |
| CPY-3-O2 | 11.00% | $\gamma_1$ | 84 mPa s |
| PY-3-O2 | 17.00% | | |
| PGIY-2-O4 | 5.00% | | |
| PP-1-2V1 | 1.00% | | |

Polymerisable mixture P141 is prepared by adding 0.3% of polymerisable compound RM-1 to the LC host mixture N14, and adding to the resulting mixture 100 ppm (0.01%) of the polymerisable compound of Example 1.

Example 15

The nematic LC host mixture N15 is formulated as follows.

| | | | |
|---|---|---|---|
| CC-3-V | 39.00% | Clp. | 75.0° C. |
| CC-3-V1 | 7.00% | Δn | 0.1098 |
| CCY-3-O1 | 1.50% | Δε | −3.0 |
| CCY-3-O2 | 5.00% | V0 | 2.41 V |
| CPY-2-O2 | 9.00% | K3/K1 | 1.11 |
| CPY-3-O2 | 6.00% | $\gamma_1$ | 82 mPa s |
| PY-3-O2 | 11.50% | | |
| PGIY-2-O4 | 16.00% | | |
| PP-1-2V1 | 5.00% | | |

Polymerisable mixture P151 is prepared by adding 0.3% of polymerisable compound RM-1 to the LC host mixture N15, and adding to the resulting mixture 100 ppm (0.01%) of the polymerisable compound of Example 1.

Example 16

The nematic LC host mixture N16 is formulated as follows.

| | | | |
|---|---|---|---|
| CY-3-O2 | 16.50% | Clp. | 74.0° C. |
| CCY-4-O2 | 10.50% | Δn | 0.1069 |
| CCY-5-O2 | 6.00% | Δε | −3.2 |
| CPY-2-O2 | 9.00% | V0 | 2.18 |
| CPY-3-O2 | 9.00% | K3/K1 | 1.06 |
| CCH-34 | 9.00% | $\gamma_1$ | 117 mPa s |
| CCH-31 | 20.00% | | |
| CCP-3-1 | 2.00% | | |
| PYP-2-3 | 6.50% | | |
| PYP-2-4 | 6.50% | | |
| PCH-301 | 5.00% | | |

Polymerisable mixture P161 is prepared by adding 0.3% of polymerisable compound RM-1 to the LC host mixture N16, and adding to the resulting mixture 100 ppm (0.01%) of the polymerisable compound of Example 1.

Example 17

The nematic LC host mixture N17 is formulated as follows.

| | | | |
|---|---|---|---|
| CY-3-O2 | 16.50% | Clp. | 74.0° C. |
| CCY-4-O2 | 9.50% | Δn | 0.1070 |
| CCY-5-O2 | 4.00% | Δε | −3.2 |
| CPY-2-O2 | 9.00% | V0 | 2.19 |
| CPY-3-O2 | 9.00% | K3/K1 | 1.06 |
| CCH-34 | 9.00% | $\gamma_1$ | 117 mPa s |
| CCH-31 | 20.00% | | |
| CCP-3-1 | 5.00% | | |
| PYP-2-3 | 4.00% | | |
| PYP-2-4 | 4.00% | | |
| PCH-301 | 5.00% | | |
| PGIY-2-O4 | 5.00% | | |

Polymerisable mixture P181 is prepared by adding 0.3% of polymerisable compound RM-1 to the LC host mixture N18, and adding to the resulting mixture 100 ppm (0.01%) of the polymerisable compound of Example 1.

Polymerisable mixture P183 is prepared by adding 0.3% of polymerisable compound RM-1 to the LC host mixture N18, and adding to the resulting mixture 100 ppm (0.01%) of the polymerisable compound of Example 3.

Example 18

The nematic LC host mixture N18 is formulated as follows.

| | | | |
|---|---|---|---|
| CY-3-O2 | 12.00% | Clp. | 74.0° C. |
| CY-3-O4 | 10.00% | Δn | 0.1064 |
| CCY-3-O2 | 6.00% | Δε | −3.2 |
| CCY-4-O2 | 6.50% | V0 | 2.19 |
| CCH-34 | 9.00% | K3/K1 | 0.99 |
| CCH-35 | 5.00% | $\gamma_1$ | 119 mPa s |
| CCP-3-1 | 14.50% | | |
| CCP-3-3 | 11.00% | | |
| PYP-2-3 | 9.00% | | |
| PYP-2-4 | 8.00% | | |
| Y-4O-O4 | 9.00% | | |

Polymerisable mixture P181 is prepared by adding 0.3% of polymerisable compound RM-1 to the LC host mixture N18, and adding to the resulting mixture 100 ppm (0.01%) of the polymerisable compound of Example 1.

Example 19

The nematic LC host mixture N19 is formulated as follows.

| | | | |
|---|---|---|---|
| CY-3-O2 | 12.00% | Clp. | 73.5° C. |
| CY-3-O4 | 10.00% | Δn | 0.1065 |
| CCY-3-O2 | 6.00% | Δε | −3.3 |
| CCY-4-O2 | 5.50% | V0 | 2.18 |
| CCH-34 | 8.50% | K3/K1 | 1.00 |
| CCH-35 | 5.00% | $\gamma_1$ | 119 mPa s |
| CCP-3-1 | 15.00% | | |
| CCP-3-3 | 11.50% | | |
| PYP-2-3 | 5.50% | | |
| PYP-2-4 | 5.00% | | |
| PP-1-2V1 | 2.00% | | |
| PGIY-2-O4 | 5.00% | | |
| Y-4O-O4 | 9.00% | | |

Polymerisable mixture P191 is prepared by adding 0.3% of polymerisable compound RM-1 to the LC host mixture N19, and adding to the resulting mixture 100 ppm (0.01%) of the polymerisable compound of Example 1.

Example 20

The nematic LC host mixture N20 is formulated as follows.

| | | | |
|---|---|---|---|
| CC-3-V | 28.50% | Clp. | 74.5° C. |
| CCP-31 | 12.50% | Δn | 0.1077 |
| CCOY-2-O2 | 19.00% | Δε | −3.2 |
| CCOY-3-O2 | 11.50% | V0 | 2.34 V |
| PY-3-O2 | 13.50% | K3/K1 | 0.91 |
| PP-1-3 | 10.00% | $\gamma_1$ | 99 mPa s |
| PYP-2-3 | 5.00% | | |

Polymerisable mixture P201 is prepared by adding 0.3% of polymerisable compound RM-1 to the LC host mixture N20, and adding to the resulting mixture 100 ppm (0.01%) of the polymerisable compound of Example 1.

Example 21

The nematic LC host mixture N21 is formulated as follows.

| | | | |
|---|---|---|---|
| CC-3-V1 | 9.00% | Clp. | 75.4° C. |
| CCH-23 | 14.00% | Δn | 0.1056 |
| CCH-34 | 6.00% | Δε | −2.8 |
| CCH-35 | 6.00% | V0 | 2.67 V |
| CCP-3-1 | 7.00% | K3/K1 | 1.07 |
| CCY-3-O1 | 5.00% | $\gamma_1$ | 102 mPa s |
| CCY-3-O2 | 10.00% | | |
| CPY-3-O2 | 12.00% | | |
| CY-3-O2 | 9.50% | | |
| PP-1-2V1 | 8.50% | | |
| PY-3-O2 | 12.00% | | |
| PY-4-O2 | 1.00% | | |

Polymerisable mixture P211 is prepared by adding 0.3% of polymerisable compound RM-1 to the LC host mixture N21, and adding to the resulting mixture 100 ppm (0.01%) of the polymerisable compound of Example 1.

Example 22

The nematic LC host mixture N22 is formulated as follows.

| | | | |
|---|---|---|---|
| CC-3-V | 34.50% | Clp. | 74.5° C. |
| CC-3-V1 | 8.00% | Δn | 0.1088 |
| CCY-3-O1 | 9.00% | Δε | −3.2 |
| CCY-3-O2 | 5.50% | CV0 | 2.33 V |
| CLY-3-O2 | 10.00% | K3/K1 | 1.12 |
| CPY-3-O2 | 5.00% | C$\gamma_1$ | 90 mPa s |
| PY-1-O4 | 10.00% | | |
| PY-3-O2 | 10.00% | | |
| PYP-2-3 | 3.00% | | |
| PGIY-2-O4 | 5.00% | | |

Polymerisable mixture P221 is prepared by adding 0.3% of polymerisable compound RM-1 to the LC host mixture N22, and adding to the resulting mixture 100 ppm (0.01%) of the polymerisable compound of Example 1.

Polymerisable mixture P222 is prepared by adding 0.3% of polymerisable compound RM-1 to the LC host mixture N22, and adding to the resulting mixture 100 ppm (0.01%) of the polymerisable compound of Example 2.

Example 23

The nematic LC host mixture N23 is formulated as follows.

| | | | |
|---|---|---|---|
| CC-3-V | 34.00% | Clp. | 74.3° C. |
| CC-3-V1 | 10.00% | Δn | 0.1091 |
| CCY-3-O1 | 4.50% | Δε | −3.2 |
| CLY-3-O2 | 10.00% | V0 | 2.34 V |
| CPY-2-O2 | 10.50% | K3/K1 | 1.12 |
| CPY-3-O2 | 11.00% | $\gamma_1$ | 88 mPa s |
| PY-1-O4 | 9.00% | | |
| PY-3-O2 | 11.00% | | |

Polymerisable mixture P231 is prepared by adding 0.3% of polymerisable compound RM-1 to the LC host mixture N23, and adding to the resulting mixture 100 ppm (0.01%) of the polymerisable compound of Example 1.

Use Example 1

A polymerisable reference mixture C11 is prepared by adding the direactive monomer RM-1 at a concentration of 0.3% by weight to the nematic LC host mixture N1.

Polymerisable mixtures P11-P13 according to the present invention are prepared as described in Mixture Example 1 above, by adding 0.3% of polymerisable compound RM-1 to the LC host mixture N1, and adding to the resulting mixture 100 ppm (0.01%) of the polymerisable compound of Example 1, 2 or 3, respectively.

The compositions of the polymerisable mixtures are shown in Table 1 below.

TABLE 1

| Polymerisable Mixture Composition | | | | | |
|---|---|---|---|---|---|
| Mix. No. | LC Host | RM-1 [%] | Cpd. 1 [%] | Cpd. 2 [%] | Cpd. 3 [%] |
| C11 | N1 | 0.3 | — | — | — |
| P11 | N1 | 0.3 | 0.01 | — | — |
| P12 | N1 | 0.3 | — | 0.0075 | — |
| P13 | N1 | 0.3 | — | — | 0.004 |

Each polymerisable mixture is inserted into a VA e/o test cell. The test cells comprise a VA-polyimide alignment layer (JALS-2096-R1) which is rubbed antiparallel. The LC-layer thickness d is approx. 4 μm.

Each test cell is irradiated with UV light having an intensity of 100 mW/cm$^2$ for the time indicated with application of a voltage of 24 $V_{rms}$ (alternating current), causing polymerisation of the polymerisable monomeric compound.

The tilt angle is determined before and after UV irradiation by a crystal rotation experiment (Autronic-Melchers TBA-105).

The tilt angles are shown in Table 2.

TABLE 2

| Tilt angles | | | | |
|---|---|---|---|---|
| UV Exposure time/min | C11 | P11 | P12 | P13 |
| | Pretilt Angle/° | | | |
| 0 | 89.8 | 89.6 | 89.8 | 89.8 |
| 0.5 | 89.8 | 89.8 | 89.8 | 89.9 |
| 2 | 86.9 | 88.4 | 89.0 | 89.5 |
| 5 | 73.2 | 75.6 | 75.5 | 75.8 |

From Table 2 it can be seen that in the mixtures P11-P13 according to the present invention, which contain a compound of formula I with a NO-HALS stabilising group and a conventional RM (RM-1), the tilt angle generation is delayed compared to the mixture C11 which contains only RM-1, indicated by the higher values at short exposure times (2 min).

However, after longer exposure time (5 min) a low pretilt angle can also be achieved in the mixtures P11-P13 according to the present invention.

This shows that mixtures P11-P13 according to the present invention provide the advantage of suppressed prepolymerisation (indicated by the delayed tilt generation), while still achieving a low final pretilt angle.

In order to determine the polymerisation rate, the residual content of unpolymerised monomer (in % by weight) in the test cells is measured by HPLC after various exposure times. For this purpose each mixture is polymerised in the test cell under the stated conditions. The mixture is then rinsed out of the test cell using MEK (methyl ethyl ketone) and measured.

The residual concentrations of the respective monomer in the mixture after different UV exposure times are shown in Table 3.

In addition, the thermal stability of the compounds of formula I and the LC medium is examined by the so-called "heat load test" (HLT). Therein the LC medium is not exposed to UV radiation, but subjected to high temperature. For this purpose a sample of the LC medium is filled into a test vial which is then sealed and exposed to 120° C. for 240 minutes. Afterwards the RM concentration in the LC medium is measured. The results of the HLT are also shown in Table 3.

TABLE 3

| Residual monomer content | | | | |
|---|---|---|---|---|
| UV Exposure time/min | C11 | P11 | P12 | P13 |
| | Residual RM/Relative ratio % | | | |
| 0 | 0.3 | 0.3 | 0.3 | 0.3 |
| 1 | 0.243 | 0.281 | 0.282 | — |
| 21 | 0.049 | 0.051 | 0.058 | 0.054 |
| 0 (HLT)* | 0.300 | 0.300 | 0.300 | 0.300 |
| 240 (HLT) | 0.300 | 0.300 | 0.300 | 0.300 |

*HLT = Heat Load Test: bulk, 1 mL, 120° C.

From Table 3 it can be seen that in the mixtures P11-P13 according to the present invention, which contain a compound of formula I with a NO-HALS stabilising group and a conventional RM (RM-1), the polymerisation is delayed compared to the mixture C11 which contains only RM-1, indicated by the higher residual monomer ratio at short exposure times (1 min).

However, after long exposure time (21 min) the mixtures P11-P13 according to the present invention show an extent of polymerisation and a low amount of residual monomer that is comparable to mixture C11.

This shows that mixtures P11-P13 according to the present invention provide the advantage of suppressed prepolymerisation (indicated by the higher amount of residual monomer after short exposure time), while still achieving a low amount of residual monomer after longer exposure time.

The HLT test results show that the monomer concentration in the LC medium after HLT remains constant even in case of mixtures P11-P13 containing the compound of formula I with a highly reactive free NO-radical group, which is however sterically protected by the 2,2,6,6,-tetramethylpiperidyl group sufficiently so that it does not interact with the other components of the LC medium even at high temperature.

The VHR values of the polymerisable mixtures before and after UV exposure are measured as described above. The VHR values after different exposure times are shown in Table 4. In addition, the VHR is measured before and after HLT. The results are also shown in Table 4.

TABLE 4

| VHR values | | | | |
|---|---|---|---|---|
| UV Exposure time/ min | C11 | P11 | P12 | P13 |
| | VHR/% | | | |
| 0 | 92.7 | 92.4 | 93.4 | 94.1 |
| 30 | 92.7 | 90.9 | 90.0 | 89.7 |
| 0 (HLT*) | 96.6 | 97.1 | 97.1 | 97.1 |
| 240 (HLT) | 97.1 | 96.8 | 96.8 | 96.9 |

*HLT = Heat Load Test: bulk, 1 mL, 120° C.

From Table 4 it can be seen that the mixtures P11-P13 according to the present invention, which contain a compound of formula I with a NO-HALS stabilising group and a conventional RM (RM-1), show VHR values that are only slightly lower than those of the mixture C11 which contains only RM-1.

In addition, it can be seen that the VHR values of mixtures P11-P13 after HLT are almost unchanged, confirming that the addition of the compound of formula I with a free NO radical does not significantly influence the reliability of the LC medium even after exposure to high temperature.

Use Example 2

Polymerisable reference mixture Cl 1 is prepared by adding the direactive monomer RM-1 at a concentration of 0.3% by weight to the nematic LC host mixture N1.

Polymerisable reference mixture C12 is prepared by adding the direactive monomer RM-1 at a concentration of 0.3% by weight and the photoinitiator Irgacure 651 at a concentration of 50 ppm to the nematic LC host mixture N1.

Polymerisable mixtures P11-P13 according to the present invention are prepared as described in Mixture Example 1 above, by adding 0.3% of polymerisable compound RM-1 to the LC host mixture N1, and adding to the resulting mixture 100 ppm (0.01%) of the polymerisable compound of Example 1, 2 or 3, respectively.

The compositions of the polymerisable mixtures are shown in Table 1 below.

TABLE 1

| Polymerisable Mixture Composition | | | | | |
|---|---|---|---|---|---|
| Mix. No. | LC Host | RM-1 [%] | Cpd. 1 [%] | Cpd. 2 [%] | Cpd. 3 [%] |
| C11 | N1 | 0.3 | — | — | — |
| P11 | N1 | 0.3 | 0.01 | — | — |
| P12 | N1 | 0.3 | — | 0.0075 | — |
| P13 | N1 | 0.3 | — | — | 0.004 |

Each polymerisable mixture is inserted into a VA e/o test cell. The test cells comprise a VA-polyimide alignment layer (JALS-2096-R1) which is rubbed antiparallel. The LC-layer thickness d is approx. 4 μm.

Each test cell is irradiated with UV light having an intensity of 100 mW/cm$^2$ for the time indicated with application of a voltage of 24 $V_{rms}$ (alternating current), causing polymerisation of the polymerisable monomeric compound.

The tilt angle is determined before and after UV irradiation by a crystal rotation experiment (Autronic-Melchers TBA-105).

The tilt angles are shown in Table 2.

TABLE 2

| Tilt Angles | | | | |
|---|---|---|---|---|
| UV Exposure time/min | C11 | P11 | P12 | P13 |
| | Pretilt Angle/° | | | |
| 0 | 89.8 | 89.6 | 89.8 | 89.8 |
| 0.5 | 89.8 | 89.8 | 89.8 | 89.9 |
| 2 | 86.9 | 88.4 | 89.0 | 89.5 |
| 5 | 73.2 | 75.6 | 75.5 | 75.8 |

From Table 2 it can be seen that in the mixtures P11-P13 according to the present invention, which contain a compound of formula I with a NO-HALS stabilising group and a conventional RM (RM-1), the tilt angle generation is delayed compared to the mixture C11 which contains only RM-1, indicated by the higher values at short exposure times (2 min).

However, after longer exposure time (5 min) a low pretilt angle can also be achieved in the mixtures P11-P13 according to the present invention.

This shows that mixtures P11-P13 according to the present invention provide the advantage of suppressed prepolymerisation (indicated by the delayed tilt generation), while still achieving a low final pretilt angle.

In order to determine the polymerisation rate, the residual content of unpolymerised monomer (in % by weight) in the test cells is measured by HPLC after various exposure times. For this purpose each mixture is polymerised in the test cell under the stated conditions. The mixture is then rinsed out of the test cell using MEK (methyl ethyl ketone) and measured.

The residual concentrations of the respective monomer in the mixture after different UV exposure times are shown in Table 3.

In addition, the thermal stability of the compounds of formula I and the LC medium is examined by the so-called "heat load test" (HLT). Therein the LC medium is not exposed to UV radiation, but subjected to high temperature. For this purpose a sample of the LC medium is filled into a test vial which is then sealed and exposed to 120° C. for 240 minutes. Afterwards the RM concentration in the LC medium is measured. The results of the HLT are also shown in Table 3.

TABLE 3

| Residual monomer content | | | | |
|---|---|---|---|---|
| UV Exposure time/min | C11 | P11 | P12 | P13 |
| | Residual RM/Relative ratio % | | | |
| 0 | 0.3 | 0.3 | 0.3 | 0.3 |
| 1 | 0.243 | 0.281 | 0.282 | — |
| 21 | 0.049 | 0.051 | 0.058 | 0.054 |
| 0 (HLT)* | 0.300 | 0.300 | 0.300 | 0.300 |
| 240 (HLT) | 0.300 | 0.300 | 0.300 | 0.300 |

*HLT = Heat Load Test: bulk, 1 mL, 120° C.

From Table 3 it can be seen that in the mixtures P11-P13 according to the present invention, which contain a compound of formula I with a NO-HALS stabilising group and a conventional RM (RM-1), the polymerisation is delayed compared to the mixture C11 which contains only RM-1, indicated by the higher residual monomer ratio at short exposure times (1 min).

However, after long exposure time (21 min) the mixtures P11-P13 according to the present invention show an extent of polymerisation and a low amount of residual monomer that is comparable to mixture C11.

This shows that mixtures P11-P13 according to the present invention provide the advantage of suppressed pre-polymerisation (indicated by the higher amount of residual monomer after short exposure time), while still achieving a low amount of residual monomer after longer exposure time.

Overall, the use examples demonstrate that the mixtures as claimed in this application combine the advantage of a reduced pre-polymerisation with the advantages of a good pretilt angle generation and a controllable and complete polymerisation without significantly lowering the reliability.

The invention claimed is:

1. A liquid-crystal medium comprising one or more compounds of formula I $$\text{P-Sp-}(A^2\text{-}Z^2\text{-}A^1)_{m1}\text{-}Z^1\text{-T} \qquad \text{I}$$

wherein the individual radicals, independently of each other, and on each occurrence identically or differently, have the following meanings $-(A^2-Z^2-A^1)_{m1}-$ is a single bond or is selected from the following formulae

A1

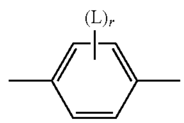

A2

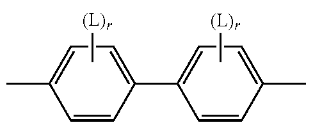

A3

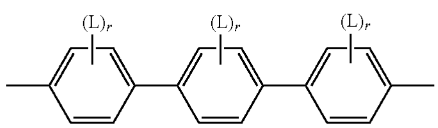

A4

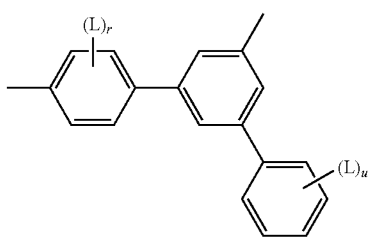

A5

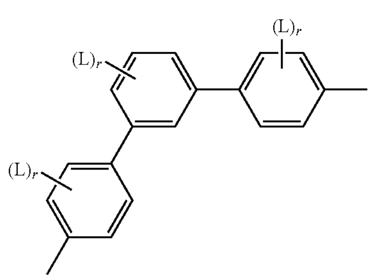

-continued

A6

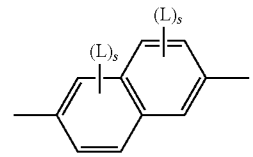

A7

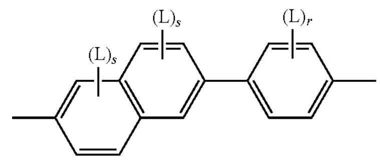

A8

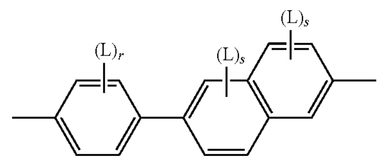

A9

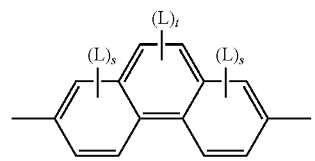

A10

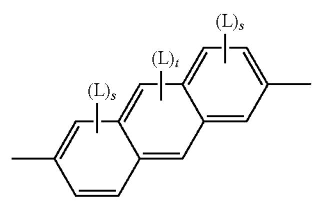

r is 0, 1, 2, 3 or 4, s is 0, 1, 2 or 3, t is 0, 1 or 2, u is 0, 1, 2, 3, 4 or 5,

T is a group selected from the following formulae 1, 2, 3 and 4, (1)

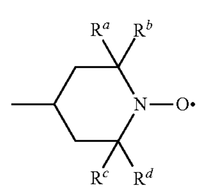

(2)

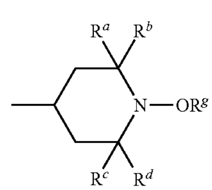

-continued (3)

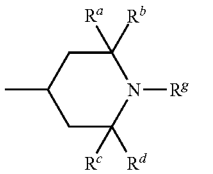

(4)

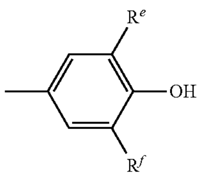

$R^{a-f}$ are, each independently, straight chain or branched alkyl with 1 to 10 C atoms, $R^g$ is H or straight chain or branched alkyl with 1 to 10 C atoms, or benzyl, P is vinyloxy, acrylate, methacrylate, fluoroacrylate, chloroacrylate, oxetane or epoxy, Sp is a spacer group or a single bond, $Z^1$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_n$—, —$CF_2CH_2$—, —$CH_2CF_2$—, —$(CF_2)_n$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^{00}R^{000}$—, or a single bond, with the proviso that, if -$(A^2$-$Z^2$-$A^1)_{m1}$- is a single bond and Sp is a single bond, $Z^1$ is a single bond, $R^{00}$, $R^{000}$ is H or alkyl having 1 to 12 C atoms, L is P-Sp-, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or P-Sp-, or L is a group selected from formula 1, 2, 3 and 4, and n is 1, 2, 3 or 4.

2. The LC medium of claim 1, wherein $R^{a-d}$ are selected, independently of each other, from methyl, ethyl, n-propyl, isopropyl, n-butyl, and t-butyl.

3. The LC medium according to claim 1, wherein the one or more compounds of formula I are selected from the following formulae

I1-1

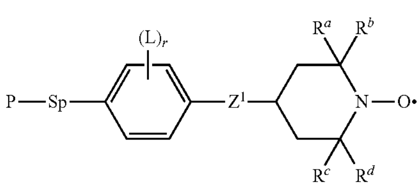

-continued

I1-2

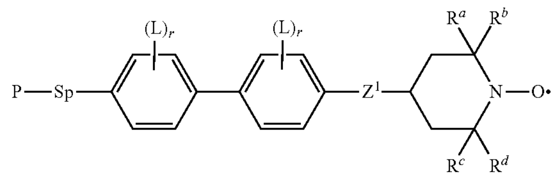

I1-3

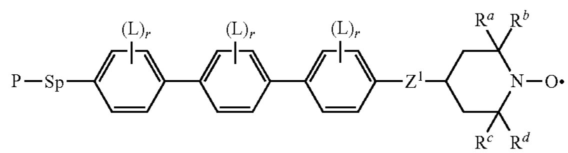

I1-4

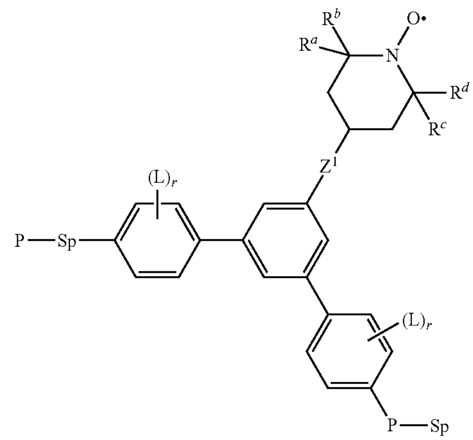

I1-5

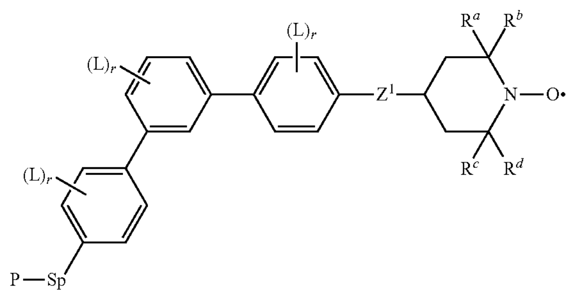

I1-6

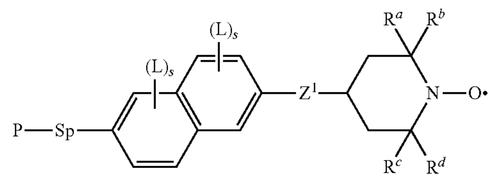

I1-7

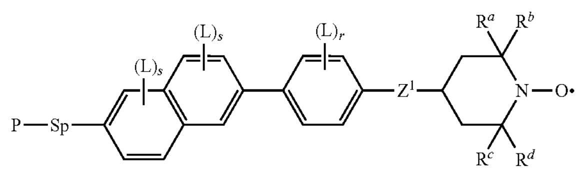

-continued
I1-8
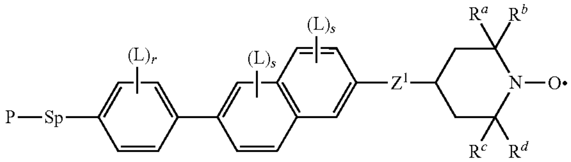
I1-9
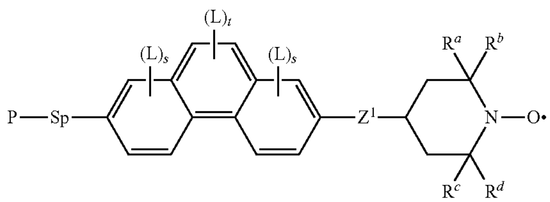
I1-10
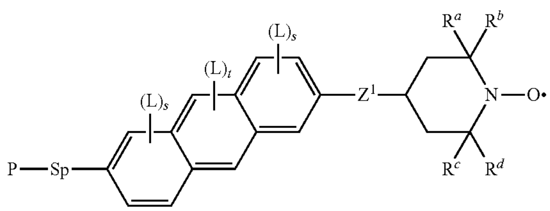
I1-11
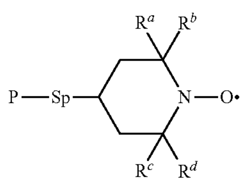
I2-1
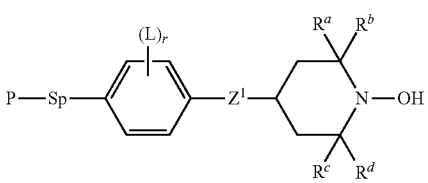
I2-2
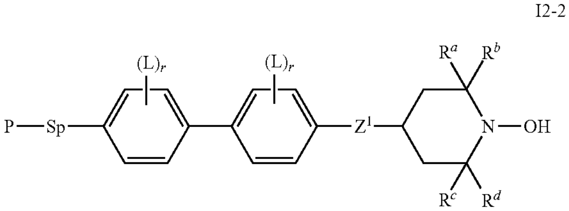
I2-3
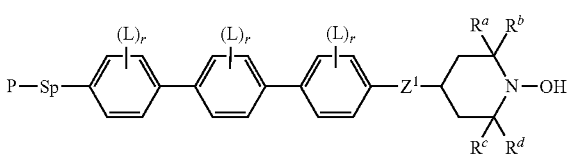
-continued
I2-4
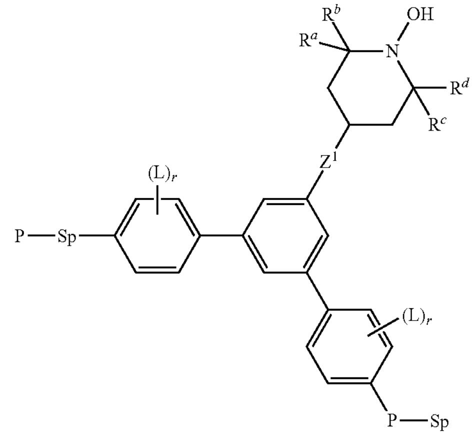
I2-5
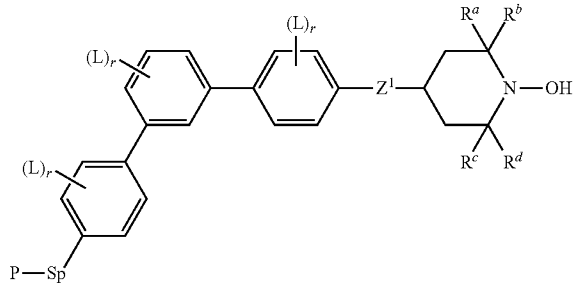
I2-6
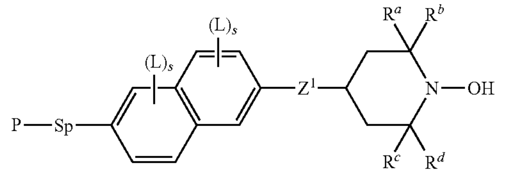
I2-7
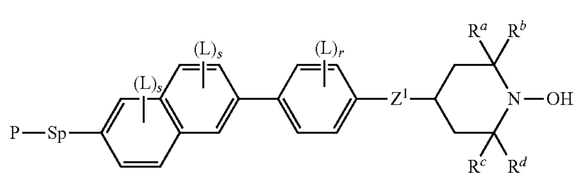
I2-8
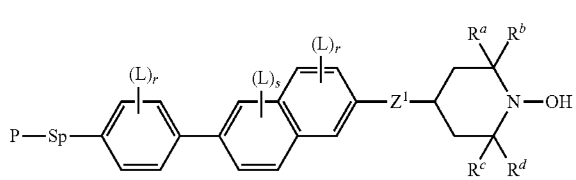
I2-9
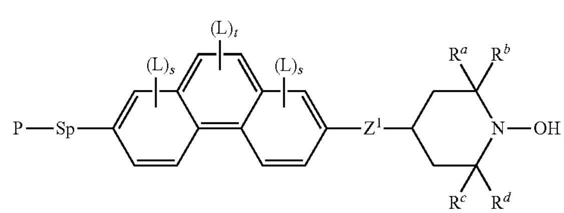

-continued
I2-10
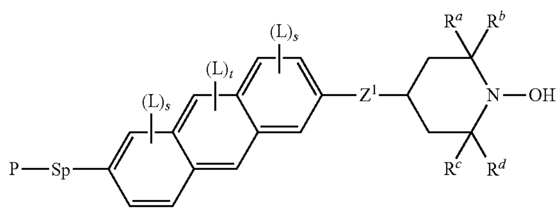
I2-11
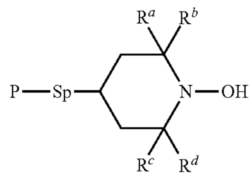
I3-1
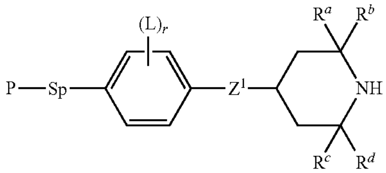
I3-2
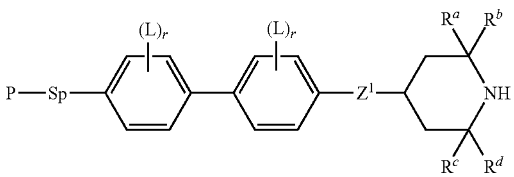
I3-3
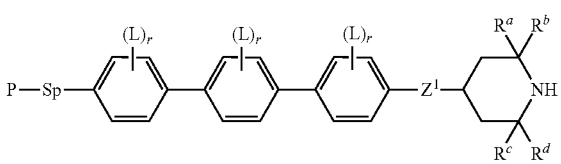
I3-4
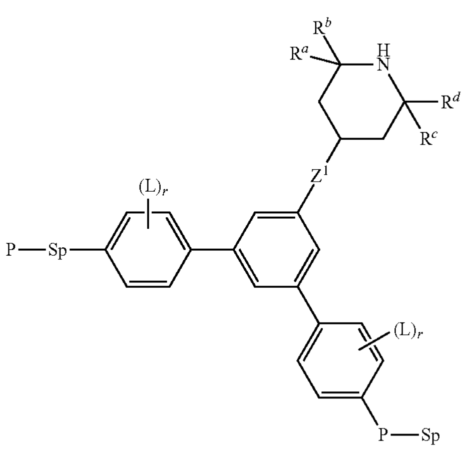
-continued
I3-5
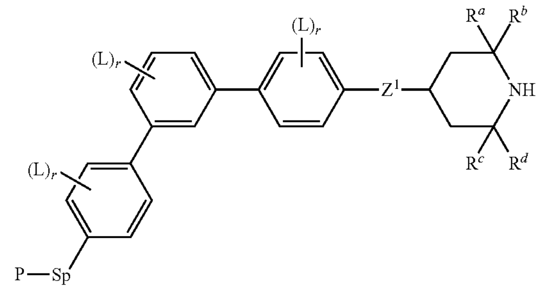
I3-6
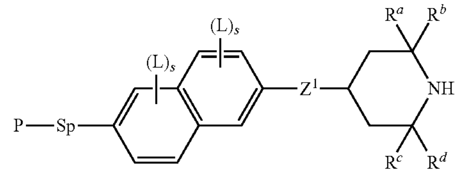
I3-7
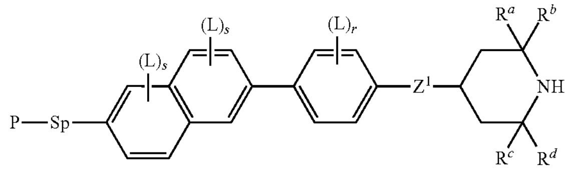
I3-8
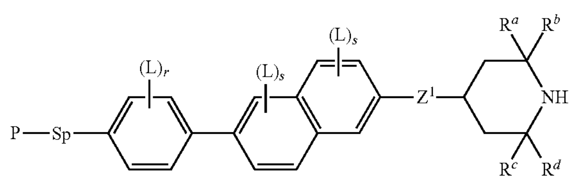
I3-9
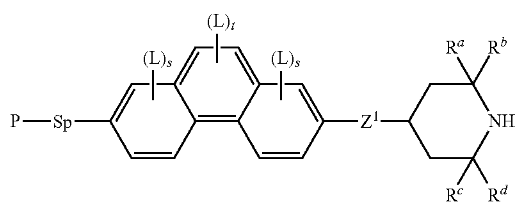
I3-10
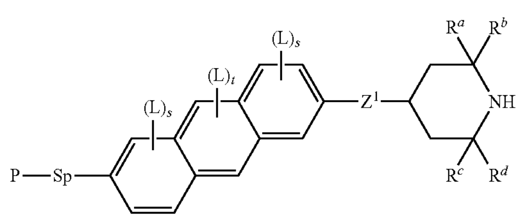
I3-11
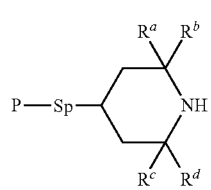

-continued
I3-12
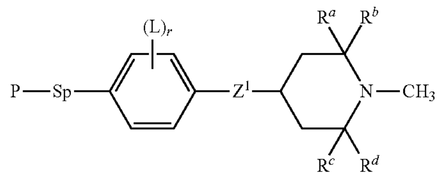
I3-13
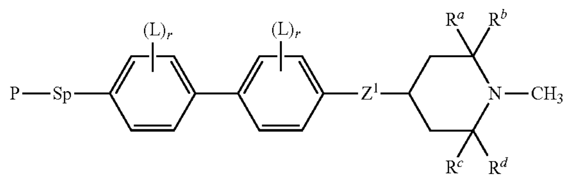
I3-14
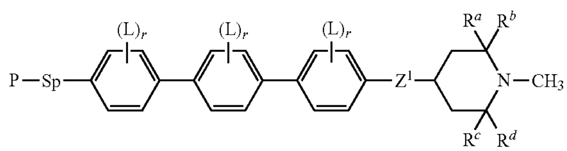
I3-15
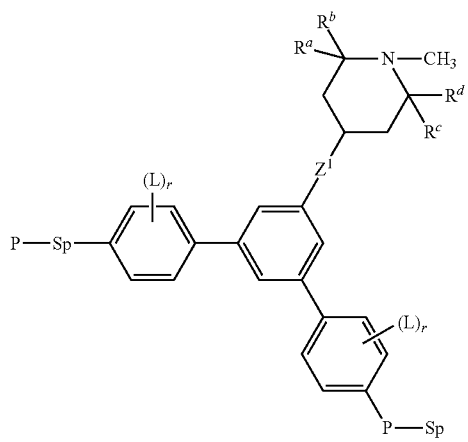
I3-16
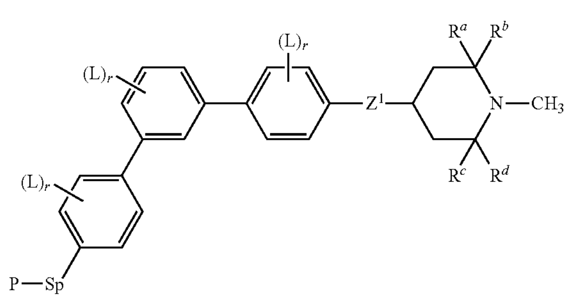
I3-17
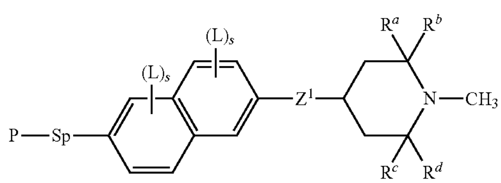
-continued
I3-18
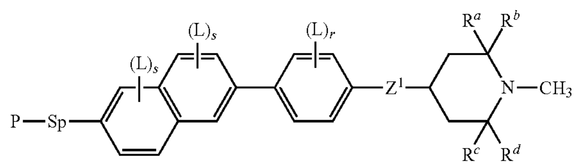
I3-19
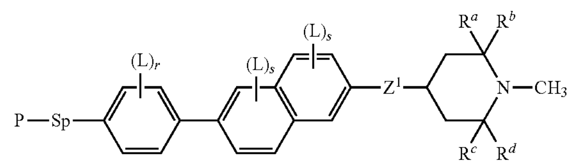
I3-20
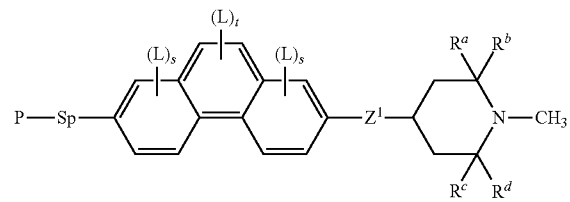
I3-21
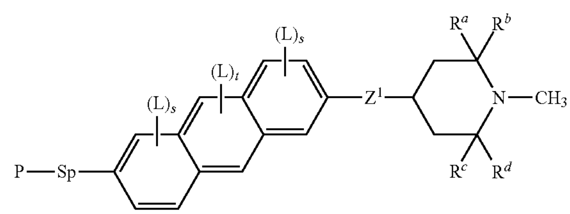
I3-22
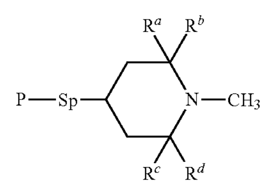
I4-1
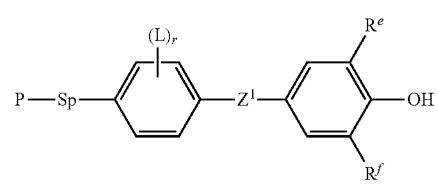
I4-2
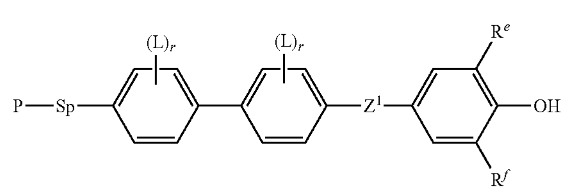
I4-3
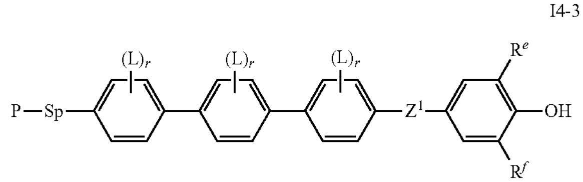

-continued

I4-4

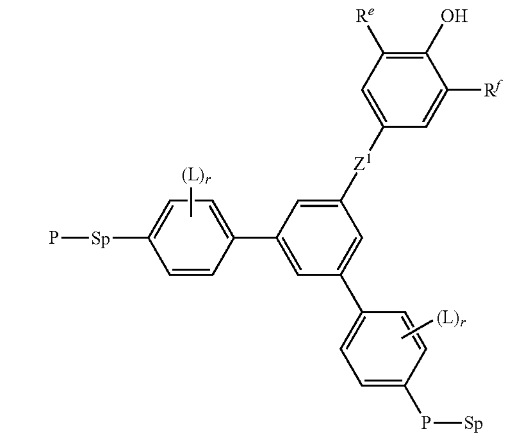

I4-5

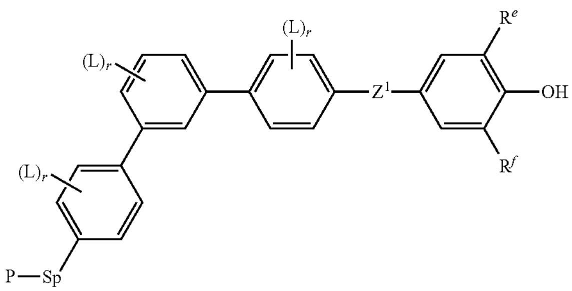

I4-6

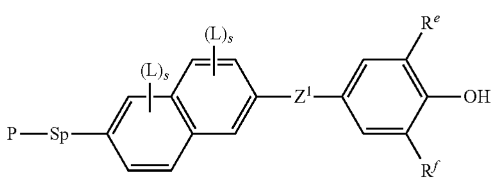

I4-7

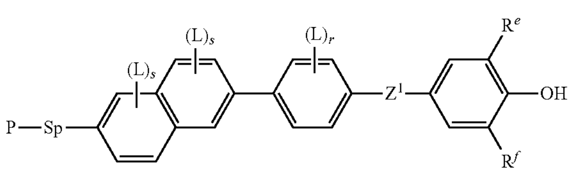

I4-8

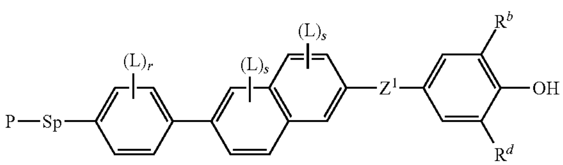

I4-9

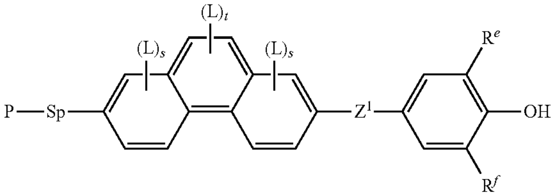

-continued

I4-10

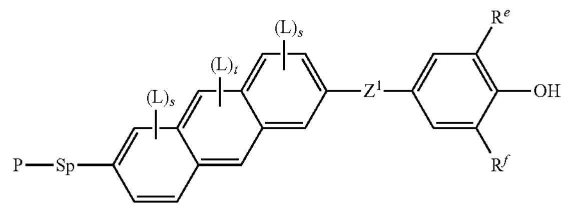

I4-11

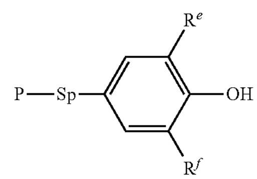

wherein

P, Sp, $R^{a-f}$, $Z^1$, and L are as defined for the compound of formula I, r is 0, 1, 2, 3 or 4 and s is 0, 1, 2 or 3.

4. The LC medium according to claim 1, wherein $Z^1$ denotes —CO—O—, —O—CO— or a single bond.

5. The LC medium according to claim 1, wherein P is acrylate or methacrylate.

6. The LC medium according to claim 1, wherein Sp is a single bond.

7. The LC medium according to claim 1, which additionally comprises one or more polymerisable compounds that are different from formula I.

8. The LC medium of claim 7, which comprises a polymerisable component A) comprising one or more polymerisable compounds of formula I, and optionally one or more polymerisable compounds different from formula I, and a liquid-crystalline LC component B) comprising one or more mesogenic or liquid-crystalline compounds.

9. The LC medium according to claim 7, wherein the said polymerisable compounds that are different from formula I are selected from the following formulae

M1

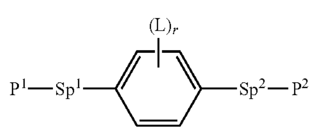

M2

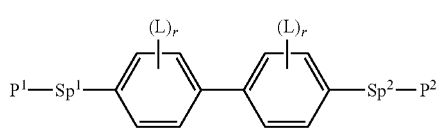

M3

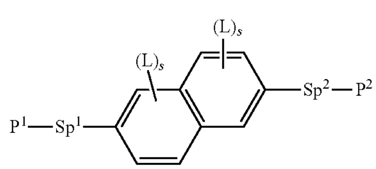

M4

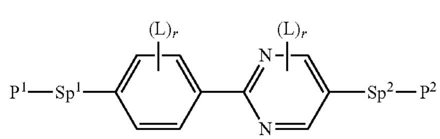

-continued
M5
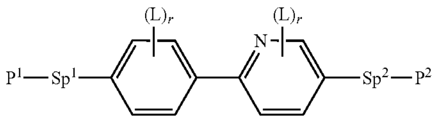
M6
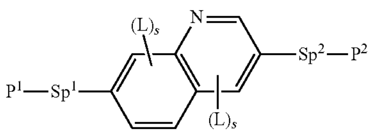
M7
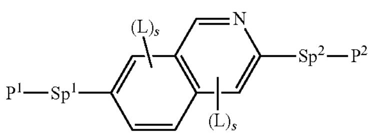
M8
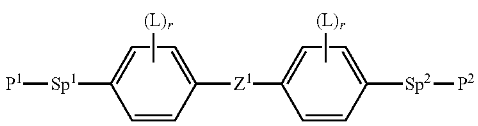
M9
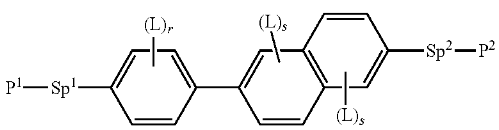
M10
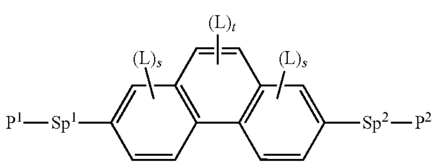
M11
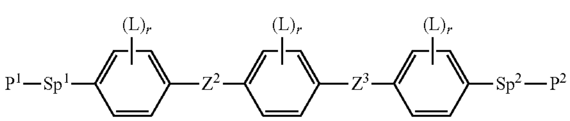
M12
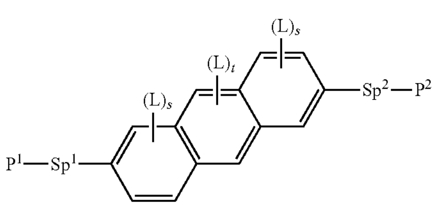
M13
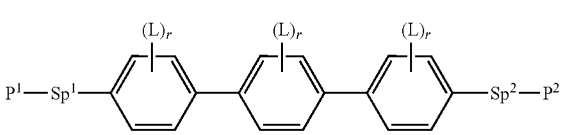
M14
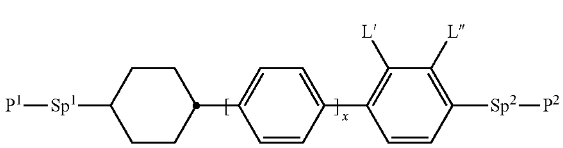
-continued
M15
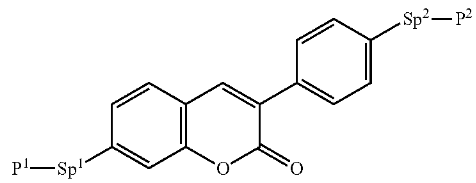
M16
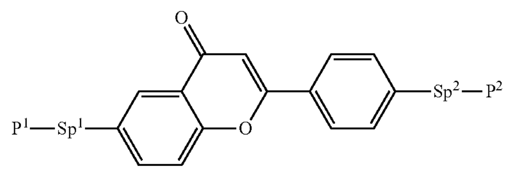
M17
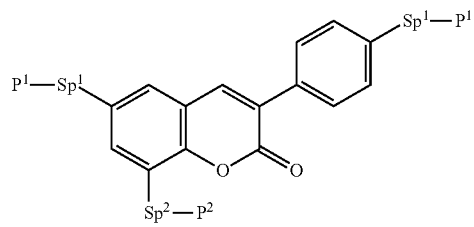
M18
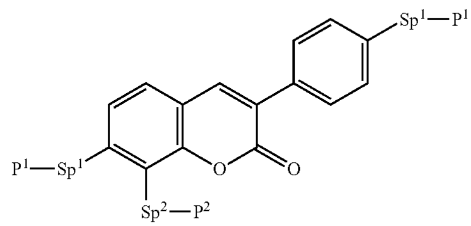
M19
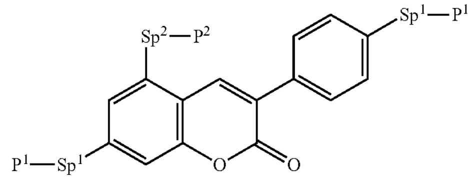
M20
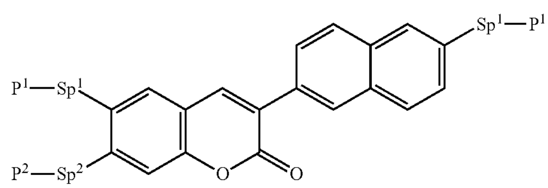
M21
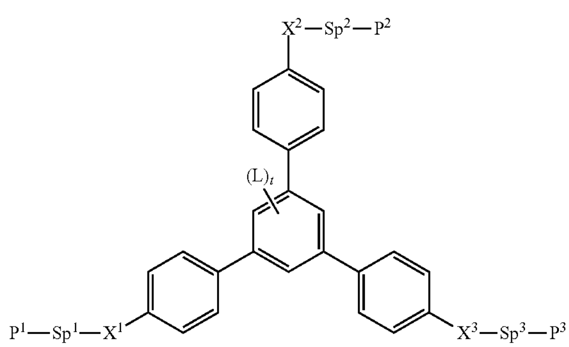

-continued

M22

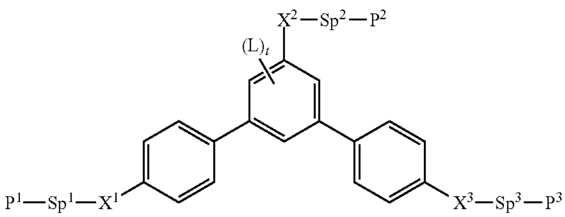

M23

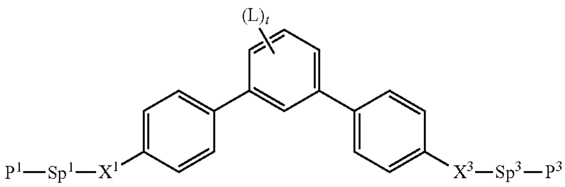

M24

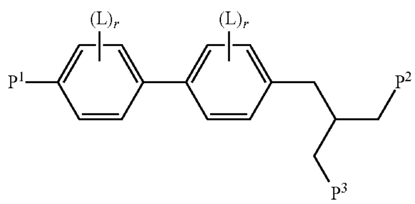

M25

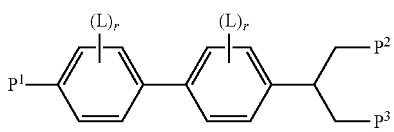

M26

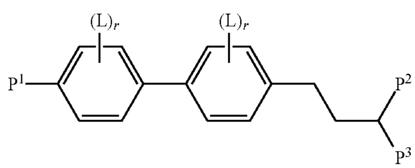

M27

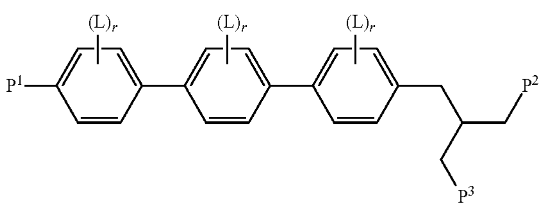

M28

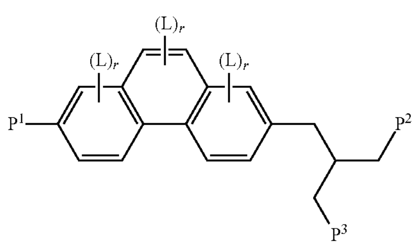

M29

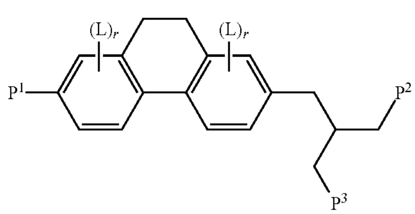

-continued

M30

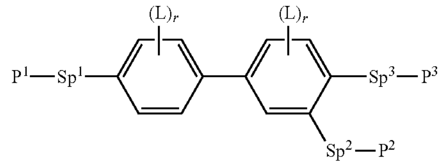

M31

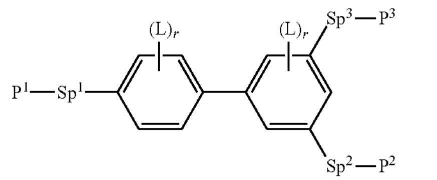

in which the individual radicals have the following meanings:

$P^1$, $P^2$, $P^3$ each, independently of one another, denote an acrylate or methacrylate group, $Sp^1$, $Sp^2$, $Sp^3$ each, independently of one another, denote a single bond or a spacer group, $R^{aa}$ denotes H, F, Cl, CN or straight-chain or branched alkyl having 1 to 25 C atoms, in which one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which one or more H atoms may be replaced by F, Cl, CN or $P^1$—$Sp^1$-, $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

10. The LC medium according to claim 9, wherein the one or more polymerisable compounds that are different from formula I are of formula M2.

11. The LC medium according to claim 1, which further comprises one or more compounds selected from the formulae CY and PY:

CY

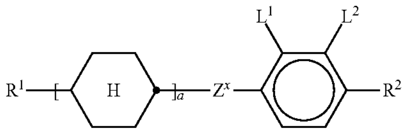

PY

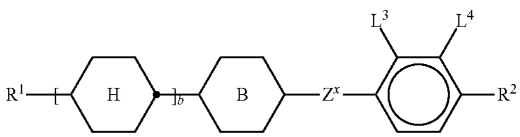

in which the individual radicals have the following meanings:

a denotes 1 or 2, b denotes 0 or 1,

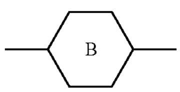
denotes

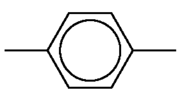
or
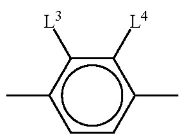

$R^1$ and $R^2$ each, independently of one another, denote alkyl having 1 to 12 C atoms, in which one or two non-adjacent $CH_2$ groups may be replaced by —O—, —CH═CH—, —CO—, —O—CO— or —CO—O— in such a way that O atoms are not linked directly to one another, $Z^x$ denotes —CH═CH—, —$CH_2$O—, —O$CH_2$—, —$CF_2$O—, —O$CF_2$—, —O—, —$CH_2$—, —$CH_2CH_2$— or a single bond, and $L^{1-4}$ each, independently of one another, denote F, Cl, $OCF_3$, $CF_3$, $CH_3$, $CH_2F$, or $CHF_2$.

12. The LC medium according to claim 1, which further comprises one or more compounds selected from the following formulae:

AN

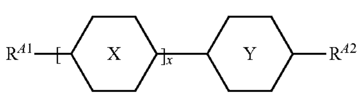

AY

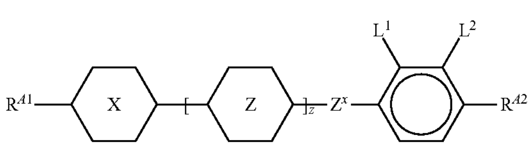

in which the individual radicals, on each occurrence identically or differently, each, independently of one another, have the following meaning:

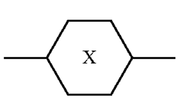
is
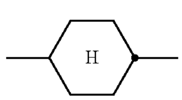
,

-continued

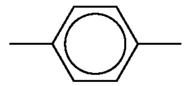
,
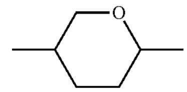
,
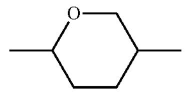
,
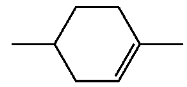
or
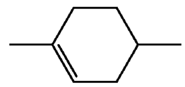
,

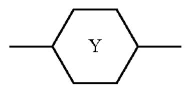
is
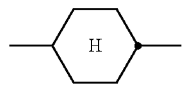
,
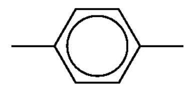
,
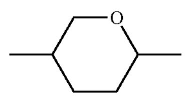
,
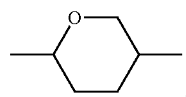
,
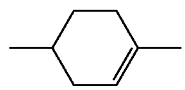
or
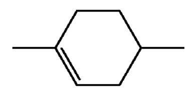
,

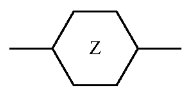
is
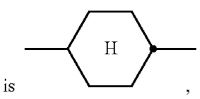
,
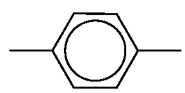
,
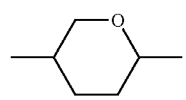
,
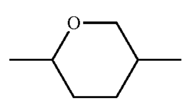
,
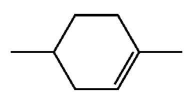
,
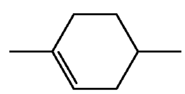
or
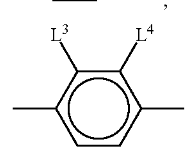

$R^{A1}$ is alkenyl having 2 to 9 C atoms or, if at least one of the rings X, Y and Z denotes cyclohexenyl, also one of the meanings of $R^{A2}$, $R^{A2}$ is alkyl having 1 to 12 C atoms, in which one or two non-adjacent $CH_2$ groups may be replaced by —O—, —CH═CH—, —CO—, —OCO— or —COO— in such a way that O atoms are not linked directly to one another, $Z^x$ is —$CH_2CH_2$—, —CH═CH—, —$CF_2$O—, —O$CF_2$—, —$CH_2$O—, —O$CH_2$—, —CO—O—, —O—CO—, —$C_2F_4$—, —CF═CF—, —CH═CH—$CH_2$O—, or a single bond, $L^{1-4}$ each, independently of one another, is H, F, Cl, $OCF_3$, $CF_3$, $CH_3$, $CH_2F$ or $CHF_2H$, x is 1 or 2, and z is 0 or 1.

13. The LC medium according to claim 1, which further comprises one or more compounds of the following formula:

ZK

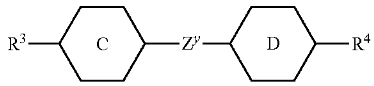

in which the individual radicals have the following meanings:

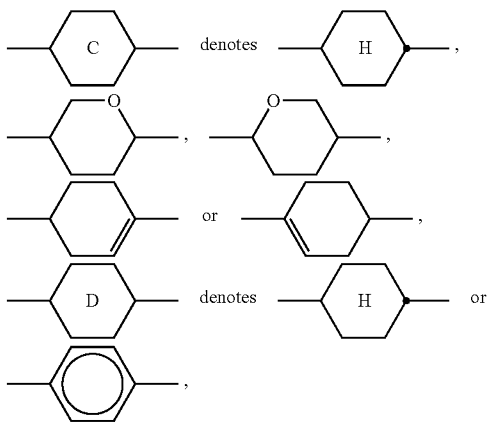

$R^3$ and $R^4$ each, independently of one another, denote alkyl having 1 to 12 C atoms, in which one or two non-adjacent $CH_2$ groups may be replaced by —O—, —CH═CH—, —CO—, —O—CO— or —CO—O— in such a way that O atoms are not linked directly to one another, and $Z^y$ denotes —$CH_2CH_2$—, —CH═CH—, —$CF_2O$—, —$OCF_2$—, —$CH_2O$—, —$OCH_2$—, —COO—, —OCO—, —$C_2F_4$—, —CF═CF— or a single bond.

14. The LC medium according to claim 1, wherein the polymerisable compounds are polymerised.

15. A process of preparing an LC medium of claim 1, comprising mixing one or more liquid-crystalline compounds, or a liquid-crystalline component B) comprising one or more liquid-crystalline compounds, with one or more compounds of formula I, optionally with one or more polymerisable compounds that are different from formula I, and optionally with further liquid-crystalline compounds and/or additives.

16. An LC display comprising one or more compounds of formula I $$\text{P-Sp-}(A^2\text{-}Z^2\text{-}A^1)_{m1}\text{-}Z^1\text{-T} \qquad \text{I}$$

wherein the individual radicals, independently of each other, and on each occurrence identically or differently, have the following meanings -$(A^2\text{-}Z^2\text{-}A^1)_{m1}$- is a single bond or is selected from the following formulae

A1

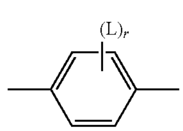

-continued

A2

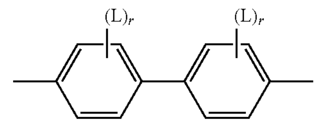

A3

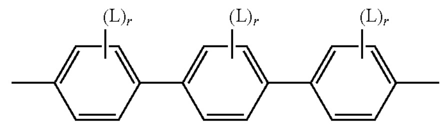

A4

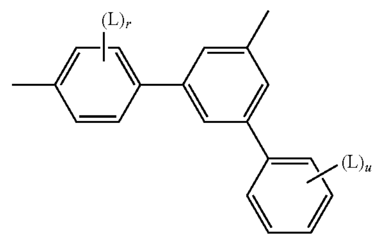

A5

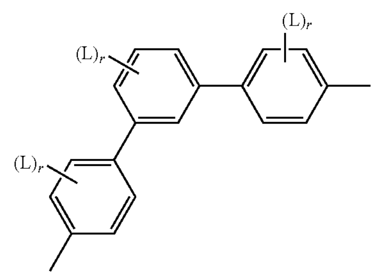

A6

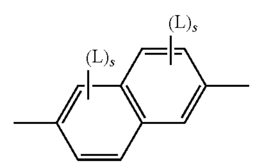

A7

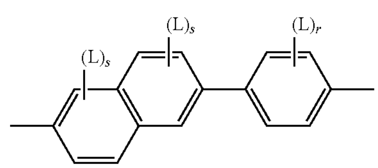

A8

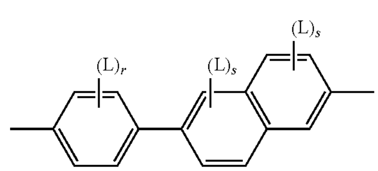

A9

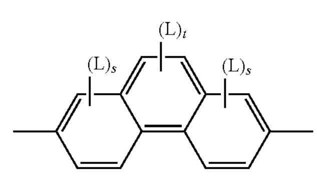

-continued

A10

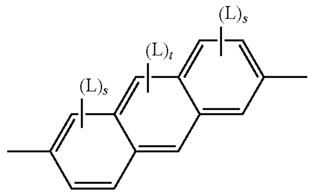

r is 0, 1, 2, 3 or 4, s is 0, 1, 2 or 3, t is 0, 1 or 2, u is 0, 1, 2, 3, 4 or 5,

T is a group selected from the following formulae 1, 2, 3 and 4, (1)

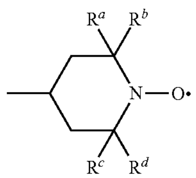

(2)

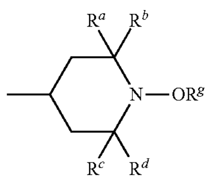

(3)

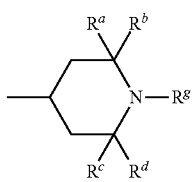

(4)

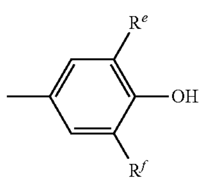

$R^{a-f}$ are, each independently, straight chain or branched alkyl with 1 to 10 C atoms, $R^g$ is H or straight chain or branched alkyl with 1 to 10 C atoms, or benzyl, P is vinyloxy, acrylate, methacrylate, fluoroacrylate, chloroacrylate, oxetane or epoxy, Sp is a spacer group or a single bond, $Z^1$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$, —$SCF_2$—, —$(CH_2)_n$, —$CF_2CH_2$—, —$CH_2CF_2$—, —$(CF_2)_n$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^{00}R^{000}$—, or a single bond, with the proviso that, if -$(A^2$-$Z^2$-$A^1)_{m1}$- is a single bond and Sp is a single bond, $Z^1$ is a single bond, $R^{00}$, $R^{000}$ is H or alkyl having 1 to 12 C atoms, L is P-Sp-, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or P-Sp-, or L is a group selected from formula 1, 2, 3 and 4, and n is 1, 2, 3 or 4.

17. The LC display of claim 16, which is a PSA display.

18. The LC display of claim 16, which is a PS-VA, PS-OCB, PS-IPS, PS-FFS, PS-UB-FFS, PS-posi-VA or PS-TN display.

19. The LC display of claim 18, which comprises two substrates, at least one which is transparent to light, an electrode provided on each substrate or two electrodes provided on only one of the substrates, and located between the substrates a layer of an LC medium, comprising one or more polymerisable compounds of formula I, wherein the polymerisable compounds are polymerised between the substrates of the display.

20. A process for the production of an LC display according to claim 19, comprising providing an LC medium, which comprises one or more polymerisable compounds of formula I, between the substrates of the display, and polymerising the polymerisable compounds.

21. A compound of formula I $$\text{P-Sp-}(A^2\text{-}Z^2\text{-}A^1)_{m1}\text{-}Z^1\text{-T} \qquad \text{I}$$

wherein the individual radicals, independently of each other, and on each occurrence identically or differently, have the following meanings -$(A^2$-$Z^2$-$A^1)_{m1}$- is selected from the following formulae

A1

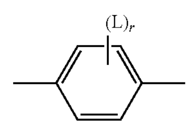

A2

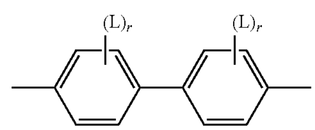

A3

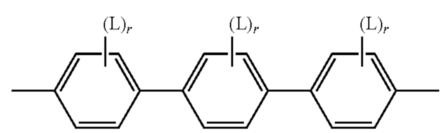

A4

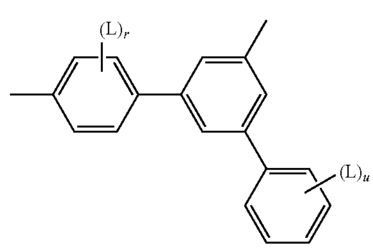

-continued

A5

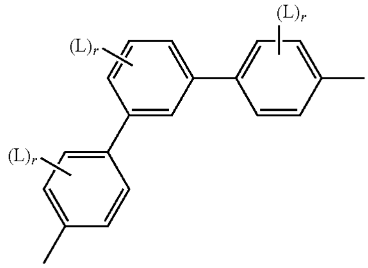

A6

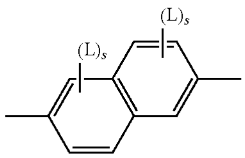

A7

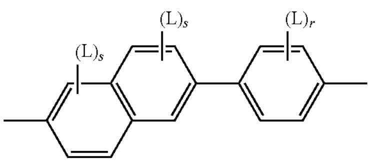

A8

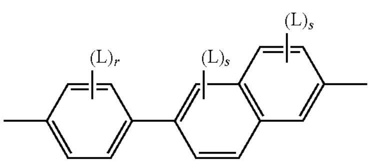

A9

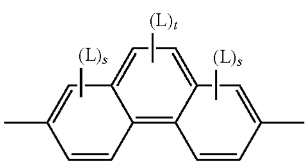

A10

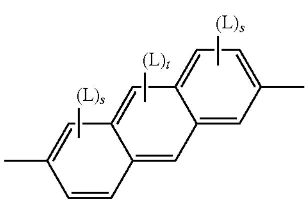

r is 0, 1, 2, 3 or 4, s is 0, 1, 2 or 3, t is 0, 1 or 2, u is 0, 1, 2, 3, 4 or 5,

T is a group selected from the following formulae 1, 2, 3 and 4, (1)

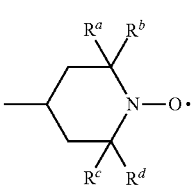

-continued (2)

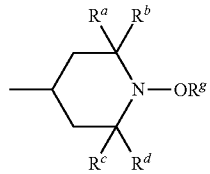

(3)

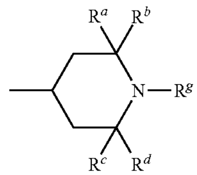

(4)

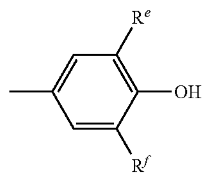

$R^{a-f}$ are, each independently, straight chain or branched alkyl with 1 to 10 C atoms, $R^g$ is H or straight chain or branched alkyl with 1 to 10 C atoms, or benzyl, P is vinyloxy, acrylate, methacrylate, fluoroacrylate, chloroacrylate, oxetane or epoxy, Sp is a spacer group or a single bond, $z^1$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_n$—, —$CF_2CH_2$—, —$CH_2CF_2$—, —$(CF_2)_n$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^{00}R^{000}$—, or a single bond, with the proviso that, if -$(A^2\text{-}Z^2\text{-}A^1)_{m1}$- is a single bond and Sp is a single bond, $Z^1$ is a single bond, $R^{00}$, $R^{000}$ is H or alkyl having 1 to 12 C atoms, L is P-Sp-, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or P-Sp-, or L is a group selected from formula 1, 2, 3 and 4, and n is 1, 2, 3 or 4.

22. A process for preparing a compound of formula I according to claim 21, comprising esterifying a compound of formula II $$Pg\text{-}Sp\text{-}(A^2\text{-}Z^2\text{-}A^1)_{m1}\text{-}Z^1\text{-}T \qquad \text{II}$$

wherein

-$(A^2\text{-}Z^2\text{-}A^1)_{m1}$- is defined as for the compound of formula I, T is a group selected from the following formulae 1, 2, 3 and 4

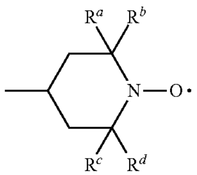

(1)

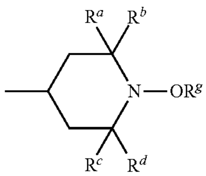

(2)

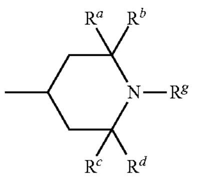

(3)

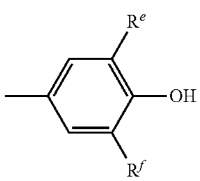

(4)

$R^{a-f}$ are, each independently, straight chain or branched alkyl with 1 to 10 C atoms, $R^g$ is H or straight chain or branched alkyl with 1 to 10 C atoms, or benzyl, Sp a spacer group or a single bond, $Z^1$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_n$—, —$CF_2CH_2$—, —$CH_2CF_2$—, —$(CF_2)_n$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^{00}R^{000}$—, or a single bond, with the proviso that, if -$(A^2$-$Z^2$-$A^1)_{m1}$- is a single bond and Sp is a single bond, $Z^1$ is a single bond, $R^{00}$, $R^{000}$ is H or alkyl having 1 to 12 C atoms, L is Pg-Sp-, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or Pg-Sp-, or L is a group selected from formula 1, 2, 3 and 4, n 1, 2, 3 or 4, and Pg denotes OH, by a corresponding acid, acid derivative, or halogenated compound containing a group P, in the presence of a dehydrating reagent.

23. An LC display comprising an LC medium according to claim 1.

24. A compound of formula I according to claim 21, wherein -$(A^2$-$Z^2$-$A^1)_{m1}$- is of formula A1 to A2.

25. A compound of formula I according to claim 21, wherein -$(A^2$-$Z^2$-$A^1)_{m1}$- is of formula A3 to A5.

26. A compound of formula I according to claim 21, wherein -$(A^2$-$Z^2$-$A^1)_{m1}$- is of formula A6 to A10.

* * * * *